(12) United States Patent
Suzuki et al.

(10) Patent No.: US 8,818,108 B2
(45) Date of Patent: Aug. 26, 2014

(54) DIGITAL PIXEL ADDITION METHOD AND DEVICE FOR PROCESSING PLURALITY OF IMAGES

(75) Inventors: Daisuke Suzuki, Tokyo (JP); Koichi Yamashita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 289 days.

(21) Appl. No.: 13/494,742

(22) Filed: Jun. 12, 2012

(65) Prior Publication Data

US 2013/0071036 A1   Mar. 21, 2013

(30) Foreign Application Priority Data

Sep. 20, 2011   (JP) ................... 2011-204651

(51) Int. Cl.
*G06K 9/68* (2006.01)
(52) U.S. Cl.
CPC ....................... *G06K 9/68* (2013.01)
USPC ......................................................... 382/218
(58) Field of Classification Search
USPC ......................................................... 382/218
See application file for complete search history.

(56) References Cited

U.S. PATENT DOCUMENTS

| | | | |
|---|---|---|---|
| 4,982,294 A | | 1/1991 | Morton et al. |
| 5,550,936 A | * | 8/1996 | Someya et al. ............... 382/263 |
| 6,201,896 B1 | * | 3/2001 | Ishikawa ....................... 382/236 |
| 2009/0033773 A1 | | 2/2009 | Kinoshita et al. |

FOREIGN PATENT DOCUMENTS

| | | |
|---|---|---|
| JP | 2-504324 A | 12/1990 |
| JP | 2000-184274 A | 6/2000 |
| JP | 2005-6283 A | 1/2005 |
| JP | 2006-033333 A | 2/2006 |
| JP | 2007-312304 A | 11/2007 |
| JP | 2010-004396 A | 1/2010 |
| JP | 2011-109576 A | 6/2011 |
| WO | WO 2007/020930 A1 | 2/2007 |

* cited by examiner

*Primary Examiner* — Stephen R Koziol
*Assistant Examiner* — Totam Le
(74) *Attorney, Agent, or Firm* — Birch, Stewart, Kolasch & Birch, LLP

(57) ABSTRACT

An image processing device includes an in-plane pattern detector that selects a pixel of interest in a frame image of interest, calculates in-plane correlation index values representing correlations between the pixel of interest and in-plane pixel patterns including the pixel of interest, and selects a most highly correlated pattern as an in-plane addition pattern. A reference pattern detector calculates inter-plane correlation index values representing correlations between the in-plane pixel addition pattern and reference pixel patterns in a reference frame image temporally adjoining the frame of interest, and selects a most highly correlated reference pixel pattern. A pixel adder adds the values of the pixels in the selected in-plane pixel pattern and the selected reference pixel addition pattern to generate a corrected pixel value, thereby achieving high sensitivity and a high signal-to-noise ratio under low illumination, with little loss of resolution.

17 Claims, 90 Drawing Sheets

| G00 | R10 | G20 | R30 | G40 | R50 | G60 | R70 | G80 | R90 | GA0 | ← Fx |
|-----|-----|-----|-----|-----|-----|-----|-----|-----|-----|-----|------|
| B01 | G11 | B21 | G31 | B41 | G51 | B61 | G71 | B81 | G91 | BA1 | |
| G02 | R12 | G22 | R32 | G42 | R52 | G62 | R72 | G82 | R92 | GA2 | |
| B03 | G13 | B23 | G33 | B43 | G53 | B63 | G73 | B83 | G93 | BA3 | |
| G04 | R14 | G24 | R34 | G44 | R54 | G64 | R74 | G84 | R94 | GA4 | |
| B05 | G15 | B25 | G35 | B45 | G55 | B65 | G75 | B85 | G95 | BA5 | |
| G06 | R16 | G26 | R36 | G46 | R56 | G66 | R76 | G86 | R96 | GA6 | |
| B07 | G17 | B27 | G37 | B47 | G57 | B67 | G77 | B87 | G97 | BA7 | |
| G08 | R18 | G28 | R38 | G48 | R58 | G68 | R78 | G88 | R98 | GA8 | |
| B09 | G19 | B29 | G39 | B49 | G59 | B69 | G79 | B89 | G99 | BA9 | |
| G0A | R1A | G2A | R3A | G4A | R5A | G6A | R7A | G8A | R9A | GAA | |

FIG. 15

| G00 | | G20 | | G40 | | G60 | | G80 | | GA0 | ← Fx |
|-----|-----|-----|-----|-----|-----|-----|-----|-----|-----|-----|------|
| | G11 | | G31 | | G51 | | G71 | | G91 | | |
| G02 | | G22 | | G42 | | G62 | | G82 | | GA2 | |
| | G13 | | G33 | | G53 | | G73 | | G93 | | |
| G04 | | G24 | | G44 | | G64 | | G84 | | GA4 | |
| | G15 | | G35 | | G55 | | G75 | | G95 | | |
| G06 | | G26 | | G46 | | G66 | | G86 | | GA6 | |
| | G17 | | G37 | | G57 | | G77 | | G97 | | |
| G08 | | G28 | | G48 | | G68 | | G88 | | GA8 | |
| | G19 | | G39 | | G59 | | G79 | | G99 | | |
| G0A | | G2A | | G4A | | G6A | | G8A | | GAA | |

FIG. 16

| R00 | G10 | R20 | G30 | R40 | G50 | R60 | G70 | R80 | G90 | RA0 | ← Fx |
|---|---|---|---|---|---|---|---|---|---|---|---|
| G01 | B11 | G21 | B31 | G41 | B51 | G61 | B71 | G81 | B91 | GA1 | |
| R02 | G12 | R22 | G32 | R42 | G52 | R62 | G72 | R82 | G92 | RA2 | |
| G03 | B13 | G23 | B33 | G43 | B53 | G63 | B73 | G83 | B93 | GA3 | |
| R04 | G14 | R24 | G34 | R44 | G54 | R64 | G74 | R84 | G94 | RA4 | |
| G05 | B15 | G25 | B35 | G45 | B55 | G65 | B75 | G85 | B95 | GA5 | |
| R06 | G16 | R26 | G36 | R46 | G56 | R66 | G76 | R86 | G96 | RA6 | |
| G07 | B17 | G27 | B37 | G47 | B57 | G67 | B77 | G87 | B97 | GA7 | |
| R08 | G18 | R28 | G38 | R48 | G58 | R68 | G78 | R88 | G98 | RA8 | |
| G09 | B19 | G29 | B39 | G49 | B59 | G69 | B79 | G89 | B99 | GA9 | |
| R0A | G1A | R2A | G3A | R4A | G5A | R6A | G7A | R8A | G9A | RAA | |

| | | | | | | | | | | | |
|---|---|---|---|---|---|---|---|---|---|---|---|
| G00 | | G20 | | G40 | | G60 | | G80 | | GA0 | ←NR2 |
| | G11 | | G31 | | G51 | | G71 | | G91 | | |
| G02 | | G22 | | G42 | | G62 | | G82 | | GA2 | |
| | G13 | | G33 | | G53 | | G73 | | G93 | | |
| G04 | | G24 | | G44 | | G64 | | G84 | | GA4 | |
| | G15 | | G35 | | G55 | | G75 | | G95 | | |
| G06 | | G26 | | G46 | | G66 | | G86 | | GA6 | |
| | G17 | | G37 | | G57 | | G77 | | G97 | | |
| G08 | | G28 | | G48 | | G68 | | G88 | | GA8 | |
| | G19 | | G39 | | G59 | | G79 | | G99 | | |
| G0A | | G2A | | G4A | | G6A | | G8A | | GAA | |

FIG. 25

| | | | | | | | | | | | |
|---|---|---|---|---|---|---|---|---|---|---|---|
| G00 | | G20 | | G40 | | G60 | | G80 | | GA0 | ←NR2 |
| | G11 | | G31 | | G51 | | G71 | | G91 | | |
| G02 | | G22 | | G42 | | G62 | | G82 | | GA2 | |
| | G13 | | G33 | | G53 | | G73 | | G93 | | |
| G04 | | G24 | | G44 | | G64 | | G84 | | GA4 | |
| | G15 | | G35 | | G55 | | G75 | | G95 | | |
| G06 | | G26 | | G46 | | G66 | | G86 | | GA6 | |
| | G17 | | G37 | | G57 | | G77 | | G97 | | |
| G08 | | G28 | | G48 | | G68 | | G88 | | GA8 | |
| | G19 | | G39 | | G59 | | G79 | | G99 | | |
| G0A | | G2A | | G4A | | G6A | | G8A | | GAA | |

| | | | | | | | | | | | |
|---|---|---|---|---|---|---|---|---|---|---|---|
| G00 | | G20 | | G40 | | G60 | | G80 | | GA0 | ←NR2 |
| | G11 | | G31 | | G51 | | G71 | | G91 | | |
| G02 | | G22 | | G42 | | G62 | | G82 | | GA2 | |
| | G13 | | G33 | | G53 | | G73 | | G93 | | |
| G04 | | G24 | | G44 | | G64 | | G84 | | GA4 | |
| | G15 | | G35 | | G55 | | G75 | | G95 | | |
| G06 | | G26 | | G46 | | G66 | | G86 | | GA6 | |
| | G17 | | G37 | | G57 | | G77 | | G97 | | |
| G08 | | G28 | | G48 | | G68 | | G88 | | GA8 | |
| | G19 | | G39 | | G59 | | G79 | | G99 | | |
| G0A | | G2A | | G4A | | G6A | | G8A | | GAA | |

FIG. 31

| | | | | | | | | | | | |
|---|---|---|---|---|---|---|---|---|---|---|---|
| G00 | | G20 | | G40 | | G60 | | G80 | | GA0 | ←NR2 |
| | G11 | | G31 | | G51 | | G71 | | G91 | | |
| G02 | | G22 | | G42 | | G62 | | G82 | | GA2 | |
| | G13 | | G33 | | G53 | | G73 | | G93 | | |
| G04 | | G24 | | G44 | | G64 | | G84 | | GA4 | |
| | G15 | | G35 | | G55 | | G75 | | G95 | | |
| G06 | | G26 | | G46 | | G66 | | G86 | | GA6 | |
| | G17 | | G37 | | G57 | | G77 | | G97 | | |
| G08 | | G28 | | G48 | | G68 | | G88 | | GA8 | |
| | G19 | | G39 | | G59 | | G79 | | G99 | | |
| G0A | | G2A | | G4A | | G6A | | G8A | | GAA | |

| G100 | | G120 | | G140 | | G160 | | G180 | | G1A0 | |
| | G111 | | G131 | | G151 | | G171 | | G191 | | |
| G102 | | G122 | | G142 | | G162 | | G182 | | G1A2 | |
| | G113 | | G133 | | G153 | | G173 | | G193 | | |
| G104 | | G124 | | G144 | | G164 | | G184 | | G1A4 | |
| | G115 | | G135 | | G155 | | G175 | | G195 | | |
| G106 | | G126 | | G146 | | G166 | | G186 | | G1A6 | |
| | G117 | | G137 | | G157 | | G177 | | G197 | | |
| G108 | | G128 | | G148 | | G168 | 78 | G188 | | G1A8 | |
| | G119 | | G139 | | G159 | | G179 | | G199 | | |
| G10A | | G12A | | G14A | | G16A | | G18A | | G1AA | |

| G00 | | G20 | | G40 | | G60 | | G80 | | GA0 | |
| | G11 | | G31 | | G51 | | G71 | | G91 | | |
| G02 | | G22 | | G42 | | G62 | | G82 | | GA2 | |
| | G13 | | G33 | | G53 | | G73 | | G93 | | |
| G04 | | G24 | | G44 | | G64 | | G84 | | GA4 | |
| | G15 | | G35 | | G55 | | G75 | | G95 | | |
| G06 | | G26 | | G46 | | G66 | | G86 | | GA6 | |
| | G17 | | G37 | | G57 | | G77 | | G97 | | |
| G08 | | G28 | | G48 | | G68 | | G88 | | GA8 | |
| | G19 | | G39 | | G59 | | G79 | | G99 | | |
| G0A | | G2A | | G4A | | G6A | | G8A | | GAA | |

| NR1D | | | | | | | | | | | |
|---|---|---|---|---|---|---|---|---|---|---|---|
| G100 | | G120 | | G140 | | G160 | | G180 | | G1A0 | |
| | G111 | | G131 | | G151 | | G171 | | G191 | | |
| G102 | | G122 | | G142 | | G162 | | G182 | | G1A2 | |
| | G113 | | G133 | | G153 | | G173 | | G193 | | |
| G104 | | G124 | | G144 | | G164 | | G184 | | G1A4 | |
| | G115 | | G135 | | G155 | | G175 | | G195 | | |
| G106 | | G126 | | G146 | | G166 | | G186 | | G1A6 | |
| | G117 | | G137 | | G157 | | G177 | | G197 | | |
| G108 | | G128 | | G148 | | G168 | 78 | G188 | | G1A8 | |
| | G119 | | G139 | | G159 | | G179 | | G199 | | |
| G10A | | G12A | | G14A | | G16A | | G18A | | G1AA | |

FIG. 40A

| NR2 | | | | | | | | | | | |
|---|---|---|---|---|---|---|---|---|---|---|---|
| G00 | | G20 | | G40 | | G60 | | G80 | | GA0 | |
| | G11 | | G31 | | G51 | | G71 | | G91 | | |
| G02 | | G22 | | G42 | | G62 | | G82 | | GA2 | |
| | G13 | | G33 | | G53 | | G73 | | G93 | | |
| G04 | | G24 | | G44 | | G64 | | G84 | | GA4 | |
| | G15 | | G35 | | G55 | | G75 | | G95 | | |
| G06 | | G26 | | G46 | | G66 | | G86 | | GA6 | |
| | G17 | | G37 | | G57 | | G77 | | G97 | | |
| G08 | | G28 | | G48 | | G68 | | G88 | | GA8 | |
| | G19 | | G39 | | G59 | | G79 | | G99 | | |
| G0A | | G2A | | G4A | | G6A | | G8A | | GAA | |

| | | | | | | | | | | |
|---|---|---|---|---|---|---|---|---|---|---|
| | G100 | | G120 | | G140 | | G160 | | G180 | | G1A0 |
| | | G111 | | G131 | | G151 | | G171 | | G191 | |
| | G102 | | G122 | | G142 | | G162 | | G182 | | G1A2 |
| | | G113 | | G133 | | G153 | | G173 | | G193 | |
| | G104 | | G124 | | G144 | | G164 | | G184 | | G1A4 |
| | | G115 | | G135 | | G155 | | G175 | | G195 | |
| | G106 | | G126 | | G146 | | G166 | | G186 | | G1A6 |
| | | G117 | | G137 | | G157 | | G177 | | G197 | |
| | G108 | | G128 | | G148 | | G168 | | G188 | | G1A8 |
| | | G119 | | G139 | | G159 | | G179 | | G199 | |
| | G10A | | G12A | | G14A | | G16A | | G18A | | G1AA |

| | | | | | | | | | | |
|---|---|---|---|---|---|---|---|---|---|---|
| | G00 | | G20 | | G40 | | G60 | | G80 | | GA0 |
| | | G11 | | G31 | | G51 | | G71 | | G91 | |
| | G02 | | G22 | | G42 | | G62 | | G82 | | GA2 |
| | | G13 | | G33 | | G53 | | G73 | | G93 | |
| | G04 | | G24 | | G44 | | G64 | | G84 | | GA4 |
| | | G15 | | G35 | | G55 | | G75 | | G95 | |
| | G06 | | G26 | | G46 | | G66 | | G86 | | GA6 |
| | | G17 | | G37 | | G57 | | G77 | | G97 | |
| | G08 | | G28 | | G48 | | G68 | | G88 | | GA8 |
| | | G19 | | G39 | | G59 | | G79 | | G99 | |
| | G0A | | G2A | | G4A | | G6A | | G8A | | GAA |

| NR1D | | | | | | | |
|---|---|---|---|---|---|---|---|
| G100 | | G120 | | G140 | | G160 | | G180 | | G1A0 |
| | G111 | | G131 | | G151 | | G171 | | G191 | |
| G102 | | G122 | | G142 | | G162 | | G182 | | G1A2 |
| | G113 | | G133 | | G153 | | G173 | | G193 | |
| G104 | | G124 | | G144 | | G164 | | G184 | | G1A4 |
| | G115 | | G135 | | G155 | | G175 | | G195 | |
| G106 | | G126 | | G146 | | G166 | | G186 | | G1A6 |
| | G117 | | G137 | | G157 | | G177 | | G197 | |
| G108 | | G128 | | G148 | | G168 | | G188 | | G1A8 |
| | G119 | | G139 | | G159 | | G179 | | G199 | |
| G10A | | G12A | | G14A | | G16A | | G18A | | G1AA |

FIG. 50B

| NR2 | | | | | | | |
|---|---|---|---|---|---|---|---|
| G00 | | G20 | | G40 | | G60 | | G80 | | GA0 |
| | G11 | | G31 | | G51 | | G71 | | G91 | |
| G02 | | G22 | | G42 | | G62 | | G82 | | GA2 |
| | G13 | | G33 | | G53 | | G73 | | G93 | |
| G04 | | G24 | | G44 | | G64 | | G84 | | GA4 |
| | G15 | | G35 | | G55 | | G75 | | G95 | |
| G06 | | G26 | | G46 | | G66 | | G86 | | GA6 |
| | G17 | | G37 | | G57 | | G77 | | G97 | |
| G08 | | G28 | | G48 | | G68 | | G88 | | GA8 |
| | G19 | | G39 | | G59 | | G79 | | G99 | |
| G0A | | G2A | | G4A | | G6A | | G8A | | GAA |

| NR1D | | | | | | | |
|---|---|---|---|---|---|---|---|
| G100 | | G120 | | G140 | | G160 | | G180 | | G1A0 |
| | G111 | | G131 | | G151 | | G171 | | G191 | |
| G102 | | G122 | | G142 | | G162 | | G182 | | G1A2 |
| | G113 | | G133 | | G153 | | G173 | | G193 | |
| G104 | | G124 | | G144 | | G164 | | G184 | | G1A4 |
| | G115 | | G135 | | G155 | | G175 | | G195 | |
| G106 | | G126 | | G146 | | G166 | | G186 | | G1A6 |
| | G117 | | G137 | | G157 | | G177 | | G197 | |
| G108 | | G128 | | G148 | | G168 | | G188 | | G1A8 |
| | G119 | | G139 | | G159 | | G179 | | G199 | |
| G10A | | G12A | | G14A | | G16A | | G18A | | G1AA |

FIG. 51A

| NR2 | | | | | | | |
|---|---|---|---|---|---|---|---|
| G00 | | G20 | | G40 | | G60 | | G80 | | GA0 |
| | G11 | | G31 | | G51 | | G71 | | G91 | |
| G02 | | G22 | | G42 | | G62 | | G82 | | GA2 |
| | G13 | | G33 | | G53 | | G73 | | G93 | |
| G04 | | G24 | | G44 | | G64 | | G84 | | GA4 |
| | G15 | | G35 | | G55 | | G75 | | G95 | |
| G06 | | G26 | | G46 | | G66 | | G86 | | GA6 |
| | G17 | | G37 | | G57 | | G77 | | G97 | |
| G08 | | G28 | | G48 | | G68 | | G88 | | GA8 |
| | G19 | | G39 | | G59 | | G79 | | G99 | |
| G0A | | G2A | | G4A | | G6A | | G8A | | GAA |

| G00 | | G20 | | G40 | | G60 | | G80 | | GA0 |
| | G11 | | G31 | | G51 | | G71 | | G91 | |
| G02 | | G22 | | G42 | | G62 | | G82 | | GA2 |
| | G13 | | G33 | | G53 | | G73 | | G93 | |
| G04 | | G24 | | G44 | | G64 | | G84 | | GA4 |
| | G15 | | G35 | | G55 | | G75 | | G95 | |
| G06 | | G26 | | G46 | | G66 | | G86 | | GA6 |
| | G17 | | G37 | | G57 | | G77 | | G97 | |
| G08 | | G28 | | G48 | | G68 | | G88 | | GA8 |
| | G19 | | G39 | | G59 | | G79 | | G99 | |
| G0A | | G2A | | G4A | | G6A | | G8A | | GAA |

| G300 | | G320 | | G340 | | G360 | | G380 | | G3A0 |
| | G311 | | G331 | | G351 | | G371 | 81 | G391 | |
| G302 | | G322 | | G342 | | G362 | | G382 | | G3A2 |
| | G313 | | G333 | | G353 | | G373 | | G393 | |
| G304 | | G324 | | G344 | | G364 | | G384 | | G3A4 |
| | G315 | | G335 | | G355 | | G375 | | G395 | |
| G306 | | G326 | | G346 | | G366 | | G386 | | G3A6 |
| | G317 | | G337 | | G357 | | G377 | | G397 | |
| G308 | | G328 | | G348 | | G368 | | G388 | | G3A8 |
| | G319 | | G339 | | G359 | | G379 | | G399 | |
| G30A | | G32A | | G34A | | G36A | | G38A | | G3AA |

| | | | | | | | | | | | |
|---|---|---|---|---|---|---|---|---|---|---|---|
| | G00 | | G20 | | G40 | | G60 | | G80 | | GA0 |
| | | G11 | | G31 | | G51 | | G71 | | G91 | |
| | G02 | | G22 | | G42 | | G62 | | G82 | | GA2 |
| | | G13 | | G33 | | G53 | | G73 | | G93 | |
| | G04 | | G24 | | G44 | | G64 | | G84 | | GA4 |
| | | G15 | | G35 | | G55 | | G75 | | G95 | |
| | G06 | | G26 | | G46 | | G66 | | G86 | | GA6 |
| | | G17 | | G37 | | G57 | | G77 | | G97 | |
| | G08 | | G28 | | G48 | | G68 | | G88 | | GA8 |
| | | G19 | | G39 | | G59 | | G79 | | G99 | |
| | G0A | | G2A | | G4A | | G6A | | G8A | | GAA |

| | | | | | | | | | | | |
|---|---|---|---|---|---|---|---|---|---|---|---|
| | G300 | | G320 | | G340 | | G360 | | G380 | | G3A0 |
| | | G311 | | G331 | | G351 | | G371 | 81 | G391 | |
| | G302 | | G322 | | G342 | | G362 | | G382 | | G3A2 |
| | | G313 | | G333 | | G353 | | G373 | | G393 | |
| | G304 | | G324 | | G344 | | G364 | | G384 | | G3A4 |
| | | G315 | | G335 | | G355 | | G375 | | G395 | |
| | G306 | | G326 | | G346 | | G366 | | G386 | | G3A6 |
| | | G317 | | G337 | | G357 | | G377 | | G397 | |
| | G308 | | G328 | | G348 | | G368 | | G388 | | G3A8 |
| | | G319 | | G339 | | G359 | | G379 | | G399 | |
| | G30A | | G32A | | G34A | | G36A | | G38A | | G3AA |

| | | | | | | | | | | | |
|---|---|---|---|---|---|---|---|---|---|---|---|
| | G100 | | G120 | | G140 | | G160 | | G180 | | G1A0 |
| | | G111 | | G131 | | G151 | | G171 | | G191 | |
| | G102 | | G122 | | G142 | | G162 | | G182 | | G1A2 |
| | | G113 | | G133 | | G153 | | G173 | | G193 | |
| | G104 | | G124 | | G144 | | G164 | | G184 | | G1A4 |
| | | G115 | | G135 | | G155 | | G175 | | G195 | |
| | G106 | | G126 | | G146 | | G166 | | G186 | | G1A6 |
| | | G117 | | G137 | | G157 | | G177 | | G197 | |
| | G108 | | G128 | | G148 | | G168 | | G188 | | G1A8 |
| | | G119 | | G139 | | G159 | | G179 | | G199 | |
| | G10A | | G12A | | G14A | | G16A | | G18A | | G1AA |

| | | | | | | | | | | | |
|---|---|---|---|---|---|---|---|---|---|---|---|
| | G00 | | G20 | | G40 | | G60 | | G80 | | GA0 |
| | | G11 | | G31 | | G51 | | G71 | | G91 | |
| | G02 | | G22 | | G42 | | G62 | | G82 | | GA2 |
| | | G13 | | G33 | | G53 | | G73 | | G93 | |
| | G04 | | G24 | | G44 | | G64 | | G84 | | GA4 |
| | | G15 | | G35 | | G55 | | G75 | | G95 | |
| | G06 | | G26 | | G46 | | G66 | | G86 | | GA6 |
| | | G17 | | G37 | | G57 | | G77 | | G97 | |
| | G08 | | G28 | | G48 | | G68 | | G88 | | GA8 |
| | | G19 | | G39 | | G59 | | G79 | | G99 | |
| | G0A | | G2A | | G4A | | G6A | | G8A | | GAA |

| G00 | | G20 | | G40 | | G60 | | G80 | | GA0 |
|---|---|---|---|---|---|---|---|---|---|---|
| | G11 | | G31 | | G51 | | G71 | | G91 | |
| G02 | | G22 | | G42 | | G62 | | G82 | | GA2 |
| | G13 | | G33 | | G53 | | G73 | | G93 | |
| G04 | | G24 | | G44 | | G64 | | G84 | | GA4 |
| | G15 | | G35 | | G55 | | G75 | | G95 | |
| G06 | | G26 | | G46 | | G66 | | G86 | | GA6 |
| | G17 | | G37 | | G57 | | G77 | | G97 | |
| G08 | | G28 | | G48 | | G68 | | G88 | | GA8 |
| | G19 | | G39 | | G59 | | G79 | | G99 | |
| G0A | | G2A | | G4A | | G6A | | G8A | | GAA |

| G300 | | G320 | | G340 | | G360 | | G380 | | G3A0 |
|---|---|---|---|---|---|---|---|---|---|---|
| | G311 | | G331 | | G351 | | G371 | 81 G391 | | |
| G302 | | G322 | | G342 | | G362 | | G382 | | G3A2 |
| | G313 | | G333 | | G353 | | G373 | | G393 | |
| G304 | | G324 | | G344 | | G364 | | G384 | | G3A4 |
| | G315 | | G335 | | G355 | | G375 | | G395 | |
| G306 | | G326 | | G346 | | G366 | | G386 | | G3A6 |
| | G317 | | G337 | | G357 | | G377 | | G397 | |
| G308 | | G328 | | G348 | | G368 | | G388 | | G3A8 |
| | G319 | | G339 | | G359 | | G379 | | G399 | |
| G30A | | G32A | | G34A | | G36A | | G38A | | G3AA |

| G100 | | G120 | | G140 | | G160 | | G180 | | G1A0 | |
|---|---|---|---|---|---|---|---|---|---|---|---|
| | G111 | | G131 | | G151 | | G171 | | G191 | | |
| G102 | | G122 | | G142 | | G162 | | G182 | | G1A2 | |
| | G113 | | G133 | | G153 | | G173 | | G193 | | |
| G104 | | G124 | | G144 | | G164 | | G184 | | G1A4 | |
| | G115 | | G135 | | G155 | | G175 | | G195 | | |
| G106 | | G126 | | G146 | | G166 | | G186 | | G1A6 | |
| | G117 | | G137 | | G157 | | G177 | | G197 | | |
| G108 | | G128 | | G148 | | G168 | | G188 | | G1A8 | |
| | G119 | | G139 | | G159 | | G179 | | G199 | | |
| G10A | | G12A | | G14A | | G16A | | G18A | | G1AA | |

| G00 | | G20 | | G40 | | G60 | | G80 | | GA0 | |
|---|---|---|---|---|---|---|---|---|---|---|---|
| | G11 | | G31 | | G51 | | G71 | | G91 | | |
| G02 | | G22 | | G42 | | G62 | | G82 | | GA2 | |
| | G13 | | G33 | | G53 | | G73 | | G93 | | |
| G04 | | G24 | | G44 | | G64 | | G84 | | GA4 | |
| | G15 | | G35 | | G55 | | G75 | | G95 | | |
| G06 | | G26 | | G46 | | G66 | | G86 | | GA6 | |
| | G17 | | G37 | | G57 | | G77 | | G97 | | |
| G08 | | G28 | | G48 | | G68 | | G88 | | GA8 | |
| | G19 | | G39 | | G59 | | G79 | | G99 | | |
| G0A | | G2A | | G4A | | G6A | | G8A | | GAA | |

| | | | | | | | | | | | |
|---|---|---|---|---|---|---|---|---|---|---|---|
| G100 | | G120 | | G140 | | G160 | | G180 | | G1A0 | |
| | G111 | | G131 | | G151 | | G171 | | G191 | | |
| G102 | | G122 | | G142 | | G162 | | G182 | | G1A2 | |
| | G113 | | G133 | | G153 | | G173 | | G193 | | |
| G104 | | G124 | | G144 | | G164 | | G184 | | G1A4 | |
| | G115 | | G135 | | G155 | | G175 | | G195 | | |
| G106 | | G126 | | G146 | | G166 | | G186 | | G1A6 | |
| | G117 | | G137 | | G157 | | G177 | | G197 | | |
| G108 | | G128 | | G148 | | G168 | | G188 | | G1A8 | |
| | G119 | | G139 | | G159 | | G179 | | G199 | | |
| G10A | | G12A | | G14A | | G16A | | G18A | | G1AA | |

| | | | | | | | | | | | |
|---|---|---|---|---|---|---|---|---|---|---|---|
| G00 | | G20 | | G40 | | G60 | | G80 | | GA0 | |
| | G11 | | G31 | | G51 | | G71 | | G91 | | |
| G02 | | G22 | | G42 | | G62 | | G82 | | GA2 | |
| | G13 | | G33 | | G53 | | G73 | | G93 | | |
| G04 | | G24 | | G44 | | G64 | | G84 | | GA4 | |
| | G15 | | G35 | | G55 | | G75 | | G95 | | |
| G06 | | G26 | | G46 | | G66 | | G86 | | GA6 | |
| | G17 | | G37 | | G57 | | G77 | | G97 | | |
| G08 | | G28 | | G48 | | G68 | | G88 | | GA8 | |
| | G19 | | G39 | | G59 | | G79 | | G99 | | |
| G0A | | G2A | | G4A | | G6A | | G8A | | GAA | |

NR2 grid (FIG. 74A):

| | | | | | | | | | | |
|---|---|---|---|---|---|---|---|---|---|---|
| G00 | | G20 | | G40 | | G60 | | G80 | | GA0 |
| | G11 | | G31 | | G51 | | G71 | | G91 | |
| G02 | | G22 | | G42 | | G62 | | G82 | | GA2 |
| | G13 | | G33 | | G53 | | G73 | | G93 | |
| G04 | | G24 | | G44 | | G64 | | G84 | | GA4 |
| | G15 | | G35 | | G55 | | G75 | | G95 | |
| G06 | | G26 | | G46 | | G66 | | G86 | | GA6 |
| | G17 | | G37 | | G57 | | G77 | | G97 | |
| G08 | | G28 | | G48 | | G68 | | G88 | | GA8 |
| | G19 | | G39 | | G59 | | G79 | | G99 | |
| G0A | | G2A | | G4A | | G6A | | G8A | | GAA |

FIG. 74A

NR3D grid (FIG. 74B):

| | | | | | | | | | | |
|---|---|---|---|---|---|---|---|---|---|---|
| G300 | | G320 | | G340 | | G360 | | G380 | | G3A0 |
| | G311 | | G331 | | G351 | | G371 | 81 G391 | | |
| G302 | | G322 | | G342 | | G362 | | G382 | | G3A2 |
| | G313 | | G333 | | G353 | | G373 | | G393 | |
| G304 | | G324 | | G344 | | G364 | | G384 | | G3A4 |
| | G315 | | G335 | | G355 | | G375 | | G395 | |
| G306 | | G326 | | G346 | | G366 | | G386 | | G3A6 |
| | G317 | | G337 | | G357 | | G377 | | G397 | |
| G308 | | G328 | | G348 | | G368 | | G388 | | G3A8 |
| | G319 | | G339 | | G359 | | G379 | | G399 | |
| G30A | | G32A | | G34A | | G36A | | G38A | | G3AA |

| G00 | | G20 | | G40 | | G60 | | G80 | | GA0 |
|---|---|---|---|---|---|---|---|---|---|---|
| | G11 | | G31 | | G51 | | G71 | | G91 | |
| G02 | | G22 | | G42 | | G62 | | G82 | | GA2 |
| | G13 | | G33 | | G53 | | G73 | | G93 | |
| G04 | | G24 | | G44 | | G64 | | G84 | | GA4 |
| | G15 | | G35 | | G55 | | G75 | | G95 | |
| G06 | | G26 | | G46 | | G66 | | G86 | | GA6 |
| | G17 | | G37 | | G57 | | G77 | | G97 | |
| G08 | | G28 | | G48 | | G68 | | G88 | | GA8 |
| | G19 | | G39 | | G59 | | G79 | | G99 | |
| G0A | | G2A | | G4A | | G6A | | G8A | | GAA |

| G300 | | G320 | | G340 | | G360 | | G380 | | G3A0 |
|---|---|---|---|---|---|---|---|---|---|---|
| | G311 | | G331 | | G351 | | G371 | 81 G391 | |
| G302 | | G322 | | G342 | | G362 | | G382 | | G3A2 |
| | G313 | | G333 | | G353 | | G373 | | G393 | |
| G304 | | G324 | | G344 | | G364 | | G384 | | G3A4 |
| | G315 | | G335 | | G355 | | G375 | | G395 | |
| G306 | | G326 | | G346 | | G366 | | G386 | | G3A6 |
| | G317 | | G337 | | G357 | | G377 | | G397 | |
| G308 | | G328 | | G348 | | G368 | | G388 | | G3A8 |
| | G319 | | G339 | | G359 | | G379 | | G399 | |
| G30A | | G32A | | G34A | | G36A | | G38A | | G3AA |

| NR1D | | | | | | |
|---|---|---|---|---|---|---|
| G100 | G120 | G140 | G160 | G180 | G1A0 | |
| | G111 | G131 | G151 | G171 | G191 | |
| G102 | G122 | G142 | G162 | G182 | G1A2 | |
| | G113 | G133 | G153 | G173 | G193 | |
| G104 | G124 | G144 | G164 | G184 | G1A4 | |
| | G115 | G135 | G155 | G175 | G195 | |
| G106 | G126 | G146 | G166 | G186 | G1A6 | |
| | G117 | G137 | G157 | G177 | G197 | |
| G108 | G128 | G148 | G168 | G188 | G1A8 | |
| | G119 | G139 | G159 | G179 | G199 | |
| G10A | G12A | G14A | G16A | G18A | G1AA | |

FIG. 77B

| NR2 | | | | | | |
|---|---|---|---|---|---|---|
| G00 | G20 | G40 | G60 | G80 | GA0 | |
| | G11 | G31 | G51 | G71 | G91 | |
| G02 | G22 | G42 | G62 | G82 | GA2 | |
| | G13 | G33 | G53 | G73 | G93 | |
| G04 | G24 | G44 | G64 | G84 | GA4 | |
| | G15 | G35 | G55 | G75 | G95 | |
| G06 | G26 | G46 | G66 | G86 | GA6 | |
| | G17 | G37 | G57 | G77 | G97 | |
| G08 | G28 | G48 | G68 | G88 | GA8 | |
| | G19 | G39 | G59 | G79 | G99 | |
| G0A | G2A | G4A | G6A | G8A | GAA | |

NR1D

| | | | | | | | | | | | |
|---|---|---|---|---|---|---|---|---|---|---|---|
| | G100 | | G120 | | G140 | | G160 | | G180 | | G1A0 |
| | | G111 | | G131 | | G151 | | G171 | | G191 | |
| | G102 | | G122 | | G142 | | G162 | | G182 | | G1A2 |
| | | G113 | | G133 | | G153 | | G173 | | G193 | |
| | G104 | | G124 | | G144 | | G164 | | G184 | | G1A4 |
| | | G115 | | G135 | | G155 | | G175 | | G195 | |
| | G106 | | G126 | | G146 | | G166 | | G186 | | G1A6 |
| | | G117 | | G137 | | G157 | | G177 | | G197 | |
| | G108 | | G128 | | G148 | | G168 | | G188 | | G1A8 |
| | | G119 | | G139 | | G159 | | G179 | | G199 | |
| | G10A | | G12A | | G14A | | G16A | | G18A | | G1AA |

| | | | | | | | | | | | |
|---|---|---|---|---|---|---|---|---|---|---|---|
| | G00 | | G20 | | G40 | | G60 | | G80 | | GA0 |
| | | G11 | | G31 | | G51 | | G71 | | G91 | |
| | G02 | | G22 | | G42 | | G62 | | G82 | | GA2 |
| | | G13 | | G33 | | G53 | | G73 | | G93 | |
| | G04 | | G24 | | G44 | | G64 | | G84 | | GA4 |
| | | G15 | | G35 | | G55 | | G75 | | G95 | |
| | G06 | | G26 | | G46 | | G66 | | G86 | | GA6 |
| | | G17 | | G37 | | G57 | | G77 | | G97 | |
| | G08 | | G28 | | G48 | | G68 | | G88 | | GA8 |
| | | G19 | | G39 | | G59 | | G79 | | G99 | |
| | G0A | | G2A | | G4A | | G6A | | G8A | | GAA |

FIG. 78B

| | | | | | | | | | | | |
|---|---|---|---|---|---|---|---|---|---|---|---|
|NR1D| | | | | | | | | | | |
| |G100| |G120| |G140| |G160| |G180| |G1A0|
| | |G111| |G131| |G151| |G171| |G191| | |
| |G102| |G122| |G142| |G162| |G182| |G1A2|
| | |G113| |G133| |G153| |G173| |G193| | |
| |G104| |G124| |G144| |G164| |G184| |G1A4|
| | |G115| |G135| |G155| |G175| |G195| | |
| |G106| |G126| |G146| |G166| |G186| |G1A6|
| | |G117| |G137| |G157| |G177| |G197| | |
| |G108| |G128| |G148| |G168| |G188| |G1A8|
| | |G119| |G139| |G159| |G179| |G199| | |
| |G10A| |G12A| |G14A| |G16A| |G18A| |G1AA|

FIG. 79A

| | | | | | | | | | | | |
|---|---|---|---|---|---|---|---|---|---|---|---|
|NR2| | | | | | | | | | | |
| |G00| |G20| |G40| |G60| |G80| |GA0| |
| | |G11| |G31| |G51| |G71| |G91| | |
| |G02| |G22| |G42| |G62| |G82| |GA2| |
| | |G13| |G33| |G53| |G73| |G93| | |
| |G04| |G24| |G44| |G64| |G84| |GA4| |
| | |G15| |G35| |G55| |G75| |G95| | |
| |G06| |G26| |G46| |G66| |G86| |GA6| |
| | |G17| |G37| |G57| |G77| |G97| | |
| |G08| |G28| |G48| |G68| |G88| |GA8| |
| | |G19| |G39| |G59| |G79| |G99| | |
| |G0A| |G2A| |G4A| |G6A| |G8A| |GAA| |

| NR2 | | | | | | | | | | | |
|---|---|---|---|---|---|---|---|---|---|---|---|
| G00 | | G20 | | G40 | | G60 | | G80 | | GA0 | |
| | G11 | | G31 | | G51 | | G71 | | G91 | | |
| G02 | | G22 | | G42 | | G62 | | G82 | | GA2 | |
| | G13 | | G33 | | G53 | | G73 | | G93 | | |
| G04 | | G24 | | G44 | | G64 | | G84 | | GA4 | |
| | G15 | | G35 | | G55 | | G75 | | G95 | | |
| G06 | | G26 | | G46 | | G66 | | G86 | | GA6 | |
| | G17 | | G37 | | G57 | | G77 | | G97 | | |
| G08 | | G28 | | G48 | | G68 | | G88 | | GA8 | |
| | G19 | | G39 | | G59 | | G79 | | G99 | | |
| G0A | | G2A | | G4A | | G6A | | G8A | | GAA | |

FIG. 82B

| NR3D | | | | | | | | | | | |
|---|---|---|---|---|---|---|---|---|---|---|---|
| G300 | | G320 | | G340 | | G360 | | G380 | | G3A0 | |
| | G311 | | G331 | | G351 | | G371 | 81 | G391 | | |
| G302 | | G322 | | G342 | | G362 | | G382 | | G3A2 | |
| | G313 | | G333 | | G353 | | G373 | | G393 | | |
| G304 | | G324 | | G344 | | G364 | | G384 | | G3A4 | |
| | G315 | | G335 | | G355 | | G375 | | G395 | | |
| G306 | | G326 | | G346 | | G366 | | G386 | | G3A6 | |
| | G317 | | G337 | | G357 | | G377 | | G397 | | |
| G308 | | G328 | | G348 | | G368 | | G388 | | G3A8 | |
| | G319 | | G339 | | G359 | | G379 | | G399 | | |
| G30A | | G32A | | G34A | | G36A | | G38A | | G3AA | |

| R111 | R131 | R151 | R171 | R191 |
| R113 | R133 | R153 | R173 | R193 |
| R115 | R135 | R155 | R175 | R195 |
| R117 | R137 | R157 | R177 | R197 |
| R119 | R139 | R159 | R179 | R199 |

| R11 | R31 | R51 | R71 | R91 |
| R13 | R33 | R53 | R73 | R93 |
| R15 | R35 | R55 | R75 | R95 |
| R17 | R37 | R57 | R77 | R97 |
| R19 | R39 | R59 | R79 | R99 |

DIGITAL PIXEL ADDITION METHOD AND DEVICE FOR PROCESSING PLURALITY OF IMAGES

BACKGROUND OF THE INVENTION

1. Field of the Invention

The present invention relates to image processing techniques for processing an image signal output from a solid-state imager such as a charge coupled device (CCD) image sensor or a complementary metal oxide semiconductor (CMOS) image sensor, and in particular for processing an image signal output from a solid-state imager having a color filter array.

2. Description of the Related Art

Digital color imaging devices such as digital still cameras and digital video cameras with CCD or CMOS image sensors are now in common use. Many of them use single plane solid-state imagers having a single image plane that receives a focused optical image through a single color filter array. A Bayer arrangement of primary colors or secondary colors is widely used in the color filter array. A Bayer array of primary colors is generally an array of red (R), green (G), and blue (B) color filters; a Bayer array of complementary colors is, for example, an array of cyan (C), magenta (M), and yellow (Y) color filters.

Methods of improving the sensitivity of a color imaging device include electrically amplifying the output signal of the solid-state imager and lengthening the exposure time by lengthening the charge storage time of the solid-state imager. An image signal captured in a dim environment, however, includes a comparatively large noise component, so if it is electrically amplified, or if a long exposure is made, the S/N ratio (signal-to-noise ratio) of the captured image may drop. To achieve both high sensitivity and a high S/N ratio, a digital pixel addition method has been proposed by Ishii in, for example, Japanese Patent Application Publication No. 2000-184274. In this proposed method a number of pixels of the same color are selected and their digital signals are added.

A problem with the proposed digital pixel addition method is that since a single pixel is generated by adding the digital signals of a number of pixels (for example, two or three pixels), resolution is lost and the image quality is impaired.

SUMMARY OF THE INVENTION

An object of the present invention is to provide an image processing device, an image processing method, and an imaging device that can achieve both high sensitivity and a high S/N ratio under low illumination conditions and mitigate the consequent loss of resolution.

A first aspect of the invention provides an image processing device for processing a plurality of frame images which are temporally consecutive images, each frame image including pixels. The image processing device includes an in-plane pattern detector, a reference pattern detector, and a pixel adder.

The in-plane pattern detector selects a pixel of interest from among the pixels in a frame image of interest among the temporally consecutive frame images; calculates, for each of a plurality of in-plane patterns including the pixel of interest, an in-plane correlation index value representing correlation with the pixel of interest; and selects, as an in-plane pixel addition pattern, on a basis of the calculated in-plane correlation index values, one in-plane pattern among the plurality of in-plane patterns that is most highly correlated with the pixel of interest.

The reference pattern detector identifies a reference pixel of interest, corresponding to the pixel of interest, in at least one reference frame image temporally adjacent to the frame image of interest; calculates, for each of a plurality of reference pixel patterns including the reference pixel of interest, at least one neighboring pixel neighboring the reference pixel of interest, or both the reference pixel of interest and at least one neighboring pixel neighboring the reference pixel of interest, an inter-plane correlation index value representing correlation with the in-plane pixel addition pattern; and selects, as a reference pixel addition pattern, on a basis of the calculated inter-plane correlation index values, at least one reference pixel pattern among the plurality of reference pixel patterns that is most highly correlated with the in-plane pixel addition pattern.

The pixel adder adds the values of the pixels included in the in-plane pixel addition pattern and the at least one reference pixel addition pattern to generate a corrected pixel.

A second aspect of the invention provides an imaging device including the image processing device of the first aspect and an imaging element that outputs the plurality of frame images.

A third aspect of the invention provides an image processing method for processing a plurality of frame images which are temporally consecutive images, each frame image including pixels. The image processing method includes the following steps:

selecting a pixel of interest from among the pixels in a frame image of interest among the plurality of frame images and calculating, for each of a plurality of in-plane patterns including the pixel of interest, an in-plane correlation index value representing correlation with the pixel of interest;

selecting, as an in-plane pixel addition pattern, on a basis of the calculated in-plane correlation index values, one in-plane pattern among the plurality of in-plane patterns that is most highly correlated with the pixel of interest;

identifying reference pixels, corresponding to the pixels of the in-plane pixel addition pattern, in a reference frame image temporally adjacent to the frame image of interest and calculating, for each of a plurality of reference pixel patterns including the reference pixels and/or neighboring pixels neighboring the reference pixels, an inter-plane correlation index value representing correlation with the in-plane pixel addition pattern;

selecting, as a reference pixel addition pattern, on a basis of the calculated inter-plane correlation index values, one reference pixel pattern among the plurality of reference pixel patterns that is most highly correlated with the in-plane pixel addition pattern; and adding values of the pixels included in the in-plane pixel addition pattern and the reference pixel addition pattern to generate a corrected pixel.

The present invention can provide both high sensitivity and a high S/N ratio under low illumination conditions, and can also mitigate the loss of resolution.

BRIEF DESCRIPTION OF THE DRAWINGS

In the attached drawings:

FIG. 15 shows the spatial arrangement of pixels when the pixel of interest is a green pixel;

FIG. 16 shows the array of pixels operated on by the spatial filters when the pixel of interest is a green pixel;

FIG. 19 shows the spatial arrangement of pixels when the pixel of interest is a blue pixel;

FIG. 20 shows the array of pixels operated on by the spatial filters when the pixel of interest is a blue pixel;

FIG. 21 shows an upper block pattern combining the pixel of interest (a green pixel) with pixels above it;

FIG. 22 shows a rightward block pattern combining the pixel of interest (a green pixel) with pixels to its right;

FIG. 23 shows a lower block pattern combining the pixel of interest (a green pixel) with pixels below it;

FIG. 24 shows a leftward block pattern combining the pixel of interest (a green pixel) with pixels to its left;

FIG. 25 shows an upper vertical line pattern combining the pixel of interest (a green pixel) with pixels above and below it;

FIG. 26 shows a lower vertical line pattern combining the pixel of interest (a green pixel) with pixels above and below it;

FIG. 27 shows a leftward horizontal line pattern combining the pixel of interest (a green pixel) with pixels to its right and left;

FIG. 28 shows a rightward horizontal line pattern combining the pixel of interest (a green pixel) with pixels to its right and left;

FIG. 29 shows an upper left diagonal line pattern combining the pixel of interest (a green pixel) with pixels to its upper left and lower right;

FIG. 30 shows a lower right diagonal line pattern combining the pixel of interest (a green pixel) with pixels to its lower right and upper left;

FIG. 31 shows an upper right diagonal line pattern combining the pixel of interest (a green pixel) with pixels to its upper right and lower left;

FIG. 32 shows a lower left diagonal line pattern combining the pixel of interest (a green pixel) with pixels to its lower left and upper right;

FIGS. 37A and 37B show an exemplary combination of the in-plane addition pattern and a forward reference addition pattern when the pixel of interest is a green pixel in the frame of interest;

FIGS. 38A and 38B show another exemplary combination of the in-plane addition pattern and a forward reference addition pattern when the pixel of interest is a green pixel in the frame of interest;

FIGS. 39A and 39B show another exemplary combination of the in-plane addition pattern and a forward reference addition pattern when the pixel of interest is a green pixel in the frame of interest;

FIGS. 40A and 40B show another exemplary combination of the in-plane addition pattern and a forward reference addition pattern when the pixel of interest is a green pixel in the frame of interest;

FIGS. 41A and 41B show another exemplary combination of the in-plane addition pattern and a forward reference addition pattern when the pixel of interest is a green pixel in the frame of interest;

FIGS. 42A and 42B show an exemplary combination of the in-plane addition pattern and a backward reference addition pattern when the pixel of interest is a green pixel in the frame of interest;

FIGS. 43A and 43B show another exemplary combination of the in-plane addition pattern and a backward reference addition pattern when the pixel of interest is a green pixel in the frame of interest;

FIGS. 44A and 44B show another exemplary combination of the in-plane addition pattern and a backward reference addition pattern when the pixel of interest is a green pixel in the frame of interest;

FIGS. 45A and 45B show another exemplary combination of the in-plane addition pattern and a backward reference addition pattern when the pixel of interest is a green pixel in the frame of interest;

FIGS. 46A and 46B show another exemplary combination of the in-plane addition pattern and a backward reference addition pattern when the pixel of interest is a green pixel in the frame of interest;

FIGS. 47A and 47B show another exemplary combination of the in-plane addition pattern and a forward reference addition pattern when the pixel of interest is a green pixel in the frame of interest;

FIGS. 48A and 48B show another exemplary combination of the in-plane addition pattern and a forward reference addition pattern when the pixel of interest is a green pixel in the frame of interest;

FIGS. 50A and 50B show another exemplary combination of the in-plane addition pattern and a forward reference addition pattern when the pixel of interest is a green pixel in the frame of interest;

FIGS. 51A and 51B show another exemplary combination of the in-plane addition pattern and a forward reference addition pattern when the pixel of interest is a green pixel in the frame of interest;

FIGS. 52A and 52B show another exemplary combination of the in-plane addition pattern and a backward reference addition pattern when the pixel of interest is a green pixel in the frame of interest;

FIGS. 53A and 53B show another exemplary combination of the in-plane addition pattern and a backward reference addition pattern when the pixel of interest is a green pixel in the frame of interest;

FIGS. 54A and 54B show another exemplary combination of the in-plane addition pattern and a backward reference addition pattern when the pixel of interest is a green pixel in the frame of interest;

FIGS. 55A and 55B show another exemplary combination of the in-plane addition pattern and a backward reference addition pattern when the pixel of interest is a green pixel in the frame of interest;

FIGS. 56A and 56B show another exemplary combination of the in-plane addition pattern and a backward reference addition pattern when the pixel of interest is a green pixel in the frame of interest;

FIGS. 57A and 57B show another exemplary combination of the in-plane addition pattern and a forward reference addition pattern when the pixel of interest is a green pixel in the frame of interest;

FIGS. 58A and 58B show another exemplary combination of the in-plane addition pattern and a forward reference addition pattern when the pixel of interest is a green pixel in the frame of interest;

FIGS. 59A and 59B show another exemplary combination of the in-plane addition pattern and a forward reference addition pattern when the pixel of interest is a green pixel in the frame of interest;

FIGS. 60A and 60B show another exemplary combination of the in-plane addition pattern and a forward reference addition pattern when the pixel of interest is a green pixel in the frame of interest;

FIGS. 61A and 61B show another exemplary combination of the in-plane addition pattern and a forward reference addition pattern when the pixel of interest is a green pixel in the frame of interest;

FIGS. 62A and 62B show another exemplary combination of the in-plane addition pattern and a backward reference addition pattern when the pixel of interest is a green pixel in the frame of interest;

FIGS. 63A and 63B show another exemplary combination of the in-plane addition pattern and a backward reference addition pattern when the pixel of interest is a green pixel in the frame of interest;

FIGS. 64A and 64B show another exemplary combination of the in-plane addition pattern and a backward reference addition pattern when the pixel of interest is a green pixel in the frame of interest;

FIGS. 65A and 65B show another exemplary combination of the in-plane addition pattern and a backward reference addition pattern when the pixel of interest is a green pixel in the frame of interest;

FIGS. 66A and 66B show another exemplary combination of the in-plane addition pattern and a backward reference addition pattern when the pixel of interest is a green pixel in the frame of interest;

FIGS. 67A and 67B show another exemplary combination of the in-plane addition pattern and a forward reference addition pattern when the pixel of interest is a green pixel in the frame of interest;

FIGS. 68A and 68B show another exemplary combination of the in-plane addition pattern and a forward reference addition pattern when the pixel of interest is a green pixel in the frame of interest;

FIGS. 69A and 69B show another exemplary combination of the in-plane addition pattern and a forward reference addition pattern when the pixel of interest is a green pixel in the frame of interest;

FIGS. 70A and 70B show another exemplary combination of the in-plane addition pattern and a forward reference addition pattern when the pixel of interest is a green pixel in the frame of interest;

FIGS. 71A and 71B show another exemplary combination of the in-plane addition pattern and a forward reference addition pattern when the pixel of interest is a green pixel in the frame of interest;

FIGS. 72A and 72B show another exemplary combination of the in-plane addition pattern and a backward reference addition pattern when the pixel of interest is a green pixel in the frame of interest;

FIGS. 73A and 73B show another exemplary combination of the in-plane addition pattern and a backward reference addition pattern when the pixel of interest is a green pixel in the frame of interest;

FIGS. 74A and 74B show another exemplary combination of the in-plane addition pattern and a backward reference addition pattern when the pixel of interest is a green pixel in the frame of interest;

FIGS. 75A and 75B show another exemplary combination of the in-plane addition pattern and a backward reference addition pattern when the pixel of interest is a green pixel in the frame of interest;

FIGS. 76A and 76B show another exemplary combination of the in-plane addition pattern and a backward reference addition pattern when the pixel of interest is a green pixel in the frame of interest;

FIGS. 77A and 77B show another exemplary combination of the in-plane addition pattern and a forward reference addition pattern when the pixel of interest is a green pixel in the frame of interest;

FIGS. 78A and 78B show another exemplary combination of the in-plane addition pattern and a forward reference addition pattern when the pixel of interest is a green pixel in the frame of interest;

FIGS. 79A and 79B show another exemplary combination of the in-plane addition pattern and a forward reference addition pattern when the pixel of interest is a green pixel in the frame of interest;

FIGS. 80A and 80B show another exemplary combination of the in-plane addition pattern and a forward reference addition pattern when the pixel of interest is a green pixel in the frame of interest;

FIGS. 81A and 81B show another exemplary combination of the in-plane addition pattern and a forward reference addition pattern when the pixel of interest is a green pixel in the frame of interest;

FIGS. 82A and 82B show another exemplary combination of the in-plane addition pattern and a backward reference addition pattern when the pixel of interest is a green pixel in the frame of interest;

FIGS. 83A and 83B show another exemplary combination of the in-plane addition pattern and a backward reference addition pattern when the pixel of interest is a green pixel in the frame of interest;

FIGS. 84A and 84B show another exemplary combination of the in-plane addition pattern and a backward reference addition pattern when the pixel of interest is a green pixel in the frame of interest;

FIGS. 85A and 85B show another exemplary combination of the in-plane addition pattern and a backward reference addition pattern when the pixel of interest is a green pixel in the frame of interest;

FIGS. 86A and 86B show another exemplary combination of the in-plane addition pattern and a backward reference addition pattern when the pixel of interest is a green pixel in the frame of interest;

FIGS. 87A and 87B show an exemplary combination of the in-plane addition pattern and a forward reference addition pattern when the pixel of interest is a red pixel in the frame of interest;

FIGS. 89A and 89B show another exemplary combination of the in-plane addition pattern and a forward reference addition pattern when the pixel of interest is a red pixel in the frame of interest;

FIGS. 91A and 91B show another exemplary combination of the in-plane addition pattern and a forward reference addition pattern when the pixel of interest is a red pixel in the frame of interest;

DETAILED DESCRIPTION OF THE INVENTION

Figure 1:
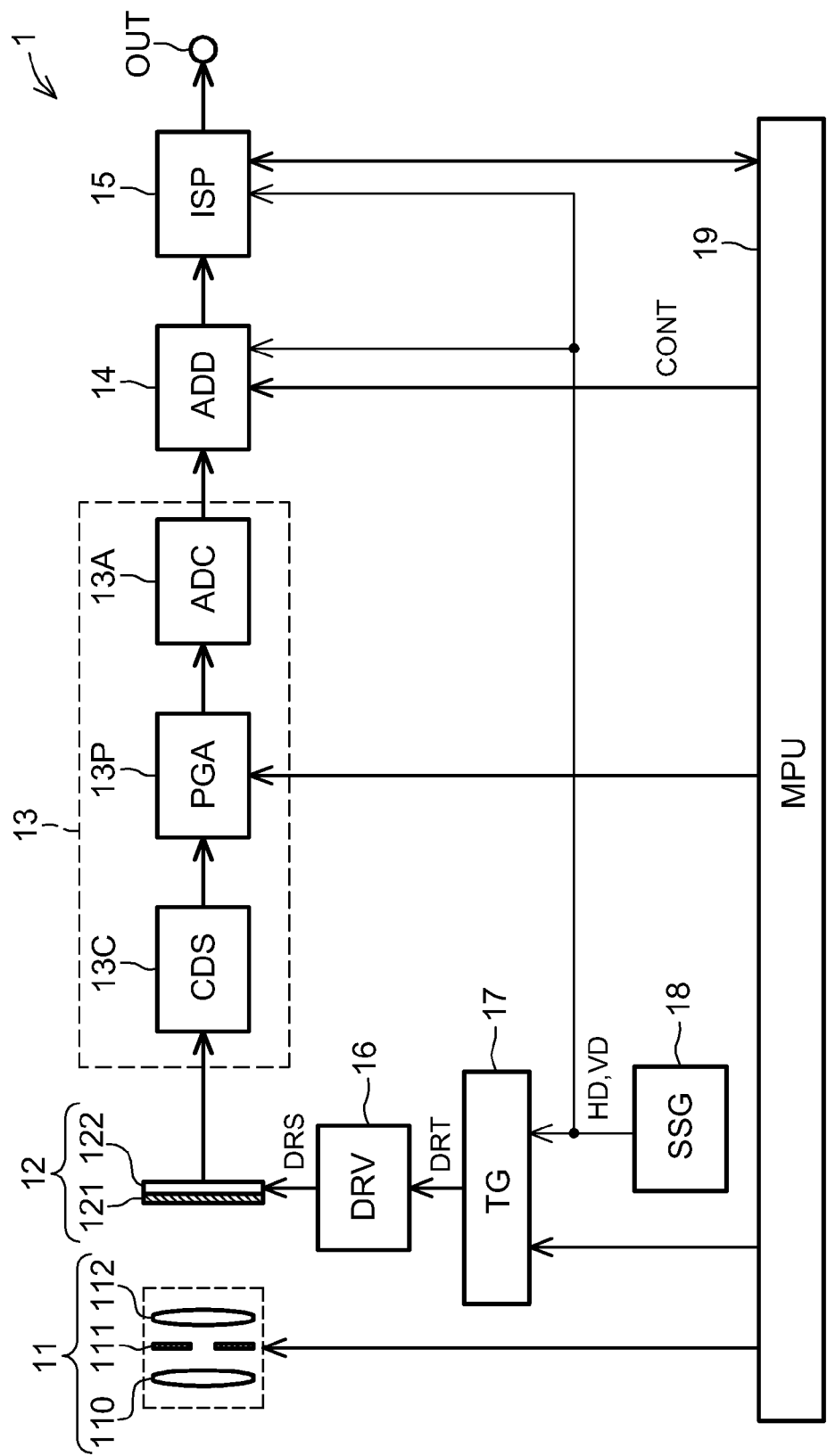
FIG. 1 is a block diagram showing the general structure of an imaging device according to a first embodiment of the present invention.

Embodiments of the invention will now be described with reference to the attached drawings, in which like elements are indicated by like reference characters and throughout which the word 'circuit' is abbreviated to CKT.

First Embodiment

FIG. 1 is a block diagram showing the general structure of an imaging device 1 according to a first embodiment of the invention. The imaging device 1 shown in FIG. 1 has imaging optics (a lens unit) 11, a CCD image sensor 12, a front end section 13, a pixel adding circuit (image processing device) 14, an image signal processor (ISP) 15, a drive circuit (DRV) 16, a timing generator (TG) 17, a synchronization signal generator (SSG) 18, and a microprocessing unit (MPU) 19 that functions as a control unit. The imaging optics 11 include a front lens 110, a diaphragm 111, and a rear lens 112.

The CCD image sensor 12 is a single plane solid-state imager having a single color filter array 121 and a single CCD device 122. The color filter array 121 has N types of color filters (where N is an integer equal to or greater than two) arrayed in a periodic manner in a plane. These filters transmit light of colors in N mutually differing wavelength regions. The color filter array 121 used in this embodiment is a primary color Bayer array, but this is not a limitation; a complementary color Bayer array may be used instead. The color filters are disposed above corresponding light receiving elements (photodiodes) in the two-dimensional array of elements in the CCD device 122. These light receiving elements are photoelectric conversion devices that detect incident light and generate signal charges.

The imaging optics (lens unit) 11 in FIG. 1 focuses an optical image of the subject being imaged on the imaging surface of the CCD image sensor 12. The image signal obtained by photoelectric conversion in the CCD image sensor 12 is sent to the front end section 13. The CCD image sensor 12 includes a correlated double sampling (CDS) circuit 13C, a programmable gain amplifier (PGA) 13P, and an analog-to-digital converter (ADC) 13A. The CDS circuit 13C removes noise and other unwanted components from the image signal output by the CCD image sensor 12. The programmable gain amplifier 13P amplifies the output signal of the CDS circuit 13C with a gain controlled by a control signal output by the microprocessing unit 19. The analog-to-digital converter 13A converts the output signal of the programmable gain amplifier 13P to a digital signal referred to below as the raw image signal.

The pixel adding circuit 14 has a control terminal INc and a synchronization signal input terminal (or pair of terminals) INs. The microprocessing unit 19 supplies a control signal CONT to the control terminal INc. The synchronization signal generator 18 supplies a horizontal synchronization signal HD and a vertical synchronization signal VD to the synchronization signal input terminal(s) INs. The pixel adding circuit 14 is operative to add selected digital outputs of the analog-to-digital converter 13A.

The image signal processor 15 carries out such signal processing as color interpolation, gamma correction, noise reduction, contour correction, white balance adjustment, signal amplitude adjustment, and color correction on the output signal of the pixel adding circuit 14, and outputs the resulting signal to an image signal output terminal (OUT).

The synchronization signal generator 18 generates the horizontal synchronization signal HD and vertical synchronization signal VD and supplies them to the pixel adding circuit 14, image signal processor 15, and timing generator 17.

The timing generator 17 generates drive timing signals DRT for the CCD image sensor 12 and supplies them to the drive circuit 16. The drive circuit 16 generates drive signals DRS for the CCD image sensor 12 responsive to the drive timing signals DRT output from the timing generator 17. The CCD image sensor 12 performs photoelectric conversion and charge shifting according to the drive signals DRS output from the drive circuit 16.

The MPU 19 controls the diaphragm 111 in the imaging optics 11 to adjust the amount of light admitted, controls the readout and flush timings generated by the timing generator 17, controls the gain of the programmable gain amplifier 13P, and controls the pixel addition process carried out by the pixel adding circuit 14. By controlling the readout timing, i.e., the timing at which charge signals are read from the photoelectric conversion elements in the CCD image sensor 12, and the flush timing, i.e., the timing at which charge is flushed to begin the next exposure, the MPU 19 controls the exposure time.

Figure 2:
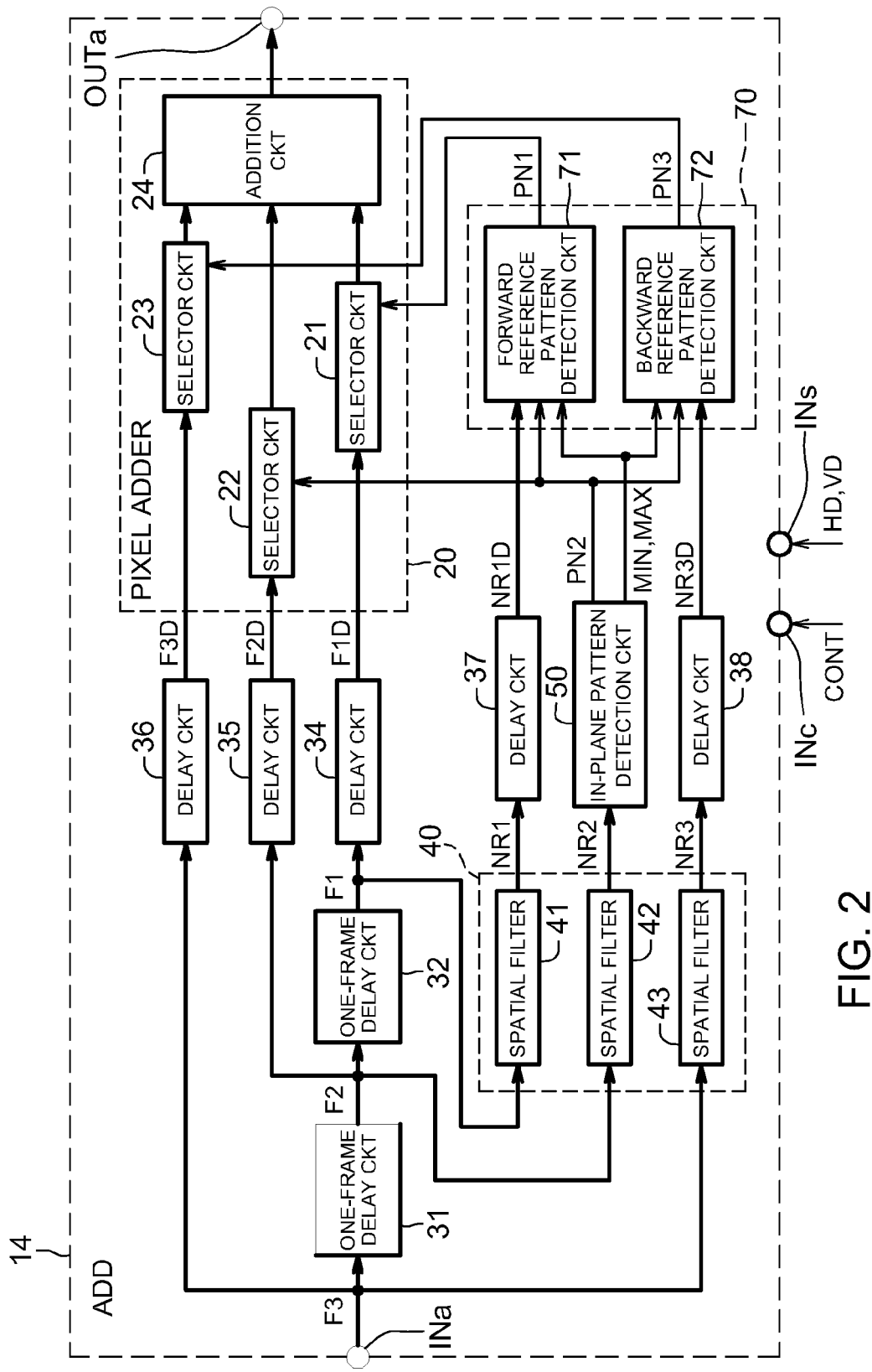
FIG. 2 is a block diagram showing an example of the schematic structure of the pixel addition circuit in the first embodiment.

FIG. 2 is a block diagram showing an example of the schematic structure of the pixel adding circuit 14 in the first embodiment. As shown in FIG. 2, the pixel adding circuit 14 includes a pixel adder 20, one-frame delay circuits 31, 32, additional delay circuits 34, 35, 36, 37, 38, a noise reduction circuit 40, an in-plane pattern detection circuit 50, and a reference pattern detection circuit 70. The operation of the pixel adding circuit 14 will now be described with reference to FIG. 2.

The raw image signal F3 including the red pixel values (values of pixels generated from light that has passed through a red filter), green pixel values (values of pixels generated from light that has passed through a green filter), and blue pixel values (values of pixels generated from light that has passed through a blue filter) output from the analog-to-digital converter 13A is applied to an input terminal INa and supplied to one-frame delay circuit 31, delay circuit 36, and spatial filter 43 in the noise reduction circuit 40. One-frame delay circuit 31 supplies a frame delayed signal F2, obtained by delaying the raw image signal F3 by one frame, to one-frame delay circuit 32 and to spatial filter 42 in the noise reduction circuit 40. One-frame delay circuit 32 supplies a frame delayed signal F1, obtained by delaying frame delayed signal F2 by one frame interval, to delay circuit 34 and to spatial filter 41 in the noise reduction circuit 40. Spatial filter 43 outputs a filtered signal NR3 obtained by reducing noise in the raw image signal F3. Spatial filter 42 outputs a filtered signal NR2 obtained by reducing noise in frame delayed signal F2. Spatial filter 41 outputs a filtered signal NR1 obtained by reducing noise in frame delayed signal F1.

Figure 3:
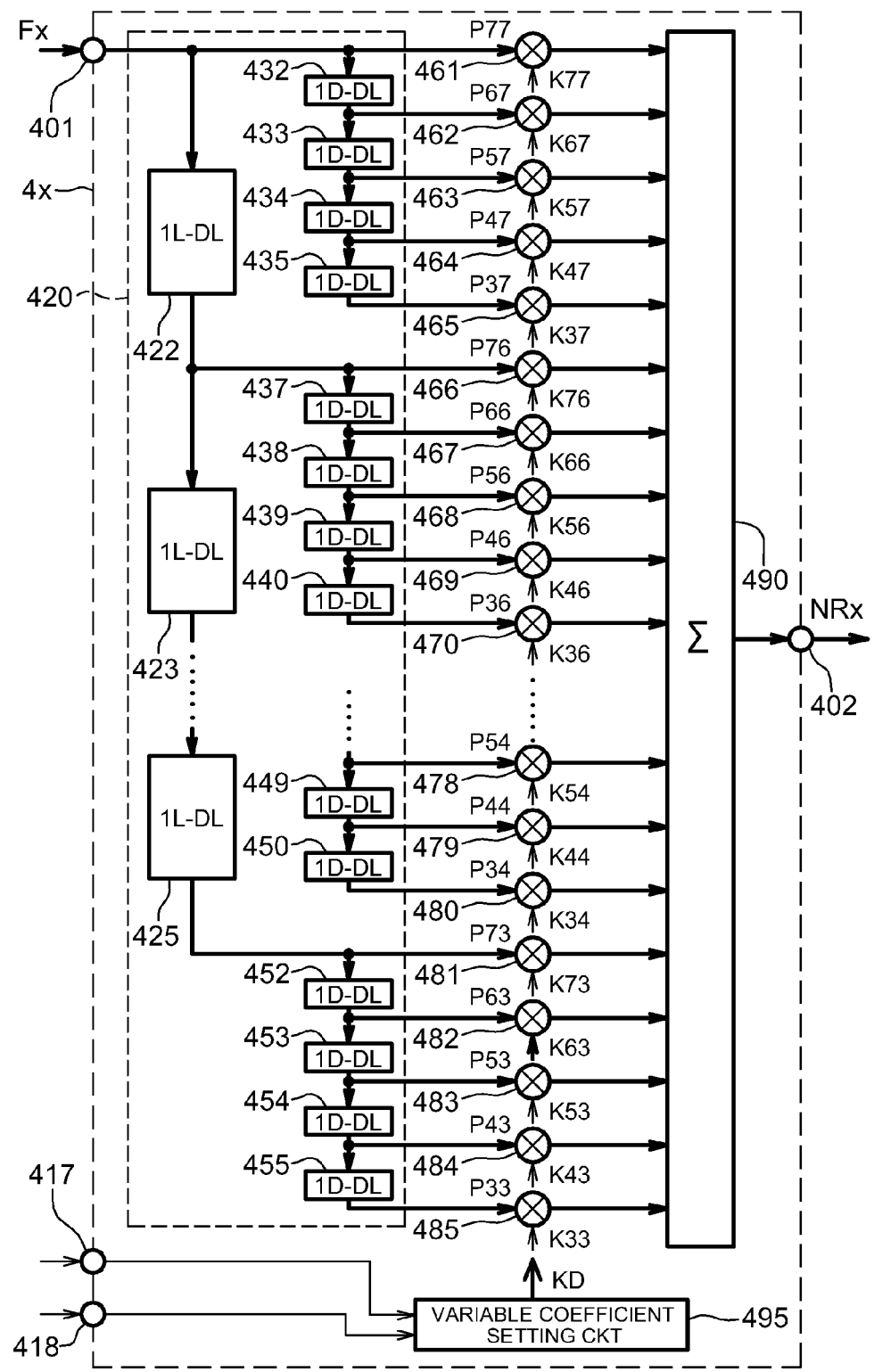
FIG. 3 shows the general structure of the spatial filters included in the noise reduction circuit (NR CKT) in the first embodiment.
Figure 4:
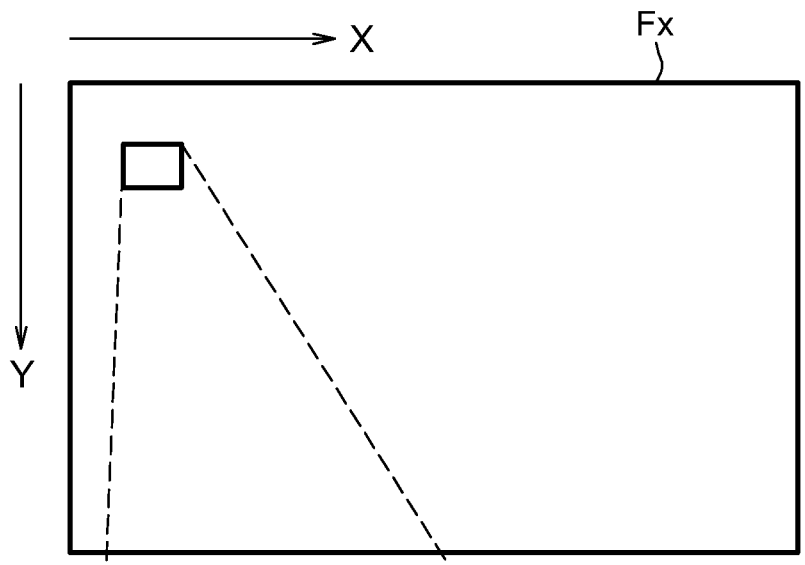
FIG. 4A represents the frame image of the frame delayed signal input to the in-plane pattern detection circuit (CKT)
FIG. 4B shows a five-by-five pixel region in the frame image in FIG. 4A.

FIG. 3 shows the schematic structure of a spatial filter 4*x* having the same circuit configuration as spatial filters 41, 42, and 43. As shown in FIGS. 4A and 4B, the delay circuit 420 in spatial filter 4*x* samples an arbitrary five-by-five pixel region in a frame signal Fx representing one of the above signals F1, F2, F3. The delay circuit 420 outputs the pixel values of the plurality of pixels in the sampled five-by-five pixel region in parallel to respective multiplier circuits 461-485. The multiplier circuits 461-485 multiply the input pixel values by respective filter coefficients K33-K37, K43-K47, K53-K57, K63-K67, and K73-K77. A summing circuit 490 outputs the sum of the output values (weighted pixel values) of the multiplier circuits 461-485 from an output terminal 402.

Figure 5:
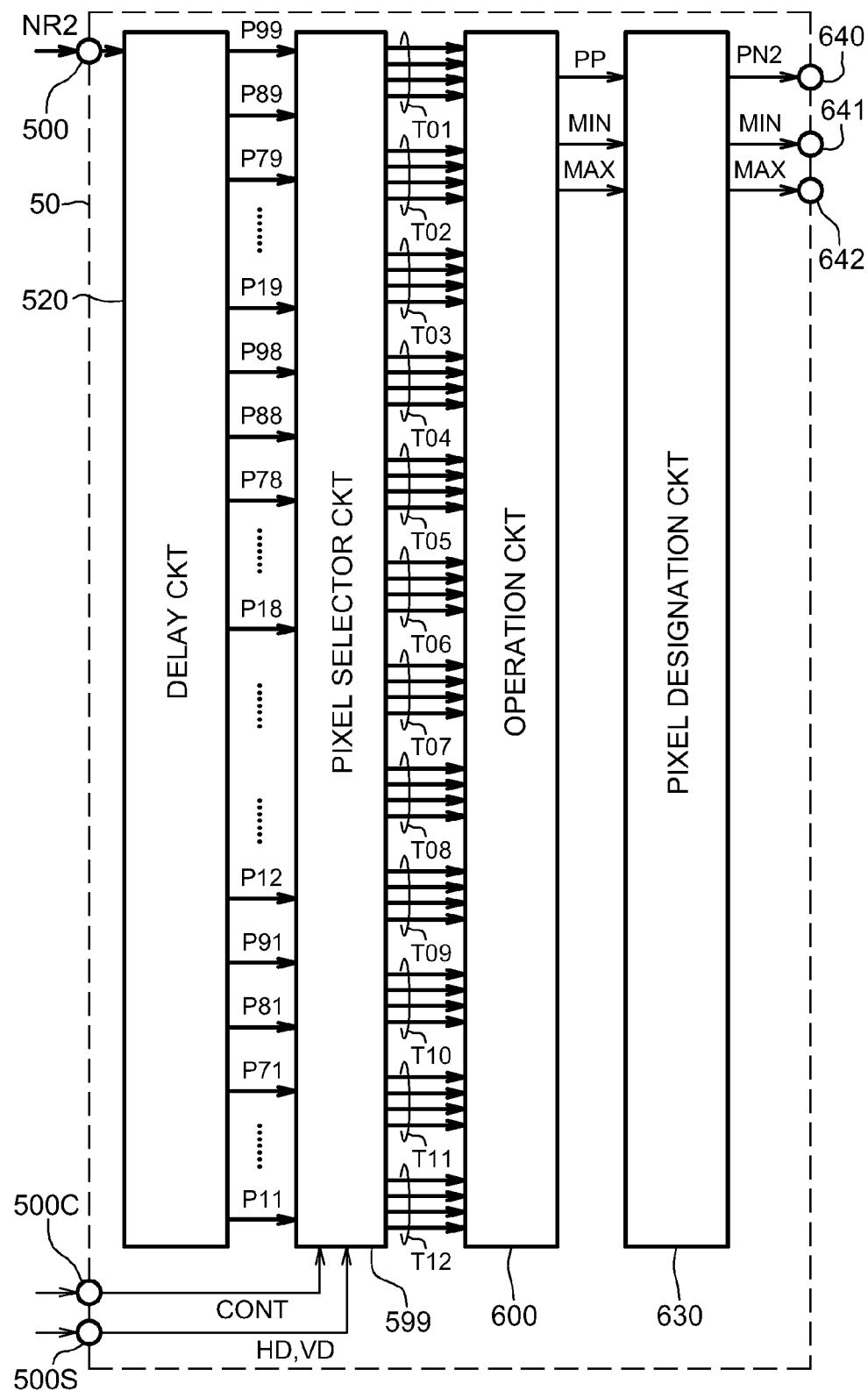
FIG. 5 is a block diagram showing the structure of the in-plane pattern detection circuit in the first embodiment.
Figure 6:
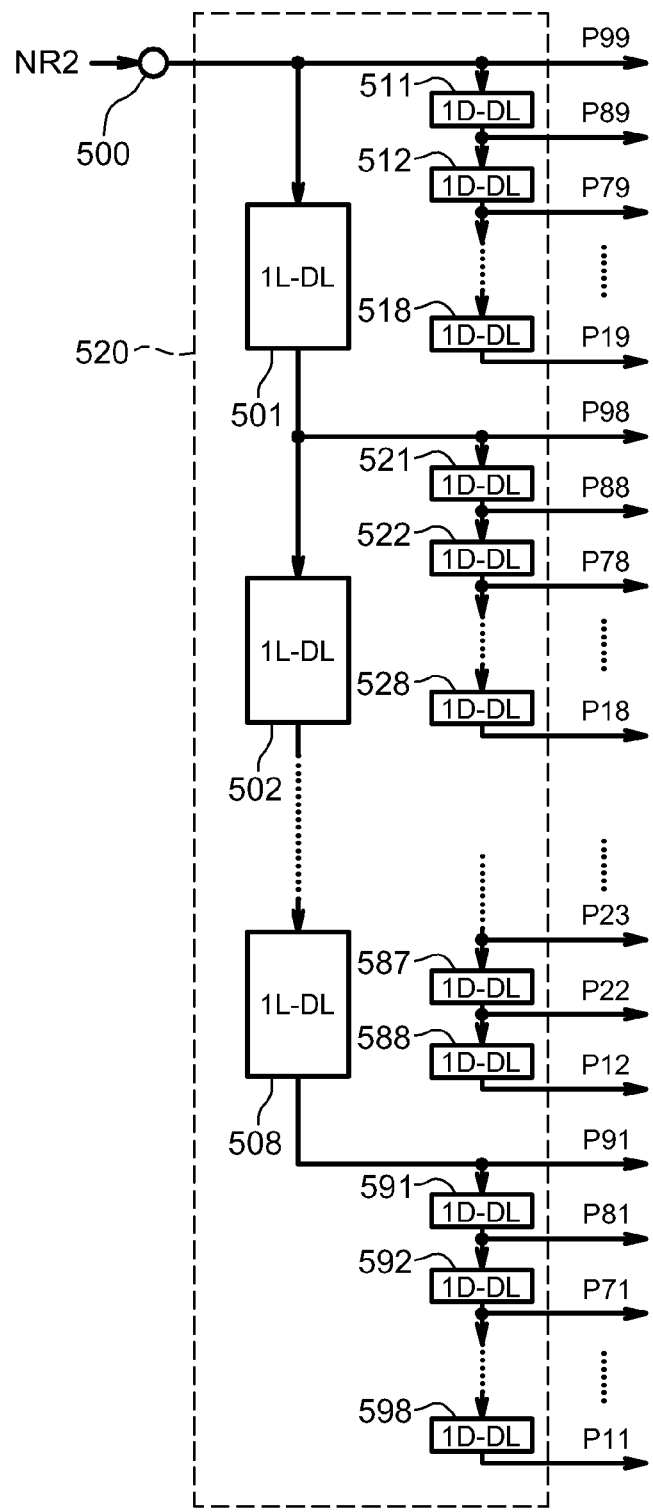
FIG. 6 shows the schematic structure of the delay circuit included in the in-plane pattern detection circuit in FIG. 5.
Figures 7A, 7B:
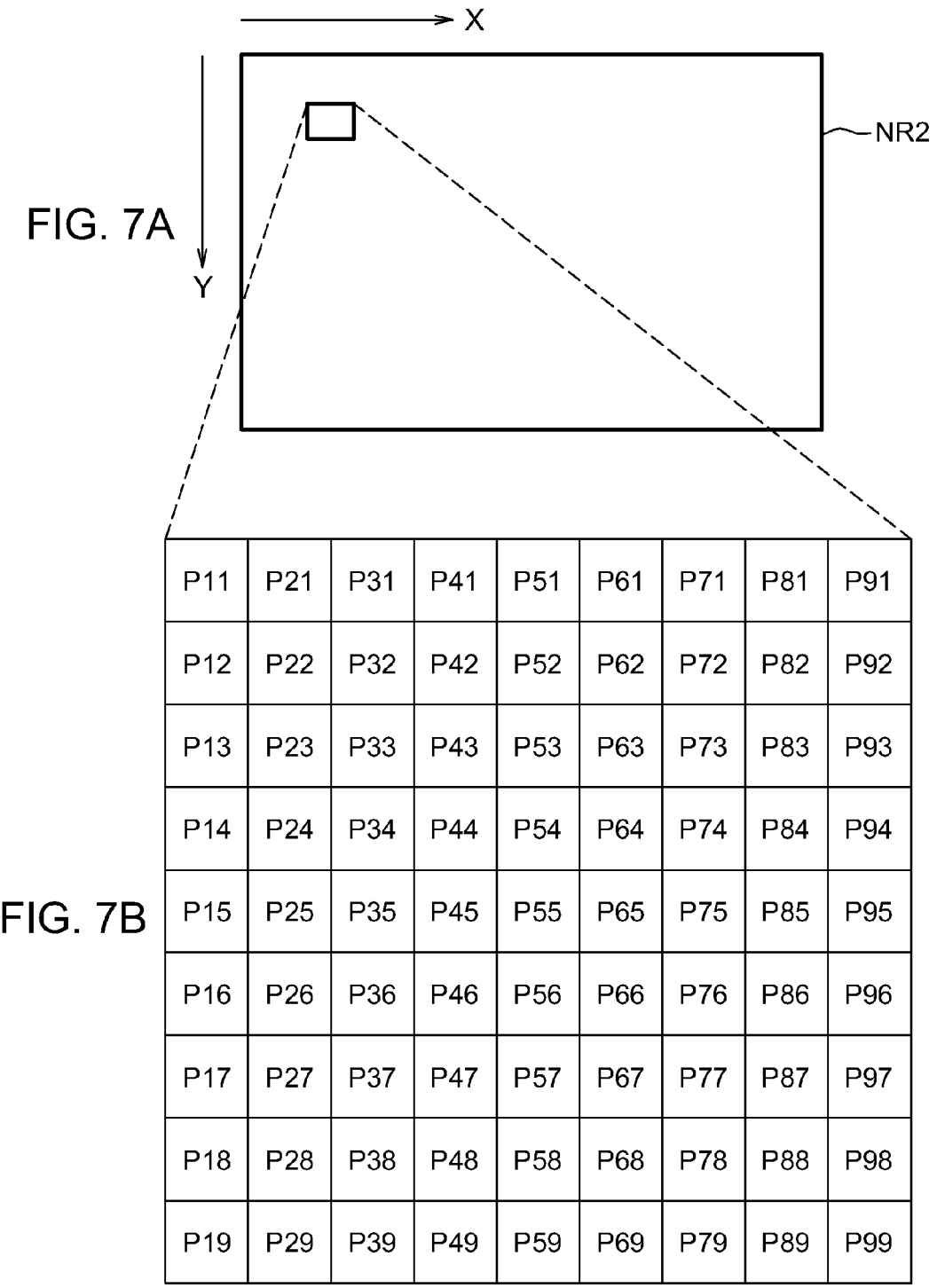
FIG. 7A represents the frame image of the filtered signal input to the delay circuit in FIG. 6.
FIG. 7B shows a nine-by-nine pixel region in the frame image in FIG. 7A.
Figure 8:
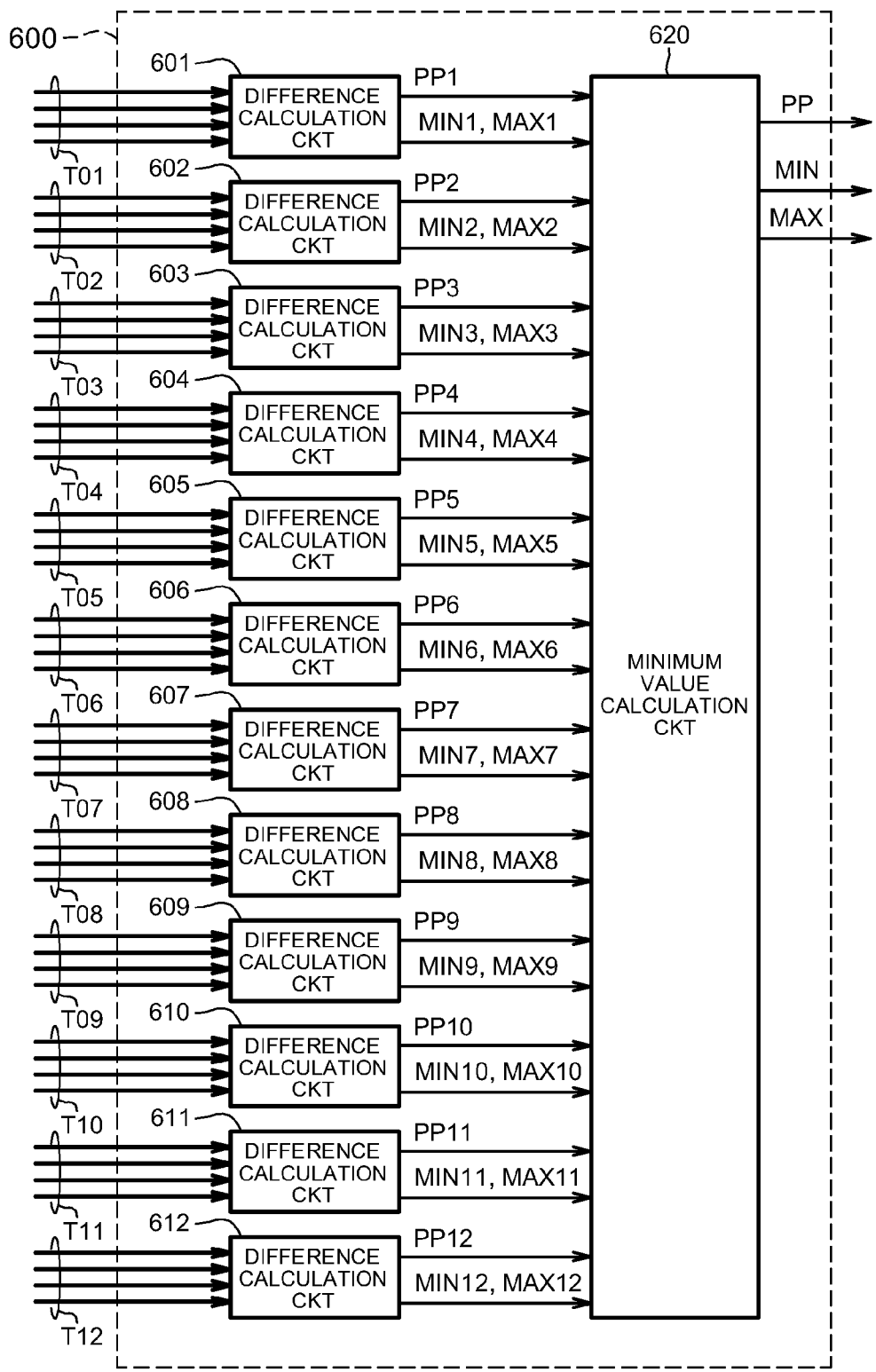
FIG. 8 is a block diagram showing the schematic structure of the operation circuit included in the in-plane pattern detection circuit in FIG. 5.

Referring again to FIG. 2, the in-plane pattern detection circuit 50 detects (discriminates) a highly correlated pixel region PN2 in the filtered signal NR2 in which noise has been reduced by spatial filter 42, notifies the pixel adder 20 of the pixel positions lying within the detected pixel region PN2, and also notifies a forward reference pattern detection circuit (spatial discrimination circuit) 71 and a backward reference pattern detection circuit (spatial discrimination circuit) 72 in the reference pattern detection circuit 70. The in-plane pattern detection circuit 50 simultaneously supplies the forward and backward reference pattern detection circuits 71, 72 with the maximum pixel value MAX and minimum pixel value MIN in pixel region PN2. FIG. 5 is a block diagram showing the schematic structure of the in-plane pattern detection circuit 50. FIG. 6 shows the schematic structure of the delay circuit 520 in the in-plane pattern detection circuit 50. FIGS. 7A and 7B illustrate an arbitrary nine-by-nine pixel region sampled by this delay circuit 520 in the frame image. FIG. 8 is a block diagram showing the schematic structure of an operation circuit 600 included in the in-plane pattern detection circuit 50. Further details of the in-plane pattern detection circuit 50 will be given later below.

Delay circuit 38 in FIG. 2 outputs a delayed filtered signal NR3D obtained by delaying the filtered signal NR3 output by spatial filter 43 by a certain time interval determined from the processing time in in-plane pattern detection circuit 50. Delay circuit 37 outputs a delayed filtered signal NR1D obtained by delaying the filtered signal NR1 output by spatial filter 41 by a certain time interval also determined from the processing time in in-plane pattern detection circuit 50.

Delay circuit 36 outputs a delayed signal F3D obtained by delaying the raw image signal F3 by a certain time interval determined from the processing time in spatial filter 42 and the pattern detection circuits 50, 70. Delay circuit 35 outputs a delayed signal F2D obtained by delaying the frame delayed signal F2 output by one-frame delay circuit 31 by a certain time interval also determined from the processing time in spatial filter 42 and the pattern detection circuits 50, 70. Delay circuit 34 outputs a signal F1D obtained by delaying the signal F1 output by one-frame delay circuit 32 by a certain time interval likewise determined from the processing time in spatial filter 42 and the pattern detection circuits 50, 70.

Figure 9:
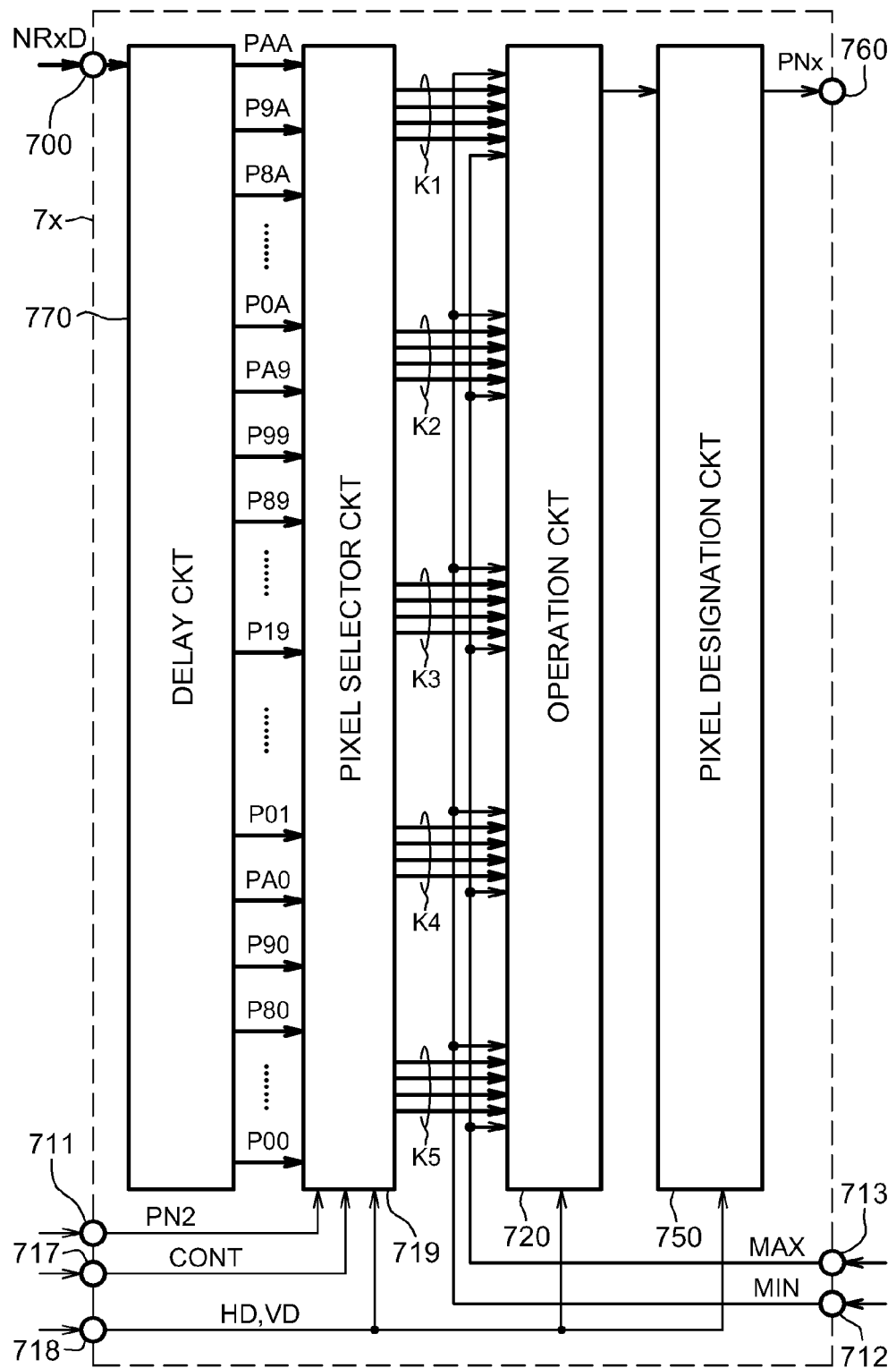
FIG. 9 is a block diagram showing the schematic structure of the forward reference pattern detection circuit and the backward reference pattern detection circuit in the first embodiment.
Figure 10:
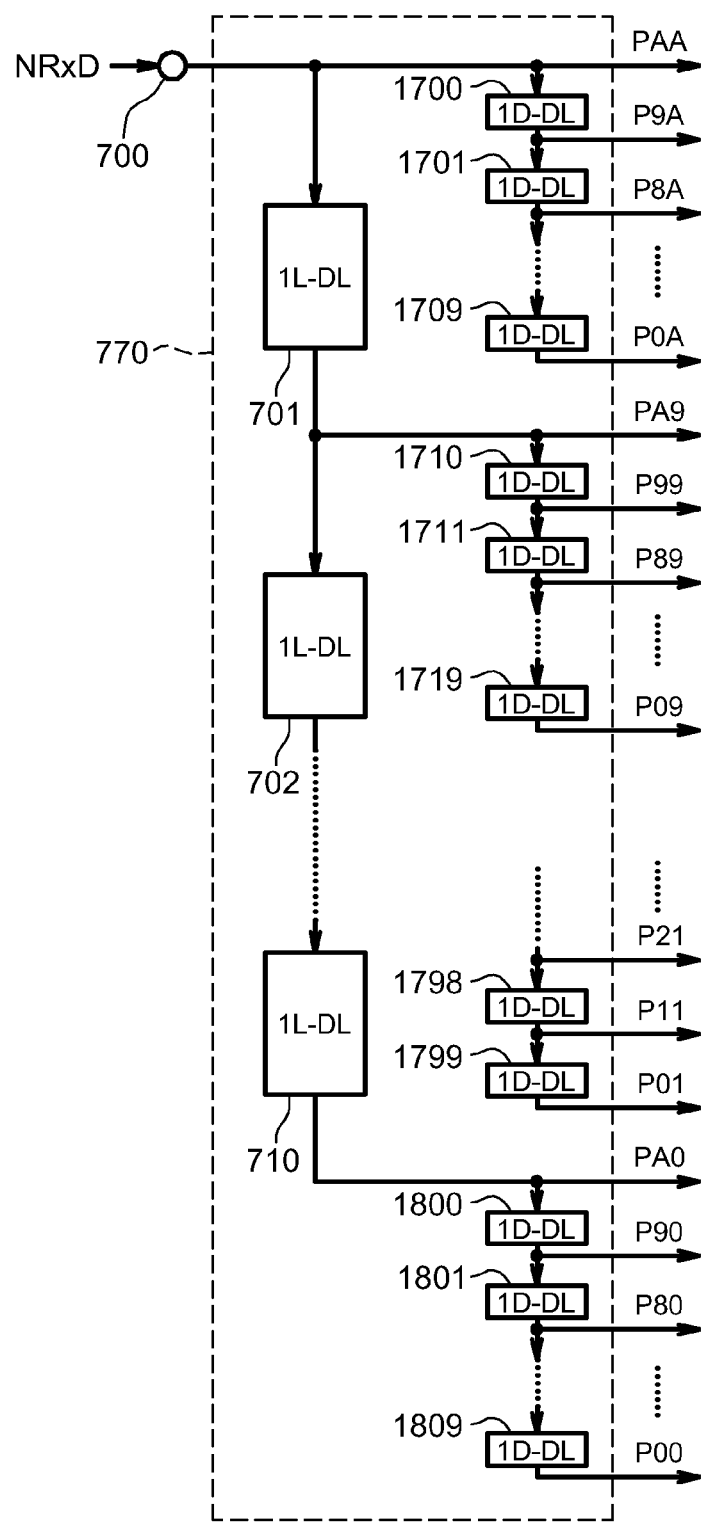
FIG. 10 shows the schematic structure of the delay circuit in FIG. 9.
Figures 11A, 11B:
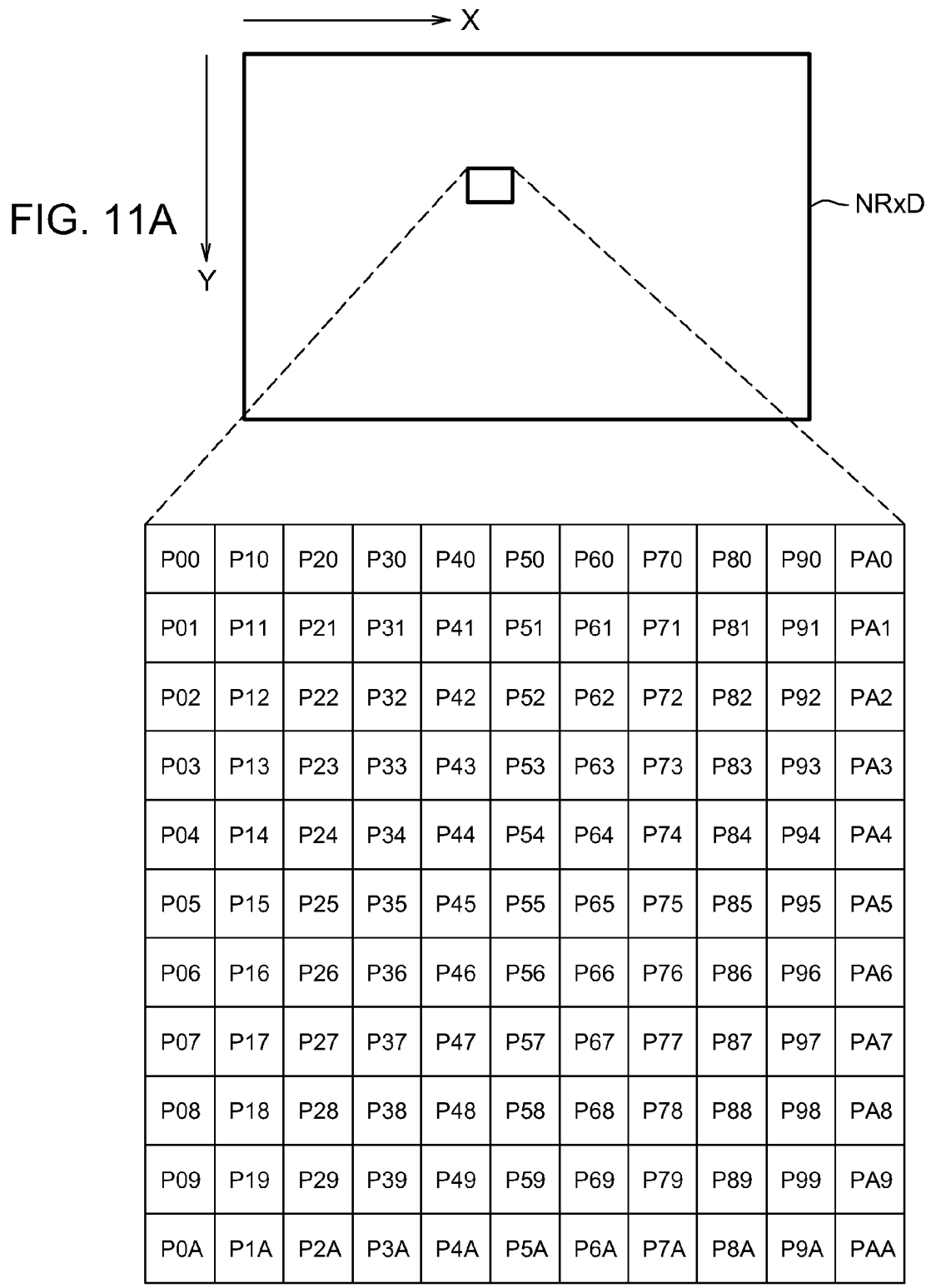
FIG. 11A represents the frame image of the delayed signal input to the delay circuit in FIG. 10.
FIG. 11B shows an eleven-by-eleven pixel region in the frame image in FIG. 7A.
Figure 12:
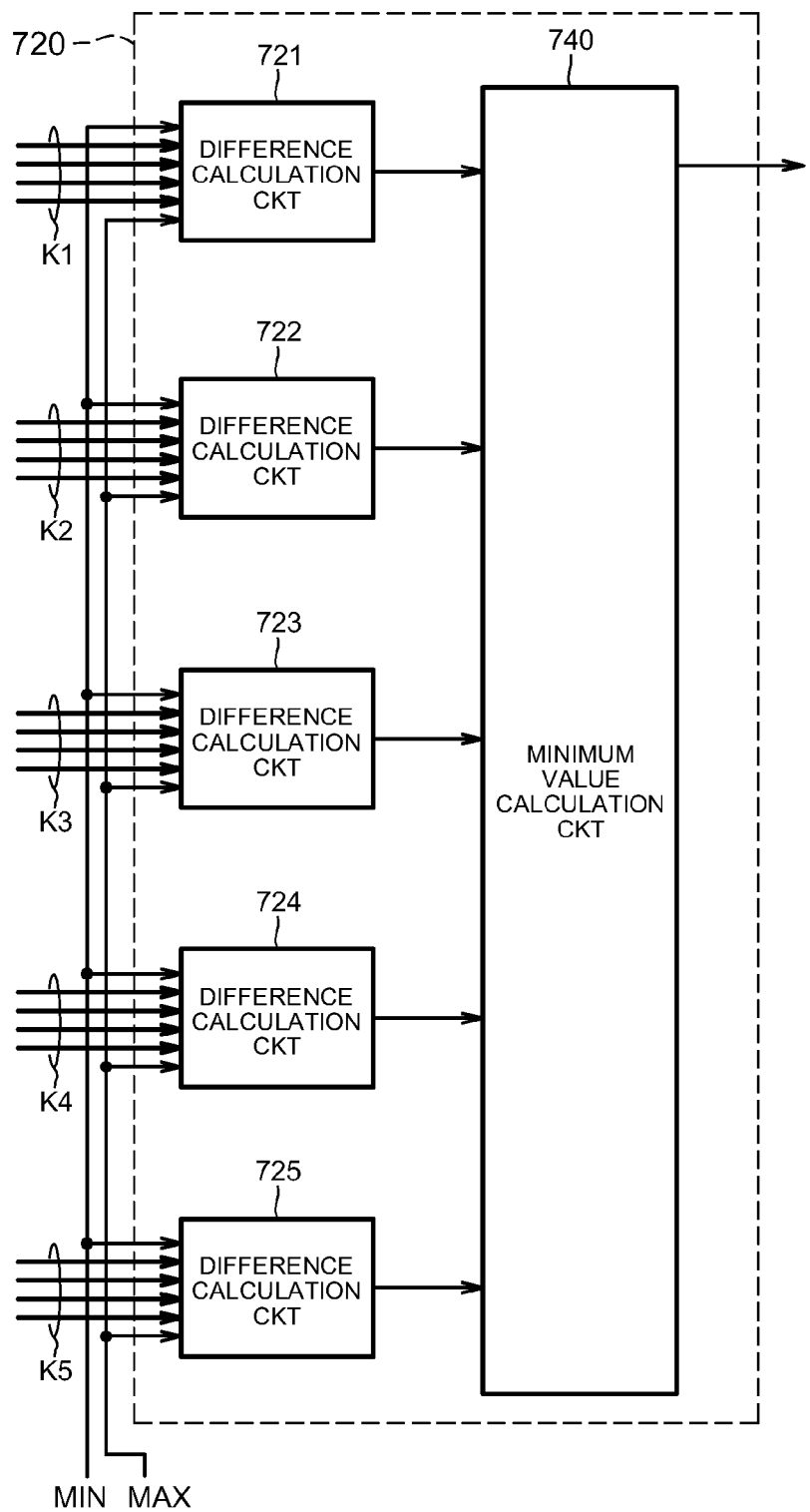
FIG. 12 is a block diagram showing the schematic structure of the operation circuit included in the circuit in FIG. 9.

From delayed signal NR1D, the forward reference pattern detection circuit 71 detects (discriminates) a pixel region PN1 that is highly correlated with the pixel region PN2 detected by the in-plane pattern detection circuit 50 and notifies the pixel adder 20 of the pixel positions lying within the detected pixel region PN1. From delayed signal NR3D, the backward reference pattern detection circuit 72 detects (discriminates) a pixel region that is highly correlated with the pixel region PN2 detected by the in-plane pattern detection circuit 50 and notifies the pixel adder 20 of the pixel positions lying within the detected pixel region PN3. FIG. 9 is a block diagram showing the schematic structure of a reference pattern detection circuit 7x having the same configuration as the forward reference pattern detection circuit 71 and backward reference pattern detection circuit 72. FIG. 10 shows the schematic structure of a delay circuit 770 included in the reference pattern detection circuit 7x in FIG. 9. FIGS. 11A and 11B illustrate an arbitrary eleven-by-eleven pixel region sampled by delay circuit 770 in the frame image. FIG. 12 is a block diagram showing the schematic structure of an operation circuit 720 included in the reference pattern detection circuit 7x in FIG. 9. Further details of the forward reference pattern detection circuit 71 and backward reference pattern detection circuit 72 will be given later below.

Referring once again to FIG. 2, the pixel adder 20 is operative to take a sum of the pixels in selected pixel patterns in the output signals F1D, F2D, F3D of delay circuits 34, 35, 36. As shown in FIG. 2, the pixel adder 20 includes selector circuits 21, 22, 23 and an addition circuit 24. The selector circuits 21, 22, 23 select the pixels to be added on the basis of the pixel positions in pixel region PN2 reported by the in-plane pattern detection circuit 50, the pixel positions in pixel region PN1 reported by the forward reference pattern detection circuit 71, and the pixel positions in pixel region PN3 reported by the backward reference pattern detection circuit 72. The addition circuit 24 generates a pixel sum signal by adding the pixels selected by the selector circuits 21, 22, 23. The pixel adder 20 supplies the pixel sum signal from its output terminal OUTa to the image signal processor 15. The pixel adder 20 must be receiving or holding the values of the selected pixels when the pattern detection circuits 50, 70 specify the positions of the selected pixels. The delays produced by delay circuits 34, 35, 36 are designed to synchronize the input of the pixel values to the pixel adder 20 with the input of the pixel positions from the pattern detection circuits 50, 70 so that this condition is met.

Figure 13:
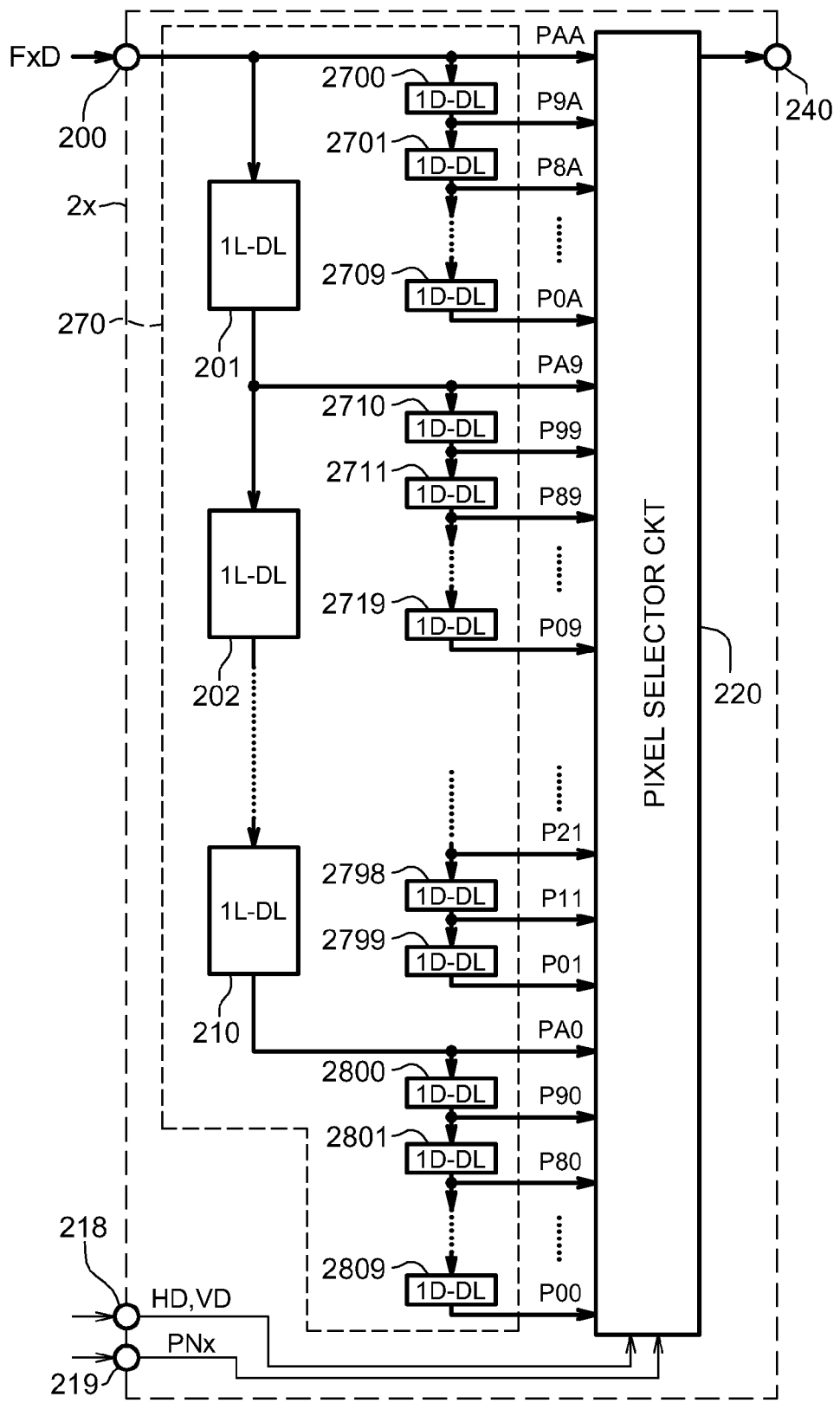
FIG. 13 shows the schematic structure of the selector circuits included in the pixel addition circuit in the first embodiment.

Selector circuit 23 is a reference pixel selector that supplies the addition circuit 24 with pixels selected from delayed signal F3D at the positions specified by the backward reference pattern detection circuit 72. Selector circuit 22 is an in-plane pixel selector that supplies the addition circuit 24 with pixels selected from delayed signal F2D at the positions specified by the in-plane pattern detection circuit 50. Selector circuit 21 is a reference pixel selector that supplies the addition circuit 24 with pixels selected from delayed signal F1D at the positions specified by the forward reference pattern detection circuit 71. The addition circuit 24 adds the pixels input from the selector circuits 21, 22, 23 and supplies the resulting pixel sum signal from the output terminal OUTa to the image signal processor 15. FIG. 13 shows the schematic structure of a selector circuit 2x having the same configuration as selector circuits 21, 22, and 23.

As shown in FIG. 3, spatial filter 4x has a delay circuit 420 that outputs the pixel values of twenty-five pixels in a five-by-five pixel region in parallel. Delay circuit 420 samples an arbitrary five-by-five pixel region in the frame image represented by frame signal Fx, which represents one of the signals F1, F2, F3, as shown in FIG. 4A, and outputs twenty-five pixel values P33-P37, P43-P47, P53-P57, P63-P67, and P73-P77, among which pixel value P55 is the value of the pixel of interest. The horizontal pixel direction is represented by X in FIG. 4A, and the vertical pixel direction by Y. Next, the operation of spatial filter 4x at the timing at which pixel value P77 in FIG. 4B is applied to the input terminal 401 will be described.

The pixel value P77 output from the analog-to-digital converter 13A is applied to the input terminal 401 of spatial filter 4x and supplied to a one-line delay circuit 422, a one-pixel delay circuit 432, and a multiplier 461. One-pixel delay circuit 432 performs a one-pixel delay and outputs pixel value P67. Pixel value P67 is supplied to a one-pixel delay circuit 433 and a multiplier circuit 462. One-pixel delay circuit 433 performs a one-pixel delay and outputs pixel value P57. Pixel value P57 is supplied to a one-pixel delay circuit 434 and a multiplier circuit 463. One-pixel delay circuit 434 performs a one-pixel delay and outputs pixel value P47. Pixel value P47 is supplied to a one-pixel delay circuit 435 and a multiplier circuit 464. One-pixel delay circuit 435 performs a one-pixel delay and outputs pixel value P37. Pixel value P37 is supplied to a multiplier circuit 465.

The pixel value P76 output from one-line delay circuit 422 is supplied to a further one-line delay circuit 423, a one-pixel delay circuit 437, and a multiplier circuit 466. One-pixel delay circuit 437 performs a one-pixel delay and outputs pixel value P66. Pixel value P66 is supplied to a one-pixel delay circuit 438 and a multiplier circuit 467. One-pixel delay circuit 438 performs a one-pixel delay and outputs pixel value P56. Pixel value P56 is supplied to a one-pixel delay circuit 439 and a multiplier circuit 468. One-pixel delay circuit 439 performs a one-pixel delay and outputs pixel value P46. Pixel value P46 is supplied to a one-pixel delay circuit 440 and a multiplier circuit 469. One-pixel delay circuit 440 performs a one-pixel delay and outputs pixel value P36. Pixel value P37 is supplied to a multiplier circuit 470.

The pixel value P75 output from one-line delay circuit 423 is supplied to a further one-line delay circuit 424, a one-pixel delay circuit 442, and a multiplier circuit 471. One-pixel delay circuit 442 performs a one-pixel delay and outputs pixel value P65. Pixel value P65 is supplied to a one-pixel delay circuit 443 and a multiplier circuit 472. One-pixel delay circuit 443 performs a one-pixel delay and outputs pixel value P55. Pixel value P55 is supplied to a one-pixel delay circuit 444 and a multiplier circuit 473. One-pixel delay circuit 444 performs a one-pixel delay and outputs pixel value P45. Pixel value P45 is supplied to a one-pixel delay circuit 445 and a multiplier circuit 474. One-pixel delay circuit 445 performs a one-pixel delay and outputs pixel value P35. Pixel value P35 is supplied to a multiplier circuit 475.

The pixel value P74 output from one-line delay circuit 424 is supplied to a further one-line delay circuit 425, a one-pixel delay circuit 447, and a multiplier circuit 476. One-pixel delay circuit 447 performs a one-pixel delay and outputs pixel value P64. Pixel value P64 is supplied to a one-pixel delay circuit 448 and a multiplier circuit 477. One-pixel delay circuit 448 performs a one-pixel delay and outputs pixel value P54. Pixel value P54 is supplied to a one-pixel delay circuit 449 and a multiplier circuit 478. One-pixel delay circuit 449 performs a one-pixel delay and outputs pixel value P44. Pixel value P44 is supplied to a one-pixel delay circuit 450 and a multiplier circuit 479. One-pixel delay circuit 450 performs a one-pixel delay and outputs pixel value P34. Pixel value P34 is supplied to a multiplier circuit 480.

The pixel value P73 output from one-line delay circuit 425 is supplied to a further one-line delay circuit 452, and a multiplier circuit 481. One-pixel delay circuit 452 performs a one-pixel delay and outputs pixel value P63. Pixel value P63 is supplied to a one-pixel delay circuit 453 and a multiplier circuit 482. One-pixel delay circuit 453 performs a one-pixel delay and outputs pixel value P53. Pixel value P53 is supplied to a one-pixel delay circuit 454 and a multiplier circuit 483. One-pixel delay circuit 454 performs a one-pixel delay and outputs pixel value P43. Pixel value P43 is supplied to a one-pixel delay circuit 455 and a multiplier circuit 484. One-pixel delay circuit 455 performs a one-pixel delay and outputs pixel value P33. Pixel value P33 is supplied to a multiplier circuit 485.

The MPU 19 sets a low-pass filter characteristic in a variable coefficient setting circuit 495 via the control terminal 417 in FIG. 3. The variable coefficient setting circuit 495 sets a group of filter coefficients (a weighting coefficient group) KD based on the setting instructions received from the MPU 19. The synchronization signal generator 18 supplies the horizontal synchronization signal HD and vertical synchronization signal VD to the variable coefficient setting circuit 495 via a synchronization signal input terminal (pair) 418 in FIG. 3. The variable coefficient setting circuit 495 determines the pixel position of the pixel of interest P55 from the horizontal synchronization signal HD and vertical synchronization signal VD, and identifies the corresponding position of the pixel of interest in the color filter array. The variable coefficient setting circuit 495 can also determine whether the pixel of interest is a red, green, or blue pixel. On the basis of the identified pixel position and the filter coefficient group KD, the variable coefficient setting circuit 495 sets twenty-five independent filter coefficients K33-K37, K43-K47, K53-K57, K63-K67, K73-K77 in the multiplying circuits 461-485. The multiplying circuits 461-485 multiply the input pixel values by these filter coefficients. A summing circuit 490 adds the values (weighted pixel values) output by the multiplying circuits 461-485 and outputs their sum from an output terminal 402.

Figure 14:
FIG. 14 schematically shows the spatial arrangement of pixels in the frame image.

FIG. 14 schematically shows the spatial arrangement of pixels in the frame image represented by frame signal Fx. Notation of the form Pks in FIG. 14 (where k and s are integers or symbols representing pixel position in the horizontal and vertical directions, respectively) represents one pixel or one pixel value in this frame image. FIG. 15 illustrates the spatial arrangement of a region measuring eleven pixels horizontally and eleven pixels vertically when the pixel of interest in FIG. 14 is a green pixel. Notation of the form Gnm in FIG. 15 (where n and m are integers or symbols representing pixel position in the horizontal and vertical directions, respectively) represents one green pixel or pixel value, while notation of the form Rpq (where p and q are integers or symbols representing pixel position in the horizontal and vertical directions, respectively) represents one red pixel or pixel value, and notation of the form Brs (where r and s are integers or symbols representing pixel position in the horizontal and vertical directions, respectively) represents one blue pixel or pixel value. This notation will be followed in subsequent drawings.

As shown in FIG. 15, red, green, and blue pixels are disposed in a checkerboard array. R10, R30, R50, R70, R90, R12, R32, R52, R72, R92, R14, R34, R54, R74, R94, R16, R36, R56, R76, R96, R18, R38, R58, R78, R98, R1A, R3A, R5A, R7A, and R9A indicate red pixels. G00, G20, G40, G60, G80, GA0, G11, G31, G51, G71, G91, G02, G22, G42, G62, G82, GA2, G13, G33, G53, G73, G91, G04, G24, G44, G64, G84, GA4, G15, G35, G55, G75, G95, G06, G26, G46, G66, G86, GA6, G17, G37, G57, G77, G97, G08, G28, G48, G68, G88, GA8, G19, G39, G59, G79, G99, G0A, G2A, G4A, G6A, G8A, and GAA indicate green pixels. B01, B21, B41, B61, B81, BA1, B03, B23, B43, B63, B83, BA3, B05, B25, B45, B65, B85, BA5, B07, B27, B47, B67, B87, BA7, B09, B29, B49, B69, B89, and BA9 indicate blue pixels. The pixel array consists of basic blocks of four pixels such as, for example, R34, G35, B45, and G44, measuring two pixels horizontally and two pixels vertically. In this example the pixels horizontally adjacent to the pixel of interest (G55) are blue pixels, but there are also array patterns in which the horizontally adjacent pixels are red pixels, as the pixel of interest is at G44. Since only green pixels are added when the pixel of interest is green, the following description applies to both types of arrays, even though the positions of the red and blue pixels may be interchanged.

FIG. 16 illustrates the positions (shown within the dashed line) of the pixels operated on by the spatial filters 41, 42, 43 when the pixel of interest is a green pixel.

The output of the spatial filters 41, 42, 43 in this case can be expressed as follows:

$$G = K44 \times G44 + K64 \times G64 + K55 \times G55 + K46 \times G46 + K66 \times G66$$

Of the filter coefficients K33-K37, K43-K47, K53-K57, K63-K67, K73-K77, the variable coefficient setting circuit 495 sets the filter coefficients not used in the computation above to zero. The MPU 19 instructs the variable coefficient setting circuit 495 to set filter coefficients that reduce noise. The following filter coefficients, for example, may be set:

K44=⅛
K64=⅛
K55=4/8
K46=⅛
K66=⅛

When the subject illumination (to be described later) is lower than a threshold value and the amplitude of the pixel signals is small, the above filter coefficients can be increased by, for example, a factor of eight. Filter coefficients with values equal to or greater than unity can be used to prevent even the slight loss of weak signal components.

Alternatively, the MPU 19 may instruct the variable coefficient setting circuit 495 to set, for example, the following coefficients:

K44=⅕
K64=⅕
K55=⅕
K46=⅕
K66=⅕

When the subject illumination is lower than a threshold value and the amplitude of the pixel signals is small, the above filter coefficients can be increased by, for example, a factor of five. Filter coefficients with values equal to or greater than unity can be used to prevent even the slight loss of weak signal components.

In the above embodiment, the spatial filters 41, 42, 43 are noise reduction filters that operate on five mutually neighboring pixels, but when the image signal is captured under low illumination and there is more noise, it is better to use a noise reduction filter operating on nine mutually neighboring pixels. In that case, the outputs of the spatial filters 41, 42, 43 are expressed as follows:

$$G = K53 \times G53 + K44 \times G44 + K64 \times G64 + K35 \times G35 +$$
$$K55 \times G55 + K75 \times G75 + K46 \times G46 + K66 \times G66 + K57 \times G57$$

Figure 17:
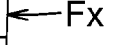
FIG. 17 shows the spatial arrangement of pixels when the pixel of interest is a red pixel.

FIG. 17 illustrates the spatial arrangement of a region measuring eleven pixels horizontally and eleven pixels vertically when the pixel of interest in FIG. 14 is a red pixel. Red, green, and blue pixels are disposed in a checkerboard array. R11, R31, R51, R71, R91, R13, R33, R53, R73, R93, R15, R35, R55, R75, R95, R17, R37, R57, R77, R97, R19, R39, R59, R79, and R99 indicate red pixels. G10, G30, G50, G70, G90, G12, G32, G52, G72, G92, G14, G34, G54, G74, G94, G16, G36, G56, G76, G96, G18, G38, G58, G78, G98, G1A, G3A, G5A, G7A, G9A, G01, G21, G41, G61, G81, GA1, G03, G23, G43, G63, G83, GA3, G05, G25, G45, G65, G85, GA5, G07, G27, G47, G67, G87, GA7, G09, G29, G49, G69, G89, and GA9 indicate green pixels. B00, B20, B40, B60, B80, BA0, B02, B22, B42, B62, B82, BA2, B04, B24, B44, B64, B84, BA4, B06, B26, B46, B66, B86, BA6, B08, B28, B48, B68, B88, BA8, B0A, B2A, B4A, B6A, B8A, and BAA indicate blue pixels. The pixel array consists of basic two-by-two blocks of four pixels such as, for example, R33, G34, B44, and G43.

Figure 18:
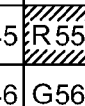
FIG. 18 shows the array of pixels operated on by the spatial filters when the pixel of interest is a red pixel.

FIG. 18 illustrates the positions of the pixels operated on by the spatial filters 41, 42, 43 when the pixel of interest is a red pixel.

The output of the spatial filters 41, 42, 43 in this case can be expressed as follows:

$$R = K53 \times R53 + K35 \times R35 + K55 \times R55 + K75 \times R75 + K57 \times R57$$

Of the filter coefficients K33-K37, K43-K47, K53-K57, K63-K67, K73-K77, the variable coefficient setting circuit 495 sets the filter coefficients not used in the computation above to zero. The MPU 19 instructs the variable coefficient setting circuit 495 to set filter coefficients that reduce noise. The following filter coefficients, for example, may be set:
K53=⅛
K35=⅛
K55=4/8
K75=⅛
K57=⅛

When the subject illumination is lower than a threshold value and the amplitude of the pixel signals is small, the above filter coefficients can be increased by, for example, a factor of eight. Filter coefficients with values equal to or greater than unity can be used to prevent even the slight loss of weak signal components.

Alternatively, the MPU 19 may instruct the variable coefficient setting circuit 495 to set, for example, the following coefficients:
K53=⅕
K35=⅕
K55=⅕
K75=⅕
K57=⅕

When the subject illumination is lower than a threshold value and the amplitude of the pixel signals is small, the above filter coefficients can be increased by, for example, a factor of five. Filter coefficients with values equal to or greater than unity can be used to prevent even the slight loss of weak signal components.

In the above embodiment, the spatial filters 41, 42, 43 are noise reduction filters that operate on five mutually neighboring pixels, but when the image signal is captured under low illumination and there is more noise, it is better to use a noise reduction filter operating on nine mutually neighboring pixels. In that case, the outputs of the spatial filters 41, 42, 43 are expressed as follows:

$$R = K33 \times R33 + K53 \times R53 + K73 \times R73 + K35 \times R35 +$$
$$K55 \times R55 + K75 \times R75 + K37 \times R37 + K57 \times R57 + K77 \times R77$$

FIG. 19 illustrates the spatial arrangement of the color filters in a region measuring eleven pixels horizontally and eleven pixels vertically when the pixel of interest in FIG. 14 is a red pixel. Red, green, and blue pixels are disposed in a checkerboard array. R00, R20, R40, R60, R80, RA0, R02, R22, R42, R62, R82, RA2, R04, R24, R44, R64, R84, RA4, R06, R26, R46, R66, R86, RA6, R08, R28, R48, R68, R88, RA8, R0A, R2A, R4A, R6A, R8A, and RAA indicate red pixels. G10, G30, G50, G70, G90, G12, G32, G52, G72, G92, G14, G34, G54, G74, G94, G16, G36, G56, G76, G96, G18, G38, G58, G78, G98, G1A, G3A, G5A, G7A, G9A, G01, G21, G41, G61, G81, GA1, G03, G23, G43, G63, G83, GA3, G05, G25, G45, G65, G85, GA5, G07, G27, G47, G67, G87, GA7, G09, G29, G49, G69, G89, and GA9 indicate green pixels. B11, B31, B51, B71, B91, B13, B33, B53, B73, B93, B15, B35, B55, B75, B95, B17, B37, B57, B77, B97, B19, B39, B59, B79, and B99 indicate blue pixels. The pixel array consists of basic two-by-two blocks of four pixels such as, for example, R44, G45, B55, and G54.

FIG. 19 illustrates the spatial arrangement of a region measuring eleven pixels horizontally and eleven pixels vertically when the pixel of interest in FIG. 14 is a blue pixel. The red, green, and blue pixels are disposed in a checkerboard array. FIG. 20 illustrates the positions of the pixels operated on by the spatial filters 41, 42, 43 when the pixel of interest is a blue pixel.

The output of the spatial filters 41, 42, 43 in this case can be expressed as follows:

$$B = K53 \times B53 + K35 \times B35 + K55 \times B55 + K75 \times B75 + K57 \times B57$$

Of the filter coefficients K33-K37, K43-K47, K53-K57, K63-K67, K73-K77, the variable coefficient setting circuit 495 sets the filter coefficients not used in the computation above to zero. The MPU 19 instructs the variable coefficient setting circuit 495 to set filter coefficients that reduce noise. The following filter coefficients, for example, may be set:
K53=⅛
K35=⅛
K55=4/8
K75=⅛
K57=⅛

When the subject illumination is lower than a threshold value and the amplitude of the pixel signals is small, the above filter coefficients can be increased by, for example, a factor of eight. Filter coefficients with values equal to or greater than unity can be used to prevent even the slight loss of weak signal components.

Alternatively, the MPU 19 may instruct the variable coefficient setting circuit 495 to set, for example, the following coefficients:

K53=⅕
K35=⅕
K55=⅕
K75=⅕
K57=⅕

When the subject illumination is lower than a threshold value and the amplitude of the pixel signals is small, the above filter coefficients can be increased by, for example, a factor of five. Filter coefficients with values equal to or greater than unity can be used to prevent even the slight loss of weak signal components.

In this embodiment, each of the spatial filters 41, 42, 43 is a noise reduction filter that operates on five pixels, including the pixel of interest and four neighboring pixels, but when the image signal is captured under low illumination and there is more noise, it is better to use a noise reduction filter operating on nine mutually neighboring pixels. In that case, the outputs of spatial filters 41, 42, 43 are expressed as follows:

$$B = K33 \times B33 + K53 \times B53 + K73 \times B73 + K35 \times B35 +$$
$$K55 \times B55 + K75 \times B75 + K37 \times B37 + K57 \times B57 + K77 \times B77$$

In this embodiment, the spatial filters 41, 42, 43 are configured as low pass filters, on the assumption that most of the noise is distributed over high frequencies, but the filter coefficients may be adjusted to obtain a noise reduction filter matched to the characteristics of the noise included in the image signal. The spatial filters 41, 42, 43 may also be configured as, for example, epsilon filters or other contour-preserving low pass filters, to reduce noise while preserving more of the features of the original image, thereby improving the accuracy with which pixels that are highly correlated with the pixel of interest are detected.

The spatial filters 41, 42, 43 may be configured as low pass filters that make use of nine pixels (three horizontally by three vertically), but when there is much noise, low pass filters that make use of twenty-five pixels (five horizontally by five vertically) may be employed.

The spatial filters 41, 42, 43 are configured as in-plane low pass filters in this embodiment, but this is not a limitation. The spatial filters 41, 42, 43 may be configured as time-axis direction low pass filters, or as time-axis direction non-recursive (finite impulse response) low pass filters the filter coefficients of which can be changed adaptively according to image motion.

Because the spatial filters 41, 42, 43 are provided in this embodiment to prevent mistaken decisions due to noise and enable more highly correlated pixels to be identified, the resolution of the pixel sum image is not impaired and higher image quality can be obtained.

Next the operation of the in-plane pattern detection circuit 50 will be described in detail with reference to FIGS. 5 to 8. As shown in FIG. 5, the in-plane pattern detection circuit 50 has a delay circuit 520, a pixel selector circuit (in-plane pixel extractor) 599, an operation circuit 600, and a pixel designation circuit 630. Repetitions of identical elements in FIG. 5 are omitted to avoid the complexity and unintelligibility that would result if all elements were to be shown. The arrangement of pixels in the pixel region measuring eleven pixels horizontally and eleven pixels vertically centered on the pixel of interest P55 is shown in FIGS. 7A and 7B. The operation of the in-plane pattern detection circuit 50 at the timing at which pixel P99 in FIG. 7B is applied to input terminal 500 in FIG. 5 will be described below. The pixel value P99 output from the analog-to-digital converter 13A is applied to the input terminal INa of the pixel adding circuit 14 and thence through one-frame delay circuit 31 and spatial filter 42 to the input terminal 500 of the in-plane pattern detection circuit 50.

FIG. 6 shows the configuration of delay circuit 520. The pixel value P99 applied to input terminal 500 is supplied to a one-line delay circuit 501 and a one-pixel delay circuit 511 in delay circuit 520 and to the pixel selector circuit 599 (FIG. 5). One-pixel delay circuit 511 outputs a pixel value P89 delayed by one pixel. Pixel value P89 is supplied to a one-pixel delay circuit 512 and the pixel selector circuit 599. One-pixel delay circuit 512 outputs a pixel value P79 delayed by one more pixel. Pixel value P79 is supplied to a one-pixel delay circuit 513 (not shown) and the pixel selector circuit 599. One-pixel delay circuit 513 outputs a pixel value P69 delayed by one more pixel. Pixel value P69 is supplied to a one-pixel delay circuit 514 (not shown) and the pixel selector circuit 599. One-pixel delay circuit 514 outputs a pixel value P59 delayed by one more pixel. Pixel value P59 is supplied to a one-pixel delay circuit 515 (not shown) and the pixel selector circuit 599. One-pixel delay circuit 515 outputs a pixel value P49 delayed by one more pixel. Pixel value P49 is supplied to a one-pixel delay circuit 516 (not shown) and the pixel selector circuit 599. One-pixel delay circuit 516 outputs a pixel value P39 delayed by one more pixel. Pixel value P39 is supplied to a one-pixel delay circuit 517 (not shown) and the pixel selector circuit 599. One-pixel delay circuit 517 outputs a pixel value P29 delayed by one more pixel. Pixel value P29 is supplied to a one-pixel delay circuit 518 and the pixel selector circuit 599. One-pixel delay circuit 518 outputs a pixel value P19 delayed by one more pixel. Pixel value P19 is supplied to the pixel selector circuit 599.

One-line delay circuit 501 outputs a pixel value P98. Pixel value P98 is supplied to a one-line delay circuit 502, a one-pixel delay circuit 521 and the pixel selector circuit 599. One-pixel delay circuit 521 outputs a pixel value P88 delayed by one pixel. Pixel value P88 is supplied to a one-pixel delay circuit 522 and the pixel selector circuit 599. One-pixel delay circuit 522 outputs a pixel value P78 delayed by one more pixel. Pixel value P78 is supplied to a one-pixel delay circuit 523 (not shown) and the pixel selector circuit 599. One-pixel delay circuit 523 outputs a pixel value P68 delayed by one more pixel. Pixel value P68 is supplied to a one-pixel delay circuit 524 (not shown) and the pixel selector circuit 599. One-pixel delay circuit 524 outputs a pixel value P58 delayed by one more pixel. Pixel value P58 is supplied to a one-pixel delay circuit 525 (not shown) and the pixel selector circuit 599. One-pixel delay circuit 525 outputs a pixel value P48 delayed by one more pixel. Pixel value P48 is supplied to a one-pixel delay circuit 526 (not shown) and the pixel selector circuit 599. One-pixel delay circuit 526 outputs a pixel value P38 delayed by one more pixel. Pixel value P38 is supplied to a one-pixel delay circuit 527 (not shown) and the pixel selector circuit 599. One-pixel delay circuit 527 outputs a pixel value P28 delayed by one more pixel. Pixel value P28 is supplied to a one-pixel delay circuit 528 and the pixel selector circuit 599. One-pixel delay circuit 528 outputs a pixel value P18 delayed by one more pixel. Pixel value P18 is supplied to the pixel selector circuit 599.

One-line delay circuit 502 outputs a pixel value P97. Pixel value P97 is supplied to a one-line delay circuit 503, a one-pixel delay circuit 531 and the pixel selector circuit 599. One-pixel delay circuit 531 outputs a pixel value P87 delayed by one pixel. Pixel value P87 is supplied to a one-pixel delay circuit 532 and the pixel selector circuit 599. One-pixel delay circuit 532 outputs a pixel value P77 delayed by one more pixel. Pixel value P77 is supplied to a one-pixel delay circuit 533 and the pixel selector circuit 599. One-pixel delay circuit 533 outputs a pixel value P67 delayed by one more pixel. Pixel value P67 is supplied to a one-pixel delay circuit 534 and the pixel selector circuit 599. One-pixel delay circuit 534 outputs a pixel value P57 delayed by one more pixel. Pixel value P57 is supplied to a one-pixel delay circuit 535 and the pixel selector circuit 599. One-pixel delay circuit 535 outputs a pixel value P47 delayed by one more pixel. Pixel value P47 is supplied to a one-pixel delay circuit 536 and the pixel selector circuit 599. One-pixel delay circuit 536 outputs a pixel value P37 delayed by one more pixel. Pixel value P37 is supplied to a one-pixel delay circuit 537 and the pixel selector circuit 599. One-pixel delay circuit 537 outputs a pixel value P27 delayed by one more pixel. Pixel value P27 is supplied to a one-pixel delay circuit 538 and the pixel selector circuit 599. One-pixel delay circuit 538 outputs a pixel value P17 delayed by one more pixel. Pixel value P17 is supplied to the pixel selector circuit 599.

One-line delay circuit 503 outputs a pixel value P96. Pixel value P96 is supplied to a one-line delay circuit 504, a one-pixel delay circuit 541 and the pixel selector circuit 599. One-pixel delay circuit 541 outputs a pixel value P86 delayed by one pixel. Pixel value P86 is supplied to a one-pixel delay circuit 542 and the pixel selector circuit 599. One-pixel delay circuit 542 outputs a pixel value P76 delayed by one more pixel. Pixel value P76 is supplied to a one-pixel delay circuit 543 and the pixel selector circuit 599. One-pixel delay circuit 543 outputs a pixel value P66 delayed by one more pixel. Pixel value P66 is supplied to a one-pixel delay circuit 544 and the pixel selector circuit 599. One-pixel delay circuit 544 outputs a pixel value P56 delayed by one more pixel. Pixel value P56 is supplied to a one-pixel delay circuit 545 and the pixel selector circuit 599. One-pixel delay circuit 545 outputs a pixel value P46 delayed by one more pixel. Pixel value P46 is supplied to a one-pixel delay circuit 546 and the pixel selector circuit 599. One-pixel delay circuit 546 outputs a pixel value P36 delayed by one more pixel. Pixel value P36 is supplied to a one-pixel delay circuit 547 and the pixel selector circuit 599. One-pixel delay circuit 547 outputs a pixel value P26 delayed by one more pixel. Pixel value P26 is supplied to a one-pixel delay circuit 548 and the pixel selector circuit 599. One-pixel delay circuit 548 outputs a pixel value P16 delayed by one more pixel. Pixel value P16 is supplied to the pixel selector circuit 599.

One-line delay circuit 504 outputs a pixel value P95. Pixel value P95 is supplied to a one-line delay circuit 505, a one-pixel delay circuit 551 and the pixel selector circuit 599. One-pixel delay circuit 551 outputs a pixel value P85 delayed by one pixel. Pixel value P85 is supplied to a one-pixel delay circuit 552 and the pixel selector circuit 599. One-pixel delay circuit 552 outputs a pixel value P75 delayed by one more pixel. Pixel value P75 is supplied to a one-pixel delay circuit 553 and the pixel selector circuit 599. One-pixel delay circuit 553 outputs a pixel value P65 delayed by one more pixel. Pixel value P65 is supplied to a one-pixel delay circuit 554 and the pixel selector circuit 599. One-pixel delay circuit 554 outputs a pixel value P55 delayed by one more pixel. Pixel value P55 is supplied to a one-pixel delay circuit 555 and the pixel selector circuit 599. One-pixel delay circuit 555 outputs a pixel value P45 delayed by one more pixel. Pixel value P45 is supplied to a one-pixel delay circuit 556 and the pixel selector circuit 599. One-pixel delay circuit 556 outputs a pixel value P35 delayed by one more pixel. Pixel value P35 is supplied to a one-pixel delay circuit 557 and the pixel selector circuit 599. One-pixel delay circuit 557 outputs a pixel value P25 delayed by one more pixel. Pixel value P25 is supplied to a one-pixel delay circuit 558 and the pixel selector circuit 599. One-pixel delay circuit 558 outputs a pixel value P15 delayed by one more pixel. Pixel value P15 is supplied to the pixel selector circuit 599.

One-line delay circuit 505 outputs a pixel value P94. Pixel value P94 is supplied to a one-line delay circuit 506, a one-pixel delay circuit 561 and the pixel selector circuit 599. One-pixel delay circuit 561 outputs a pixel value P84 delayed by one pixel. Pixel value P84 is supplied to a one-pixel delay circuit 562 and the pixel selector circuit 599. One-pixel delay circuit 562 outputs a pixel value P74 delayed by one more pixel. Pixel value P74 is supplied to a one-pixel delay circuit 563 and the pixel selector circuit 599. One-pixel delay circuit 563 outputs a pixel value P64 delayed by one more pixel. Pixel value P64 is supplied to a one-pixel delay circuit 564 and the pixel selector circuit 599. One-pixel delay circuit 564 outputs a pixel value P54 delayed by one more pixel. Pixel value P54 is supplied to a one-pixel delay circuit 565 and the pixel selector circuit 599. One-pixel delay circuit 565 outputs a pixel value P44 delayed by one more pixel. Pixel value P44 is supplied to a one-pixel delay circuit 566 and the pixel selector circuit 599. One-pixel delay circuit 566 outputs a pixel value P34 delayed by one more pixel. Pixel value P34 is supplied to a one-pixel delay circuit 567 and the pixel selector circuit 599. One-pixel delay circuit 567 outputs a pixel value P24 delayed by one more pixel. Pixel value P24 is supplied to a one-pixel delay circuit 568 and the pixel selector circuit 599. One-pixel delay circuit 568 outputs a pixel value P14 delayed by one more pixel. Pixel value P14 is supplied to the pixel selector circuit 599.

One-line delay circuit 506 outputs a pixel value P93. Pixel value P93 is supplied to a one-line delay circuit 507, a one-pixel delay circuit 571 and the pixel selector circuit 599. One-pixel delay circuit 571 outputs a pixel value P83 delayed by one pixel. Pixel value P83 is supplied to a one-pixel delay circuit 572 and the pixel selector circuit 599. One-pixel delay circuit 572 outputs a pixel value P73 delayed by one more pixel. Pixel value P73 is supplied to a one-pixel delay circuit 573 and the pixel selector circuit 599. One-pixel delay circuit 573 outputs a pixel value P63 delayed by one more pixel. Pixel value P63 is supplied to a one-pixel delay circuit 574 and the pixel selector circuit 599. One-pixel delay circuit 574 outputs a pixel value P53 delayed by one more pixel. Pixel value P53 is supplied to a one-pixel delay circuit 575 and the pixel selector circuit 599. One-pixel delay circuit 575 outputs a pixel value P43 delayed by one more pixel. Pixel value P43 is supplied to a one-pixel delay circuit 576 and the pixel selector circuit 599. One-pixel delay circuit 576 outputs a pixel value P33 delayed by one more pixel. Pixel value P33 is supplied to a one-pixel delay circuit 577 and the pixel selector circuit 599. One-pixel delay circuit 577 outputs a pixel value P23 delayed by one more pixel. Pixel value P23 is supplied to a one-pixel delay circuit 578 and the pixel selector circuit 599. One-pixel delay circuit 578 outputs a pixel value P13 delayed by one more pixel. Pixel value P13 is supplied to the pixel selector circuit 599.

One-line delay circuit 507 outputs a pixel value P92. Pixel value P92 is supplied to a one-line delay circuit 508, a one-pixel delay circuit 581 and the pixel selector circuit 599. One-pixel delay circuit 581 outputs a pixel value P82 delayed by one pixel. Pixel value P82 is supplied to a one-pixel delay circuit 582 and the pixel selector circuit 599. One-pixel delay circuit 582 outputs a pixel value P72 delayed by one more pixel. Pixel value P72 is supplied to a one-pixel delay circuit 583 and the pixel selector circuit 599. One-pixel delay circuit 583 outputs a pixel value P62 delayed by one more pixel. Pixel value P62 is supplied to a one-pixel delay circuit 584 and the pixel selector circuit 599. One-pixel delay circuit 584 outputs a pixel value P52 delayed by one more pixel. Pixel value P52 is supplied to a one-pixel delay circuit 585 and the pixel selector circuit 599. One-pixel delay circuit 585 outputs a pixel value P42 delayed by one more pixel. Pixel value P42 is supplied to a one-pixel delay circuit 586 and the pixel selector circuit 599. One-pixel delay circuit 586 outputs a pixel value P32 delayed by one more pixel. Pixel value P32 is supplied to a one-pixel delay circuit 587 and the pixel selector circuit 599. One-pixel delay circuit 587 outputs a pixel value P22 delayed by one more pixel. Pixel value P22 is supplied to a one-pixel delay circuit 588 and the pixel selector circuit 599. One-pixel delay circuit 588 outputs a pixel value P12 delayed by one more pixel. Pixel value P12 is supplied to the pixel selector circuit 599.

One-line delay circuit 508 outputs a pixel value P91. Pixel value P91 is supplied to a one-pixel delay circuit 591 and the pixel selector circuit 599. One-pixel delay circuit 591 outputs a pixel value P81 delayed by one pixel. Pixel value P81 is supplied to a one-pixel delay circuit 592 and the pixel selector circuit 599. One-pixel delay circuit 592 outputs a pixel value P71 delayed by one more pixel. Pixel value P71 is supplied to a one-pixel delay circuit 593 and the pixel selector circuit 599. One-pixel delay circuit 593 outputs a pixel value P61 delayed by one more pixel. Pixel value P61 is supplied to a one-pixel delay circuit 594 and the pixel selector circuit 599. One-pixel delay circuit 594 outputs a pixel value P51 delayed by one more pixel. Pixel value P51 is supplied to a one-pixel delay circuit 595 and the pixel selector circuit 599. One-pixel delay circuit 595 outputs a pixel value P41 delayed by one more pixel. Pixel value P41 is supplied to a one-pixel delay circuit 596 and the pixel selector circuit 599. One-pixel delay circuit 596 outputs a pixel value P31 delayed by one more pixel. Pixel value P31 is supplied to a one-pixel delay circuit 597 and the pixel selector circuit 599. One-pixel delay circuit 597 outputs a pixel value P21 delayed by one more pixel. Pixel value P21 is supplied to a one-pixel delay circuit 598 and the pixel selector circuit 599. One-pixel delay circuit 598 outputs a pixel value P11 delayed by one more pixel. Pixel value P11 is supplied to the pixel selector circuit 599.

The horizontal synchronization signal HD and vertical synchronization signal VD are supplied from the synchronization signal generator 18 via a synchronization signal input terminal (pair) 500S in FIG. 5 to the pixel selector circuit 599. The pixel selector circuit 599 determines the position of the pixel of interest P55 from the horizontal synchronization signal HD and vertical synchronization signal VD, and can identify the corresponding position of the pixel of interest in the color filter array. The pixel selector circuit 599 can also tell whether the pixel of interest is a red, green, or blue pixel. On the basis of the identified pixel position, pixel values constituting addition patterns T01-T12 are supplied to difference calculation circuits 601-612.

Next the addition patterns (in-plane pixel addition patterns) T01-T12 will be described. If pixels that are highly correlated with the pixel of interest can be correctly selected for use in pixel addition, the loss of resolution following from the pixel addition process can be reduced. The pixel of interest and its neighboring pixels can be combined in a plurality of addition patterns. When the pixel of interest in FIG. 14 is a green pixel, there are twelve pixel addition patterns, shown in FIGS. 21-32, each including four pixels. For four-pixel addition of green pixels, the optimal addition pattern, that is, the most highly correlated pattern is selected from among these twelve patterns.

Figures 21, 22:
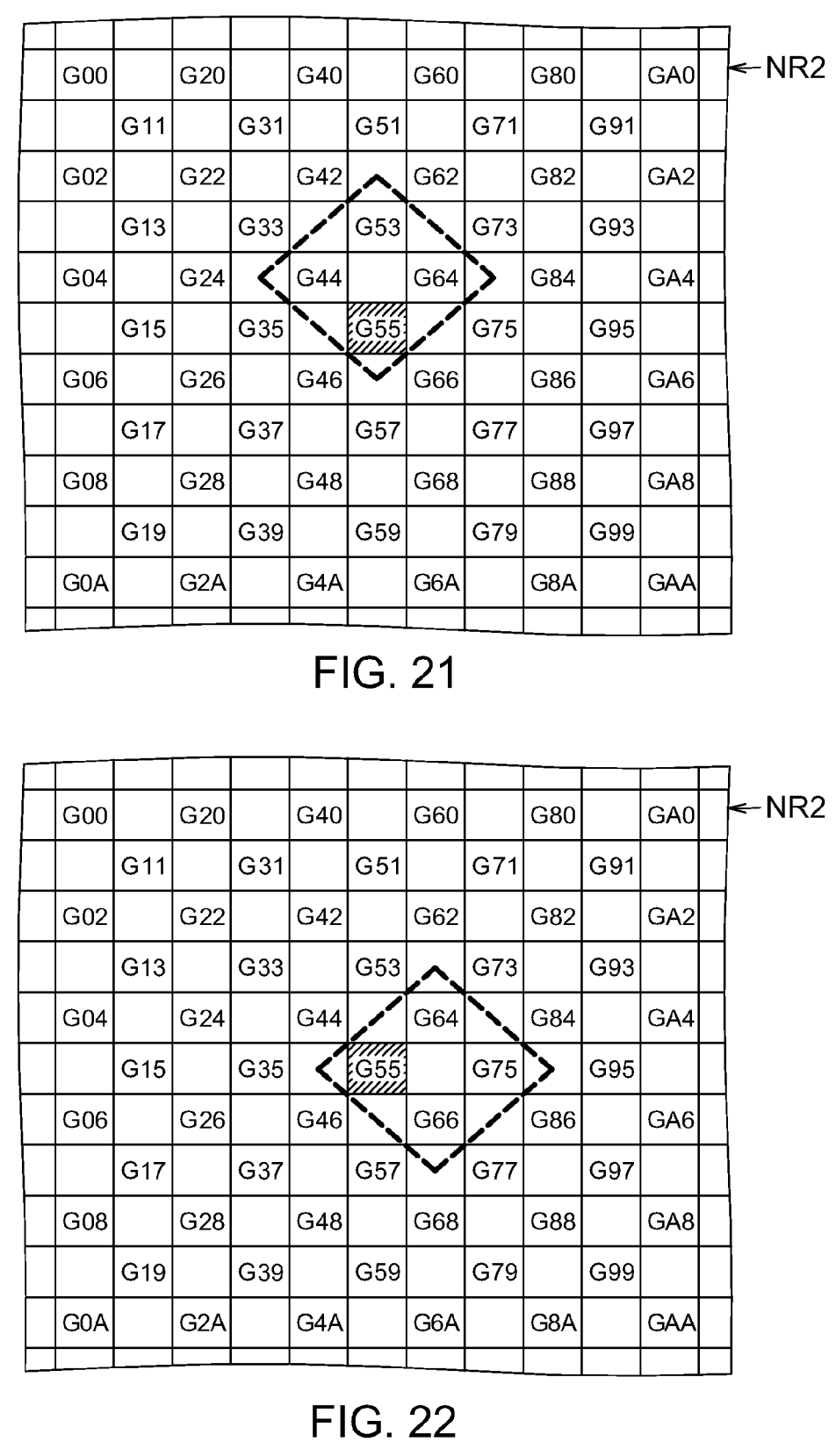
Figures 23, 24:
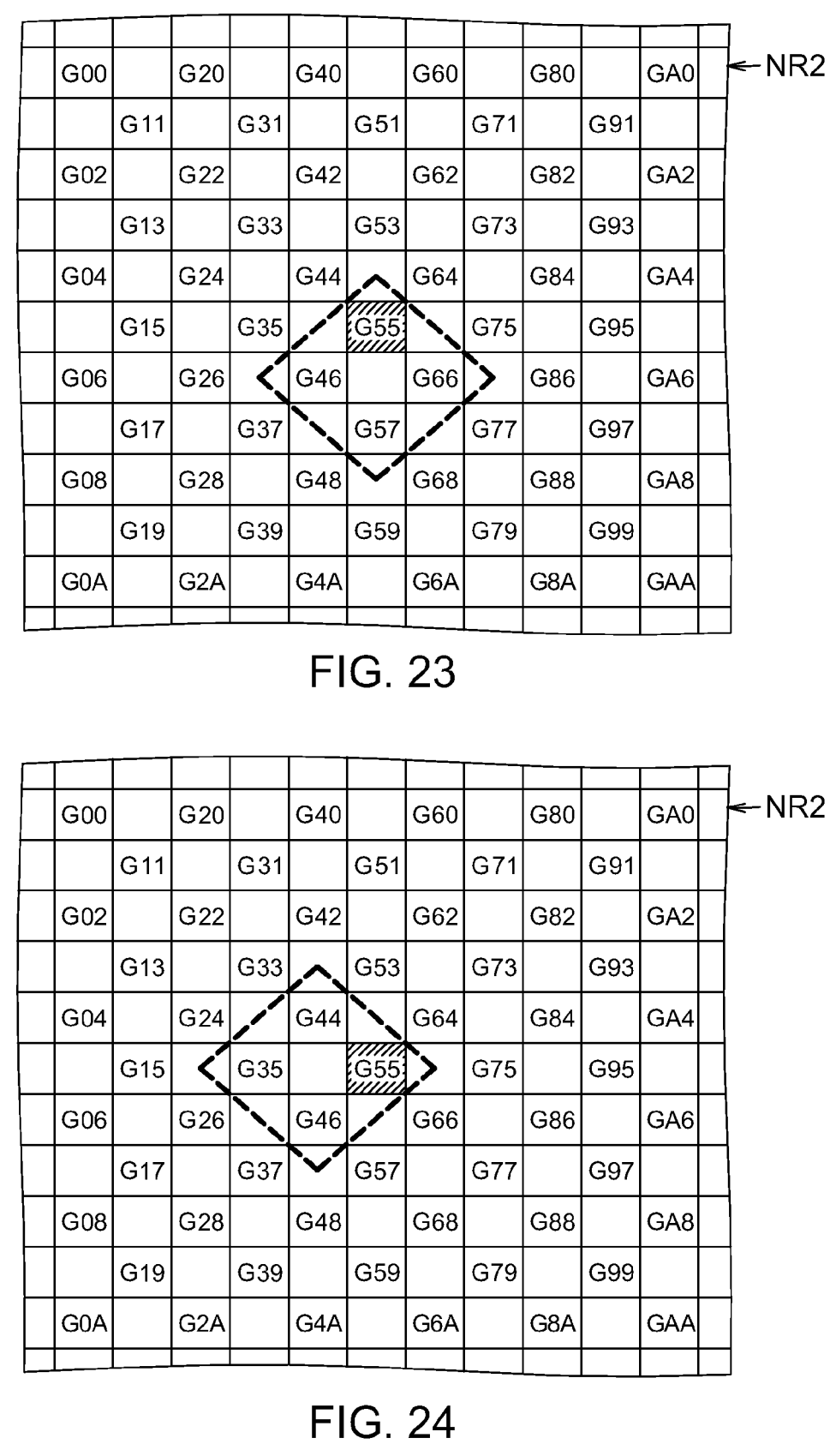

The pattern in FIG. 21 is an upper block pattern including the pixel of interest and neighboring pixels above it. The pixel selector circuit 599 supplies pixel values G53, G44, G64, G55 to difference calculation circuit 601. The pattern in FIG. 22 is a rightward block pattern including the pixel of interest and neighboring pixels to its right. The pixel selector circuit 599 supplies pixel values G64, G55, G75, G66 to difference calculation circuit 602. The pattern in FIG. 23 is a lower block pattern including the pixel of interest and neighboring pixels below it. The pixel selector circuit 599 supplies pixel values G55, G46, G66, G57 to difference calculation circuit 603. The pattern in FIG. 24 is a leftward block pattern including the pixel of interest and neighboring pixels to its left. The pixel selector circuit 599 supplies pixel values G44, G35, G55, G46 to difference calculation circuit 604.

Figures 27, 28:
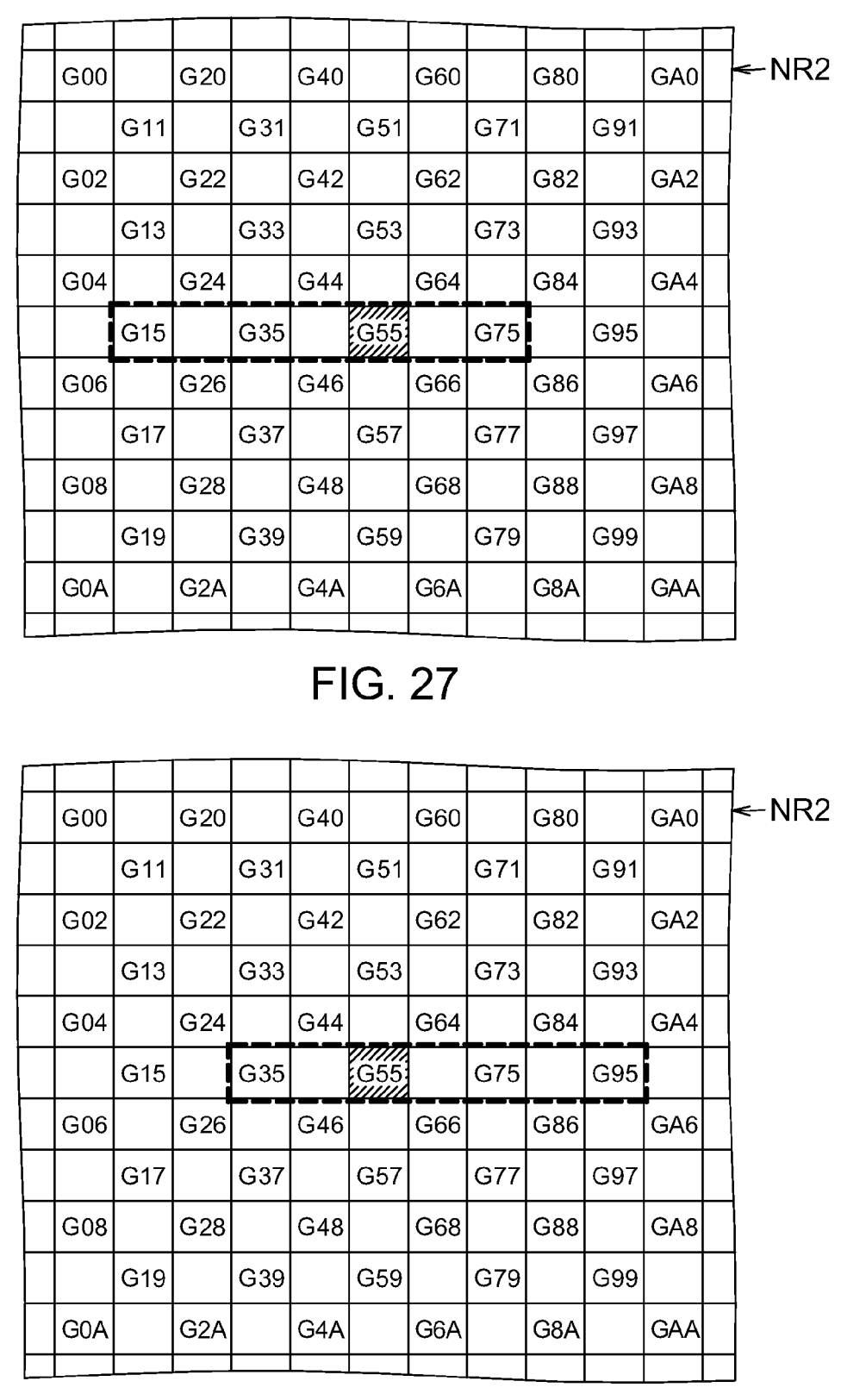

The pattern in FIG. 25 is an upper vertical line pattern including the pixel of interest and neighboring pixels above and below it. The pixel selector circuit 599 supplies pixel values G51, G53, G55, G57 to difference calculation circuit 605. The pattern in FIG. 26 is a lower vertical line pattern including the pixel of interest and neighboring pixels above and below it. The pixel selector circuit 599 supplies pixel values G53, G55, G57, G59 to difference calculation circuit 606. The pattern in FIG. 27 is a leftward horizontal line pattern including the pixel of interest and neighboring pixels to its right and left. The pixel selector circuit 599 supplies pixel values G15, G35, G55, G75 to difference calculation circuit 607. The pattern in FIG. 28 is a rightward horizontal line pattern including the pixel of interest and neighboring pixels to its right and left. The pixel selector circuit 599 supplies pixel values G35, G55, G75, G95 to difference calculation circuit 608.

Figures 29, 30:
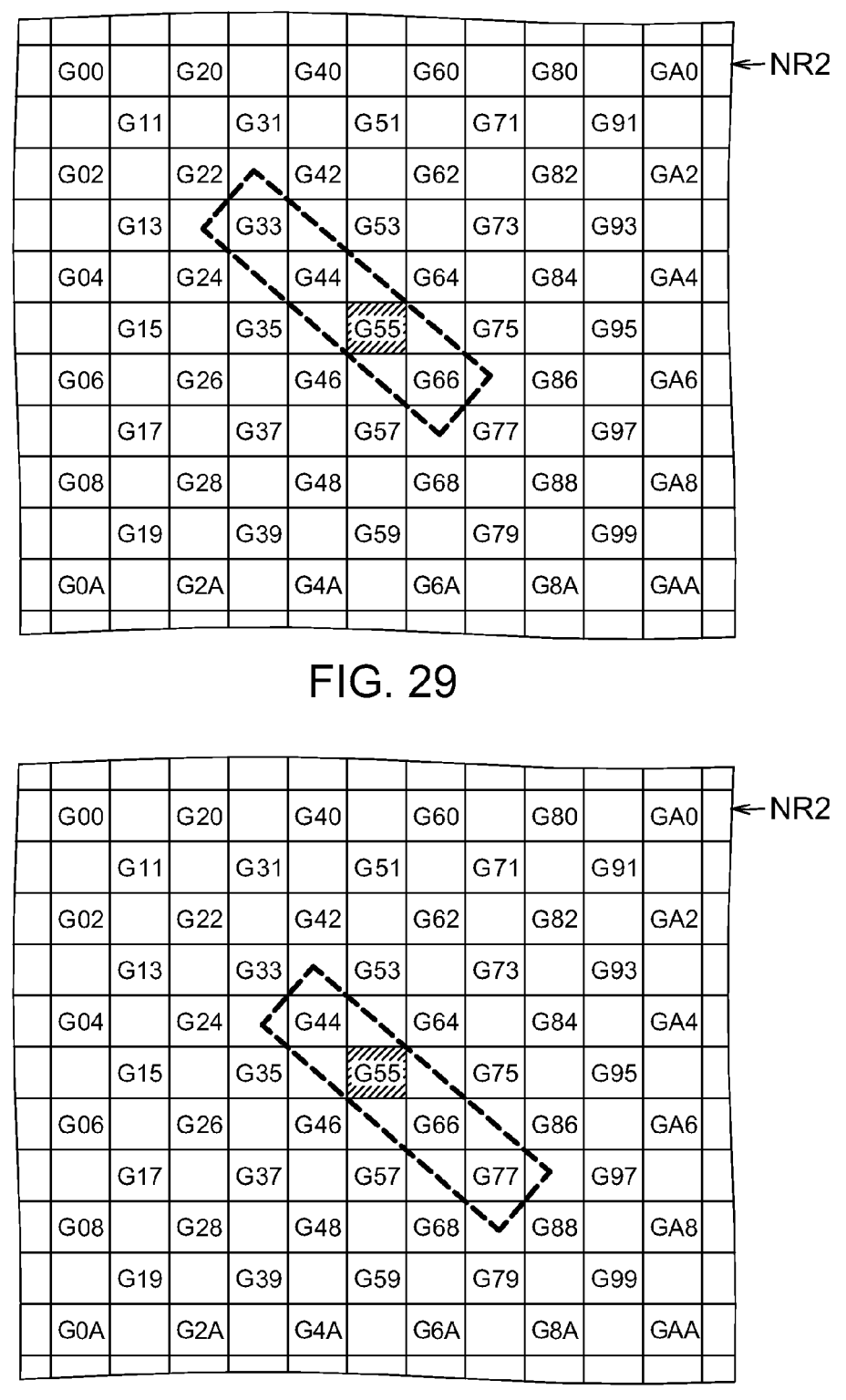

The pattern in FIG. 29 is an upper left diagonal line pattern including the pixel of interest and neighboring pixels to its upper left and lower right. The pixel selector circuit 599 supplies pixel values G33, G44, G55, G66 to difference calculation circuit 609. The pattern in FIG. 30 is a lower right diagonal line pattern including the pixel of interest and neighboring pixels to its lower right and upper left. The pixel selector circuit 599 supplies pixel values G44, G55, G66, G77 to difference calculation circuit 610. The pattern in FIG. 31 is an upper right diagonal line pattern including the pixel of interest and neighboring pixels to its upper right and lower left. The pixel selector circuit 599 supplies pixel values G73, G64, G55, G46 to difference calculation circuit 611. The pattern in FIG. 32 is a lower left diagonal line pattern including the pixel of interest and neighboring pixels to its lower left and upper right. The pixel selector circuit 599 supplies pixel values G64, G55, G46, G37 to difference calculation circuit 612.

Figure 33:
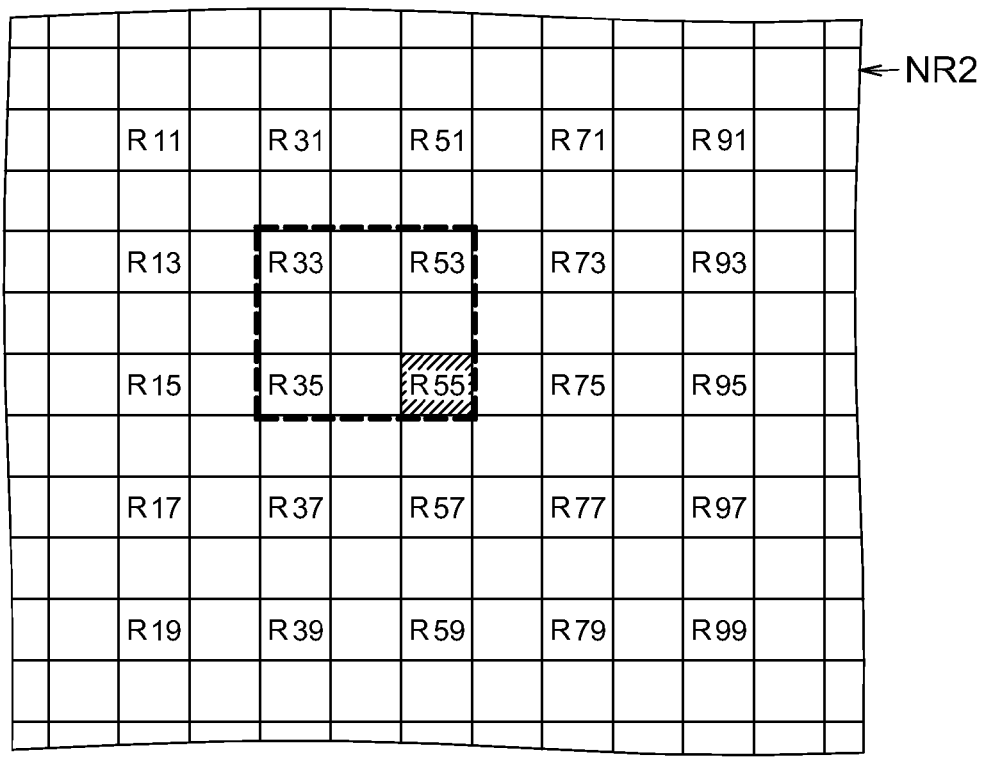
FIG. 33 shows an upper left block pattern combining the pixel of interest (a red pixel) with neighboring pixels above it and to its left.
Figure 34:
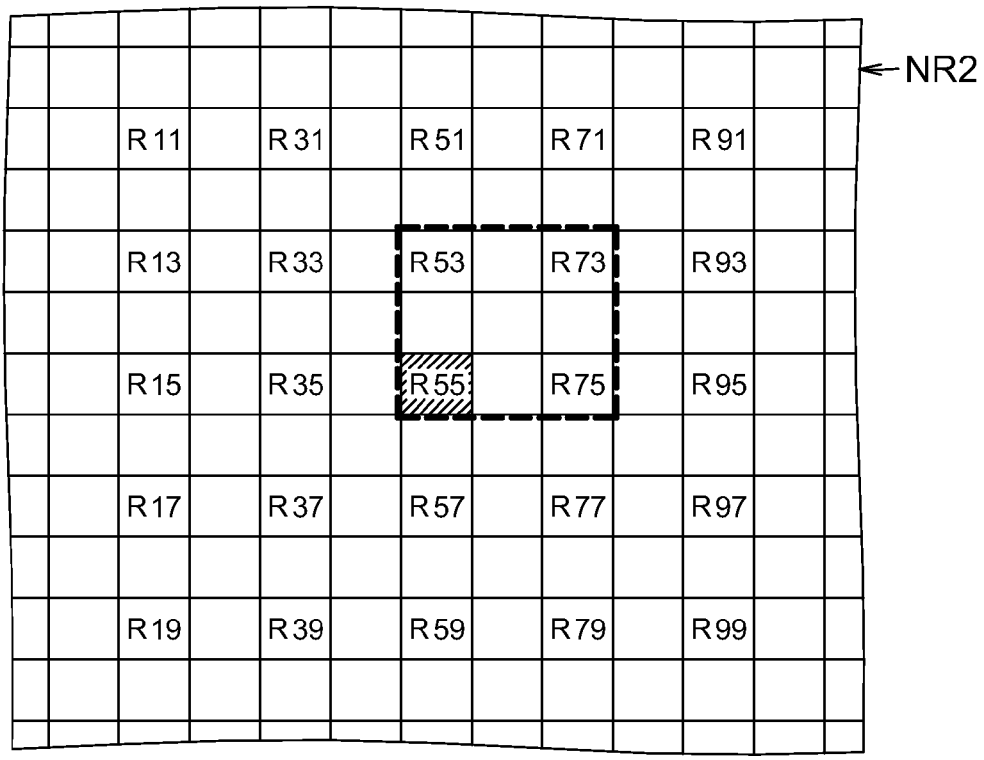
FIG. 34 shows an upper right block pattern combining the pixel of interest (a red pixel) with neighboring pixels above it and to its right.
Figure 35:
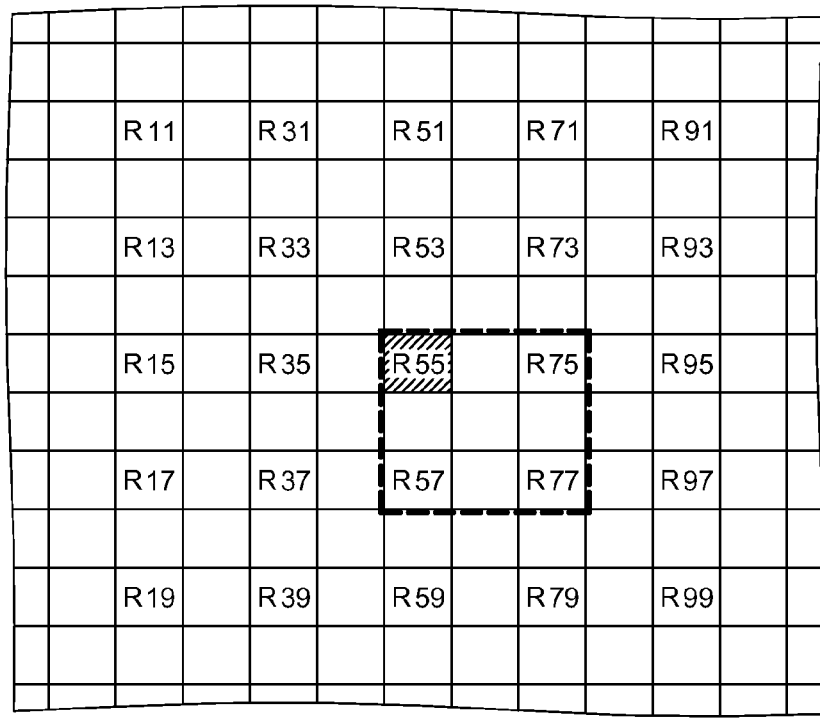
FIG. 35 shows a lower right block pattern combining the pixel of interest (a red pixel) with neighboring pixels below it and to its right.
Figure 36:
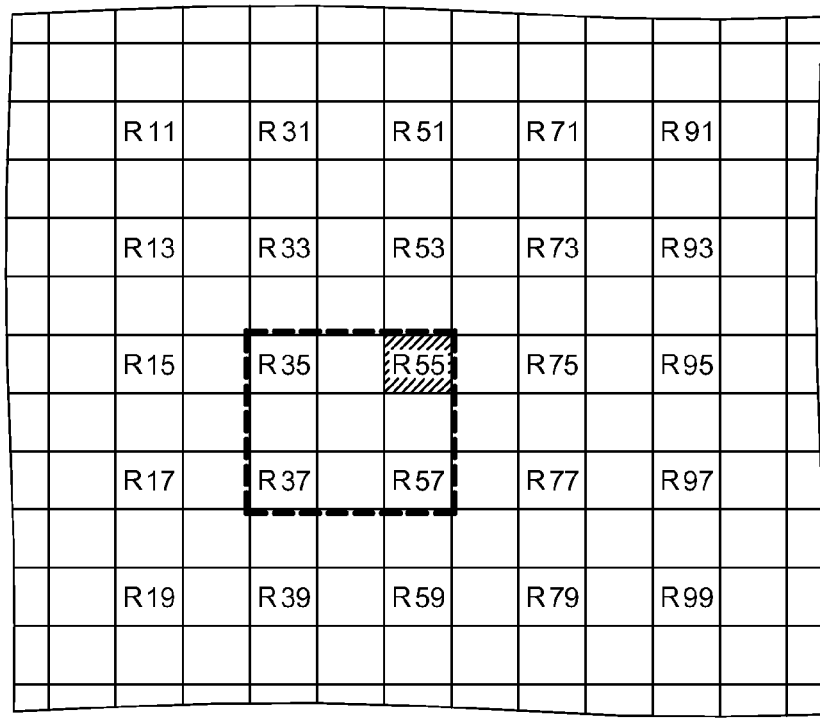
FIG. 36 shows a lower left block pattern combining the pixel of interest (a red pixel) with neighboring pixels below it and to its left.

When the pixel of interest in FIG. 14 is a red pixel, there are four pixel addition patterns, shown in FIGS. 33-36, each including four pixels. For four-pixel addition of red pixels, the most highly correlated and thus the optimal addition pattern is selected from among these four patterns. The pattern in FIG. 33 is an upper left block pattern including the pixel of interest and neighboring pixels above it and to its left. The pixel selector circuit 599 supplies pixel values R33, R53, R35, R55 to difference calculation circuit 601. The pattern in FIG. 34 is an upper right block pattern including the pixel of interest and neighboring pixels above it and to its right. The pixel selector circuit 599 supplies pixel values R53, R73, R55, R75 to difference calculation circuit 602. The pattern in FIG. 35 is a lower right block pattern including the pixel of interest and neighboring pixels below it and to its right. The pixel selector circuit 599 supplies pixel values R55, R75, R57, R77 to difference calculation circuit 603. The pattern in FIG. 36 is a lower left block pattern including the pixel of interest and neighboring pixels below it and to its left. The pixel selector circuit 599 supplies pixel values R35, R55, R37, R57 to difference calculation circuit 604.

When the pixel of interest in the spatial pixel arrangement in FIG. 14 is a blue pixel, the situation is the same as when the pixel of interest is red: there are four pixel addition patterns, each including four blue pixels. The optimal (most highly correlated) pattern can be found from among these four blue pixel patterns.

As indicated in FIG. 8, the difference calculation circuits 601-612 in the operation circuit 600 in the in-plane pattern detection circuit 50 compare the pixel values in the concurrently input pixel patterns T01-T12 to determine their maximum values MAX1-MAX12 and minimum values MIN1-MIN12. That is, the maximum pixel value in each pattern and the minimum pixel value in each pattern are detected. Next the difference calculation circuits take the differences between the maximum and minimum values as in-plane correlation indicators PP1-PP12, and send these differences to the minimum value calculation circuit 620. When the pixel of interest is a green pixel, difference calculation circuit 601 calculates the pixel difference in the upper block pattern. Difference calculation circuit 602 calculates the pixel difference in the lower block pattern. Difference calculation circuit 603 calculates the pixel difference in the leftward block pattern. Difference calculation circuit 604 calculates the pixel difference in the rightward block pattern. Difference calculation circuit 605 calculates the pixel difference in the upper vertical line pattern. Difference calculation circuit 606 calculates the pixel difference in the lower vertical line pattern. Difference calculation circuit 607 calculates the pixel difference in the leftward horizontal line pattern. Difference calculation circuit 608 calculates the pixel difference in the rightward horizontal line pattern. Difference calculation circuit 609 calculates the pixel difference in the upper left diagonal line pattern. Difference calculation circuit 610 calculates the pixel difference in the lower right diagonal line pattern. Difference calculation circuit 611 calculates the pixel difference in the upper right diagonal line pattern. Difference calculation circuit 612 calculates the pixel difference in the lower left diagonal line pattern.

When the pixel of interest is a red or blue pixel, difference calculation circuit 601 calculates the pixel difference in the upper left block pattern. Difference calculation circuit 602 calculates the pixel difference in the upper right block pattern. Difference calculation circuit 603 calculates the pixel difference in the lower right block pattern. Difference calculation circuit 604 calculates the pixel difference in the lower left block pattern.

The operation of the minimum value calculation circuit 620 when the pixel of interest is a green pixel will now be described. The minimum value calculation circuit 620 compares the pixel-to-pixel differences PP1-PP12 of the twelve pixel patterns T01-T12 input from the difference calculation circuits 601-612, finds the addition pattern with the minimum difference PP, and notifies the pixel designation circuit 630. The pixel designation circuit 630 supplies the pixel positions of the pixels in the addition pattern reported by the minimum value calculation circuit 620 from output terminal 640 in FIG. 5 to selector circuit 22, the forward reference pattern detection circuit 71, and the backward reference pattern detection circuit 72. The pixel designation circuit 630 also supplies the maximum value MAX and minimum value MIN of the addition pattern reported by the minimum value calculation circuit 620 from a maximum pixel value output terminal 641 and minimum pixel value output terminal 642 to the forward reference pattern detection circuit 71 and backward reference pattern detection circuit 72.

When the pixels in the upper block pattern have the minimum difference, pixel position information for pixels G53, G44, G64, and G55 is supplied to selector circuit 22. When the pixels in the rightward block pattern have the minimum difference, pixel position information for pixels G64, G55, G75, and G66 is supplied to selector circuit 22. When the pixels in the lower block pattern have the minimum difference, pixel position information for pixels G55, G46, G66, and G57 is supplied to selector circuit 22. When the pixels in the leftward block pattern have the minimum difference, pixel position information for pixels G44, G35, G55, and G46 is supplied to selector circuit 22. When the pixels in the upper vertical line pattern have the minimum difference, pixel position information for pixels G51, G53, G55, and G57 is supplied to selector circuit 22. When the pixels in the lower vertical line pattern have the minimum difference, pixel position information for pixels G53, G55, G57, and G59 is supplied to selector circuit 22. When the pixels in the leftward horizontal line pattern have the minimum difference, pixel position information for pixels G15, G35, G55, and G75 is supplied to selector circuit 22. When the pixels in the rightward horizontal line pattern have the minimum difference, pixel position information for pixels G35, G55, G75, and G95 is supplied to selector circuit 22. When the pixels in the upper left diagonal line pattern have the minimum difference, pixel position information for pixels G33, G44, G55, and G66 is supplied to selector circuit 22. When the pixels in the lower right diagonal line pattern have the minimum difference, pixel position information for pixels G44, G55, G66, and G77 is supplied to selector circuit 22. When the pixels in the upper right diagonal line pattern have the minimum difference, pixel position information for pixels G73, G64, G55, and G46 is supplied to selector circuit 22. When the pixels in the lower left diagonal line pattern have the minimum difference, pixel position information for pixels G64, G55, G46, and G37 is supplied to selector circuit 22.

The operation of the minimum value calculation circuit 620 when the pixel of interest is a red pixel will now be described. The minimum value calculation circuit 620 compares the pixel-to-pixel differences of the four-pixel patterns input from the difference calculation circuits 601-604, finds the addition pattern with the minimum difference, and notifies the pixel designation circuit 630. The pixel designation circuit 630 supplies the pixel positions of the pixels in the addition pattern reported by the minimum value calculation circuit 620 from output terminal 640 to selector circuit 22, the forward reference pattern detection circuit 71, and the backward reference pattern detection circuit 72. The pixel designation circuit 630 also supplies the maximum value and minimum value of the addition pattern reported by the minimum value calculation circuit 620 from the maximum pixel value output terminal 641 and minimum pixel value output terminal 642 to the forward reference pattern detection circuit 71 and backward reference pattern detection circuit 72.

When the upper left block pattern has the minimum difference, pixel position information for pixels R33, R53, R35, and R55 is supplied to selector circuit 22. When the upper right block pattern has the minimum difference, pixel position information for pixels R53, R73, R55, and R75 is supplied to selector circuit 22. When the lower right block pattern has the minimum difference, pixel position information for pixels R55, R75, R57, and R77 is supplied to selector circuit 22. When the lower left block pattern has the minimum difference, pixel position information for pixels R35, R55, R37, and R57 is supplied to selector circuit 22.

The operation of the minimum value calculation circuit 620 when the pixel of interest is a blue pixel is performed in the same way as when the pixel of interest is a red pixel.

The most highly correlated, optimal addition pattern is obtained from twelve addition patterns when the pixel of interest is a green pixel or from four addition patterns when the pixel of interest is a red or blue pixel. Accordingly, pixels highly correlated with the pixel of interest can be selected correctly for use in pixel addition. The loss of resolution following the pixel addition process can therefore be reduced.

The operation of the forward reference pattern detection circuit 71 and backward reference pattern detection circuit 72 will now be described. The forward reference pattern detection circuit 71 and backward reference pattern detection circuit 72 both have the schematic structure shown in FIG. 9. The reference pattern detection circuit 7x shown in FIG. 9 includes a delay circuit 770, a pixel selector circuit (reference pixel extractor) 719, an operation circuit 720, and a pixel designation circuit 750.

FIG. 11B shows the arrangement of neighboring pixels in a region measuring eleven pixels horizontally and eleven pixels vertically centered on the pixel P55 of interest. The operation of the reference pattern detection circuit 7x at the timing at which pixel value PAA in FIG. 11B is applied to input terminal 500 will be described. The pixel value PAA output from the analog-to-digital converter 13A is applied to the input terminal INa of the pixel adding circuit 14 and thence through spatial filter 43 and delay circuit 38 to input terminal 700 of the backward reference pattern detection circuit 72. Alternatively, pixel value PAA is applied to the input terminal INa of the pixel adding circuit 14 and thence through one-frame delay circuit 31, one-frame delay circuit 32, spatial filter 41, and delay circuit 37 to the input terminal 700 of the forward reference pattern detection circuit 71.

The pixel value PAA applied to the input terminal 700 is supplied to a one-line delay circuit 701 and a one-pixel delay circuit 1700 in FIG. 10 and the pixel selector circuit 719 in FIG. 9. One-pixel delay circuit 1700 outputs a pixel value P9A delayed by one pixel. Pixel value P9A is supplied to a one-pixel delay circuit 1701 and pixel selector circuit 719. One-pixel delay circuit 1701 outputs a pixel value P8A delayed by one pixel. Pixel value P8A is supplied to a one-pixel delay circuit 1702 and pixel selector circuit 719. One-pixel delay circuit 1702 outputs a pixel value P7A delayed by one pixel. Pixel value P7A is supplied to a one-pixel delay circuit 1703 and pixel selector circuit 719. One-pixel delay circuit 1703 outputs a pixel value P6A delayed by one pixel. Pixel value P6A is supplied to a one-pixel delay circuit 1704 and pixel selector circuit 719. One-pixel delay circuit 1704 outputs a pixel value P5A delayed by one pixel. Pixel value P5A is supplied to a one-pixel delay circuit 1705 and pixel selector circuit 719. One-pixel delay circuit 1705 outputs a pixel value P4A delayed by one pixel. Pixel value P4A is supplied to a one-pixel delay circuit 1706 and pixel selector circuit 719. One-pixel delay circuit 1706 outputs a pixel value P3A delayed by one pixel. Pixel value P3A is supplied to a one-pixel delay circuit 1707 and pixel selector circuit 719. One-pixel delay circuit 1707 outputs a pixel value P2A delayed by one pixel. Pixel value P2A is supplied to a one-pixel delay circuit 1708 and pixel selector circuit 719. One-pixel delay circuit 1708 outputs a pixel value P1A delayed by one pixel. Pixel value P1A is supplied to a one-pixel delay circuit 1709 and pixel selector circuit 719. One-pixel delay circuit 1709 outputs a pixel value P0A delayed by one pixel. Pixel value P0A is supplied to pixel selector circuit 719.

One-line delay circuit 701 outputs a pixel value PA9. Pixel value PA9 is supplied to a one-line delay circuit 702, the one-pixel delay circuit 1710, and pixel selector circuit 719. One-pixel delay circuit 1710 outputs a pixel value P99 delayed by one pixel. Pixel value P99 is supplied to a one-pixel delay circuit 1711 and pixel selector circuit 719. One-pixel delay circuit 1711 outputs a pixel value P89 delayed by one pixel. Pixel value P89 is supplied to a one-pixel delay circuit 1712 and pixel selector circuit 719. One-pixel delay circuit 1712 outputs a pixel value P79 delayed by one pixel. Pixel value P79 is supplied to a one-pixel delay circuit 1713 and pixel selector circuit 719. One-pixel delay circuit 1713 outputs a pixel value P69 delayed by one pixel. Pixel value P69 is supplied to a one-pixel delay circuit 1714 and pixel selector circuit 719. One-pixel delay circuit 1714 outputs a pixel value P59 delayed by one pixel. Pixel value P59 is supplied to a one-pixel delay circuit 1715 and pixel selector circuit 719. One-pixel delay circuit 1715 outputs a pixel value P49 delayed by one pixel. Pixel value P49 is supplied to a one-pixel delay circuit 1716 and pixel selector circuit 719. One-pixel delay circuit 1716 outputs a pixel value P39 delayed by one pixel. Pixel value P39 is supplied to a one-pixel delay circuit 1717 and pixel selector circuit 719. One-pixel delay circuit 1717 outputs a pixel value P29 delayed by one pixel. Pixel value P29 is supplied to a one-pixel delay circuit 1718 and pixel selector circuit 719. One-pixel delay circuit 1718 outputs a pixel value P19 delayed by one pixel. Pixel value P19 is supplied to a one-pixel delay circuit 1719 and pixel selector circuit 719. One-pixel delay circuit 1719 outputs a pixel value P09 delayed by one pixel. Pixel value P09 is supplied to pixel selector circuit 719.

One-line delay circuit 702 outputs a pixel value PA8. Pixel value PA8 is supplied to a one-line delay circuit 703, the one-pixel delay circuit 1720, and pixel selector circuit 719. One-pixel delay circuit 1720 outputs a pixel value P98 delayed by one pixel. Pixel value P98 is supplied to a one-pixel delay circuit 1721 and pixel selector circuit 719. One-pixel delay circuit 1721 outputs a pixel value P88 delayed by one pixel. Pixel value P88 is supplied to a one-pixel delay circuit 1722 and pixel selector circuit 719. One-pixel delay circuit 1722 outputs a pixel value P78 delayed by one pixel. Pixel value P78 is supplied to a one-pixel delay circuit 1723 and pixel selector circuit 719. One-pixel delay circuit 1723 outputs a pixel value P68 delayed by one pixel. Pixel value P68 is supplied to a one-pixel delay circuit 1724 and pixel selector circuit 719. One-pixel delay circuit 1724 outputs a pixel value P58 delayed by one pixel. Pixel value P58 is supplied to a one-pixel delay circuit 1725 and pixel selector circuit 719. One-pixel delay circuit 1725 outputs a pixel value P48 delayed by one pixel. Pixel value P48 is supplied to a one-pixel delay circuit 1726 and pixel selector circuit 719. One-pixel delay circuit 1726 outputs a pixel value P38 delayed by one pixel. Pixel value P38 is supplied to a one-pixel delay circuit 1727 and pixel selector circuit 719. One-pixel delay circuit 1727 outputs a pixel value P28 delayed by one pixel. Pixel value P28 is supplied to a one-pixel delay circuit 1728 and pixel selector circuit 719. One-pixel delay circuit 1728 outputs a pixel value P18 delayed by one pixel. Pixel value P18 is supplied to a one-pixel delay circuit 1729 and pixel selector circuit 719. One-pixel delay circuit 1729 outputs a pixel value P08 delayed by one pixel. Pixel value P08 is supplied to pixel selector circuit 719.

One-line delay circuit 703 outputs a pixel value PA7. Pixel value PA7 is supplied to a one-line delay circuit 704, the one-pixel delay circuit 1730, and pixel selector circuit 719. One-pixel delay circuit 1730 outputs a pixel value P97 delayed by one pixel. Pixel value P97 is supplied to a one-pixel delay circuit 1731 and pixel selector circuit 719. One-pixel delay circuit 1731 outputs a pixel value P87 delayed by one pixel. Pixel value P87 is supplied to a one-pixel delay circuit 1732 and pixel selector circuit 719. One-pixel delay circuit 1732 outputs a pixel value P77 delayed by one pixel. Pixel value P77 is supplied to a one-pixel delay circuit 1733 and pixel selector circuit 719. One-pixel delay circuit 1733 outputs a pixel value P67 delayed by one pixel. Pixel value P67 is supplied to a one-pixel delay circuit 1734 and pixel selector circuit 719. One-pixel delay circuit 1734 outputs a pixel value P57 delayed by one pixel. Pixel value P57 is supplied to a one-pixel delay circuit 1735 and pixel selector circuit 719. One-pixel delay circuit 1735 outputs a pixel value P47 delayed by one pixel. Pixel value P47 is supplied to a one-pixel delay circuit 1736 and pixel selector circuit 719. One-pixel delay circuit 1736 outputs a pixel value P37 delayed by one pixel. Pixel value P37 is supplied to a one-pixel delay circuit 1737 and pixel selector circuit 719. One-pixel delay circuit 1737 outputs a pixel value P27 delayed by one pixel. Pixel value P27 is supplied to a one-pixel delay circuit 1738 and pixel selector circuit 719. One-pixel delay circuit 1738 outputs a pixel value P17 delayed by one pixel. Pixel value P17 is supplied to a one-pixel delay circuit 1739 and pixel selector circuit 719. One-pixel delay circuit 1739 outputs a pixel value P07 delayed by one pixel. Pixel value P07 is supplied to pixel selector circuit 719.

One-line delay circuit 704 outputs a pixel value PA6. Pixel value PA6 is supplied to a one-line delay circuit 705, the one-pixel delay circuit 1740, and pixel selector circuit 719. One-pixel delay circuit 1740 outputs a pixel value P96 delayed by one pixel. Pixel value P96 is supplied to a one-pixel delay circuit 1741 and pixel selector circuit 719. One-pixel delay circuit 1741 outputs a pixel value P86 delayed by one pixel. Pixel value P86 is supplied to a one-pixel delay circuit 1742 and pixel selector circuit 719. One-pixel delay circuit 1742 outputs a pixel value P76 delayed by one pixel. Pixel value P76 is supplied to a one-pixel delay circuit 1743 and pixel selector circuit 719. One-pixel delay circuit 1743 outputs a pixel value P66 delayed by one pixel. Pixel value P66 is supplied to a one-pixel delay circuit 1744 and pixel selector circuit 719. One-pixel delay circuit 1744 outputs a pixel value P56 delayed by one pixel. Pixel value P56 is supplied to a one-pixel delay circuit 1745 and pixel selector circuit 719. One-pixel delay circuit 1745 outputs a pixel value P46 delayed by one pixel. Pixel value P46 is supplied to a one-pixel delay circuit 1746 and pixel selector circuit 719. One-pixel delay circuit 1746 outputs a pixel value P36 delayed by one pixel. Pixel value P36 is supplied to a one-pixel delay circuit 1747 and pixel selector circuit 719. One-pixel delay circuit 1747 outputs a pixel value P26 delayed by one pixel. Pixel value P26 is supplied to a one-pixel delay circuit 1748 and pixel selector circuit 719. One-pixel delay circuit 1748 outputs a pixel value P16 delayed by one pixel. Pixel value P16 is supplied to a one-pixel delay circuit 1749 and pixel selector circuit 719. One-pixel delay circuit 1749 outputs a pixel value P06 delayed by one pixel. Pixel value P06 is supplied to pixel selector circuit 719.

One-line delay circuit 705 outputs a pixel value PA5. Pixel value PA5 is supplied to a one-line delay circuit 706, the one-pixel delay circuit 1750, and pixel selector circuit 719. One-pixel delay circuit 1750 outputs a pixel value P95 delayed by one pixel. Pixel value P95 is supplied to a one-pixel delay circuit 1751 and pixel selector circuit 719. One-pixel delay circuit 1751 outputs a pixel value P85 delayed by one pixel. Pixel value P85 is supplied to a one-pixel delay circuit 1752 and pixel selector circuit 719. One-pixel delay circuit 1752 outputs a pixel value P75 delayed by one pixel. Pixel value P75 is supplied to a one-pixel delay circuit 1753 and pixel selector circuit 719. One-pixel delay circuit 1753 outputs a pixel value P65 delayed by one pixel. Pixel value P65 is supplied to a one-pixel delay circuit 1754 and pixel selector circuit 719. One-pixel delay circuit 1754 outputs a pixel value P55 delayed by one pixel. Pixel value P55 is supplied to a one-pixel delay circuit 1755 and pixel selector circuit 719. One-pixel delay circuit 1755 outputs a pixel value P45 delayed by one pixel. Pixel value P45 is supplied to a one-pixel delay circuit 1756 and pixel selector circuit 719. One-pixel delay circuit 1756 outputs a pixel value P35 delayed by one pixel. Pixel value P35 is supplied to a one-pixel delay circuit 1757 and pixel selector circuit 719. One-pixel delay circuit 1757 outputs a pixel value P25 delayed by one pixel. Pixel value P25 is supplied to a one-pixel delay circuit 1758 and pixel selector circuit 719. One-pixel delay circuit 1758 outputs a pixel value P15 delayed by one pixel. Pixel value P15 is supplied to a one-pixel delay circuit 1759 and pixel selector circuit 719. One-pixel delay circuit 1759 outputs a pixel value P05 delayed by one pixel. Pixel value P05 is supplied to pixel selector circuit 719.

One-line delay circuit 706 outputs a pixel value PA4. Pixel value PA4 is supplied to a one-line delay circuit 707, the one-pixel delay circuit 1760, and pixel selector circuit 719. One-pixel delay circuit 1760 outputs a pixel value P94 delayed by one pixel. Pixel value P94 is supplied to a one-pixel delay circuit 1761 and pixel selector circuit 719. One-pixel delay circuit 1761 outputs a pixel value P84 delayed by one pixel. Pixel value P84 is supplied to a one-pixel delay circuit 1762 and pixel selector circuit 719. One-pixel delay circuit 1762 outputs a pixel value P74 delayed by one pixel. Pixel value P74 is supplied to a one-pixel delay circuit 1763 and pixel selector circuit 719. One-pixel delay circuit 1763 outputs a pixel value P64 delayed by one pixel. Pixel value P64 is supplied to a one-pixel delay circuit 1764 and pixel selector circuit 719. One-pixel delay circuit 1764 outputs a pixel value P54 delayed by one pixel. Pixel value P54 is supplied to a one-pixel delay circuit 1765 and pixel selector circuit 719. One-pixel delay circuit 1765 outputs a pixel value P44 delayed by one pixel. Pixel value P44 is supplied to a one-pixel delay circuit 1766 and pixel selector circuit 719. One-pixel delay circuit 1766 outputs a pixel value P34 delayed by one pixel. Pixel value P34 is supplied to a one-pixel delay circuit 1767 and pixel selector circuit 719. One-pixel delay circuit 1767 outputs a pixel value P24 delayed by one pixel. Pixel value P24 is supplied to a one-pixel delay circuit 1768 and pixel selector circuit 719. One-pixel delay circuit 1768 outputs a pixel value P14 delayed by one pixel. Pixel value P14 is supplied to a one-pixel delay circuit 1769 and pixel selector circuit 719. One-pixel delay circuit 1769 outputs a pixel value PO4 delayed by one pixel. Pixel value PO4 is supplied to pixel selector circuit 719.

One-line delay circuit 707 outputs a pixel value PA3. Pixel value PA3 is supplied to a one-line delay circuit 708, the one-pixel delay circuit 1770, and pixel selector circuit 719. One-pixel delay circuit 1770 outputs a pixel value P93 delayed by one pixel. Pixel value P93 is supplied to a one-pixel delay circuit 1771 and pixel selector circuit 719. One-pixel delay circuit 1771 outputs a pixel value P83 delayed by one pixel. Pixel value P83 is supplied to a one-pixel delay circuit 1772 and pixel selector circuit 719. One-pixel delay circuit 1772 outputs a pixel value P73 delayed by one pixel. Pixel value P73 is supplied to a one-pixel delay circuit 1773 and pixel selector circuit 719. One-pixel delay circuit 1773 outputs a pixel value P63 delayed by one pixel. Pixel value P63 is supplied to a one-pixel delay circuit 1774 and pixel selector circuit 719. One-pixel delay circuit 1774 outputs a pixel value P53 delayed by one pixel. Pixel value P53 is supplied to a one-pixel delay circuit 1775 and pixel selector circuit 719. One-pixel delay circuit 1775 outputs a pixel value P43 delayed by one pixel. Pixel value P43 is supplied to a one-pixel delay circuit 1776 and pixel selector circuit 719. One-pixel delay circuit 1776 outputs a pixel value P33 delayed by one pixel. Pixel value P39 is supplied to a one-pixel delay circuit 1777 and pixel selector circuit 719. One-pixel delay circuit 1777 outputs a pixel value P23 delayed by one pixel. Pixel value P23 is supplied to a one-pixel delay circuit 1778 and pixel selector circuit 719. One-pixel delay circuit 1778 outputs a pixel value P13 delayed by one pixel. Pixel value P13 is supplied to a one-pixel delay circuit 1779 and pixel selector circuit 719. One-pixel delay circuit 1779 outputs a pixel value P03 delayed by one pixel. Pixel value P03 is supplied to pixel selector circuit 719.

One-line delay circuit 708 outputs a pixel value PA2. Pixel value PA2 is supplied to a one-line delay circuit 709, the one-pixel delay circuit 1780, and pixel selector circuit 719. One-pixel delay circuit 1780 outputs a pixel value P92 delayed by one pixel. Pixel value P92 is supplied to a one-pixel delay circuit 1781 and pixel selector circuit 719. One-pixel delay circuit 1781 outputs a pixel value P82 delayed by one pixel. Pixel value P82 is supplied to a one-pixel delay circuit 1782 and pixel selector circuit 719. One-pixel delay circuit 1782 outputs a pixel value P72 delayed by one pixel. Pixel value P72 is supplied to a one-pixel delay circuit 1783 and pixel selector circuit 719. One-pixel delay circuit 1783 outputs a pixel value P62 delayed by one pixel. Pixel value P62 is supplied to a one-pixel delay circuit 1784 and pixel selector circuit 719. One-pixel delay circuit 1784 outputs a pixel value P52 delayed by one pixel. Pixel value P52 is supplied to a one-pixel delay circuit 1785 and pixel selector circuit 719. One-pixel delay circuit 1785 outputs a pixel value P42 delayed by one pixel. Pixel value P42 is supplied to a one-pixel delay circuit 1786 and pixel selector circuit 719. One-pixel delay circuit 1786 outputs a pixel value P32 delayed by one pixel. Pixel value P32 is supplied to a one-pixel delay circuit 1787 and pixel selector circuit 719. One-pixel delay circuit 1787 outputs a pixel value P22 delayed by one pixel. Pixel value P22 is supplied to a one-pixel delay circuit 1788 and pixel selector circuit 719. One-pixel delay circuit 1788 outputs a pixel value P12 delayed by one pixel. Pixel value P12 is supplied to a one-pixel delay circuit 1789 and pixel selector circuit 719. One-pixel delay circuit 1789 outputs a pixel value P02 delayed by one pixel. Pixel value P02 is supplied to pixel selector circuit 719.

One-line delay circuit 709 outputs a pixel value PA1. Pixel value PA1 is supplied to a one-line delay circuit 710, the one-pixel delay circuit 1790, and pixel selector circuit 719. One-pixel delay circuit 1790 outputs a pixel value P91 delayed by one pixel. Pixel value P91 is supplied to a one-pixel delay circuit 1791 and pixel selector circuit 719. One-pixel delay circuit 1791 outputs a pixel value P81 delayed by one pixel. Pixel value P81 is supplied to a one-pixel delay circuit 1792 and pixel selector circuit 719. One-pixel delay circuit 1792 outputs a pixel value P71 delayed by one pixel. Pixel value P71 is supplied to a one-pixel delay circuit 1793 and pixel selector circuit 719. One-pixel delay circuit 1793 outputs a pixel value P61 delayed by one pixel. Pixel value P61 is supplied to a one-pixel delay circuit 1794 and pixel selector circuit 719. One-pixel delay circuit 1794 outputs a pixel value P51 delayed by one pixel. Pixel value P51 is supplied to a one-pixel delay circuit 1795 and pixel selector circuit 719. One-pixel delay circuit 1795 outputs a pixel value P41 delayed by one pixel. Pixel value P41 is supplied to a one-pixel delay circuit 1796 and pixel selector circuit 719. One-pixel delay circuit 1796 outputs a pixel value P31 delayed by one pixel. Pixel value P31 is supplied to a one-pixel delay circuit 1797 and pixel selector circuit 719. One-pixel delay circuit 1797 outputs a pixel value P21 delayed by one pixel. Pixel value P21 is supplied to a one-pixel delay circuit 1798 and pixel selector circuit 719. One-pixel delay circuit 1798 outputs a pixel value P11 delayed by one pixel. Pixel value P11 is supplied to a one-pixel delay circuit 1799 and pixel selector circuit 719. One-pixel delay circuit 1799 outputs a pixel value P01 delayed by one pixel. Pixel value P01 is supplied to pixel selector circuit 719.

One-line delay circuit 710 outputs a pixel value PA0. Pixel value PA0 is supplied to the one-pixel delay circuit 1800, and pixel selector circuit 719. One-pixel delay circuit 1800 outputs a pixel value P90 delayed by one pixel. Pixel value P90 is supplied to a one-pixel delay circuit 1801 and pixel selector circuit 719. One-pixel delay circuit 1801 outputs a pixel value P80 delayed by one pixel. Pixel value P80 is supplied to a one-pixel delay circuit 1802 and pixel selector circuit 719. One-pixel delay circuit 1802 outputs a pixel value P70 delayed by one pixel. Pixel value P70 is supplied to a one-pixel delay circuit 1803 and pixel selector circuit 719. One-pixel delay circuit 1803 outputs a pixel value P60 delayed by one pixel. Pixel value P60 is supplied to a one-pixel delay circuit 1804 and pixel selector circuit 719. One-pixel delay circuit 1804 outputs a pixel value P50 delayed by one pixel. Pixel value P50 is supplied to a one-pixel delay circuit 1805 and pixel selector circuit 719. One-pixel delay circuit 1805 outputs a pixel value P40 delayed by one pixel. Pixel value P40 is supplied to a one-pixel delay circuit 1806 and pixel selector circuit 719. One-pixel delay circuit 1806 outputs a pixel value P30 delayed by one pixel. Pixel value P30 is supplied to a one-pixel delay circuit 1807 and pixel selector circuit 719. One-pixel delay circuit 1807 outputs a pixel value P20 delayed by one pixel. Pixel value P20 is supplied to a one-pixel delay circuit 1808 and pixel selector circuit 719. One-pixel delay circuit 1808 outputs a pixel value P10 delayed by one pixel. Pixel value P10 is supplied to a one-pixel delay circuit 1809 and pixel selector circuit 719. One-pixel delay circuit 1809 outputs a pixel value P00 delayed by one pixel. Pixel value P00 is supplied to pixel selector circuit 719.

The pixel selector circuit 719 determines the pixel position of the pixel of interest P55 in the frame image of interest, or the pixel position P55 corresponding to the pixel of interest in the relevant adjacent frame image, from the horizontal synchronization signal HD and vertical synchronization signal VD, which it receives from the synchronization signal generator 18 via the synchronization signal input terminal(s) 718 shown in FIG. 9, and thereby identifies the position of the pixel of interest with respect to the color filter array. The pixel selector circuit 719 can also determine whether the pixel of interest is a red, green, or blue pixel. On the basis of the identified pixel position, the pixel selector circuit 719 supplies difference calculation circuits 721-725, shown in FIG. 12, with the pixel values in pixel regions of corresponding addition patterns. The in-plane pattern detection circuit 50 notifies the pixel selector circuit 719, through a pixel region input terminal 711 shown in FIG. 9, of the addition pattern of neighboring pixels that was detected in the in-plane pattern detection circuit 50 as being most highly correlated with the pixel of interest. The addition patterns from which the pixel selector circuit 719 selects pixels are based on the addition pattern detected by the in-plane pattern detection circuit 50, allowing for movement of the pixel region between frame images.

Next, these addition patterns will be described. FIGS. 37A, 37B to 46A, 46B show the in-plane addition pattern paired with four-pixel addition patterns in the forward reference frame image and four-pixel addition patterns in the backward reference frame image when the pixel of interest is a green pixel and the upper block pattern, including the pixel of interest and pixels above it, is selected as the four-pixel in-plane addition pattern in the spatial arrangement in FIG. 14.

FIGS. 37A, 37B to 46A, 46B show the in-plane addition pattern in the frame image of interest in the filtered signal NR2, addition patterns (forward reference pixel patterns) in the forward adjacent frame image (reference frame image) in frame delayed signal NR1D, and addition patterns (backward reference pixel patterns) in the backward adjacent frame image in frame delayed signal NR3D. The forward reference pattern detection circuit 71 and backward reference pattern detection circuit 72 respectively identify a most highly correlated addition pattern among five addition patterns in the relevant adjacent frame image as the reference pixel addition pattern corresponding to the in-plane addition pattern identified by the in-plane pattern detection circuit 50.

FIGS. 37A, 37B to 41A, 41B show the five forward reference addition patterns tested by the forward reference pattern detection circuit 71 when the pixel of interest is a green pixel and the first in-plane addition pattern is selected. The first in-plane addition pattern is the upper block pattern including the pixel of interest and pixels above it. G155 is the reference pixel of interest.

Figures 38A, 38B:
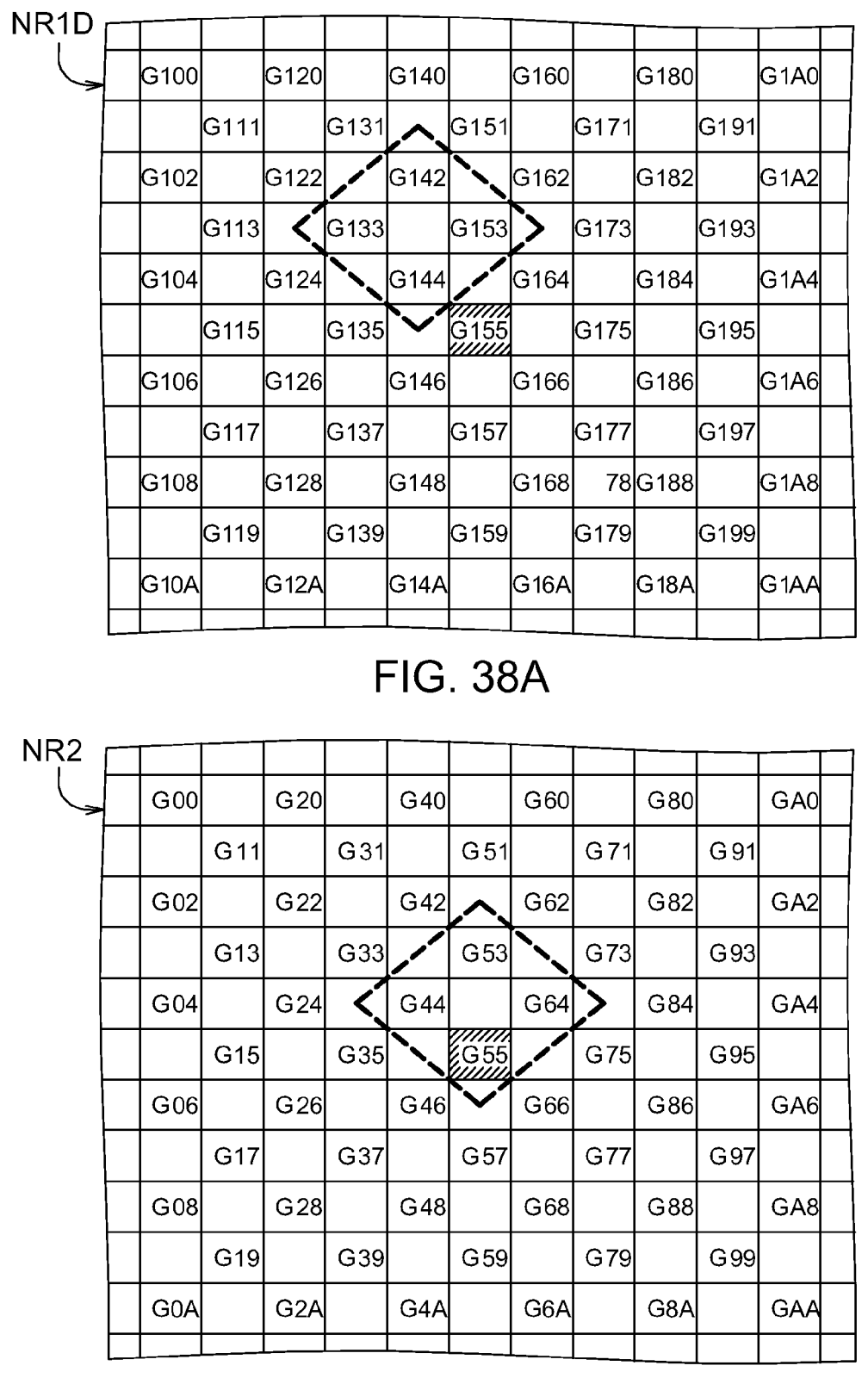
Figures 39A, 39B:
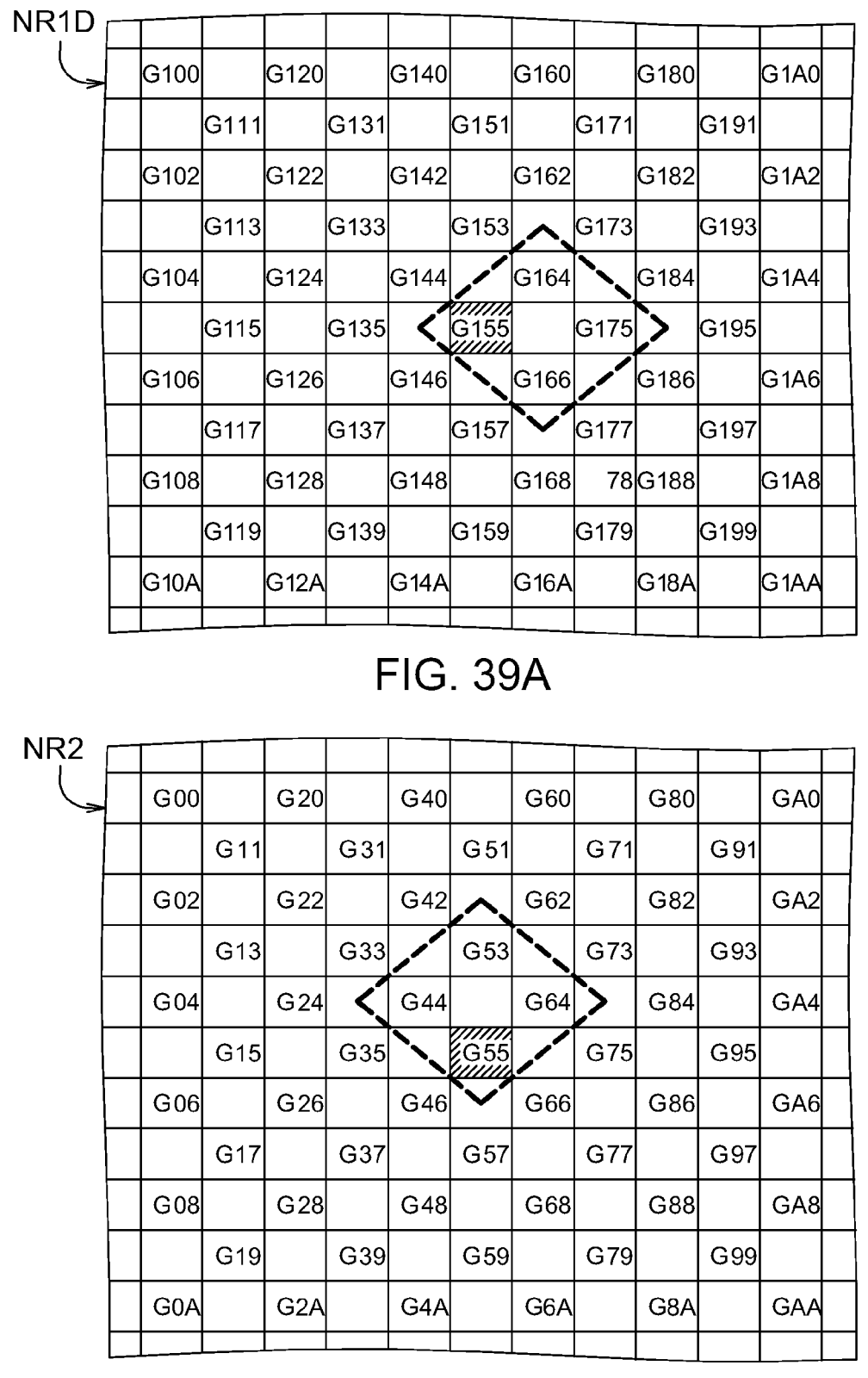
Figures 41A, 41B:
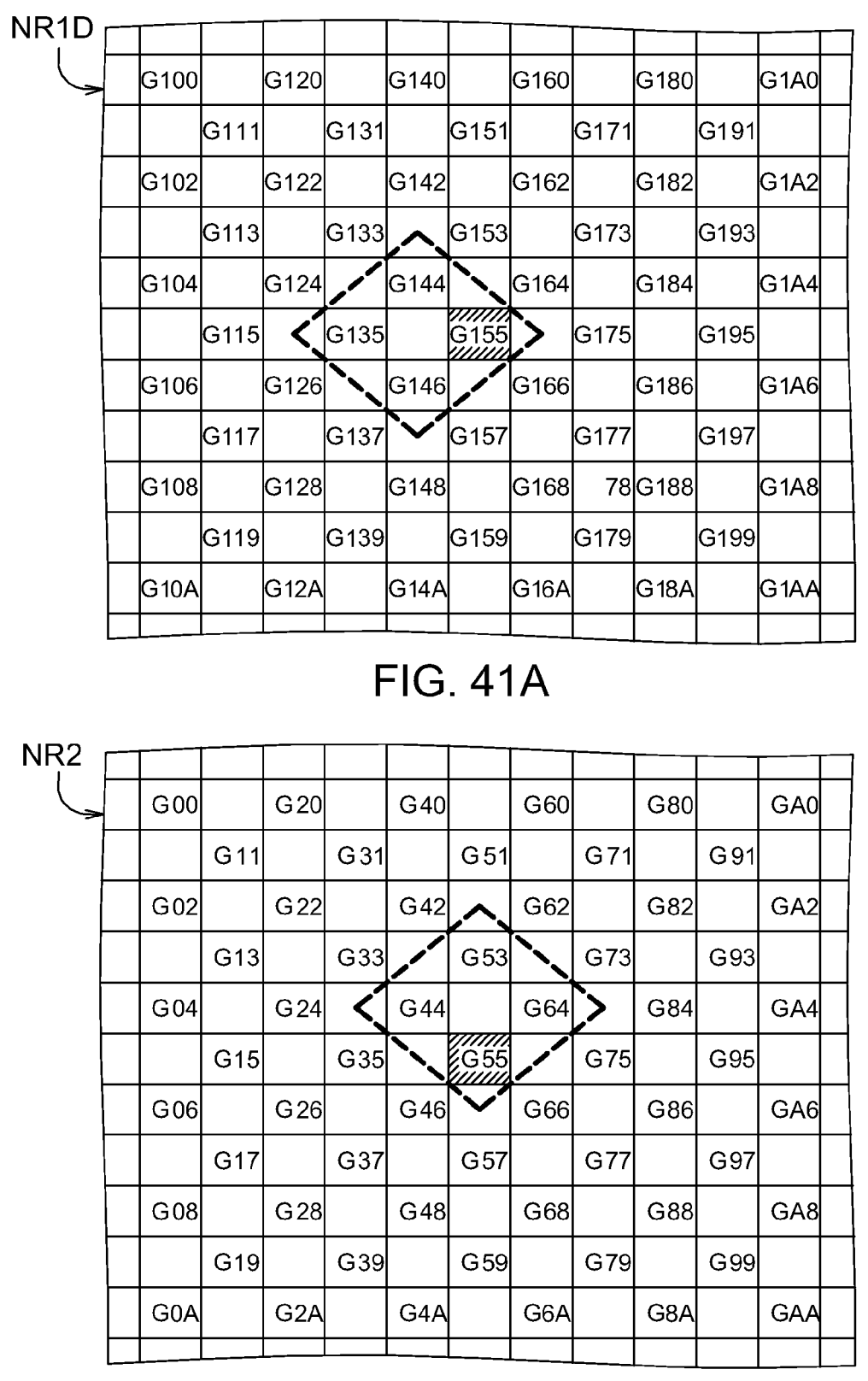

The forward reference addition pattern in FIG. 37A has the same pixel arrangement as the in-plane addition pattern in the frame image of interest, shown in FIG. 37B. The pixel selector circuit 719 supplies pixel values G153, G144, G164, and G155 to difference calculation circuit 721. The forward reference addition pattern in FIG. 38A has a pixel arrangement shifted to the upper left from the pattern in the frame image of interest (FIG. 38B). The pixel selector circuit 719 supplies pixel values G142, G133, G153, and G144 to difference calculation circuit 722. The forward reference addition pattern in FIG. 39A has a pixel arrangement shifted to the lower right from the pattern in the frame image of interest (FIG. 39B). The pixel selector circuit 719 supplies pixel values G164, G155, G175, and G166 to difference calculation circuit 723. The forward reference addition pattern in FIG. 40A has a pixel arrangement shifted to the upper right from the pattern in the frame image of interest (FIG. 40B). The pixel selector circuit 719 supplies pixel values G162, G153, G173, and G164 to difference calculation circuit 724. The forward reference addition pattern in FIG. 41A has a pixel arrangement shifted to the lower left from the pattern in the frame image of interest (FIG. 41B). The pixel selector circuit 719 supplies pixel values G144, G135, G155, and G146 to difference calculation circuit 725.

FIGS. 42A, 42B to 46A, 46B show the five backward reference addition patterns tested by the backward reference pattern detection circuit 72 when the pixel of interest is a green pixel and when the first in-plane addition pattern is selected. The first in-plane addition pattern is the upper block pattern including the pixel of interest and pixels above it. G355 is the reference pixel of interest.

Figures 42A, 42B:
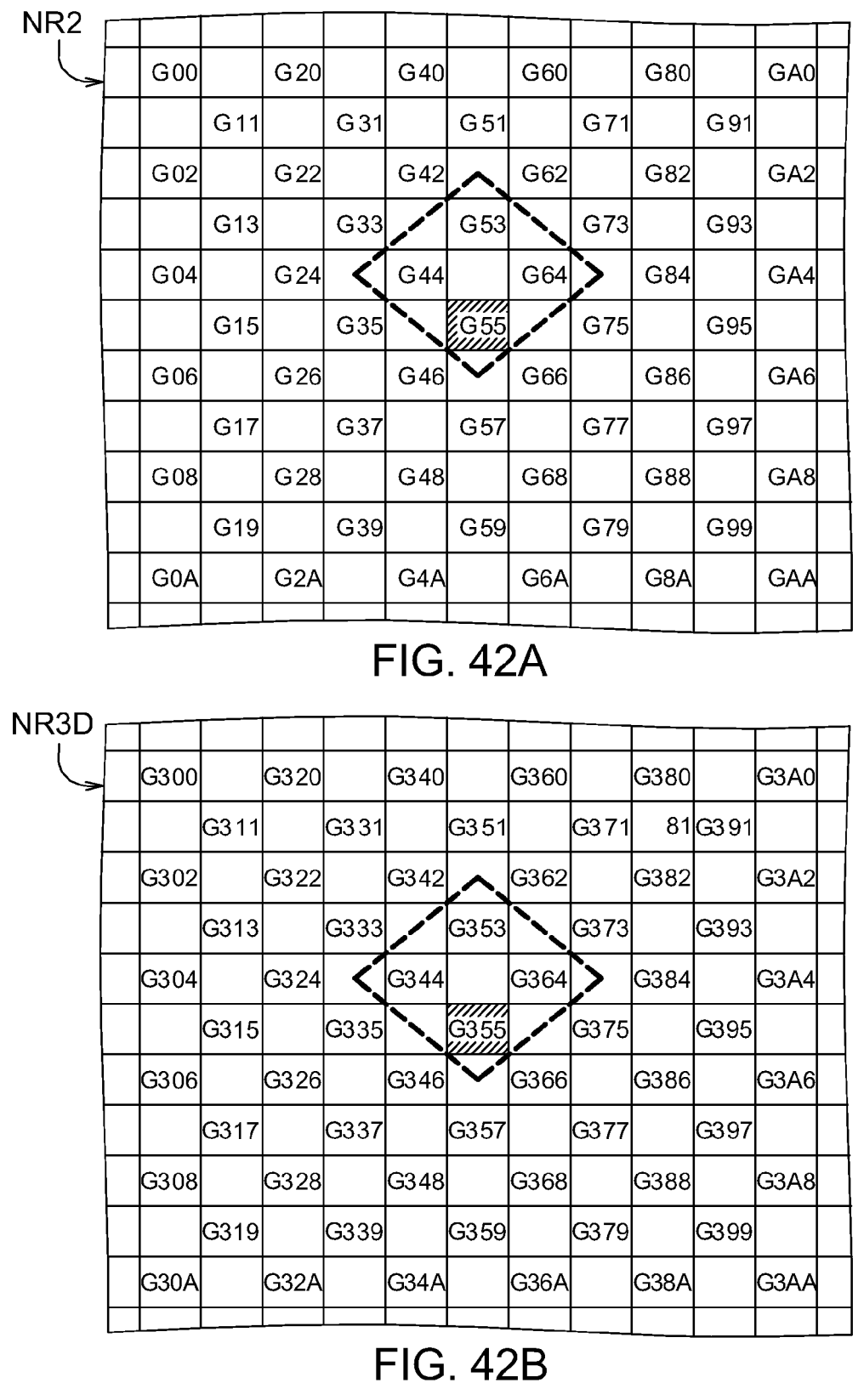
Figures 43A, 43B:
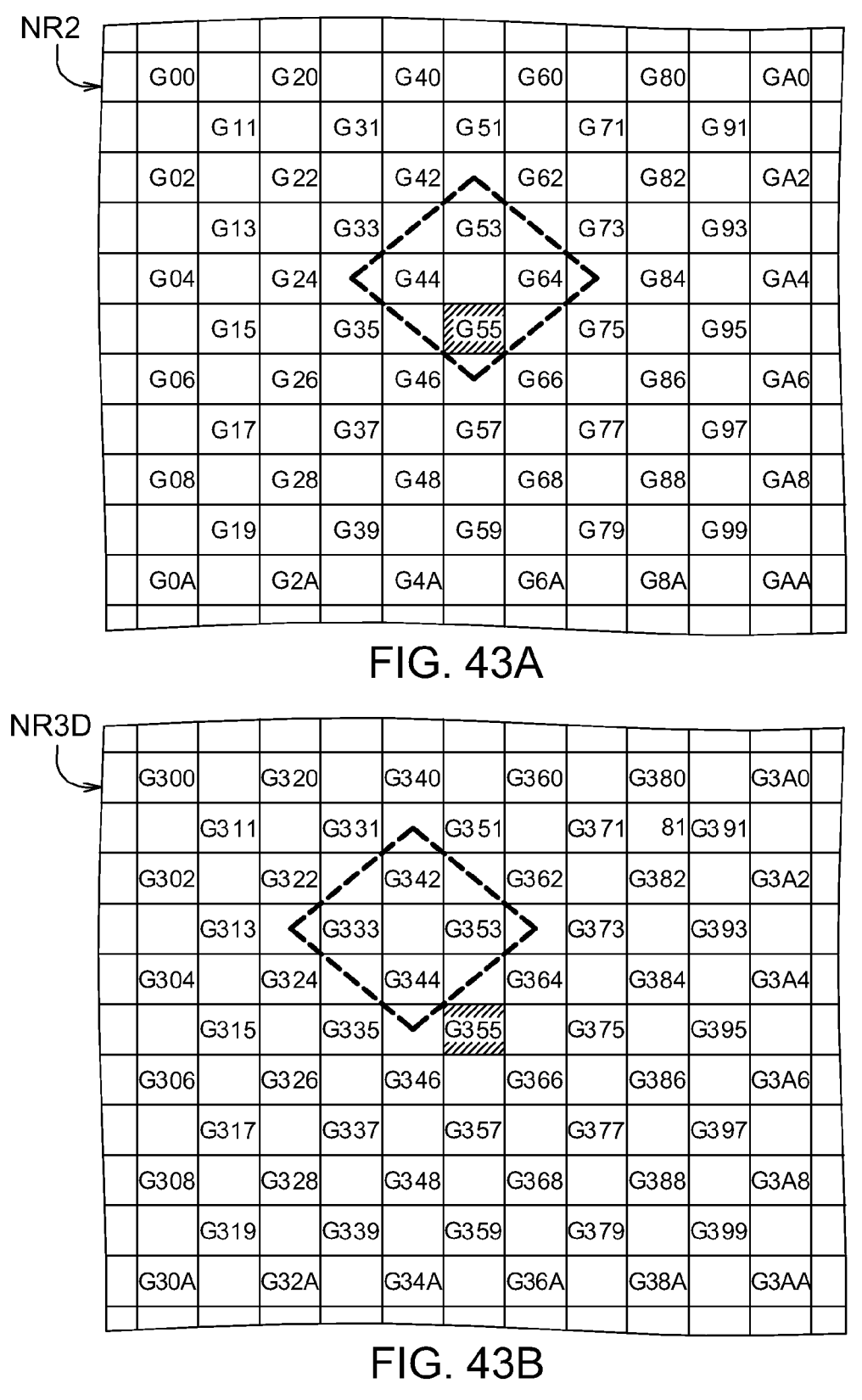
Figures 44A, 44B:
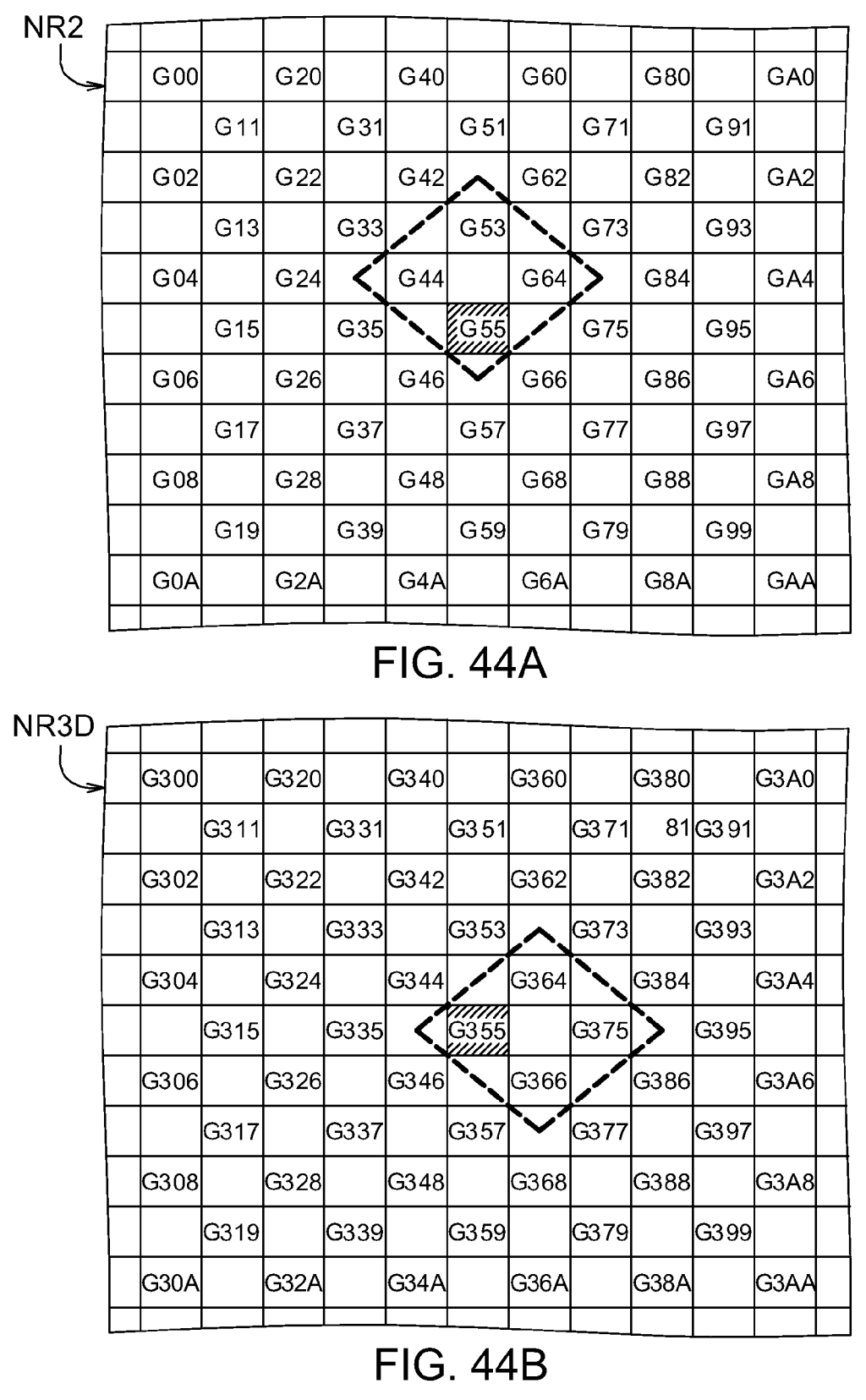
Figures 45A, 45B:
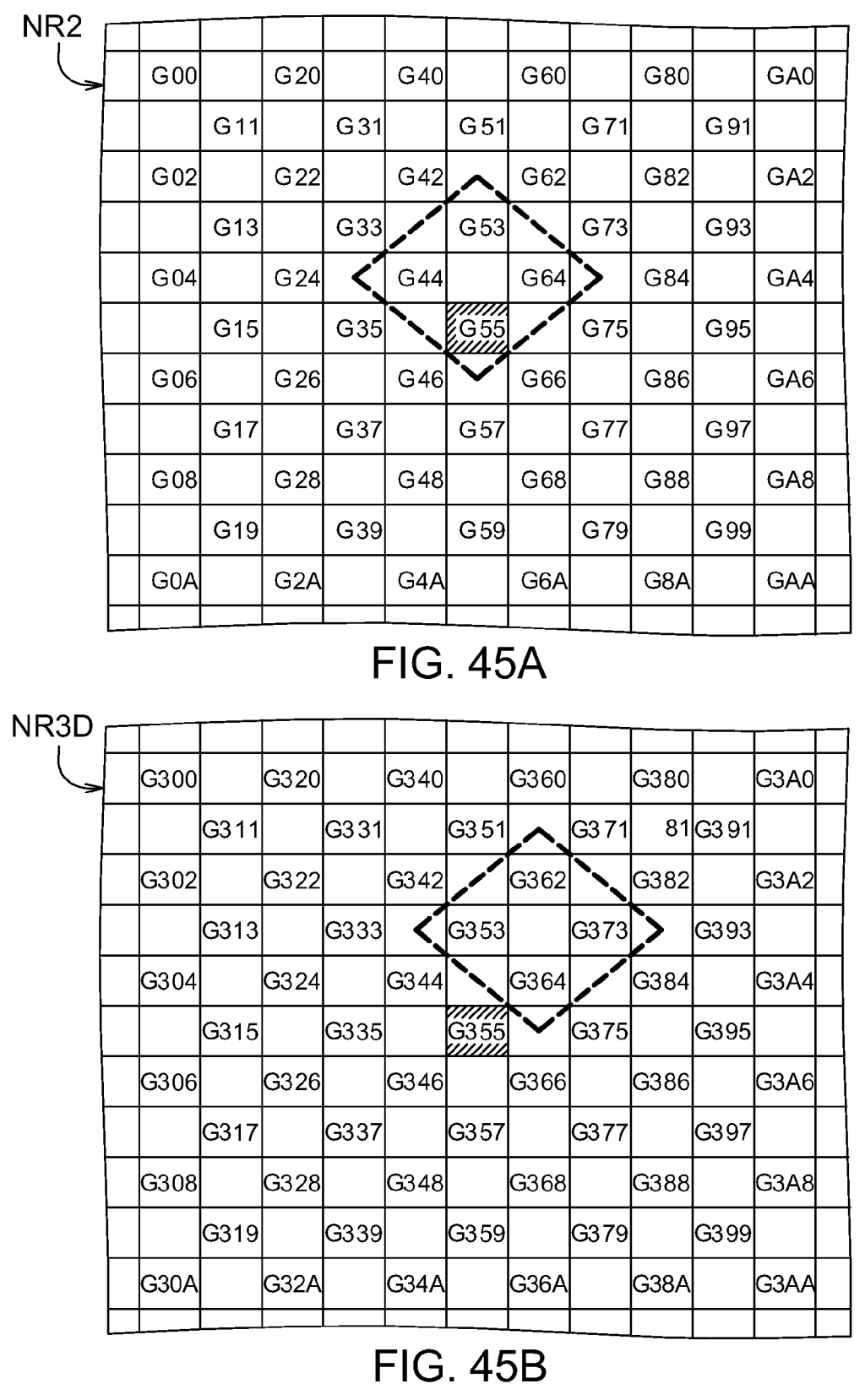
Figures 46A, 46B:
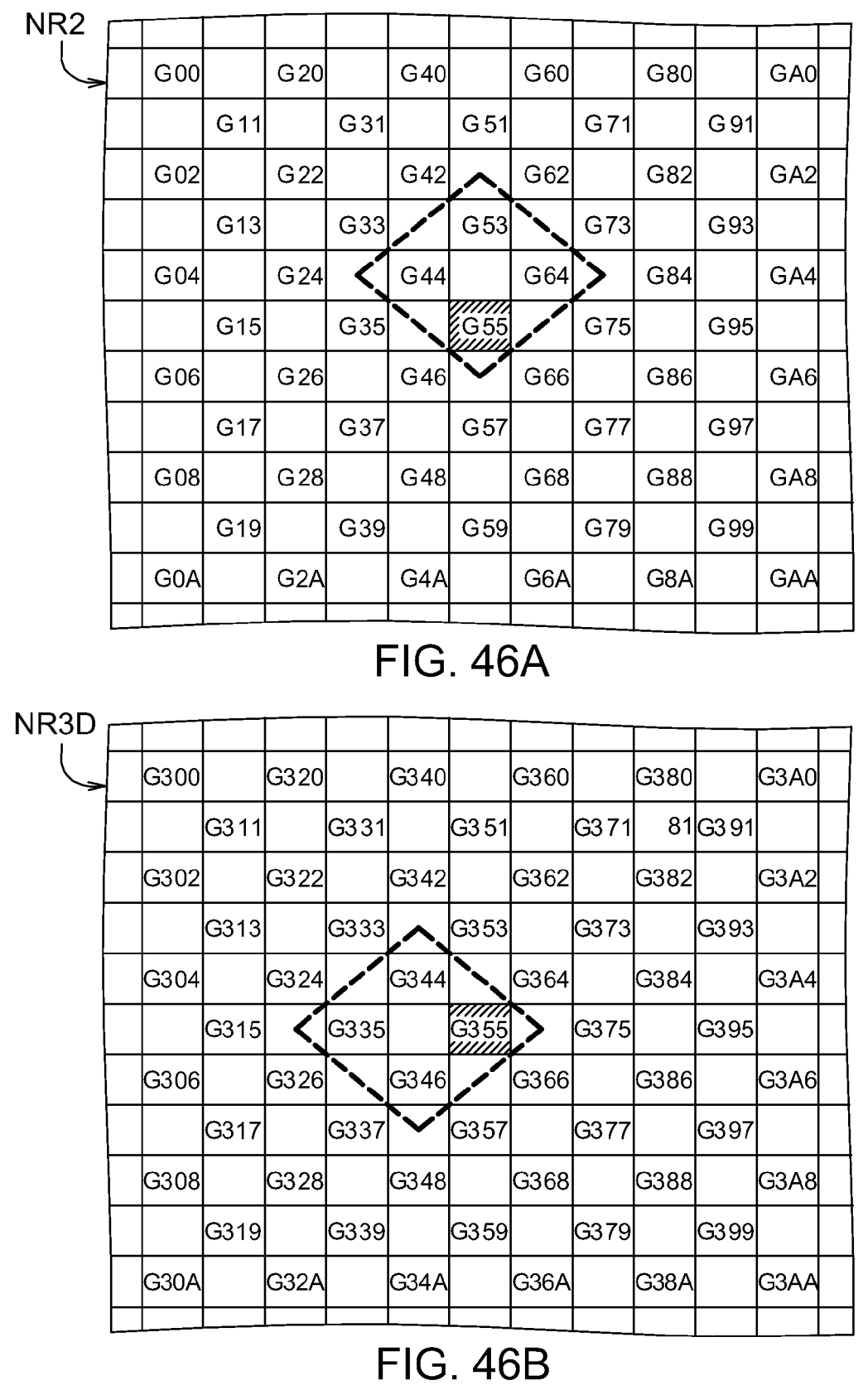

The backward reference addition pattern in FIG. 42B has the same pixel arrangement as the in-plane addition pattern in the frame image of interest (FIG. 42A). The pixel selector circuit 719 supplies pixel values G353, G344, G364, and G355 to difference calculation circuit 721. The backward reference addition pattern in FIG. 43B has a pixel arrangement shifted to the upper left from the pattern in the frame image of interest (FIG. 43A). The pixel selector circuit 719 supplies pixel values G342, G333, G353, and G344 to difference calculation circuit 722. The backward reference addition pattern in FIG. 44B has a pixel arrangement shifted to the lower right from the pattern in the frame image of interest (FIG. 44A). The pixel selector circuit 719 supplies pixel values G364, G355, G375, and G366 to difference calculation circuit 723. The backward reference addition pattern in FIG. 45B has a pixel arrangement shifted to the upper right from the pattern in the frame image of interest (FIG. 45A). The pixel selector circuit 719 supplies pixel values G362, G353, G373, and G364 to difference calculation circuit 724. The backward reference addition pattern in FIG. 46B has a pixel arrangement shifted to the lower left from the pattern in the frame image of interest (FIG. 46A). The pixel selector circuit 719 supplies pixel values G344, G335, G355, and G346 to difference calculation circuit 725.

If the rightward block pattern (G64, G55, G75, G66) including the pixel of interest and pixels to its right, which is the second in-plane addition pattern, is selected when the pixel of interest is a green pixel, similar combinations of the in-plane addition pattern with four-pixel addition patterns in the forward reference frame image and four-pixel addition patterns in the backward reference frame image are tested. These patterns are shifted in the same way as when the first in-plane addition pattern is selected.

If the lower block pattern (G55, G46, G66, G57) including the pixel of interest and pixels below it, which is the third in-plane addition pattern, is selected when the pixel of interest is a green pixel, similar combinations of the in-plane addition pattern with four-pixel addition patterns in the forward reference frame image and four-pixel addition patterns in the backward reference frame image are tested. These patterns are also shifted in the same way as when the first in-plane addition pattern is selected.

If the leftward block pattern (G44, G35, G55, G46) including the pixel of interest and pixels to its left, which is the fourth in-plane addition pattern, is selected when the pixel of interest is a green pixel, similar combinations of the in-plane addition pattern with four-pixel addition patterns in the forward reference frame image and four-pixel addition patterns in the backward reference frame image are tested. These patterns are also shifted in the same way as when the first in-plane addition pattern is selected.

FIGS. 47A, 47B to 51A, 51B show the five forward reference addition patterns tested by the forward reference pattern detection circuit 71 when the pixel of interest is a green pixel and the fifth in-plane addition pattern is selected. The fifth in-plane addition pattern is the upper vertical line pattern including the pixel of interest and neighboring pixels above and below it.

Figures 48A, 48B:
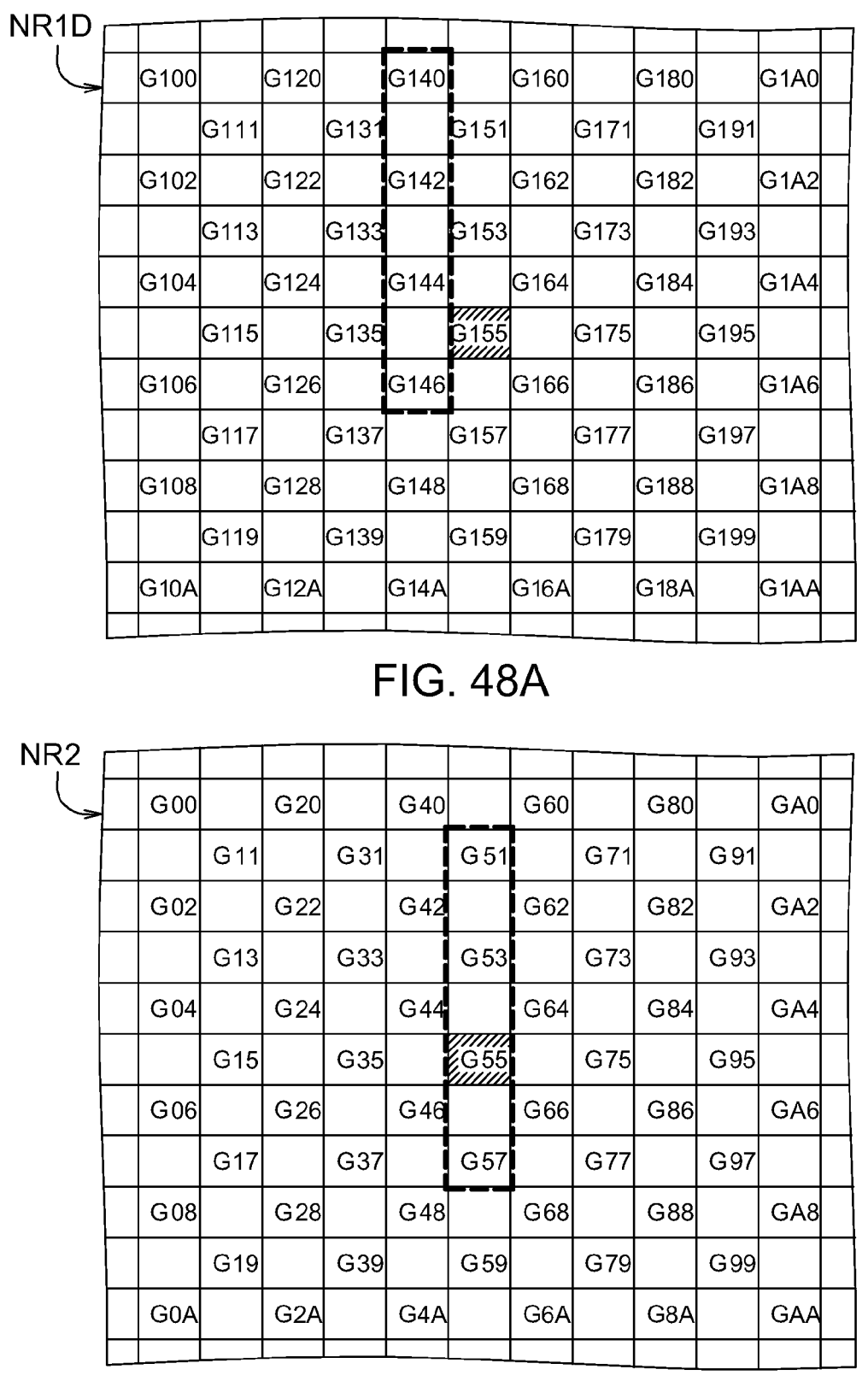
Figure 49A:
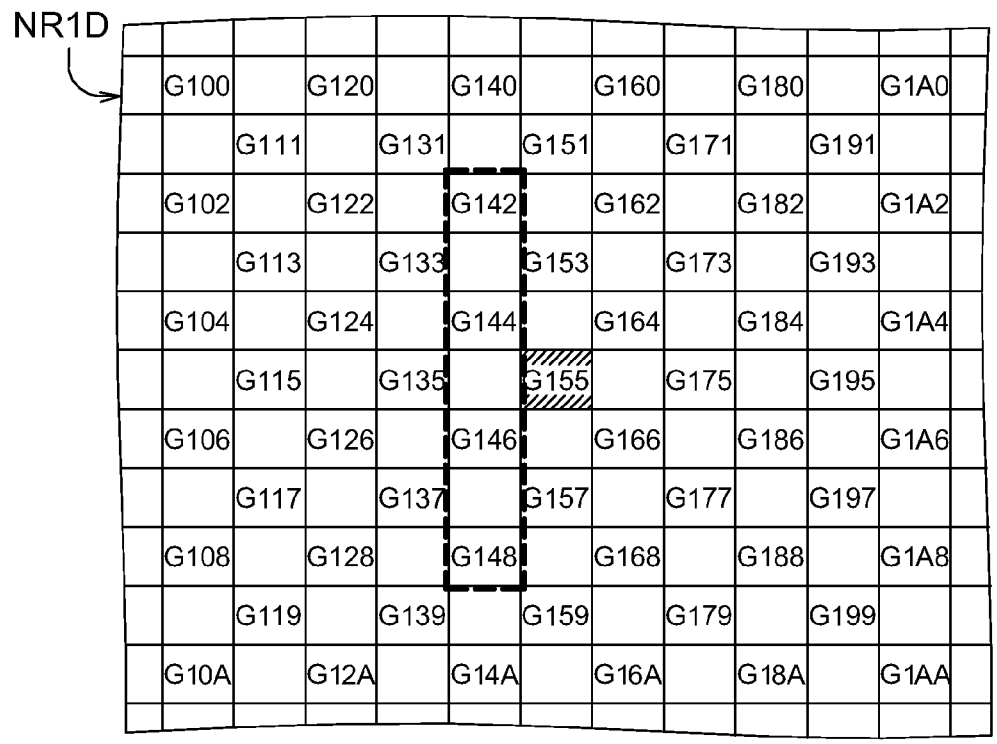
FIGS. 49A and 49B show another exemplary combination of the in-plane addition pattern and a forward reference addition pattern when the pixel of interest is a green pixel in the frame of interest.
Figure 49B:
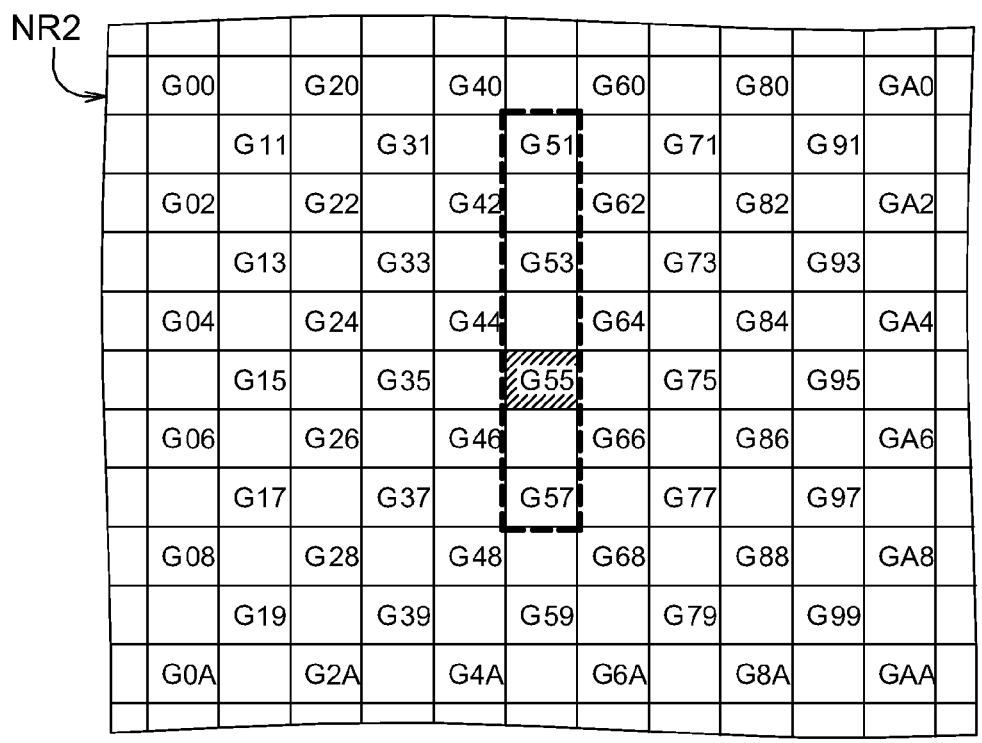

The forward reference addition pattern in FIG. 47A has the same pixel arrangement as the in-plane addition pattern in the frame image of interest, shown in FIG. 47B. The pixel selector circuit 719 supplies pixel values G151, G153, G155, and G157 to difference calculation circuit 721. The forward reference addition pattern in FIG. 48A has a pixel arrangement shifted to the upper left from the pattern in the frame image of interest (FIG. 48B). The pixel selector circuit 719 supplies pixel values G140, G142, G144, and G146 to difference calculation circuit 722. The forward reference addition pattern in FIG. 49A has a pixel arrangement shifted to the lower left from the pattern in the frame image of interest (FIG. 49B). The pixel selector circuit 719 supplies pixel values G142, G144, G146, and G148 to difference calculation circuit 723. The forward reference addition pattern in FIG. 50A has a pixel arrangement shifted to the upper right from the pattern in the frame image of interest (FIG. 50B). The pixel selector circuit 719 supplies pixel values G160, G162, G164, and G166 to difference calculation circuit 724. The forward reference addition pattern in FIG. 51A has a pixel arrangement shifted to the lower right from the pattern in the frame image of interest (FIG. 51B). The pixel selector circuit 719 supplies pixel values G162, G164, G166, and G168 to difference calculation circuit 725.

FIGS. 52A, 52B to 56A, 56B show the five backward reference addition patterns tested by the backward reference pattern detection circuit 72 when the pixel of interest is a green pixel and the fifth in-plane addition pattern is selected. The fifth in-plane addition pattern is the upper vertical line pattern including the pixel of interest and neighboring pixels above and below it.

Figures 52A, 52B:
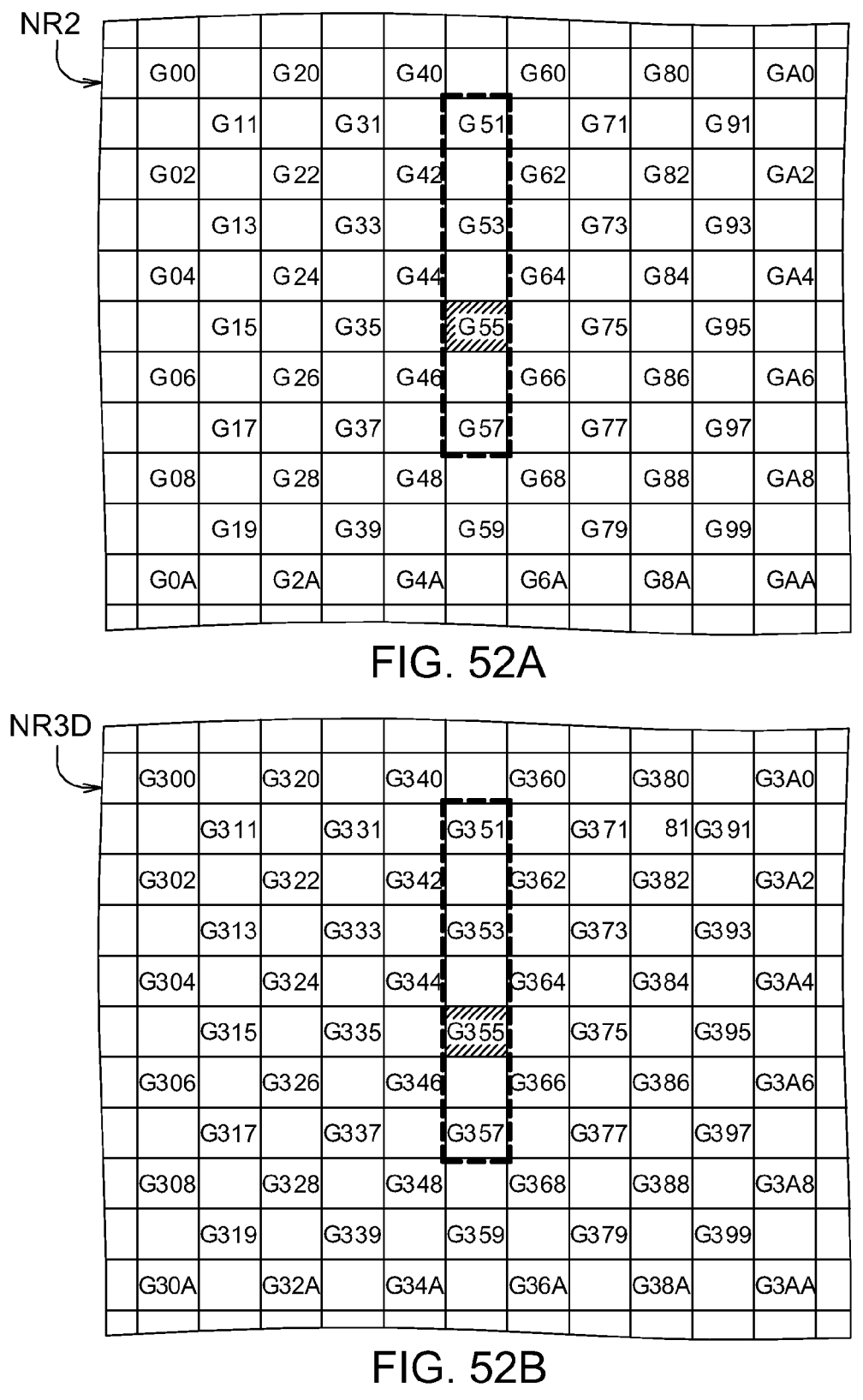
Figures 54A, 54B:
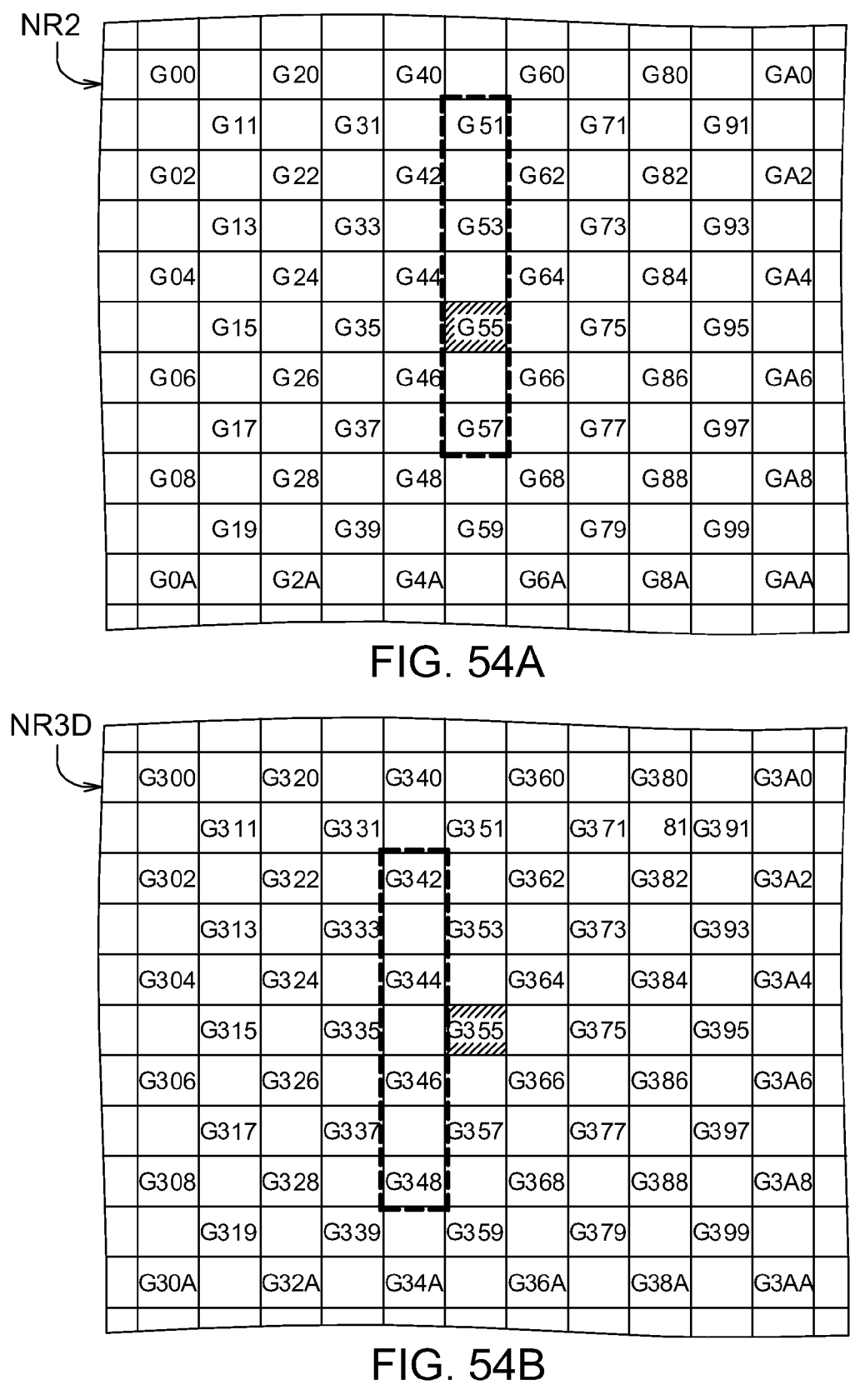
Figures 55A, 55B:
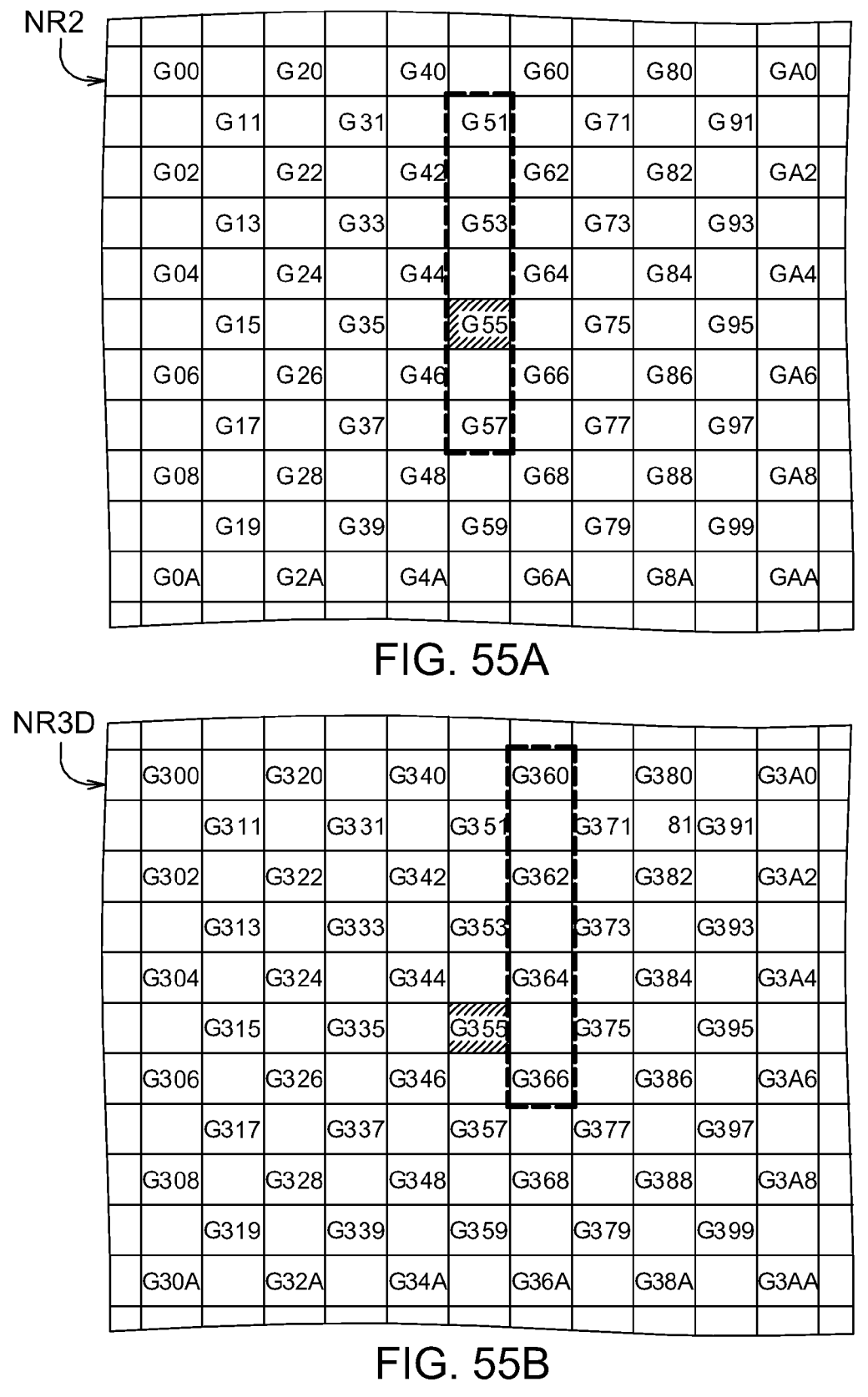

The backward reference addition pattern in FIG. 52B has the same pixel arrangement as the in-plane addition pattern in the frame image of interest (FIG. 52A). The pixel selector circuit 719 supplies pixel values G351, G353, G355, and G357 to difference calculation circuit 721. The backward reference addition pattern in FIG. 53B has a pixel arrangement shifted to the upper left from the pattern in the frame image of interest (FIG. 53A). The pixel selector circuit 719 supplies pixel values G340, G342, G344, and G346 to difference calculation circuit 722. The backward reference addition pattern in FIG. 54B has a pixel arrangement shifted to the lower left from the pattern in the frame image of interest (FIG. 54A). The pixel selector circuit 719 supplies pixel values G342, G344, G346, and G348 to difference calculation circuit 723. The backward reference addition pattern in FIG. 55B has a pixel arrangement shifted to the upper right from the pattern in the frame image of interest (FIG. 55A). The pixel selector circuit 719 supplies pixel values G360, G362, G364, and G366 to difference calculation circuit 724. The backward reference addition pattern in FIG. 56B has a pixel arrangement shifted to the lower right from the pattern in the frame image of interest (FIG. 56A). The pixel selector circuit 719 supplies pixel values G362, G364, G366, and G368 to difference calculation circuit 725.

If the lower vertical line pattern (G53, G55, G57, G59) including the pixel of interest and neighboring pixels above and below it, which is the sixth in-plane addition pattern, is selected when the pixel of interest is a green pixel, similar combinations of the in-plane addition pattern with four-pixel addition patterns in the forward reference frame image and four-pixel addition patterns in the backward reference frame image are tested. These patterns are shifted in the same way as when the fifth in-plane addition pattern is selected.

FIGS. 57A, 57B to 61A, 61B show the five forward reference addition patterns tested by the forward reference pattern detection circuit 71 when the pixel of interest is a green pixel and the seventh in-plane addition pattern is selected. The seventh in-plane addition pattern is the leftward horizontal line pattern including the pixel of interest and pixels to its right and left.

Figures 57A, 57B:
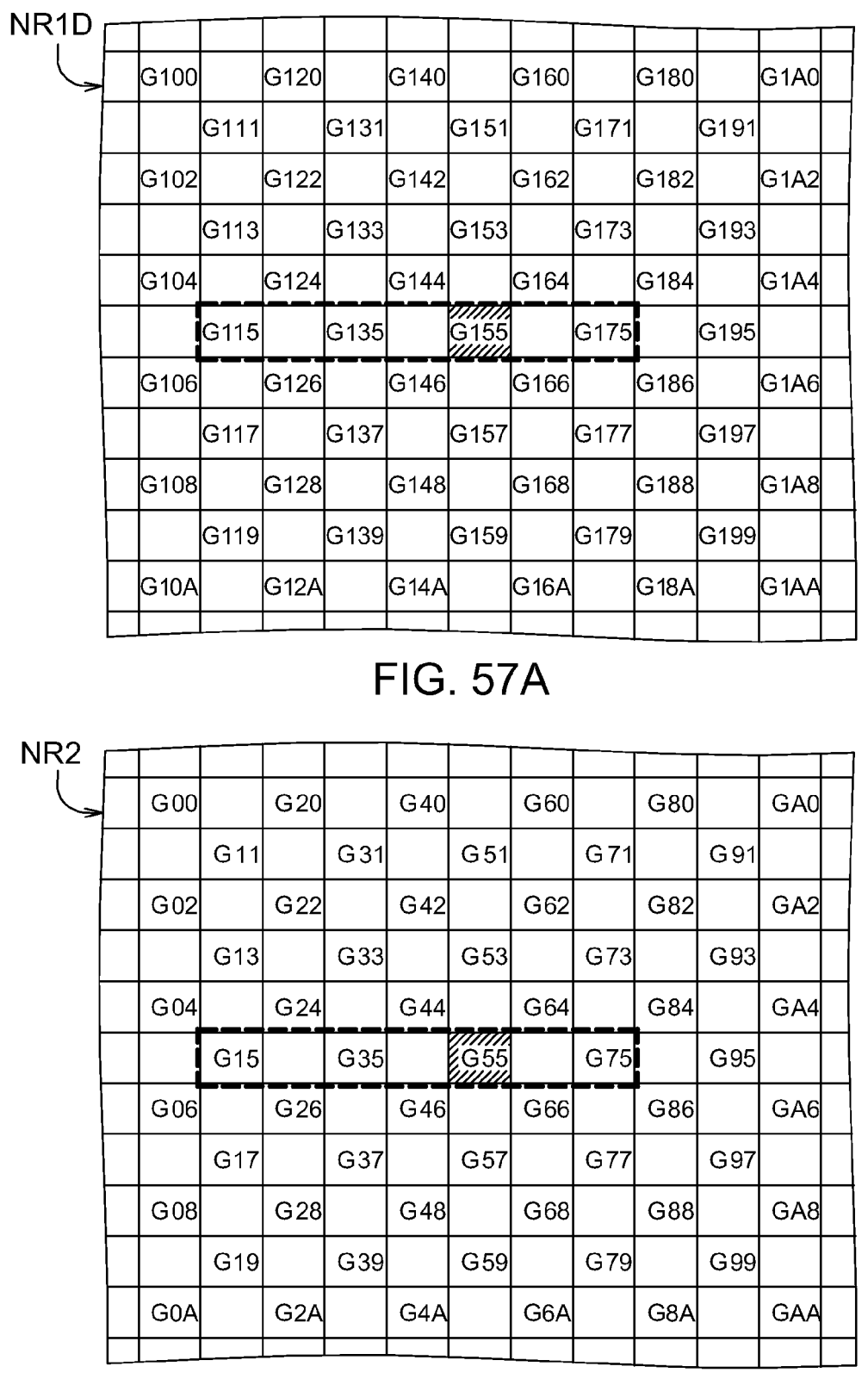
Figures 58A, 58B:
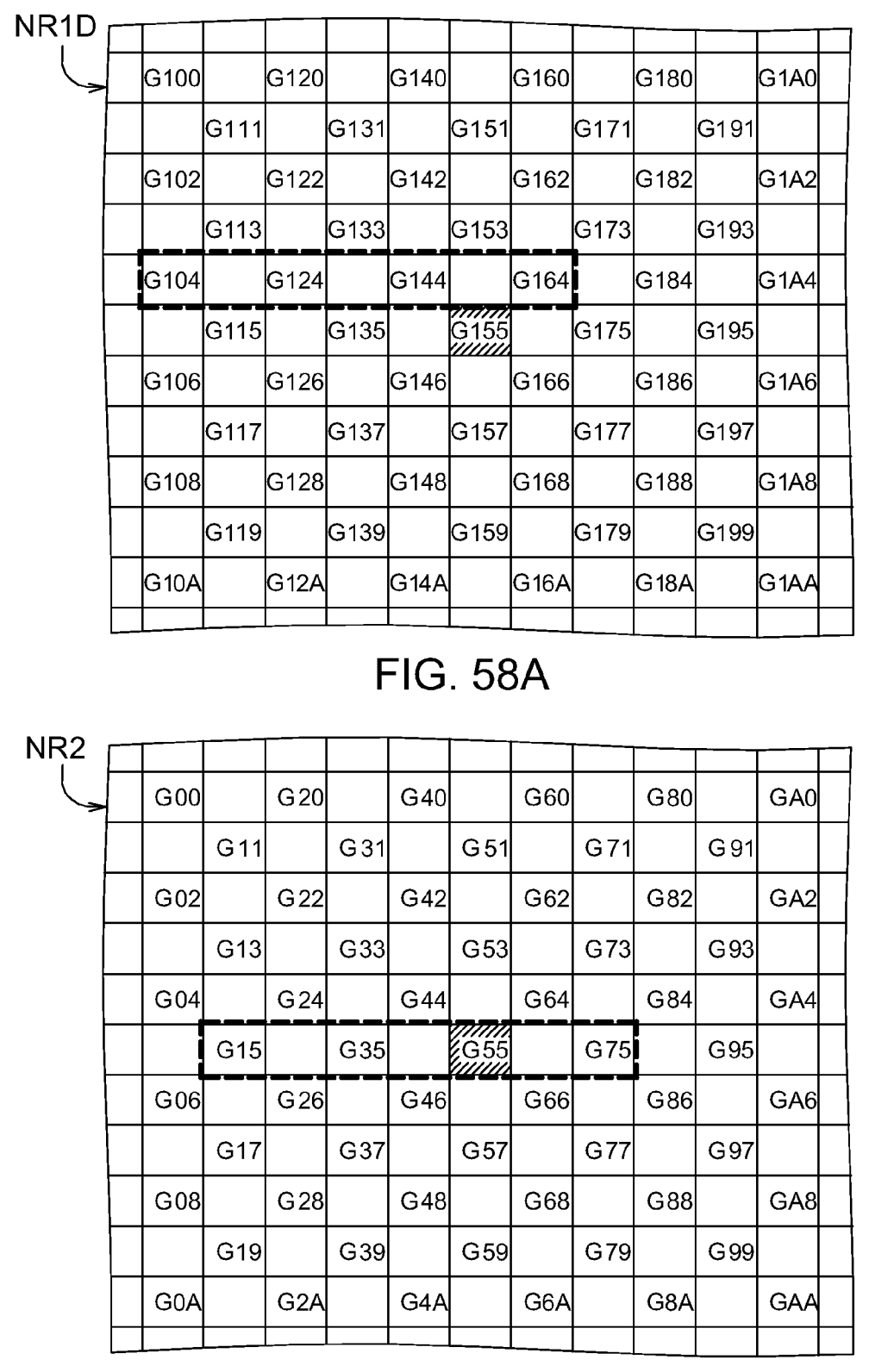
Figures 59A, 59B:
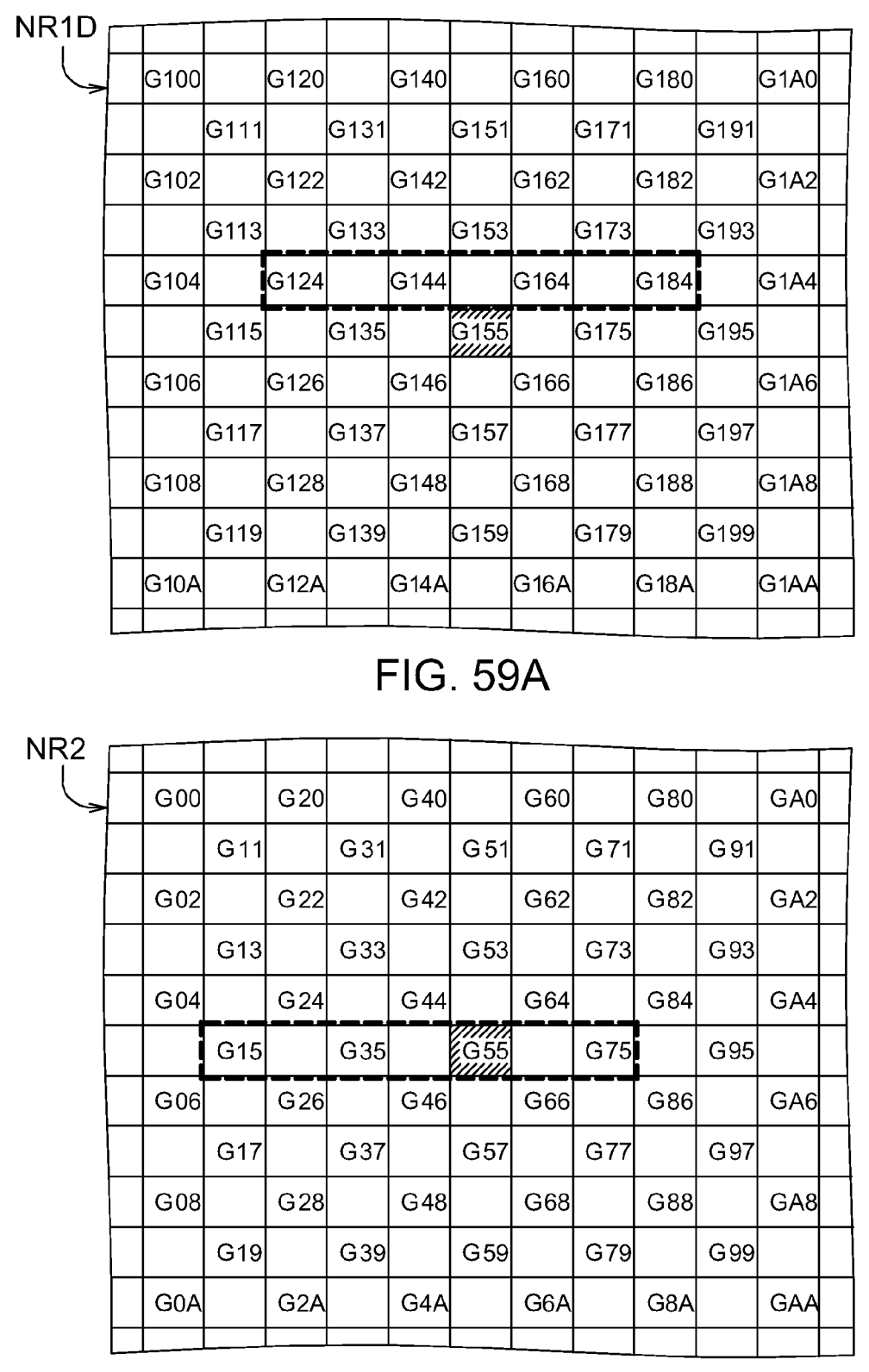
Figures 60A, 60B:
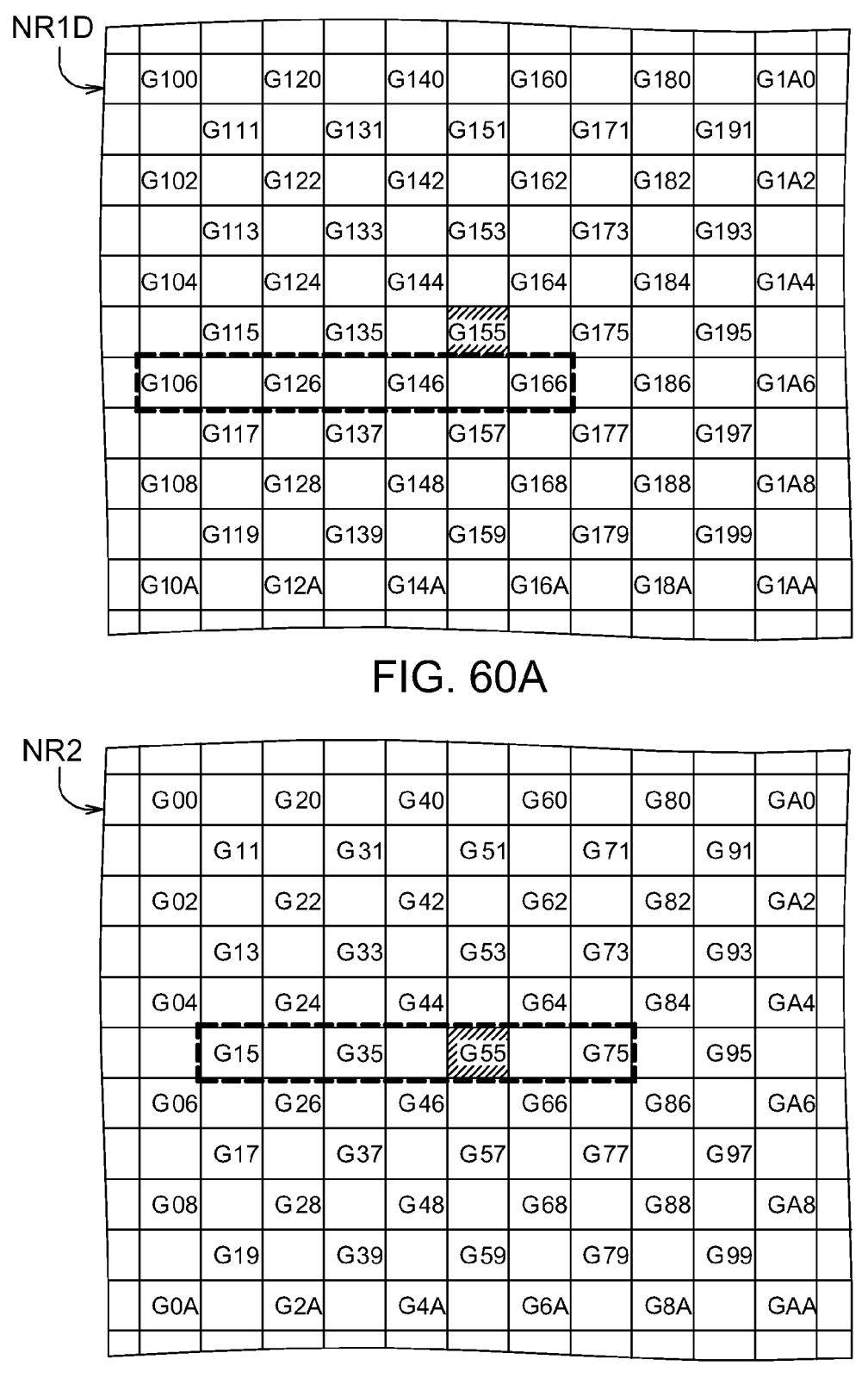

The forward reference addition pattern in FIG. 57A has the same pixel arrangement as the in-plane addition pattern in the frame image of interest, shown in FIG. 57B. The pixel selector circuit 719 supplies pixel values G115, G135, G155, and G175 to difference calculation circuit 721. The forward reference addition pattern in FIG. 58A has a pixel arrangement shifted to the upper left from the pattern in the frame image of interest (FIG. 58B). The pixel selector circuit 719 supplies pixel values G104, G124, G144, and G164 to difference calculation circuit 722. The forward reference addition pattern in FIG. 59A has a pixel arrangement shifted to the upper right from the pattern in the frame image of interest (FIG. 59B). The pixel selector circuit 719 supplies pixel values G124, G144, G164, and G184 to difference calculation circuit 723. The forward reference addition pattern in FIG. 60A has a pixel arrangement shifted to the lower left from the pattern in the frame image of interest (FIG. 60B). The pixel selector circuit 719 supplies pixel values G106, G126, G146, and G166 to difference calculation circuit 724. The forward reference addition pattern in FIG. 61A has a pixel arrangement shifted to the lower right from the pattern in the frame image of interest (FIG. 61B). The pixel selector circuit 719 supplies pixel values G126, G146, G166, and G186 to difference calculation circuit 725.

FIGS. 62A, 62B to 66A, 66B show the five backward reference addition patterns tested by the backward reference pattern detection circuit 72 when the pixel of interest is a green pixel and the seventh in-plane addition pattern is selected. The seventh in-plane addition pattern is the leftward horizontal line pattern including the pixel of interest and pixels to its right and left.

Figures 63A, 63B:
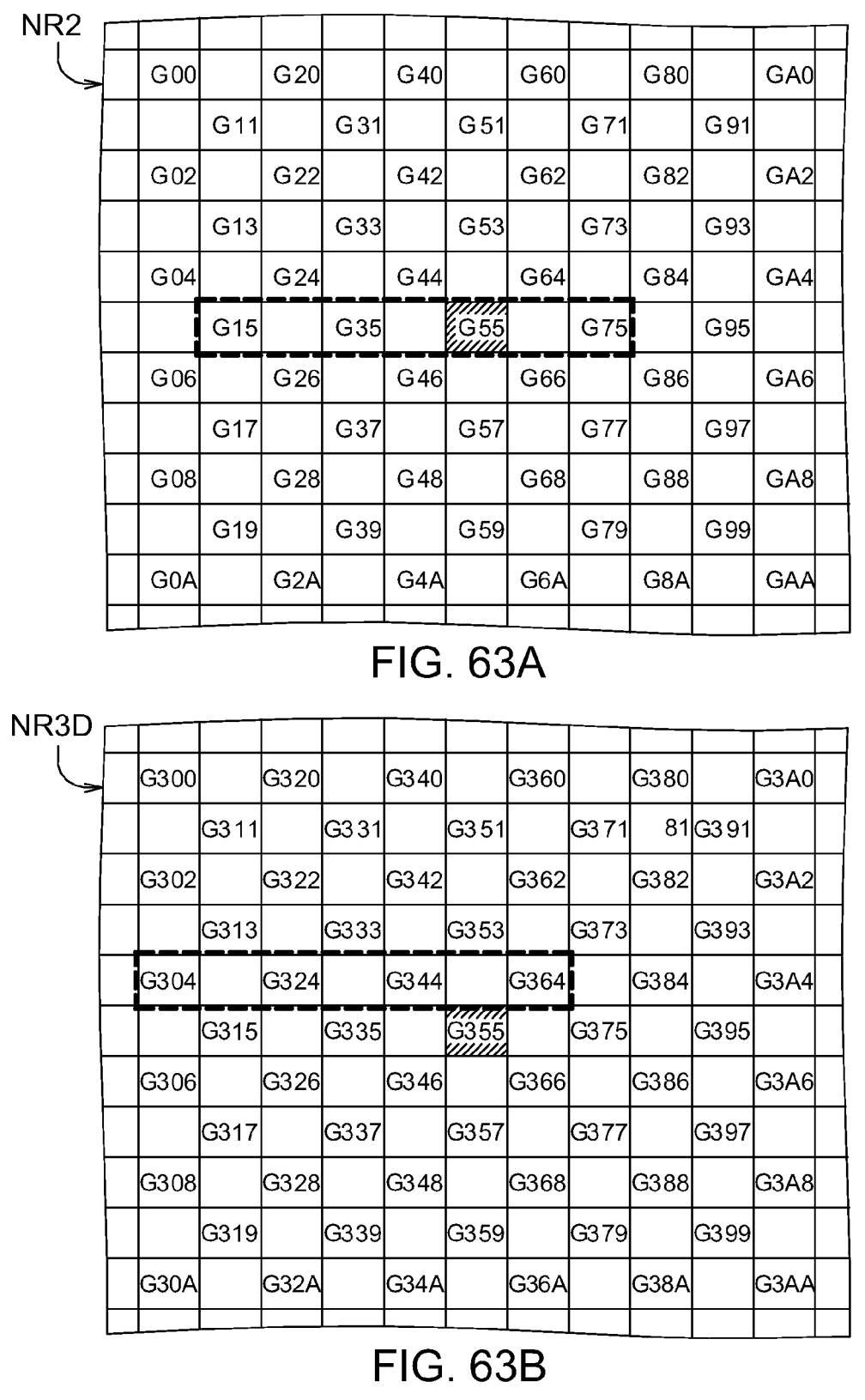
Figures 64A, 64B:
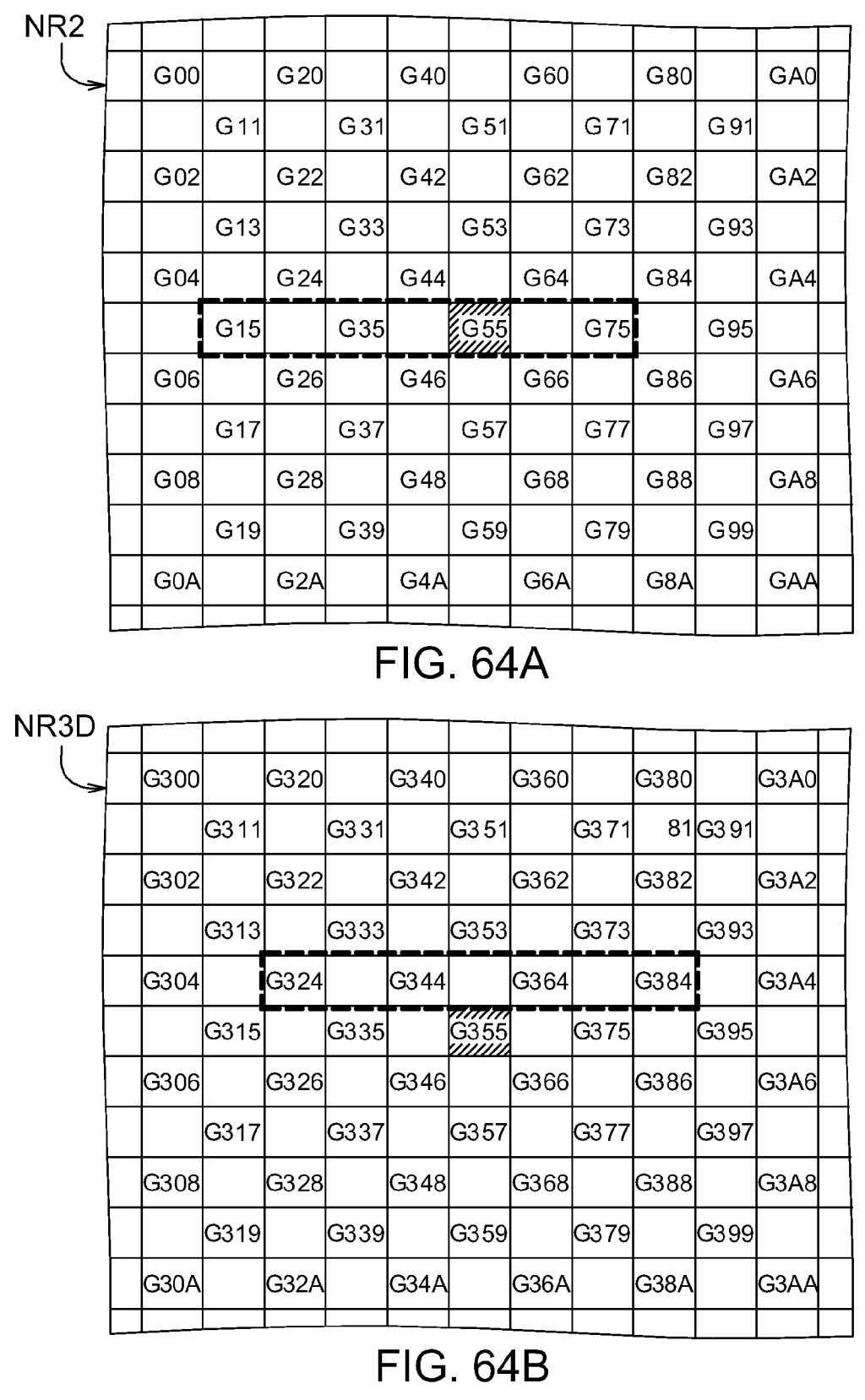
Figures 65A, 65B:
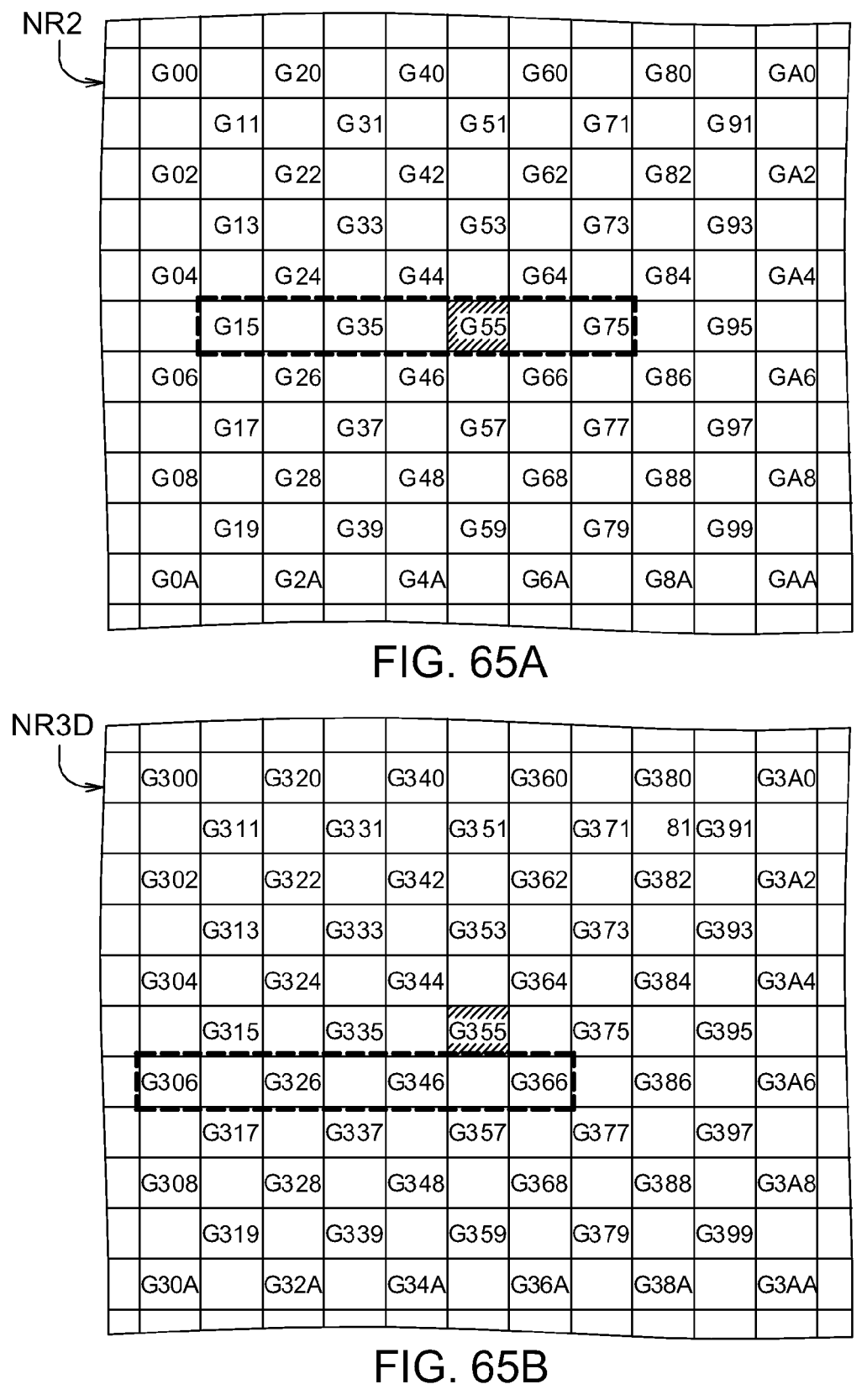
Figures 66A, 66B:
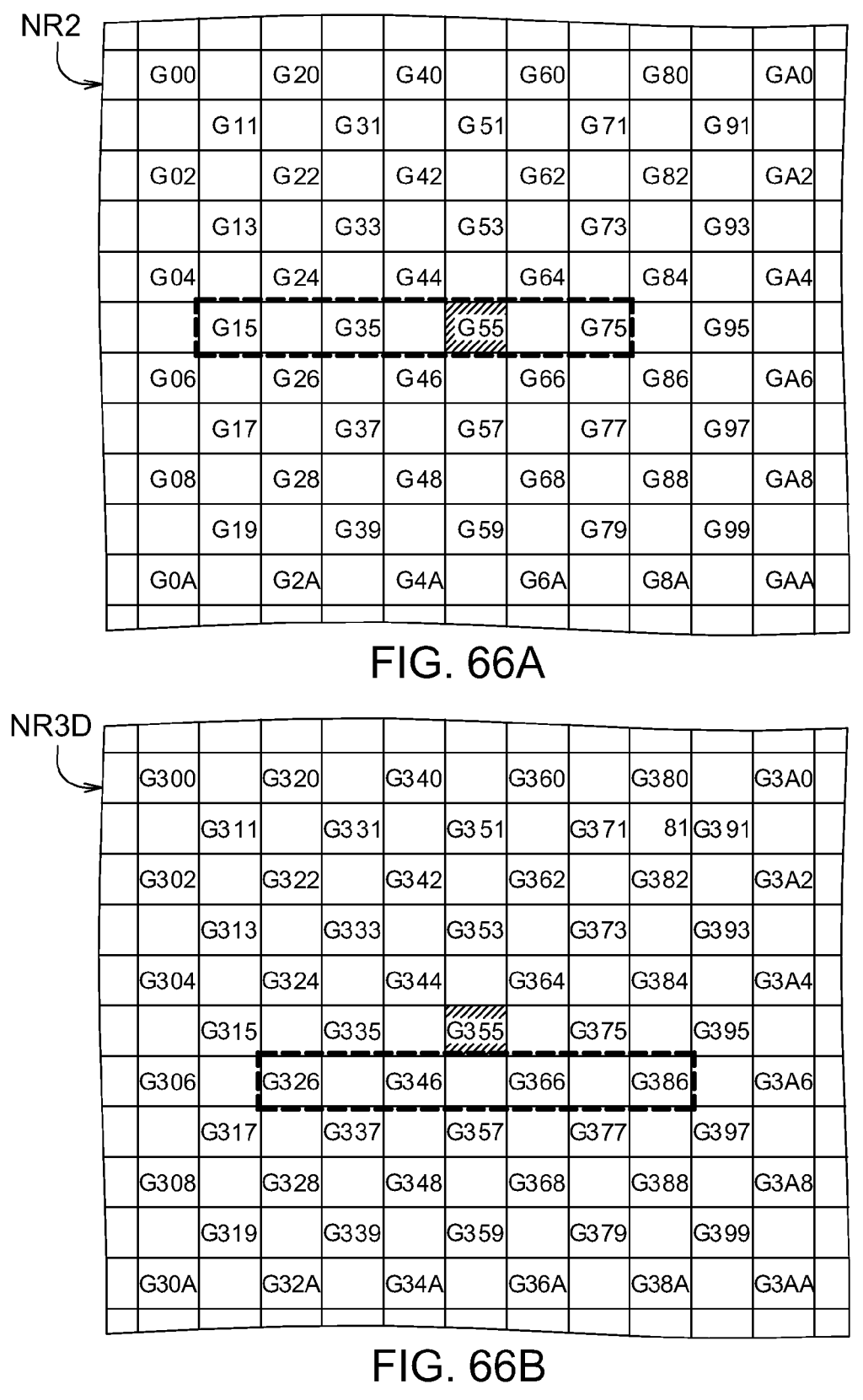

The backward reference addition pattern in FIG. 62B has the same pixel arrangement as the in-plane addition pattern in the frame image of interest (FIG. 62A). The pixel selector circuit 719 supplies pixel values G315, G335, G355, and G375 to difference calculation circuit 721. The backward reference addition pattern in FIG. 63B has a pixel arrangement shifted to the upper left from the pattern in the frame image of interest (FIG. 63A). The pixel selector circuit 719 supplies pixel values G304, G324, G344, and G364 to difference calculation circuit 722. The backward reference addition pattern in FIG. 64B has a pixel arrangement shifted to the upper right from the pattern in the frame image of interest (FIG. 64A). The pixel selector circuit 719 supplies pixel values G324, G344, G364, and G384 to difference calculation circuit 723. The backward reference addition pattern in FIG. 65B has a pixel arrangement shifted to the lower left from the pattern in the frame image of interest (FIG. 65A). The pixel selector circuit 719 supplies pixel values G306, G326, G346, and G366 to difference calculation circuit 724. The backward reference addition pattern in FIG. 66B has a pixel arrangement shifted to the lower right from the pattern in the frame image of interest (FIG. 66A). The pixel selector circuit 719 supplies pixel values G326, G346, G366, and G386 to difference calculation circuit 725.

If the rightward horizontal line pattern (G35, G55, G75, G95) including the pixel of interest and pixels to its right and left, which is the eighth in-plane addition pattern, is selected when the pixel of interest is a green pixel, similar combinations of the in-plane addition pattern with four-pixel addition patterns in the forward reference frame image and four-pixel addition patterns in the backward reference frame image are tested. These patterns are shifted in the same way as when the seventh in-plane addition pattern is selected.

FIGS. 67A, 67B to 71A, 71B show the five forward reference addition patterns tested by the forward reference pattern detection circuit 71 when the pixel of interest is a green pixel and the ninth in-plane addition pattern is selected. The ninth in-plane addition pattern is the upper left diagonal line pattern including the pixel of interest and pixels to its upper left and lower right.

Figures 68A, 68B:
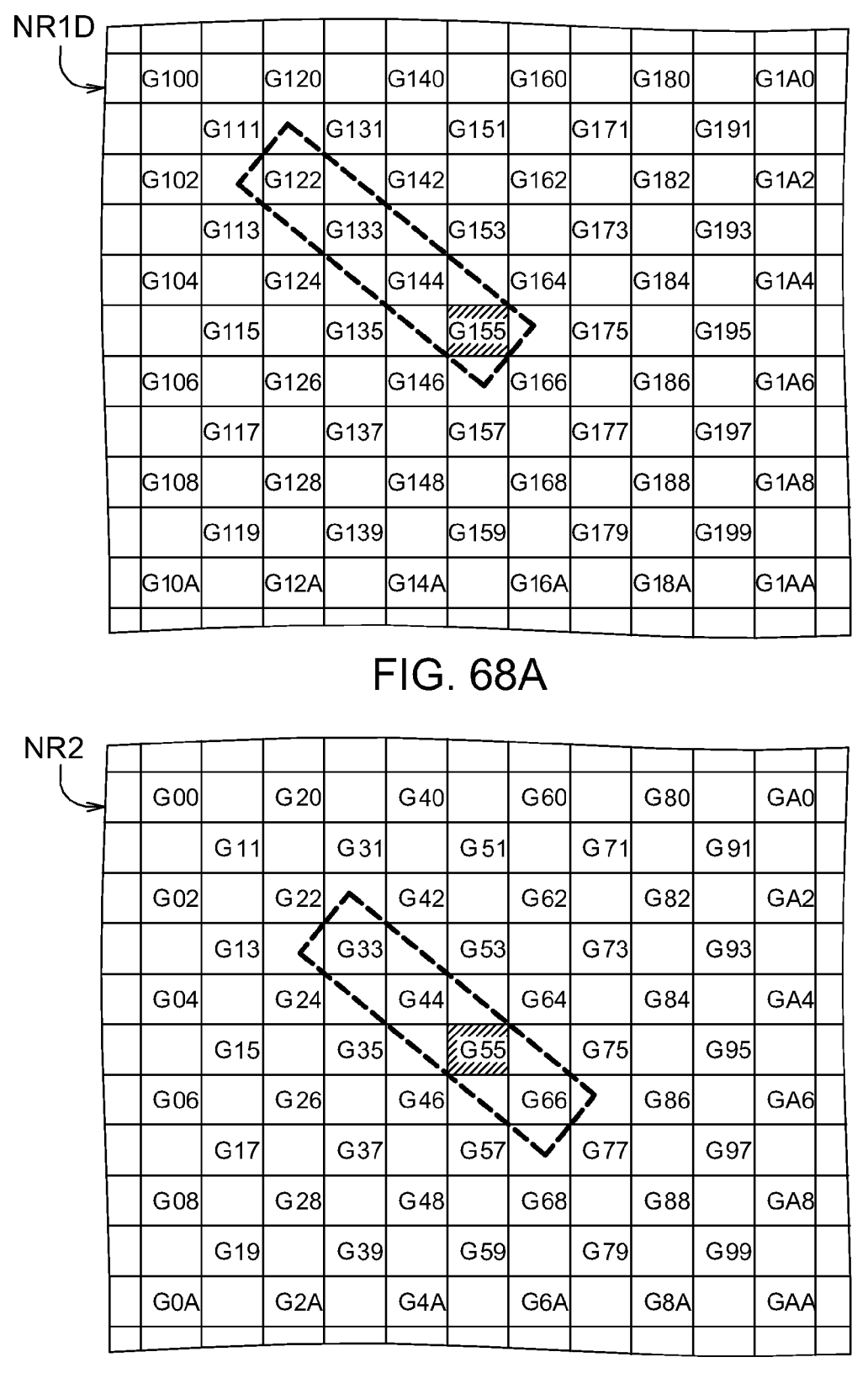
Figures 69A, 69B:
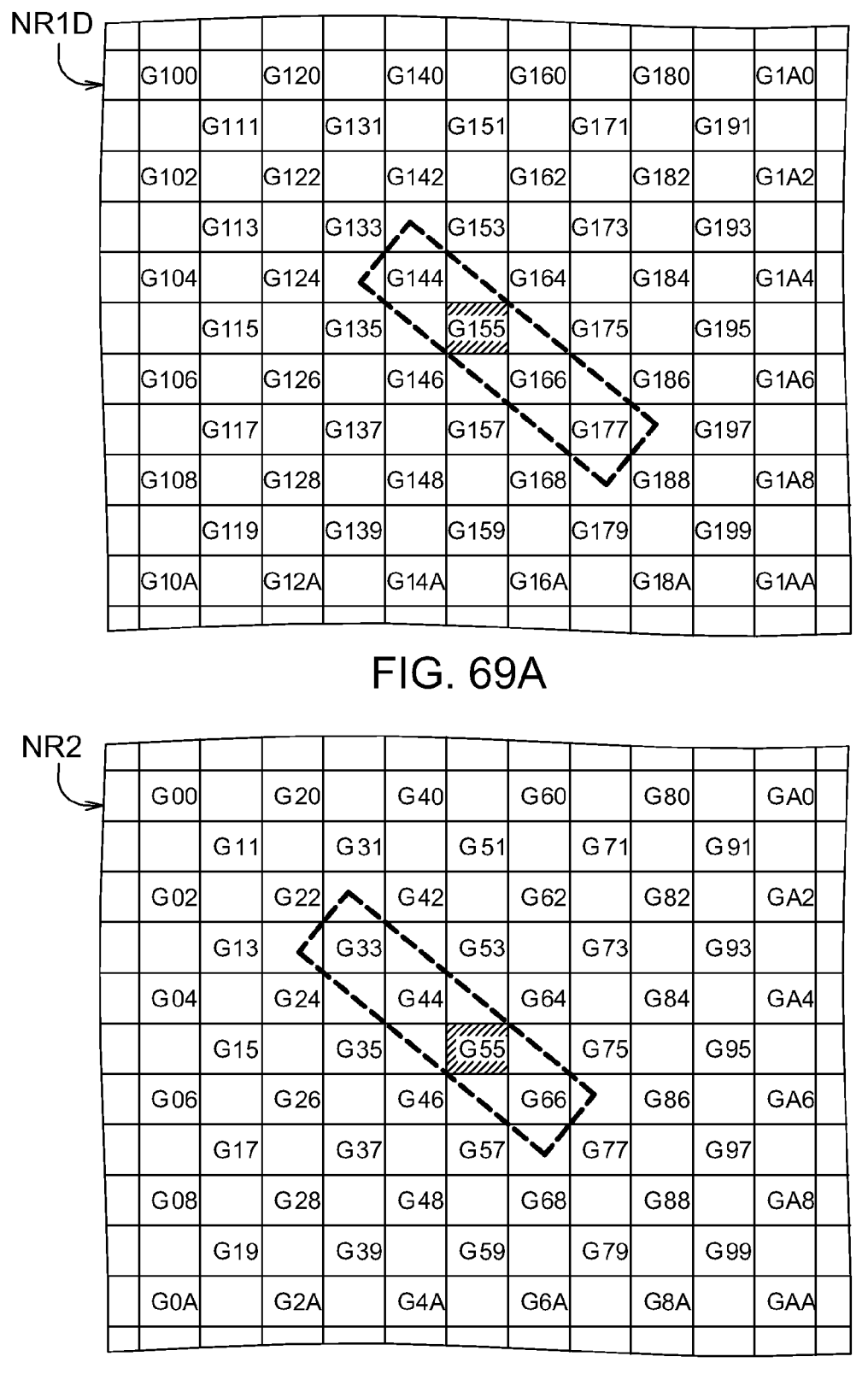

The forward reference addition pattern in FIG. 67A has the same pixel arrangement as the in-plane addition pattern in the frame image of interest, shown in FIG. 67B. The pixel selector circuit 719 supplies pixel values G133, G144, G155, and G166 to difference calculation circuit 721. The forward reference addition pattern in FIG. 68A has a pixel arrangement shifted to the upper left from the pattern in the frame image of interest (FIG. 68B). The pixel selector circuit 719 supplies pixel values G122, G133, G144, and G155 to difference calculation circuit 722. The forward reference addition pattern in FIG. 69A has a pixel arrangement shifted to the lower right from the pattern in the frame image of interest (FIG.

Figures 70A, 70B:
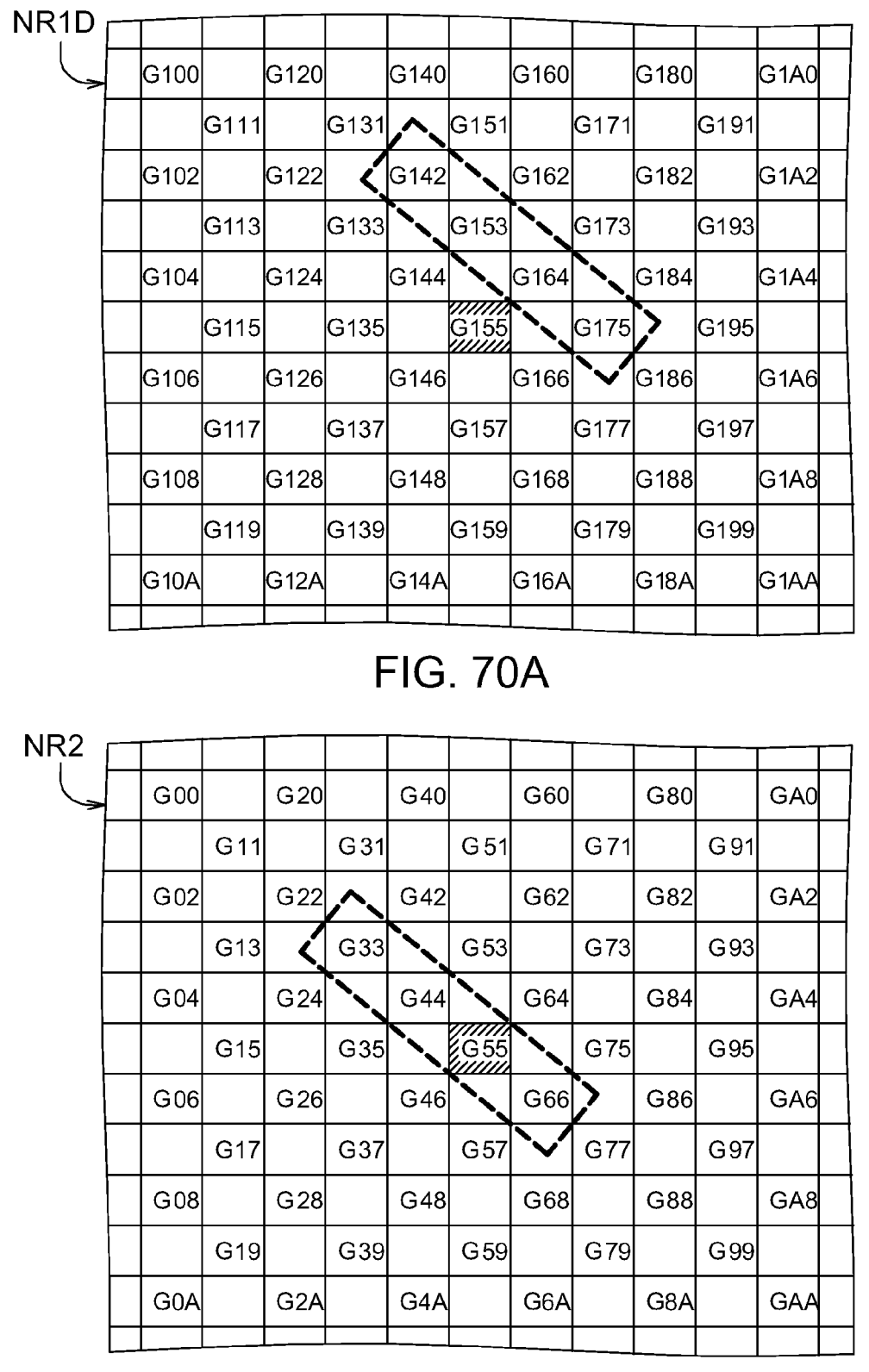

69B). The pixel selector circuit 719 supplies pixel values G144, G155, G166, and G177 to difference calculation circuit 723. The forward reference addition pattern in FIG. 70A has a pixel arrangement shifted to the upper right from the pattern in the frame image of interest (FIG. 70B). The pixel selector circuit 719 supplies pixel values G142, G153, G164, and G175 to difference calculation circuit 724. The forward reference addition pattern in FIG. 71A has a pixel arrangement shifted to the lower left from the pattern in the frame image of interest (FIG. 71B). The pixel selector circuit 719 supplies pixel values G124, G135, G146, and G157 to difference calculation circuit 725.

FIGS. 72A, 72B to 76A, 76B show the five backward reference addition patterns tested by the backward reference pattern detection circuit 72 when the pixel of interest is a green pixel and the ninth in-plane addition pattern is selected. The ninth in-plane addition pattern is the upper left diagonal line pattern including the pixel of interest and pixels to its upper left and lower right.

Figures 72A, 72B:
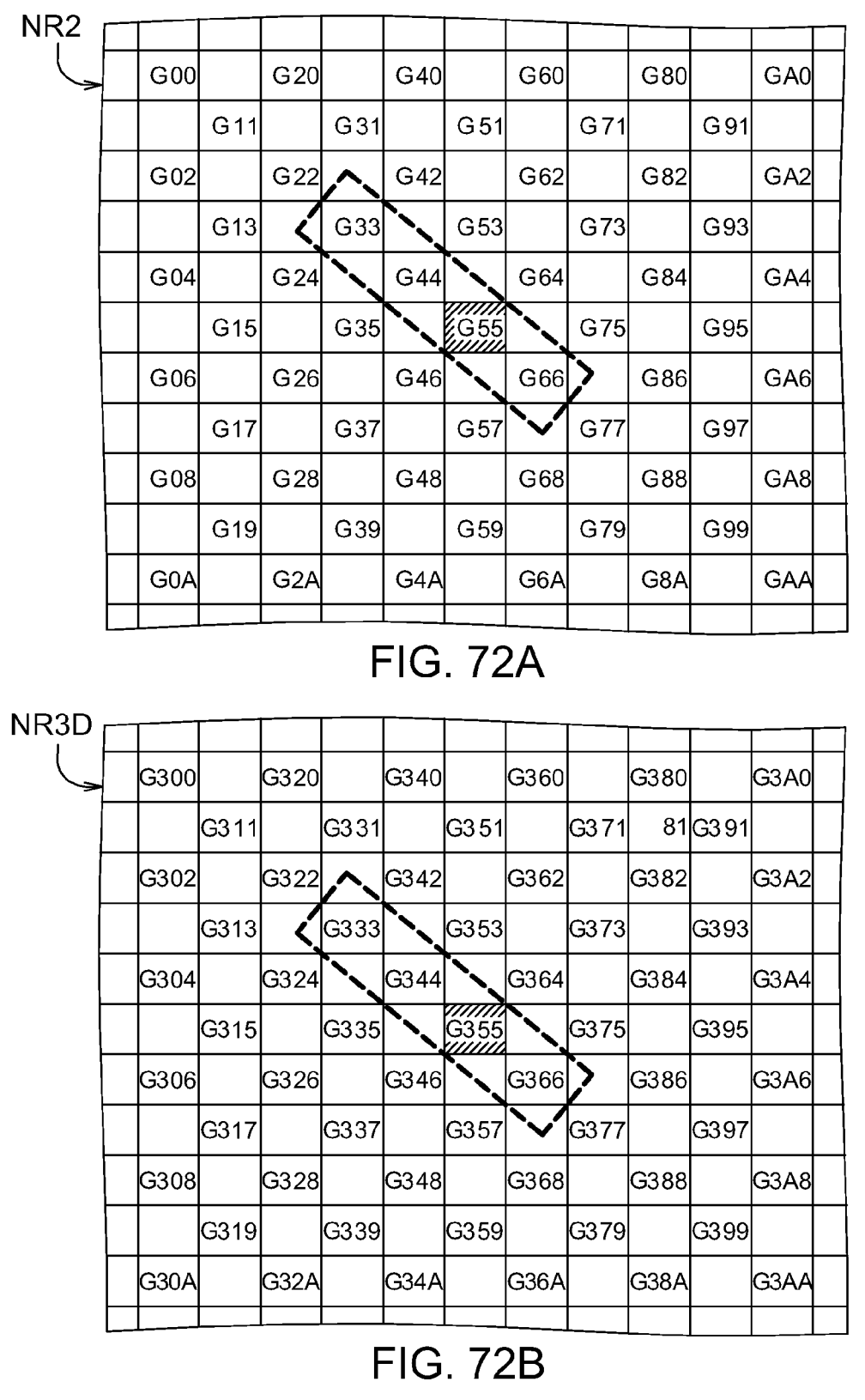
Figures 73A, 73B:
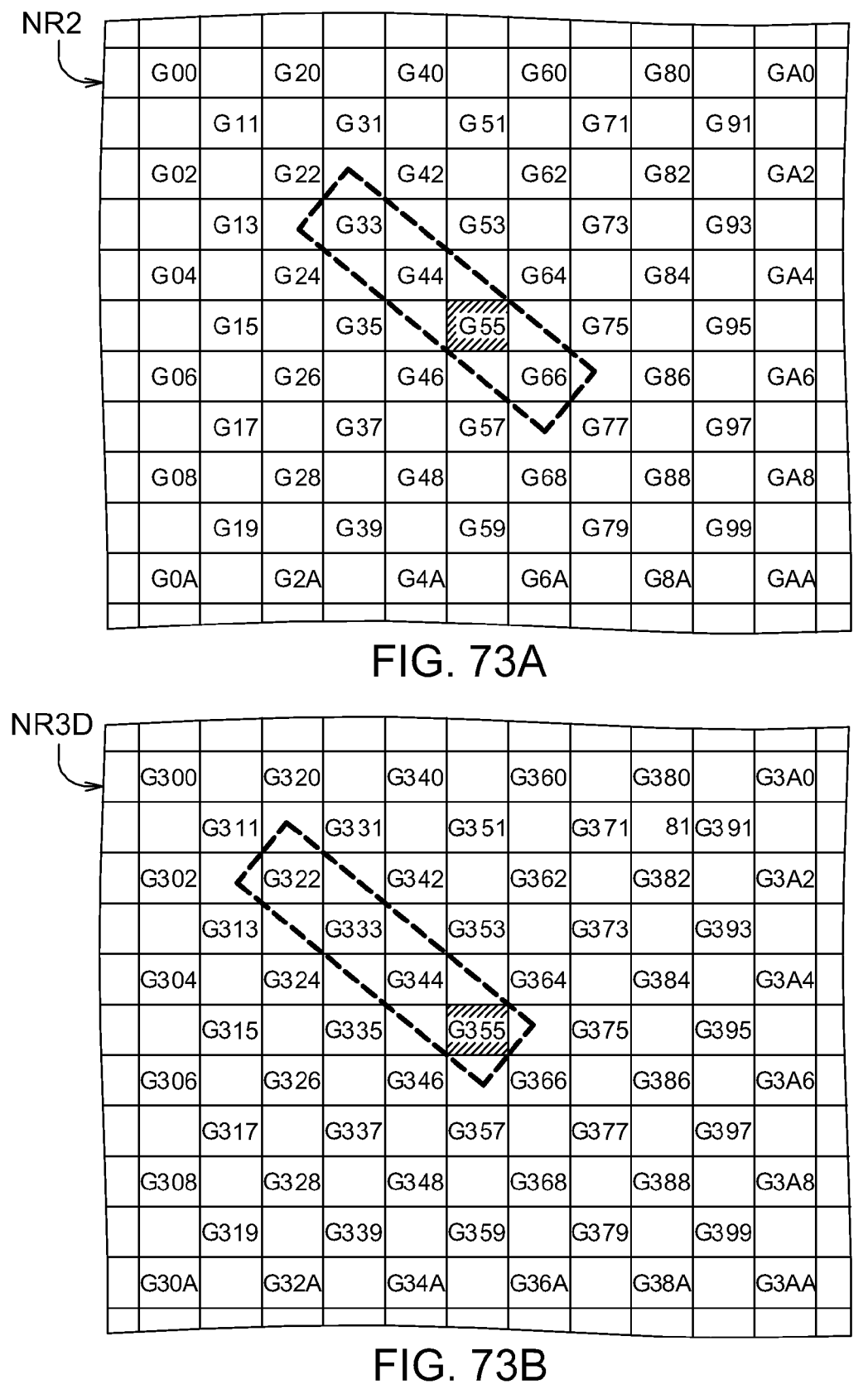
Figures 75A, 75B:
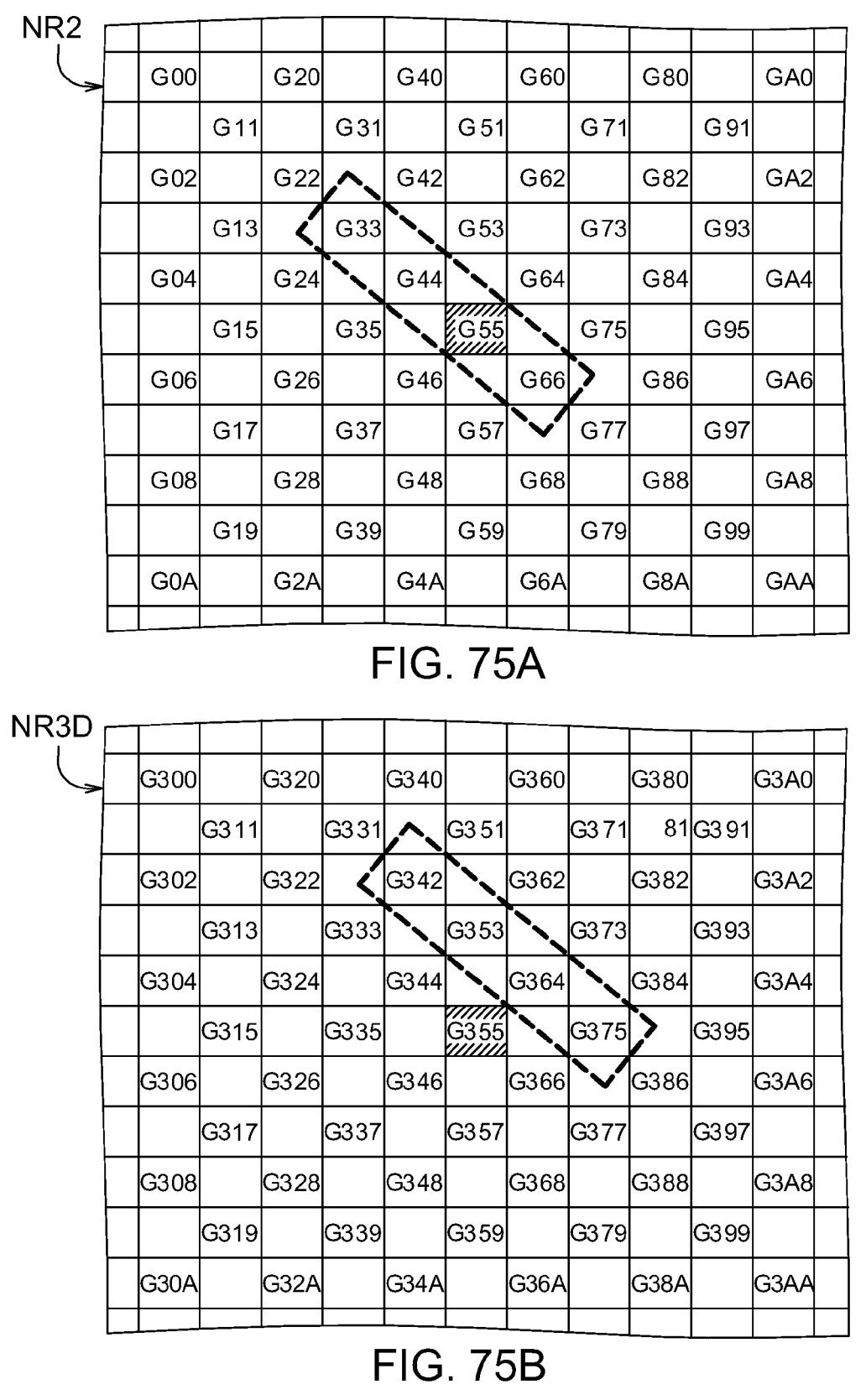

The backward reference addition pattern in FIG. 72B has the same pixel arrangement as the in-plane addition pattern in the frame image of interest (FIG. 72A). The pixel selector circuit 719 supplies pixel values G333, G344, G355, and G366 to difference calculation circuit 721. The backward reference addition pattern in FIG. 73B has a pixel arrangement shifted to the upper left from the pattern in the frame image of interest (FIG. 73A). The pixel selector circuit 719 supplies pixel values G322, G333, G344, and G355 to difference calculation circuit 722. The backward reference addition pattern in FIG. 74B has a pixel arrangement shifted to the lower right from the pattern in the frame image of interest (FIG. 74A). The pixel selector circuit 719 supplies pixel values G344, G355, G366, and G377 to difference calculation circuit 723. The backward reference addition pattern in FIG. 75B has a pixel arrangement shifted to the upper right from the pattern in the frame image of interest (FIG. 75A). The pixel selector circuit 719 supplies pixel values G342, G353, G364, and G375 to difference calculation circuit 724. The backward reference addition pattern in FIG. 76B has a pixel arrangement shifted to the lower left from the pattern in the frame image of interest (FIG. 76A). The pixel selector circuit 719 supplies pixel values G324, G335, G346, and G357 to difference calculation circuit 725.

If the lower right diagonal line pattern (G44, G55, G66, G77) including the pixel of interest and pixels to its upper left and lower right, which is the tenth in-plane addition pattern, is selected when the pixel of interest is a green pixel, similar combinations of the in-plane addition pattern with four-pixel addition patterns in the forward reference frame image and four-pixel addition patterns in the backward reference frame image are tested. These patterns are shifted in the same way as when the ninth in-plane addition pattern is selected.

Figures 80A, 80B:
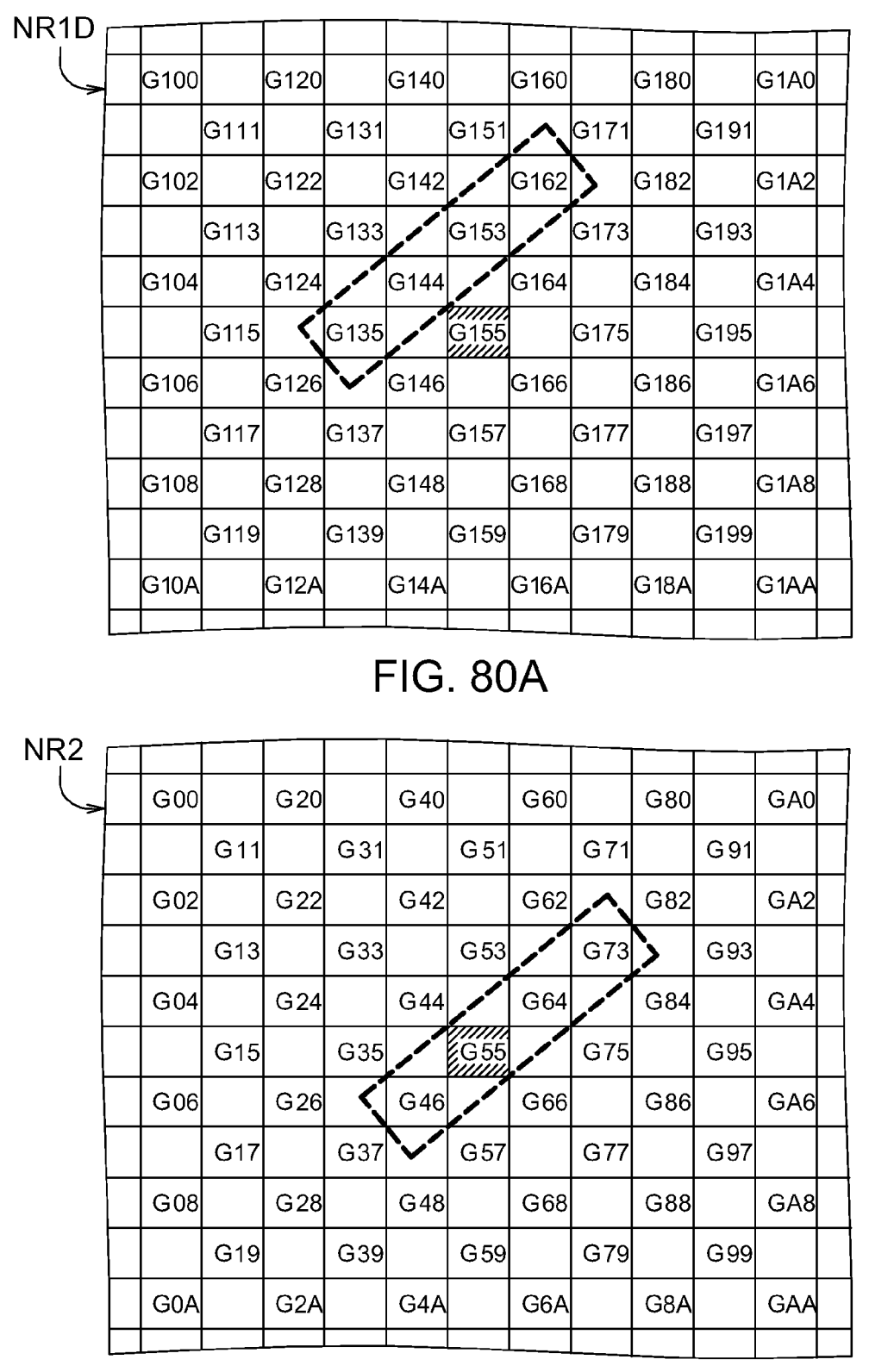
Figures 81A, 81B:
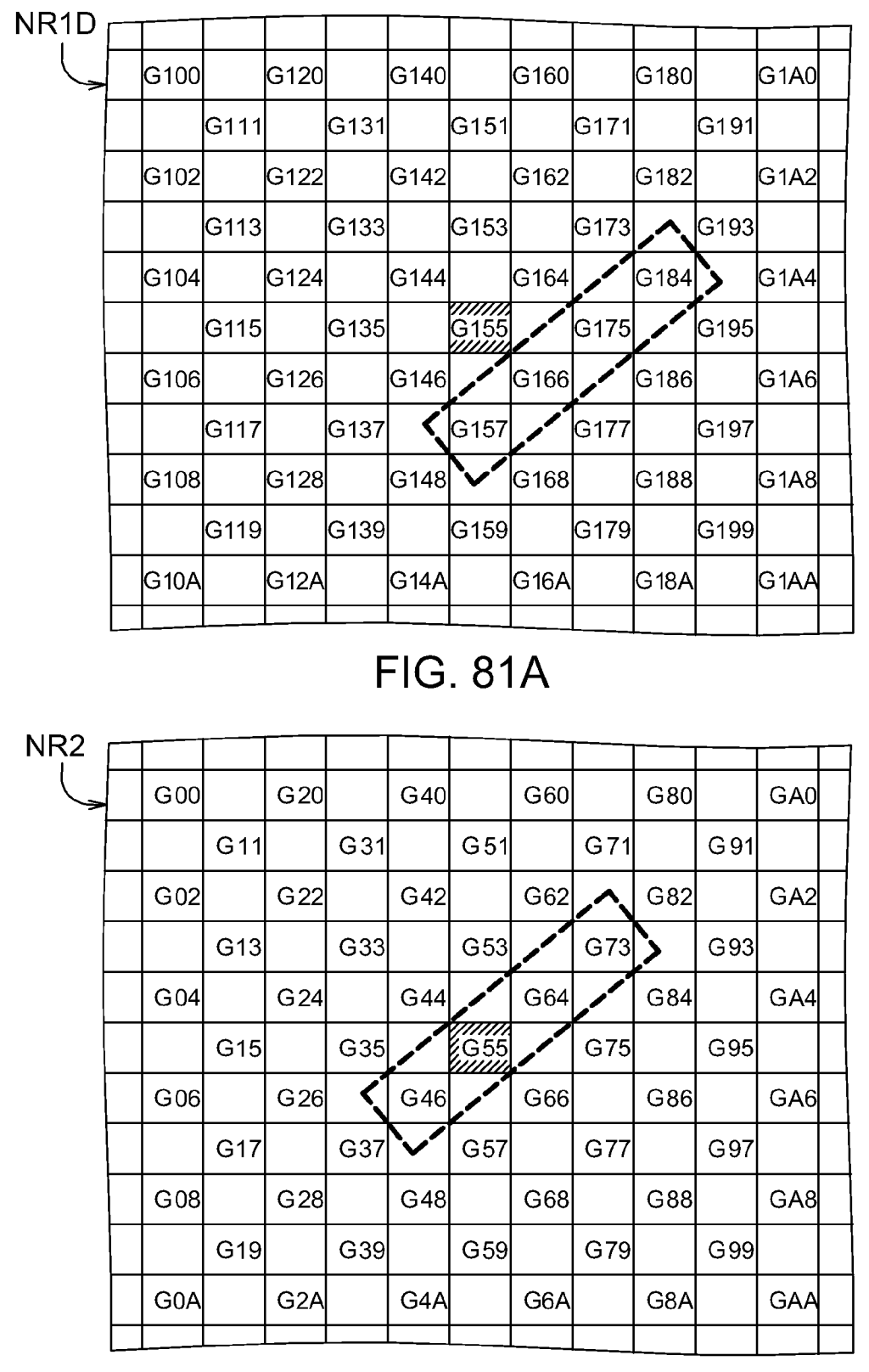

The forward reference addition pattern in FIG. 77A has the same pixel arrangement as the in-plane addition pattern in the frame image of interest, shown in FIG. 77B. The pixel selector circuit 719 supplies pixel values G146, G155, G164, and G173 to difference calculation circuit 721. The forward reference addition pattern in FIG. 78A has a pixel arrangement shifted to the upper right from the pattern in the frame image of interest (FIG. 78B). The pixel selector circuit 719 supplies pixel values G155, G164, G173, and G182 to difference calculation circuit 722. The forward reference addition pattern in FIG. 79A has a pixel arrangement shifted to the lower left from the pattern in the frame image of interest (FIG. 79B). The pixel selector circuit 719 supplies pixel values G137, G146, G155, and G164 to difference calculation circuit 723. The forward reference addition pattern in FIG. 80A has a pixel arrangement shifted to the upper left from the pattern in the frame image of interest (FIG. 80B). The pixel selector circuit 719 supplies pixel values G135, G144, G153, and G162 to difference calculation circuit 724. The forward reference addition pattern in FIG. 81A has a pixel arrangement shifted to the lower right from the pattern in the frame image of interest (FIG. 81B). The pixel selector circuit 719 supplies pixel values G157, G166, G175, and G184 to difference calculation circuit 725.

FIGS. 82A, 82B to 86A, 86B show the five backward reference addition patterns tested by the backward reference pattern detection circuit 72 when the pixel of interest is a green pixel and the eleventh in-plane addition pattern is selected. The eleventh in-plane addition pattern is the upper right diagonal line pattern including the pixel of interest and pixels to its upper right and lower left.

Figures 83A, 83B:
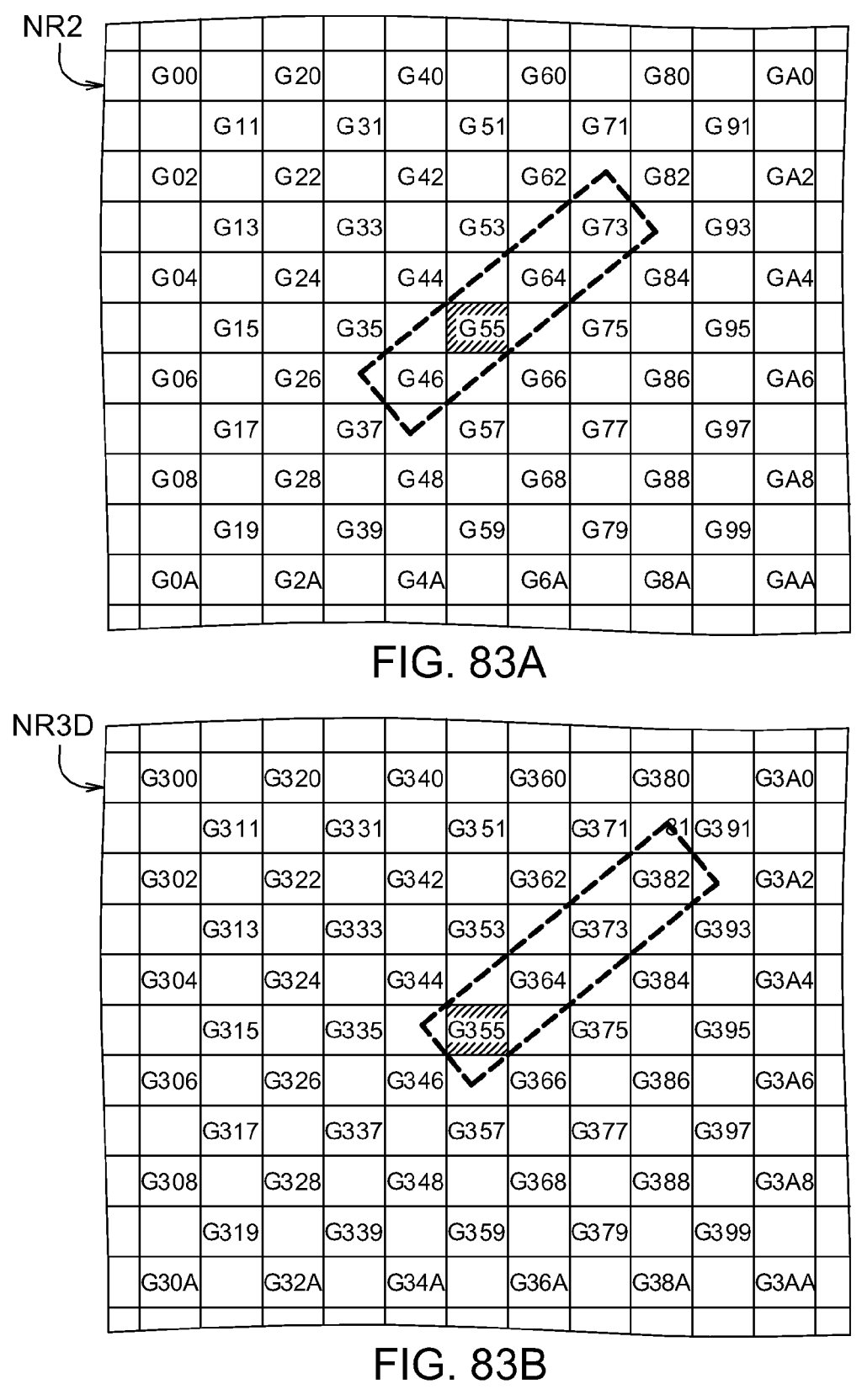
Figures 84A, 84B:
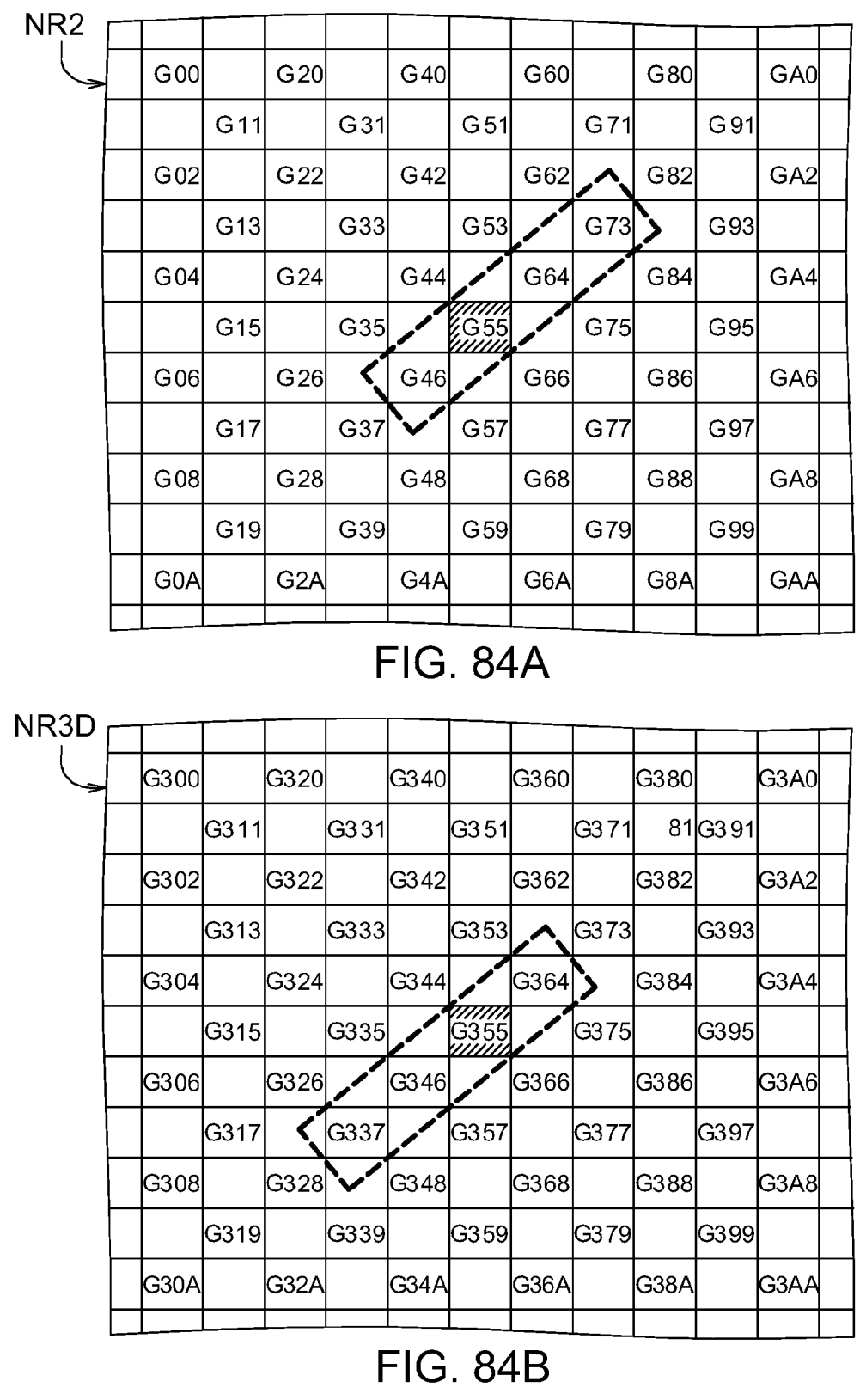
Figures 85A, 85B:
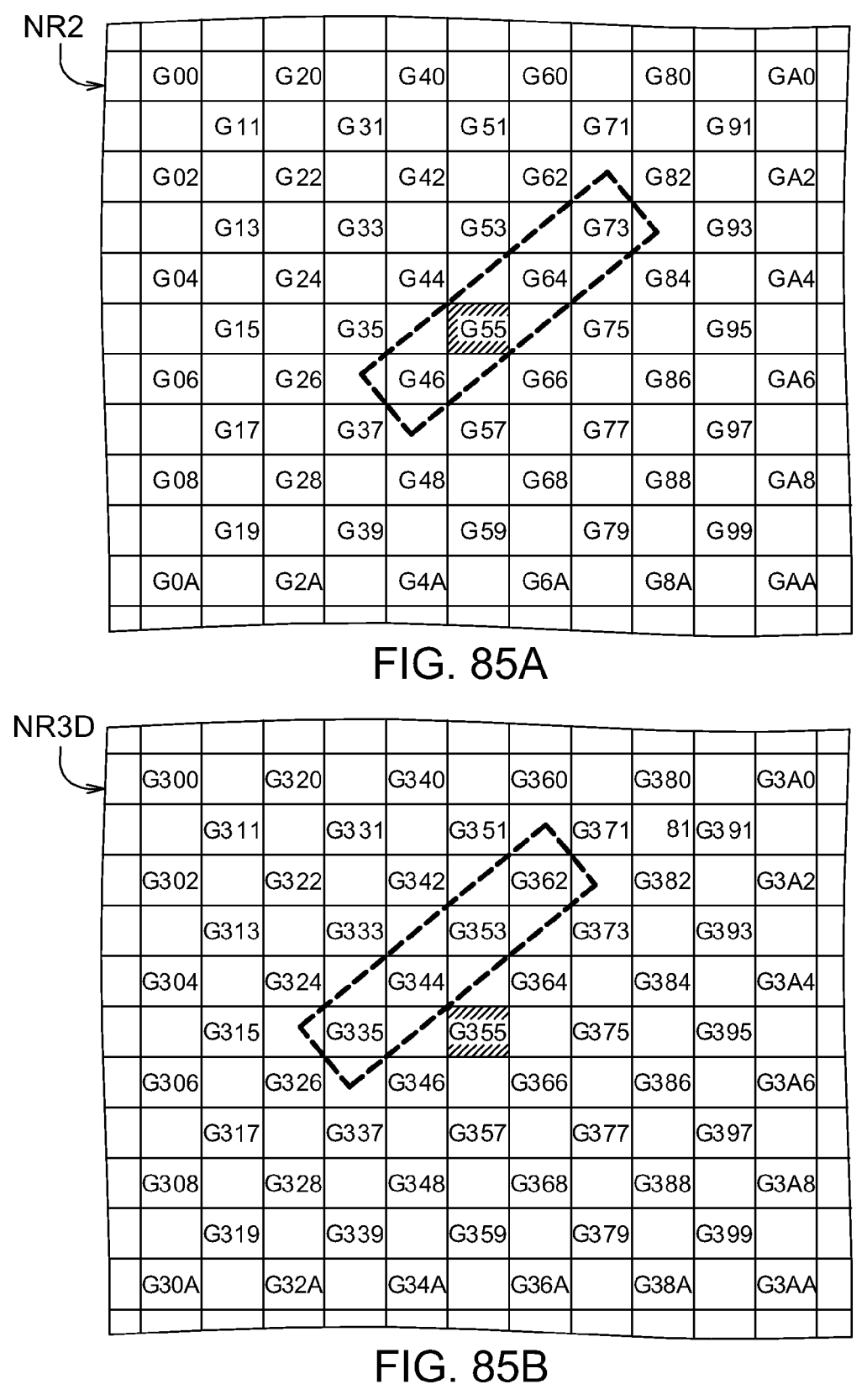
Figures 86A, 86B:
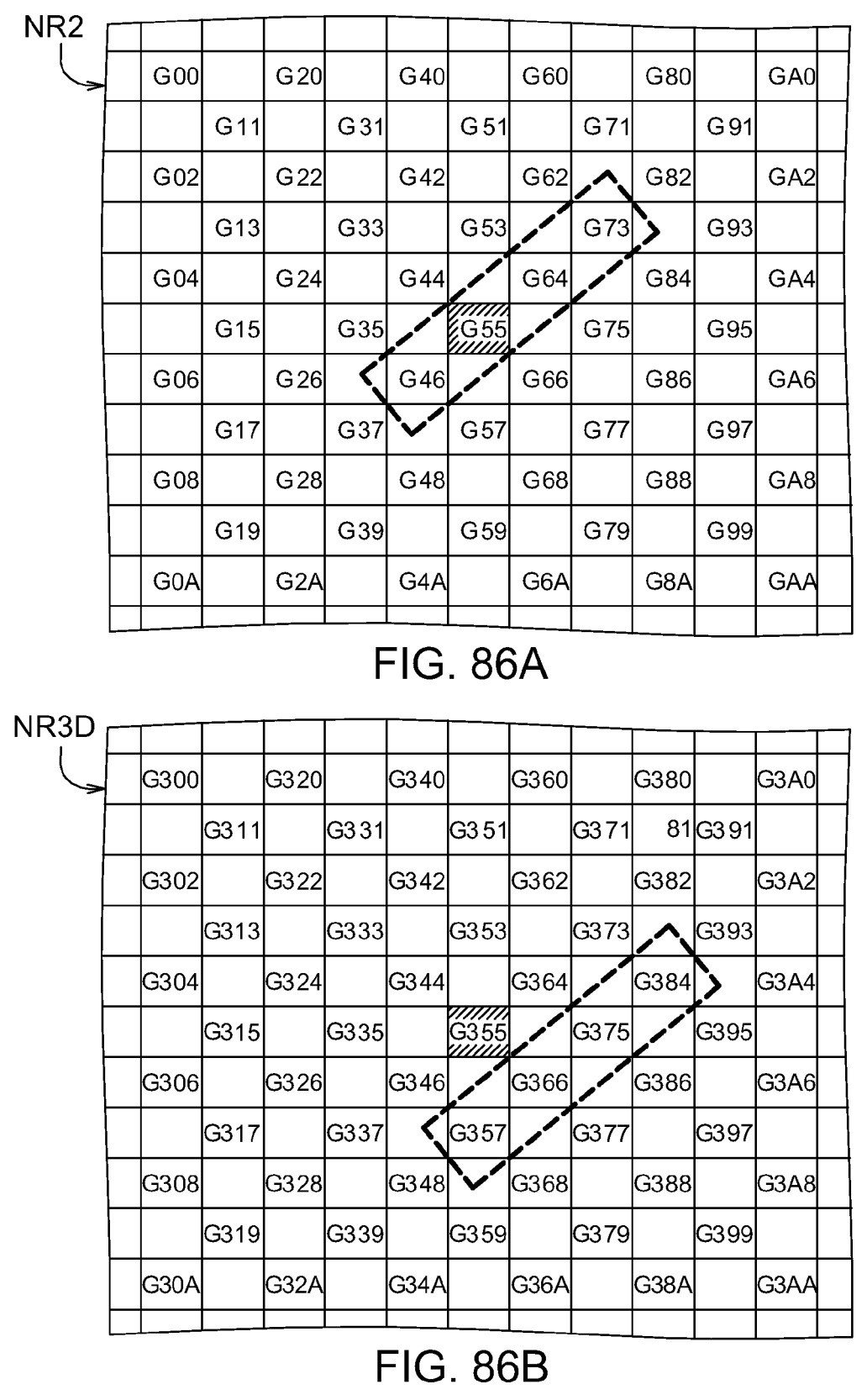

The backward reference addition pattern in FIG. 82B has the same pixel arrangement as the in-plane addition pattern in the frame image of interest (FIG. 82A). The pixel selector circuit 719 supplies pixel values G346, G355, G364, and G373 to difference calculation circuit 721. The backward reference addition pattern in FIG. 83B has a pixel arrangement shifted to the upper right from the pattern in the frame image of interest (FIG. 83A). The pixel selector circuit 719 supplies pixel values G355, G364, G373, and G382 to difference calculation circuit 722. The backward reference addition pattern in FIG. 84B has a pixel arrangement shifted to the lower left from the pattern in the frame image of interest (FIG. 84A). The pixel selector circuit 719 supplies pixel values G337, G346, G355, and G364 to difference calculation circuit 723. The backward reference addition pattern in FIG. 85B has a pixel arrangement shifted to the upper left from the pattern in the frame image of interest (FIG. 85A). The pixel selector circuit 719 supplies pixel values G335, G344, G353, and G362 to difference calculation circuit 724. The backward reference addition pattern in FIG. 86B has a pixel arrangement shifted to the lower right from the pattern in the frame image of interest (FIG. 86A). The pixel selector circuit 719 supplies pixel values G357, G366, G375, and G384 to difference calculation circuit 725.

If the lower left diagonal line pattern (G64, G55, G46, G37) including the pixel of interest and pixels to its upper right and lower left, which is the twelfth in-plane addition pattern, is selected when the pixel of interest is a green pixel, similar combinations of the in-plane addition pattern with four-pixel addition patterns in the forward reference frame image and four-pixel addition patterns in the backward reference frame image are tested. These patterns are shifted in the same way as when the eleventh in-plane addition pattern is selected.

FIGS. 87A and 87B to 96A to 96B show the in-plane addition pattern paired with four-pixel addition patterns in the forward reference frame image and four-pixel addition patterns in the backward reference frame image when the pixel of interest is a red pixel and the upper left block pattern, including the pixel of interest and neighboring pixels above it and to its left, is selected as the four-pixel in-plane addition pattern in the spatial arrangement in FIG. 14. FIGS. 87A and 87B to 96A to 96B show the in-plane addition pattern in the frame image of interest in the filter signal NR2, addition patterns (forward reference pixel patterns) in the forward adjacent frame image in frame delayed signal NR1D, and addition patterns (backward reference pixel patterns) in the backward adjacent frame image in frame delayed signal NR3D. The forward reference pattern detection circuit 71 and backward reference pattern detection circuit 72 respectively identify a most highly correlated addition pattern among five addition patterns in the relevant adjacent frame image as the reference pixel addition pattern corresponding to the in-plane addition pattern identified by the in-plane pattern detection circuit 50.

FIGS. 87A, 87B to 91A, 91B show the five forward reference addition patterns tested by the forward reference pattern detection circuit 71 when the pixel of interest is a red pixel and when the first in-plane addition pattern is selected. The first in-plane addition pattern is the upper left block pattern, including the pixel of interest and neighboring pixels above it and to its left.

Figure 88A:
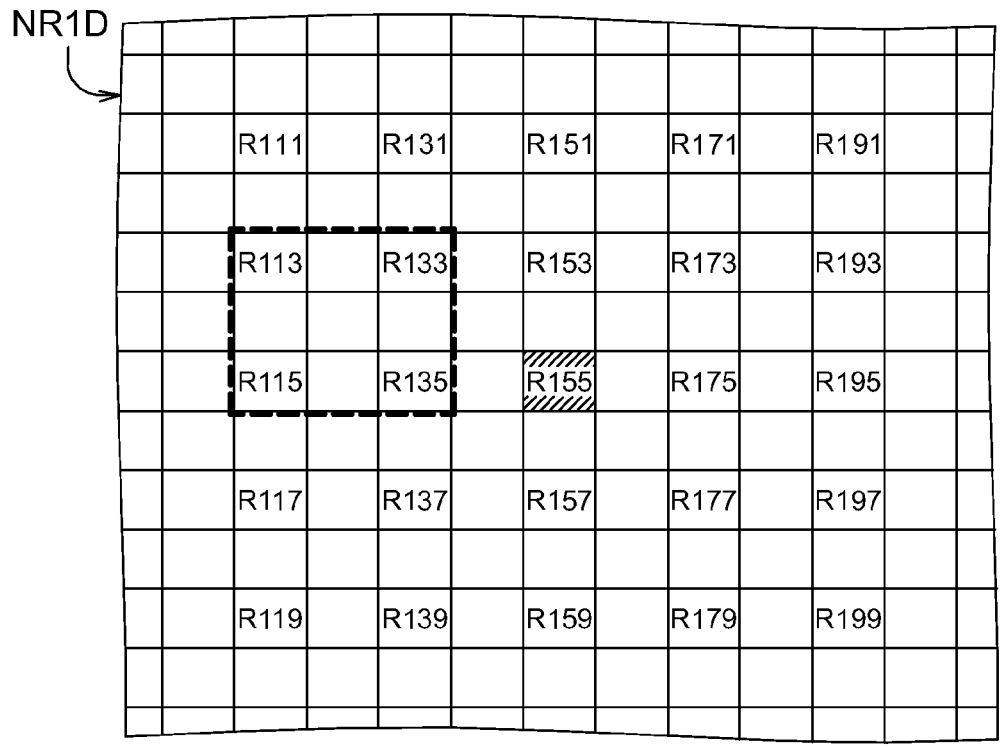
FIGS. 88A and 88B show another exemplary combination of the in-plane addition pattern and a forward reference addition pattern when the pixel of interest is a red pixel in the frame of interest.
Figure 88B:
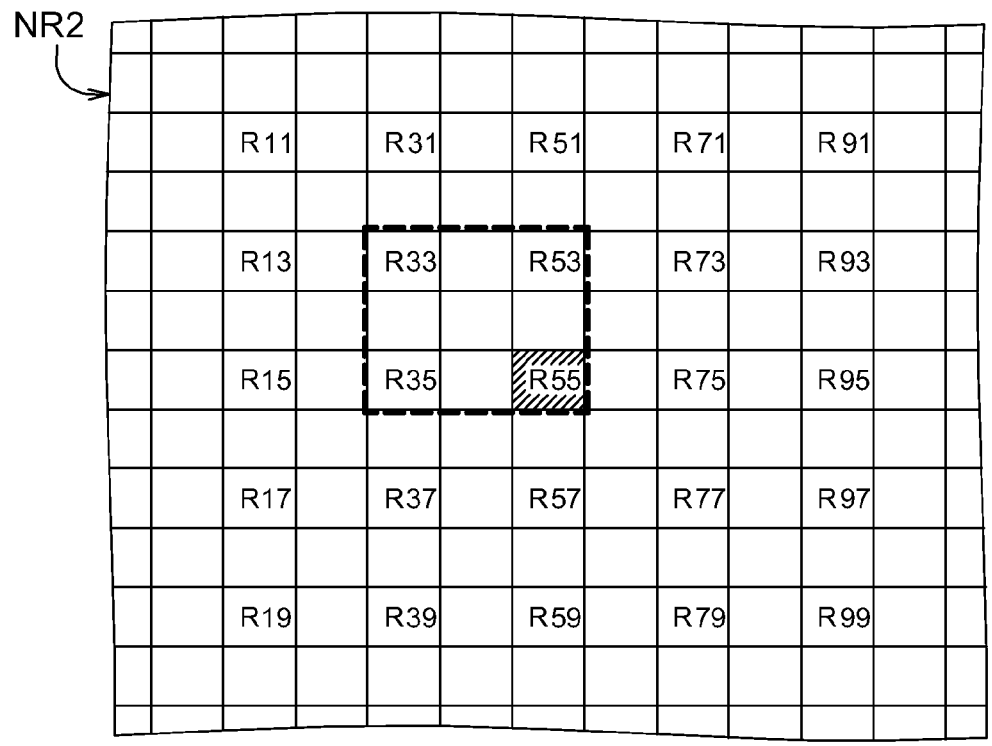
Figures 89A, 89B:
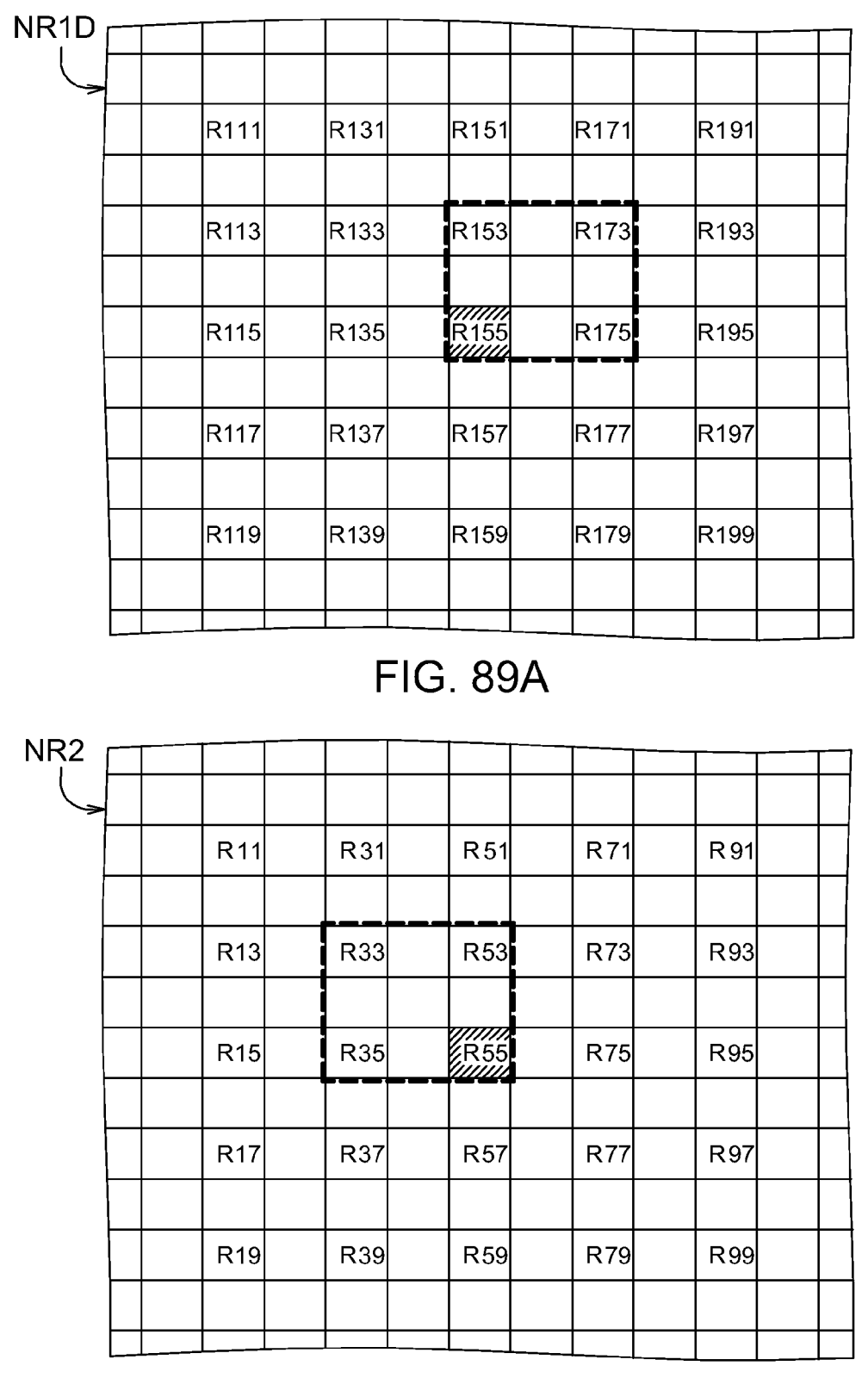
Figure 90A:
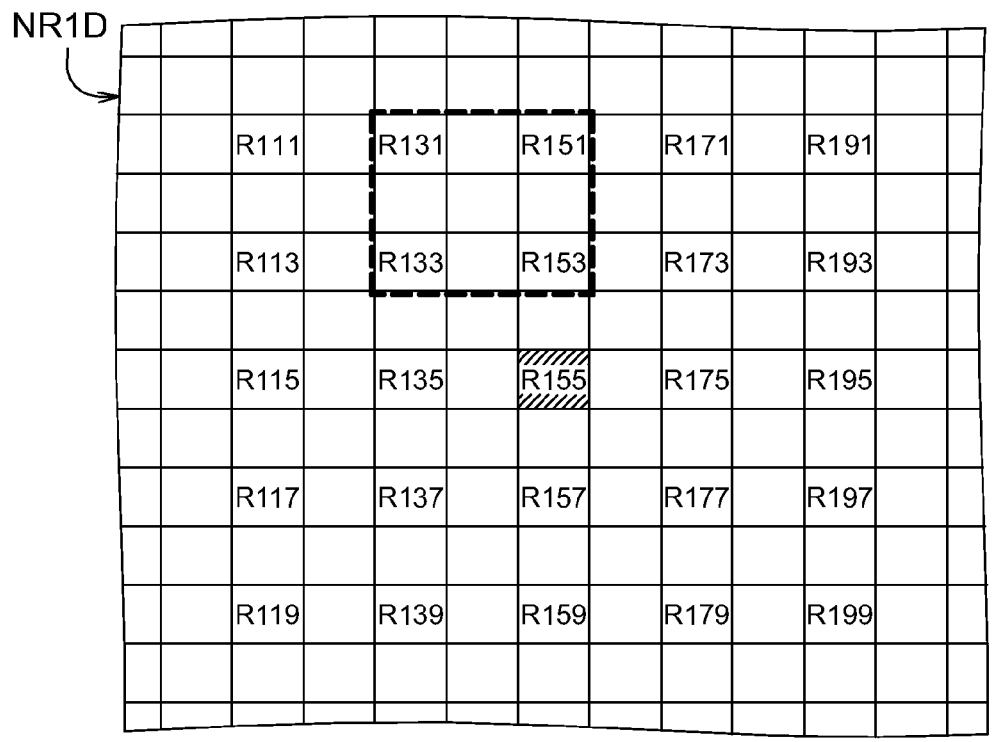
FIGS. 90A and 90B show another exemplary combination of the in-plane addition pattern and a forward reference addition pattern when the pixel of interest is a red pixel in the frame of interest.
Figure 90B:
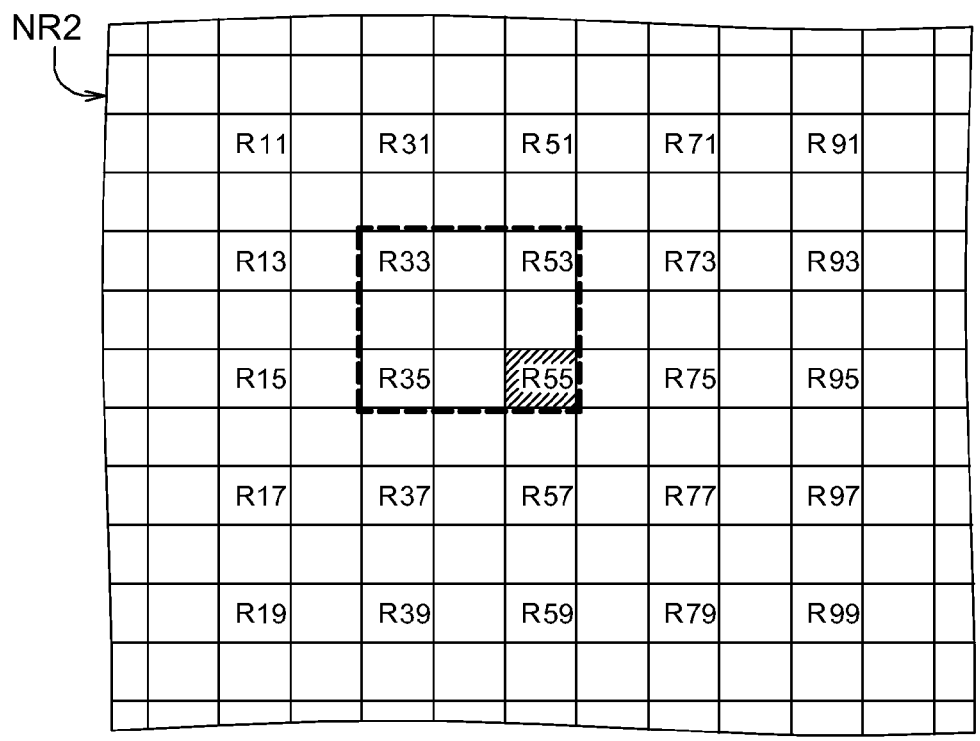
Figures 91A, 91B:
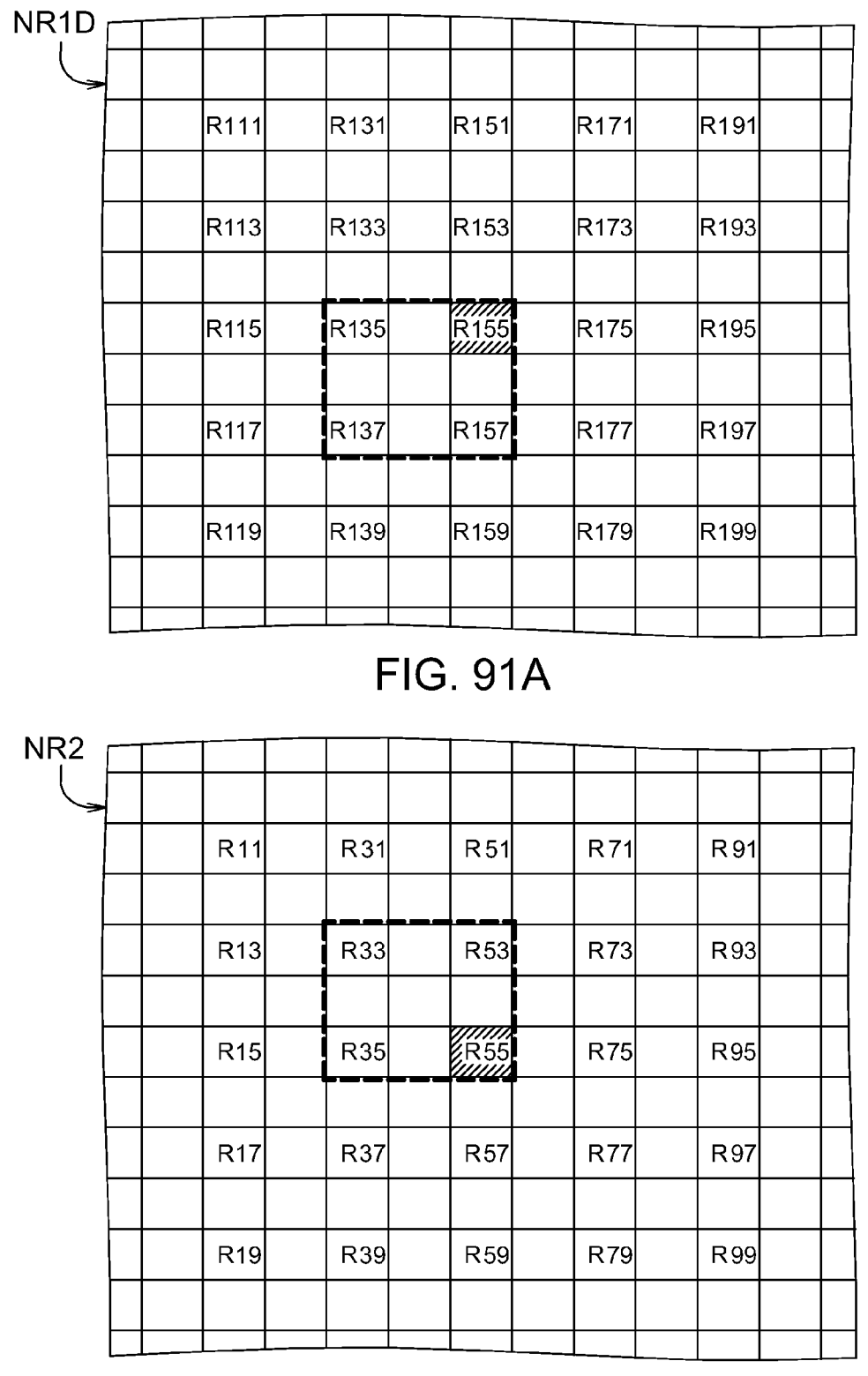

The forward reference addition pattern in FIG. 87A has the same pixel arrangement as the in-plane addition pattern in the frame image of interest, shown in FIG. 87B. The pixel selector circuit 719 supplies pixel values R133, R153, R135, and R155 to difference calculation circuit 721. The forward reference addition pattern in FIG. 88A has a pixel arrangement shifted to the left from the pattern in the frame image of interest (FIG. 88B). The pixel selector circuit 719 supplies pixel values R113, R133, R115, and R135 to difference calculation circuit 722. The forward reference addition pattern in FIG. 89A has a pixel arrangement shifted to the right from the pattern in the frame image of interest (FIG. 89B). The pixel selector circuit 719 supplies pixel values R153, R173, R155, and R175 to difference calculation circuit 723. The forward reference addition pattern in FIG. 90A has a pixel arrangement shifted upward from the pattern in the frame image of interest (FIG. 90B). The pixel selector circuit 719 supplies pixel values R131, R151, R133, and R153 to difference calculation circuit 724. The forward reference addition pattern in FIG. 91A has a pixel arrangement shifted downward from the pattern in the frame image of interest (FIG. 91B). The pixel selector circuit 719 supplies pixel values R135, R155, R137, and R157 to difference calculation circuit 725.

FIGS. 92A, 92B to 96A, 96B show the five backward reference addition patterns tested by the backward reference pattern detection circuit 72 when the pixel of interest is a red pixel and when the first in-plane addition pattern is selected. The first in-plane addition pattern is the upper left block pattern including the pixel of interest and pixels above it and to its left.

Figure 92A:
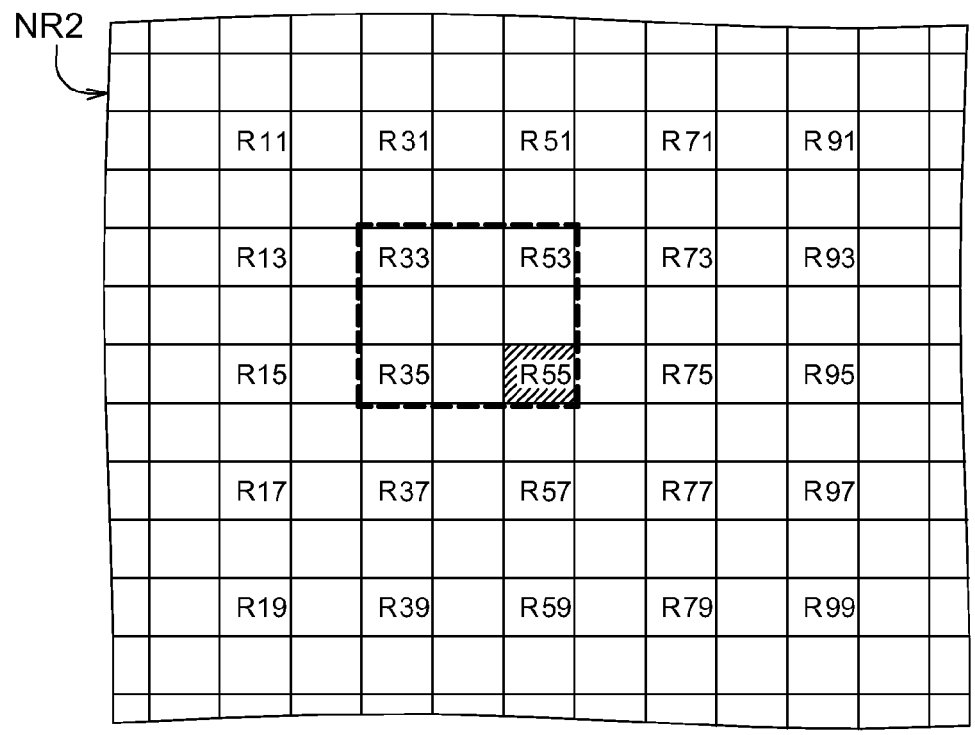
FIGS. 92A and 92B show an exemplary combination of the in-plane addition pattern and a backward reference addition pattern when the pixel of interest is a red pixel in the frame of interest.
Figure 92B:
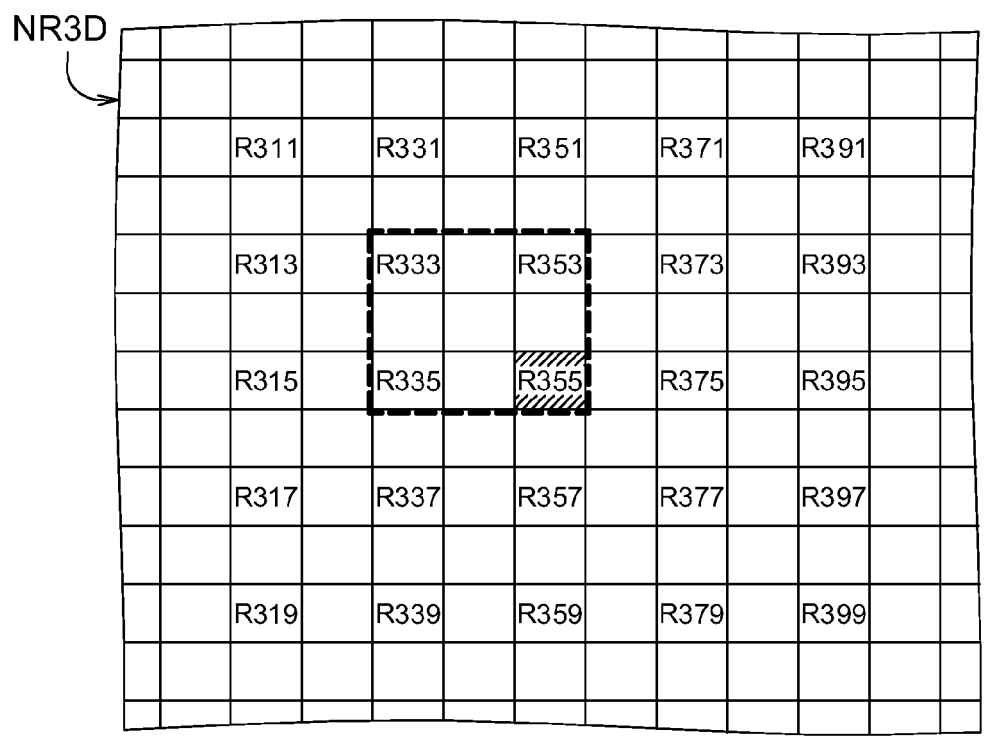
Figure 93A:
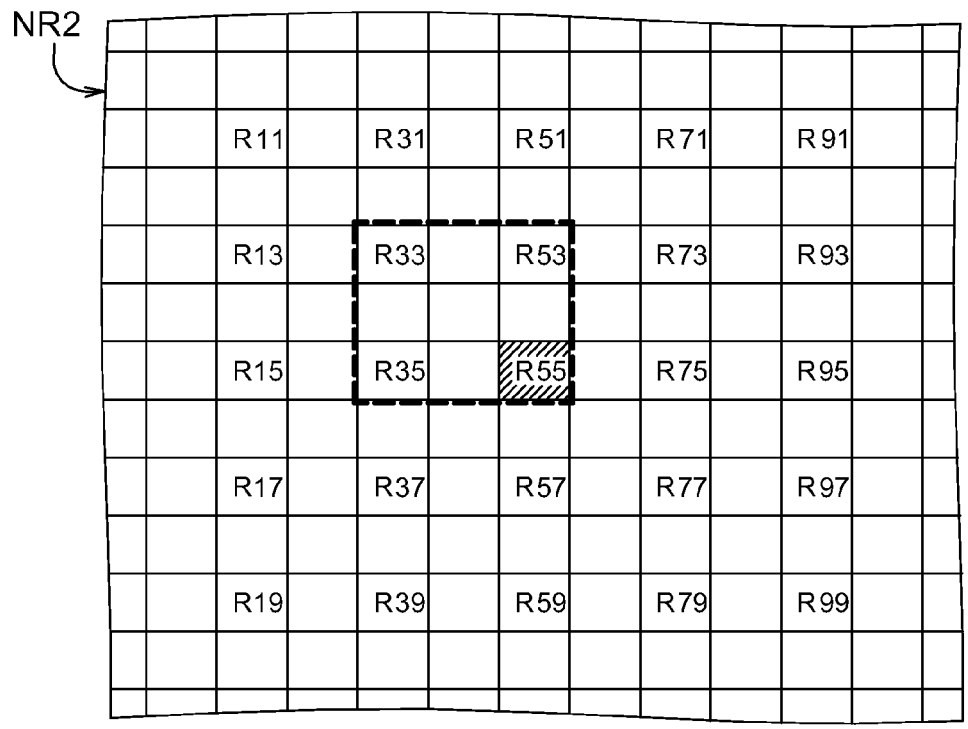
FIGS. 93A and 93B show another exemplary combination of the in-plane addition pattern and a backward reference addition pattern when the pixel of interest is a red pixel in the frame of interest.
Figure 93B:
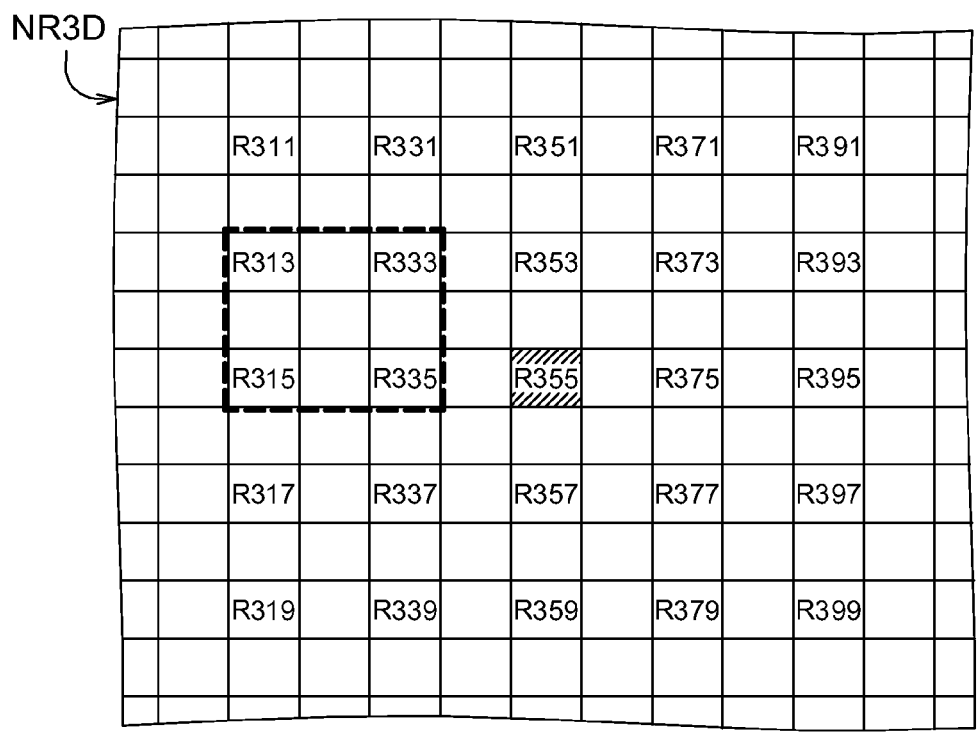
Figure 94A:
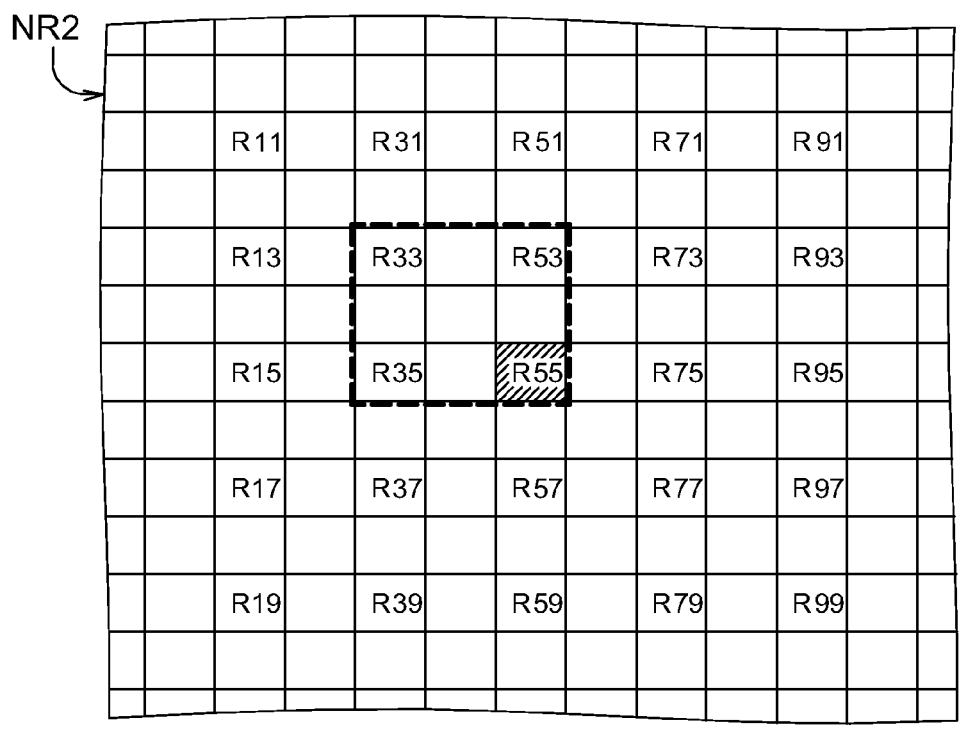
FIGS. 94A and 94B show another exemplary combination of the in-plane addition pattern and a backward reference addition pattern when the pixel of interest is a red pixel in the frame of interest.
Figure 94B:
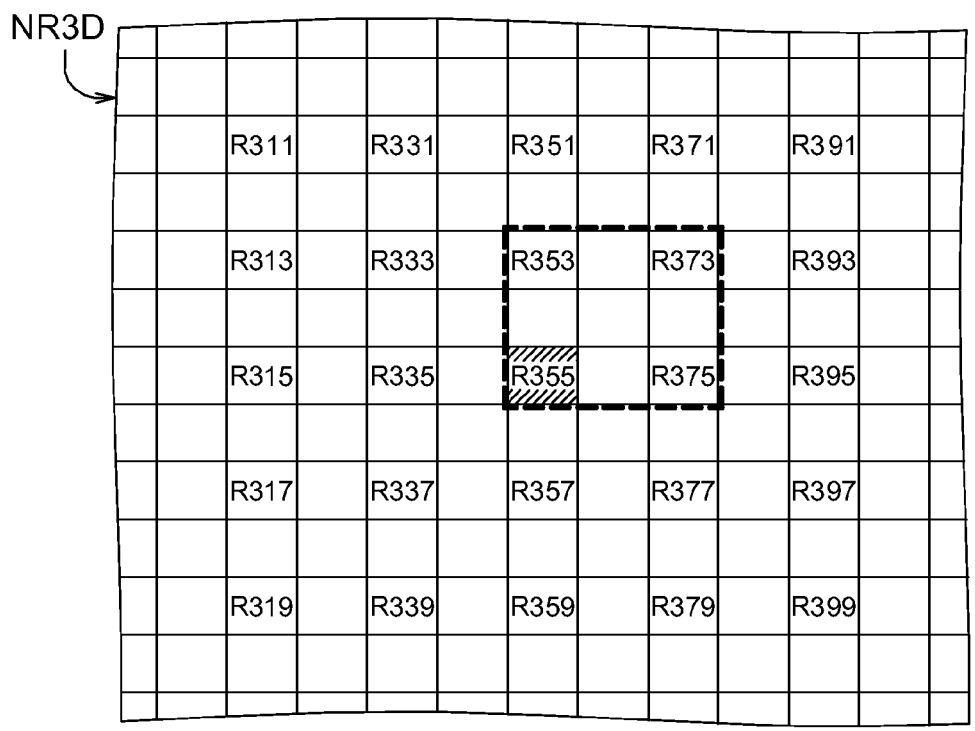
Figure 95A:
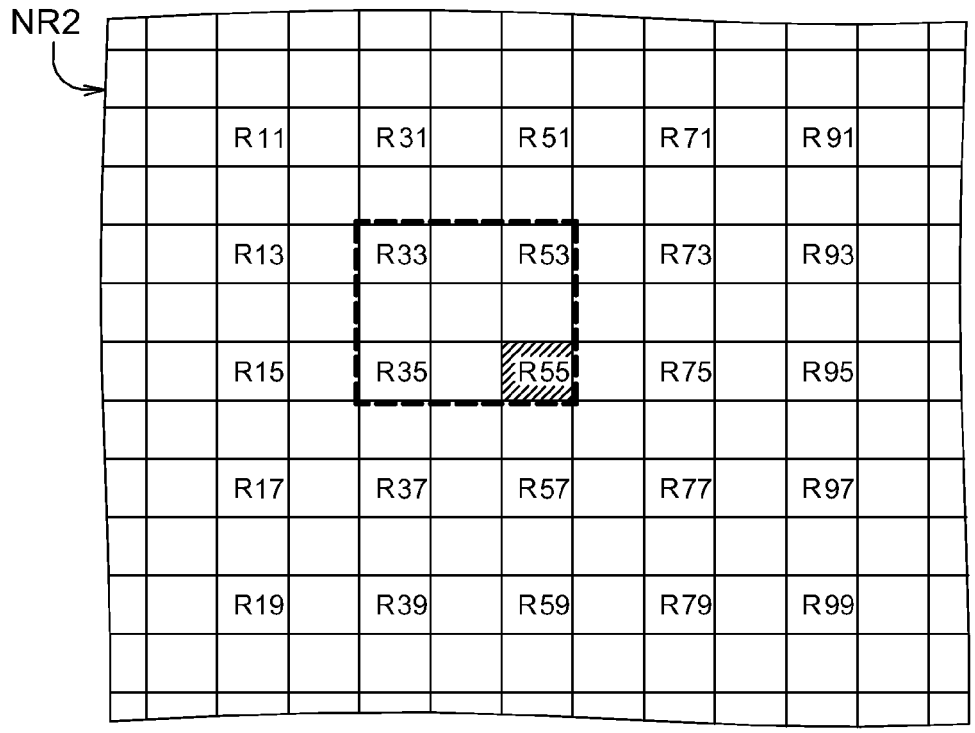
FIGS. 95A and 95B show another exemplary combination of the in-plane addition pattern and a backward reference addition pattern when the pixel of interest is a red pixel in the frame of interest.
Figure 95B:
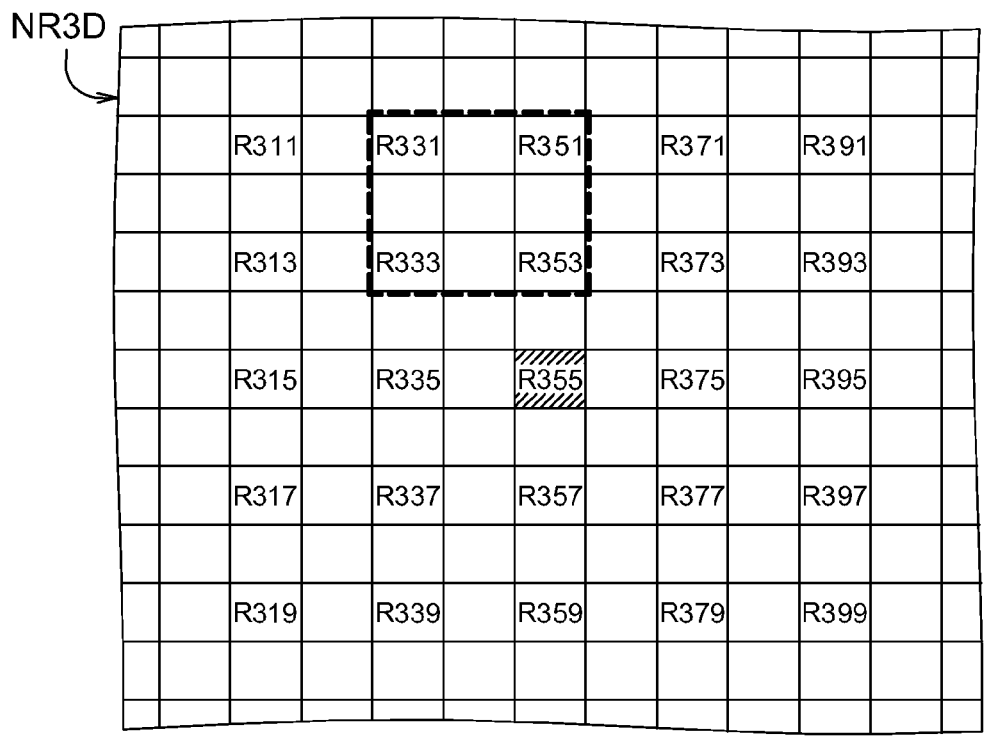
Figure 96A:
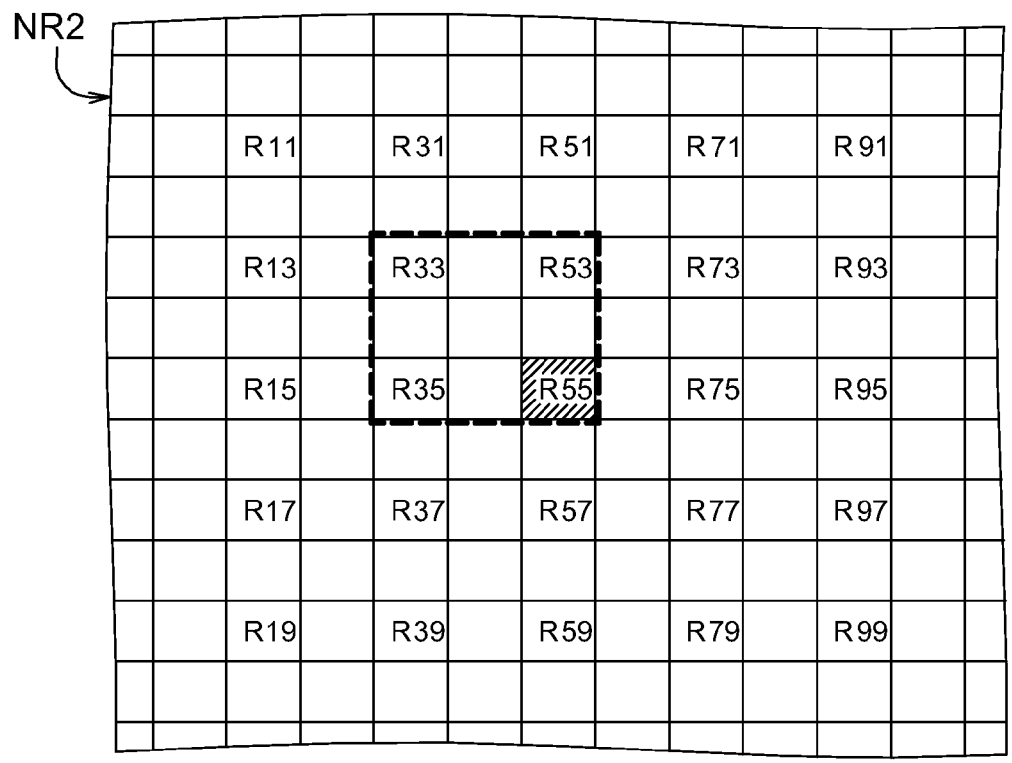
FIGS. 96A and 96B show another exemplary combination of the in-plane addition pattern and a backward reference addition pattern when the pixel of interest is a red pixel in the frame of interest.
Figure 96B:
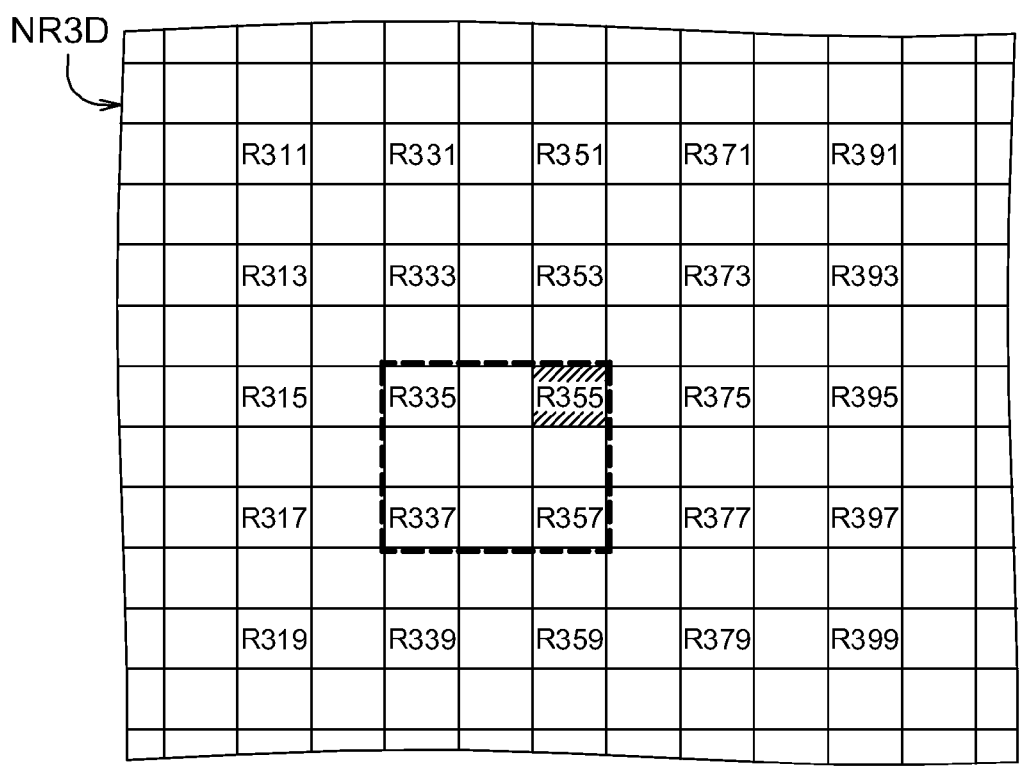

The backward reference addition pattern in FIG. 92B has the same pixel arrangement as the in-plane addition pattern in the frame image of interest (FIG. 92A). The pixel selector circuit 719 supplies pixel values R333, R353, R335, and R355 to difference calculation circuit 721. The backward reference addition pattern in FIG. 93B has a pixel arrangement shifted to the left from the pattern in the frame image of interest (FIG. 93A). The pixel selector circuit 719 supplies pixel values R313, R333, R315, and R335 to difference calculation circuit 722. The backward reference addition pattern in FIG. 94B has a pixel arrangement shifted to the right from the pattern in the frame image of interest (FIG. 94A). The pixel selector circuit 719 supplies pixel values R353, G373, R355, and R375 to difference calculation circuit 723. The backward reference addition pattern in FIG. 95B has a pixel arrangement shifted upward from the pattern in the frame image of interest (FIG. 95A). The pixel selector circuit 719 supplies pixel values R331, R351, R333, and R353 to difference calculation circuit 724. The backward reference addition pattern in FIG. 96B has a pixel arrangement shifted downward from the pattern in the frame image of interest (FIG. 96A). The pixel selector circuit 719 supplies pixel values R335, R355, R337, and R357 to difference calculation circuit 725.

If the upper right block pattern (R53, R73, R55, R75) including the pixel of interest and pixels above it and to its right, which is the second in-plane addition pattern, is selected when the pixel of interest is a red pixel, similar combinations of the in-plane addition pattern with four-pixel addition patterns in the forward reference frame image and four-pixel addition patterns in the backward reference frame image are tested. These patterns are shifted in the same way as when the first in-plane addition pattern is selected.

If the lower right block pattern (R55, R75, R57, R77) including the pixel of interest and pixels to its below it and to its right, which is the third in-plane addition pattern, is selected when the pixel of interest is a red pixel, similar combinations of the in-plane addition pattern with four-pixel addition patterns in the forward reference frame image and four-pixel addition patterns in the backward reference frame image are tested. These patterns are also shifted in the same way as when the first in-plane addition pattern is selected.

If the lower left block pattern (R35, R55, R37, R57) including the pixel of interest and pixels below it and to its left, which is the fourth in-plane addition pattern, is selected when the pixel of interest is a red pixel, similar combinations of the in-plane addition pattern with four-pixel addition patterns in the forward reference frame image and four-pixel addition patterns in the backward reference frame image are tested. These patterns are also shifted in the same way as when the first in-plane addition pattern is selected.

When the pixel of interest is a blue pixel in the spatial arrangement in FIG. 14, the same combinations of the in-plane addition pattern with four-pixel addition patterns in the forward reference frame image and four-pixel addition patterns in the backward reference frame image are tested as when the pixel of interest is a red pixel. The forward reference pattern detection circuit 71 and backward reference pattern detection circuit 72 respectively identify a most highly correlated addition pattern among five addition patterns in the relevant adjacent frame image as the reference pixel addition pattern corresponding to the in-plane addition pattern identified by the in-plane pattern detection circuit 50.

The in-plane pattern detection circuit 50 supplies the maximum pixel value MAX and minimum pixel value MIN in the addition pattern detected as being most highly correlated by the in-plane pattern detection circuit 50 via the maximum pixel value input terminal 712 and minimum pixel value input terminal 713 in FIG. 9 to the difference calculation circuits 721 to 725 in FIG. 12. Each of the difference calculation circuits 721 to 725 compares the pixel values in one of the four-pixel groups K1 to K5 input from the pixel selector circuit 719 in FIG. 9 with each other and with the maximum pixel value MAX and minimum pixel value MIN input from the in-plane pattern detection circuit 50 and finds the maximum pixel value and the minimum pixel value among these six pixel values. Each of the difference calculation circuits 721 to 725 then takes the difference between the maximum pixel value and the minimum pixel value it finds and supplies this difference value as addition pattern difference information (an inter-plane correlation index value) to the minimum value calculation circuit 740.

The minimum value calculation circuit 740 compares the five difference values input from the difference calculation circuits 721 to 725 with one another, finds the addition pattern with the minimum difference, and sends information reporting this addition pattern to the pixel designation circuit 750. The pixel designation circuit 750 supplies the pixel positions of the pixels constituting the addition pattern reported by the minimum value calculation circuit 740 from the output terminal 760 in FIG. 9 to the pixel adder 20 in FIG. 2. From the forward reference pattern detection circuit 71, this output is supplied to selector circuit 21; from the backward reference pattern detection circuit 72, this output is supplied to selector circuit 23.

When the pixel of interest is a green pixel, each of the twelve addition patterns examined by the in-plane pattern detection circuit 50 can be combined with five addition patterns in each adjacent frame image. When the pixel of interest is a red pixel or a blue pixel, each of the four addition patterns examined by the in-plane pattern detection circuit 50 can likewise be combined with five addition patterns in each adjacent frame image. This flexibility allows pixels highly correlated with the pixel of interest to be correctly selected for use in pixel addition, reducing the loss of resolution in the pixel addition process.

Next, the operation of a generic selector circuit 2x representing any of selector circuits 21, 22, and 23 will be described with reference to FIG. 13. This selector circuit 2x includes a delay circuit 270 that samples pixels in the pixel region shown in FIG. 14, measuring eleven pixels horizontally and eleven pixels vertically and centered on the pixel of interest P55 and outputs their values in parallel. The operation at the timing at which pixel value PAA in FIG. 14 is applied to input terminal 200 in FIG. 13 will now be described. The pixel value PAA output from the analog-to-digital converter 13A in FIG. 1 is applied via the input terminal INa of the pixel adding circuit 14 in FIG. 2 through delay circuit 36 to the input terminal 200 of selector circuit 23, through one-frame delay circuit 31 and delay circuit 35 to the input terminal 200 of selector circuit 22, and through one-frame delay circuit 31, one-frame delay circuit 32 and delay circuit 34 to the input terminal 200 of selector circuit 21.

Referring again to FIG. 13, the pixel value PAA applied to the input terminal 200 is supplied to a one-line delay circuit 201, one-pixel delay circuit 2700, and pixel selector circuit 220. One-pixel delay circuit 2700 outputs a pixel value P9A delayed by one pixel. Pixel value P9A is supplied to a one-pixel delay circuit 2701 and the pixel selector circuit 220. One-pixel delay circuit 2701 outputs a pixel value P8A delayed by one more pixel. Pixel value P8A is supplied to a one-pixel delay circuit 2702 (not shown) and the pixel selector circuit 220. One-pixel delay circuit 2702 outputs a pixel value P7A delayed by one more pixel. Pixel value P7A is supplied to a one-pixel delay circuit 2703 (not shown) and the pixel selector circuit 220. One-pixel delay circuit 2702 outputs a pixel value P6A delayed by one more pixel. Pixel value P6A is supplied to a one-pixel delay circuit 2704 (not shown) and the pixel selector circuit 220. One-pixel delay circuit 2704 outputs a pixel value P5A delayed by one more pixel. Pixel value P5A is supplied to a one-pixel delay circuit 2705 (not shown) and the pixel selector circuit 220. One-pixel delay circuit 2705 outputs a pixel value P4A delayed by one more pixel. Pixel value P4A is supplied to a one-pixel delay circuit 2706 (not shown) and the pixel selector circuit 220. One-pixel delay circuit 2706 outputs a pixel value P3A delayed by one more pixel. Pixel value P3A is supplied to a one-pixel delay circuit 2707 (not shown) and the pixel selector circuit 220. One-pixel delay circuit 2707 outputs a pixel value P2A delayed by one more pixel. Pixel value P2A is supplied to a one-pixel delay circuit 2708 (not shown) and the pixel selector circuit 220. One-pixel delay circuit 2708 outputs a pixel value P1A delayed by one more pixel. Pixel value P1A is supplied to a one-pixel delay circuit 2709 and the pixel selector circuit 220. One-pixel delay circuit 2709 outputs a pixel value P0A delayed by one more pixel. Pixel value P0A is supplied to the pixel selector circuit 220.

One-line delay circuit 201 outputs a pixel value PA9. Pixel value PA9 is supplied to a one-line delay circuit 202, a one-pixel delay circuit 2710, and the pixel selector circuit 220. One-pixel delay circuit 2710 outputs a pixel value P99 delayed by one pixel. Pixel value P99 is supplied to a one-pixel delay circuit 2711 and the pixel selector circuit 220. One-pixel delay circuit 2711 outputs a pixel value P89 delayed by one more pixel. Pixel value P89 is supplied to a one-pixel delay circuit 2712 (not shown) and the pixel selector circuit 220. One-pixel delay circuit 2712 outputs a pixel value P79 delayed by one more pixel. Pixel value P79 is supplied to a one-pixel delay circuit 2713 (not shown) and the pixel selector circuit 220. One-pixel delay circuit 2713 outputs a pixel value P69 delayed by one more pixel. Pixel value P69 is supplied to a one-pixel delay circuit 2714 (not shown) and the pixel selector circuit 220. One-pixel delay circuit 2714 outputs a pixel value P59 delayed by one more pixel. Pixel value P59 is supplied to a one-pixel delay circuit 2715 (not shown) and the pixel selector circuit 220. One-pixel delay circuit 2715 outputs a pixel value P49 delayed by one more pixel. Pixel value P49 is supplied to a one-pixel delay circuit 2716 (not shown) and the pixel selector circuit 220. One-pixel delay circuit 2716 outputs a pixel value P39 delayed by one more pixel. Pixel value P39 is supplied to a one-pixel delay circuit 2717 (not shown) and the pixel selector circuit 220. One-pixel delay circuit 2717 outputs a pixel value P29 delayed by one more pixel. Pixel value P29 is supplied to a one-pixel delay circuit 2718 (not shown) and the pixel selector circuit 220. One-pixel delay circuit 2718 outputs a pixel value P19 delayed by one more pixel. Pixel value P19 is supplied to a one-pixel delay circuit 2719 and the pixel selector circuit 220. One-pixel delay circuit 2719 outputs a pixel value P09 delayed by one more pixel. Pixel value P09 is supplied to the pixel selector circuit 220. One-line delay circuit 202 outputs a pixel value PA8. Pixel value PA8 is supplied to a one-line delay circuit 203 (not shown), a one-pixel delay circuit 2720 (not shown), and the pixel selector circuit 220. One-pixel delay circuit 2720 outputs a pixel value P98 delayed by one pixel. Pixel value P98 is supplied to a one-pixel delay circuit 2721 (not shown) and the pixel selector circuit 220. One-pixel delay circuit 2721 outputs a pixel value P88 delayed by one more pixel. Pixel value P88 is supplied to a one-pixel delay circuit 2722 (not shown) and the pixel selector circuit 220. One-pixel delay circuit 2722 outputs a pixel value P78 delayed by one more pixel. Pixel value P78 is supplied to a one-pixel delay circuit 2723 (not shown) and the pixel selector circuit 220. One-pixel delay circuit 2723 outputs a pixel value P68 delayed by one more pixel. Pixel value P68 is supplied to a one-pixel delay circuit 2724 (not shown) and the pixel selector circuit 220. One-pixel delay circuit 2724 outputs a pixel value P58 delayed by one more pixel. Pixel value P58 is supplied to a one-pixel delay circuit 2725 (not shown) and the pixel selector circuit 220. One-pixel delay circuit 2725 outputs a pixel value P48 delayed by one more pixel. Pixel value P48 is supplied to a one-pixel delay circuit 2726 (not shown) and the pixel selector circuit 220. One-pixel delay circuit 2726 outputs a pixel value P38 delayed by one more pixel. Pixel value P38 is supplied to a one-pixel delay circuit 2727 (not shown) and the pixel selector circuit 220. One-pixel delay circuit 2727 outputs a pixel value P28 delayed by one more pixel. Pixel value P28 is supplied to a one-pixel delay circuit 2728 (not shown) and the pixel selector circuit 220. One-pixel delay circuit 2728 outputs a pixel value P18 delayed by one more pixel. Pixel value P18 is supplied to a one-pixel delay circuit 2729 (not shown) and the pixel selector circuit 220. One-pixel delay circuit 2729 outputs a pixel value P08 delayed by one more pixel. Pixel value P08 is supplied to the pixel selector circuit 220.

One-line delay circuit 203 outputs a pixel value PA7. Pixel value PA7 is supplied to a one-line delay circuit 204, a one-pixel delay circuit 2730, and the pixel selector circuit 220. One-pixel delay circuit 2730 outputs a pixel value P97 delayed by one pixel. Pixel value P97 is supplied to a one-pixel delay circuit 2731 and the pixel selector circuit 220. One-pixel delay circuit 2731 outputs a pixel value P89 delayed by one more pixel. Pixel value P89 is supplied to a one-pixel delay circuit 2712 (not shown) and the pixel selector circuit 220. One-pixel delay circuit 2712 outputs a pixel value P79 delayed by one more pixel. Pixel value P79 is supplied to a one-pixel delay circuit 2713 (not shown) and the pixel selector circuit 220. One-pixel delay circuit 2713 outputs a pixel value P69 delayed by one more pixel. Pixel value P69 is supplied to a one-pixel delay circuit 2714 (not shown) and the pixel selector circuit 220. One-pixel delay circuit 2714 outputs a pixel value P59 delayed by one more pixel. Pixel value P59 is supplied to a one-pixel delay circuit 2715 (not shown) and the pixel selector circuit 220. One-pixel delay circuit 2715 outputs a pixel value P49 delayed by one more pixel. Pixel value P49 is supplied to a one-pixel delay circuit 2716 (not shown) and the pixel selector circuit 220. One-pixel delay circuit 2716 outputs a pixel value P39 delayed by one more pixel. Pixel value P39 is supplied to a one-pixel delay circuit 2717 (not shown) and the pixel selector circuit 220. One-pixel delay circuit 2717 outputs a pixel value P29 delayed by one more pixel. Pixel value P29 is supplied to a one-pixel delay circuit 2718 (not shown) and the pixel selector circuit 220. One-pixel delay circuit 2718 outputs a pixel value P19 delayed by one more pixel. Pixel value P19 is supplied to a one-pixel delay circuit 2719 and the pixel selector circuit 220. One-pixel delay circuit 2719 outputs a pixel value P09 delayed by one more pixel. Pixel value P09 is supplied to the pixel selector circuit 220. One-line delay circuit 202 outputs a pixel value PA8. Pixel value PA8 is supplied to a one-line delay circuit 203 (not shown), a one-pixel delay circuit 2720 (not shown), and the pixel selector circuit 220. One-pixel delay circuit 2720 outputs a pixel value P98 delayed by one pixel. Pixel value P98 is supplied to a one-pixel delay circuit 2721 (not shown) and the pixel selector circuit 220. One-pixel delay circuit 2721 outputs a pixel value P88 delayed by one more pixel. Pixel value P88 is supplied to a one-pixel delay circuit 2722 (not shown) and the pixel selector circuit 220. One-pixel delay circuit 2722 outputs a pixel value P78 delayed by one more pixel. Pixel value P78 is supplied to a one-pixel delay circuit 2723 (not shown) and the pixel selector circuit 220. One-pixel delay circuit 2723 outputs a pixel value P68 delayed by one more pixel. Pixel value P68 is supplied to a one-pixel delay circuit 2724 (not shown) and the pixel selector circuit 220. One-pixel delay circuit 2724 outputs a pixel value P58 delayed by one more pixel. Pixel value P58 is supplied to a one-pixel delay circuit 2725 (not shown) and the pixel selector circuit 220. One-pixel delay circuit 2725 outputs a pixel value P48 delayed by one more pixel. Pixel value P48 is supplied to a one-pixel delay circuit 2726 (not shown) and the pixel selector circuit 220. One-pixel delay circuit 2726 outputs a pixel value P38 delayed by one more pixel. Pixel value P38 is supplied to a one-pixel delay circuit 2727 (not shown) and the pixel selector circuit 220. One-pixel delay circuit 2727 outputs a pixel value P28 delayed by one more pixel. Pixel value P28 is supplied to a one-pixel delay circuit 2728 (not shown) and the pixel selector circuit 220. One-pixel delay circuit 2728 outputs a pixel value P18 delayed by one more pixel. Pixel value P18 is supplied to a one-pixel delay circuit 2729 (not shown) and the pixel selector circuit 220. One-pixel delay circuit 2729 outputs a pixel value P08 delayed by one more pixel. Pixel value P08 is supplied to the pixel selector circuit 220.

One-line delay circuit 204 outputs a pixel value PA6. Pixel value PA6 is supplied to a one-line delay circuit 202, a one-pixel delay circuit 2710, and the pixel selector circuit 220. One-pixel delay circuit 2710 outputs a pixel value P99 delayed by one pixel. Pixel value P99 is supplied to a one-pixel delay circuit 2711 and the pixel selector circuit 220. One-pixel delay circuit 2711 outputs a pixel value P89 delayed by one more pixel. Pixel value P89 is supplied to a one-pixel delay circuit 2712 (not shown) and the pixel selector circuit 220. One-pixel delay circuit 2712 outputs a pixel value P79 delayed by one more pixel. Pixel value P79 is supplied to a one-pixel delay circuit 2713 (not shown) and the pixel selector circuit 220. One-pixel delay circuit 2713 outputs a pixel value P69 delayed by one more pixel. Pixel value P69 is supplied to a one-pixel delay circuit 2714 (not shown) and the pixel selector circuit 220. One-pixel delay circuit 2714 outputs a pixel value P59 delayed by one more pixel. Pixel value P59 is supplied to a one-pixel delay circuit 2715 (not shown) and the pixel selector circuit 220. One-pixel delay circuit 2715 outputs a pixel value P49 delayed by one more pixel. Pixel value P49 is supplied to a one-pixel delay circuit 2716 (not shown) and the pixel selector circuit 220. One-pixel delay circuit 2716 outputs a pixel value P39 delayed by one more pixel. Pixel value P39 is supplied to a one-pixel delay circuit 2717 (not shown) and the pixel selector circuit 220. One-pixel delay circuit 2717 outputs a pixel value P29 delayed by one more pixel. Pixel value P29 is supplied to a one-pixel delay circuit 2718 (not shown) and the pixel selector circuit 220. One-pixel delay circuit 2718 outputs a pixel value P19 delayed by one more pixel. Pixel value P19 is supplied to a one-pixel delay circuit 2719 and the pixel selector circuit 220. One-pixel delay circuit 2719 outputs a pixel value P09 delayed by one more pixel. Pixel value P09 is supplied to the pixel selector circuit 220. One-line delay circuit 202 outputs a pixel value PA8. Pixel value PA8 is supplied to a one-line delay circuit 203 (not shown), a one-pixel delay circuit 2720 (not shown), and the pixel selector circuit 220. One-pixel delay circuit 2720 outputs a pixel value P98 delayed by one pixel. Pixel value P98 is supplied to a one-pixel delay circuit 2721 (not shown) and the pixel selector circuit 220. One-pixel delay circuit 2721 outputs a pixel value P88 delayed by one more pixel. Pixel value P88 is supplied to a one-pixel delay circuit 2722 (not shown) and the pixel selector circuit 220. One-pixel delay circuit 2722 outputs a pixel value P78 delayed by one more pixel. Pixel value P78 is supplied to a one-pixel delay circuit 2723 (not shown) and the pixel selector circuit 220. One-pixel delay circuit 2723 outputs a pixel value P68 delayed by one more pixel. Pixel value P68 is supplied to a one-pixel delay circuit 2724 (not shown) and the pixel selector circuit 220. One-pixel delay circuit 2724 outputs a pixel value P58 delayed by one more pixel. Pixel value P58 is supplied to a one-pixel delay circuit 2725 (not shown) and the pixel selector circuit 220. One-pixel delay circuit 2725 outputs a pixel value P48 delayed by one more pixel. Pixel value P48 is supplied to a one-pixel delay circuit 2726 (not shown) and the pixel selector circuit 220. One-pixel delay circuit 2726 outputs a pixel value P38 delayed by one more pixel. Pixel value P38 is supplied to a one-pixel delay circuit 2727 (not shown) and the pixel selector circuit 220. One-pixel delay circuit 2727 outputs a pixel value P28 delayed by one more pixel. Pixel value P28 is supplied to a one-pixel delay circuit 2728 (not shown) and the pixel selector circuit 220. One-pixel delay circuit 2728 outputs a pixel value P18 delayed by one more pixel.

Pixel value P18 is supplied to a one-pixel delay circuit 2729 (not shown) and the pixel selector circuit 220. One-pixel delay circuit 2729 outputs a pixel value P08 delayed by one more pixel. Pixel value P08 is supplied to the pixel selector circuit 220.

One-line delay circuit 205 outputs a pixel value PA5. Pixel value PA5 is supplied to a one-line delay circuit 202, a one-pixel delay circuit 2710, and the pixel selector circuit 220. One-pixel delay circuit 2710 outputs a pixel value P99 delayed by one pixel. Pixel value P99 is supplied to a one-pixel delay circuit 2711 and the pixel selector circuit 220. One-pixel delay circuit 2711 outputs a pixel value P89 delayed by one more pixel. Pixel value P89 is supplied to a one-pixel delay circuit 2712 (not shown) and the pixel selector circuit 220. One-pixel delay circuit 2712 outputs a pixel value P79 delayed by one more pixel. Pixel value P79 is supplied to a one-pixel delay circuit 2713 (not shown) and the pixel selector circuit 220. One-pixel delay circuit 2713 outputs a pixel value P69 delayed by one more pixel. Pixel value P69 is supplied to a one-pixel delay circuit 2714 (not shown) and the pixel selector circuit 220. One-pixel delay circuit 2714 outputs a pixel value P59 delayed by one more pixel. Pixel value P59 is supplied to a one-pixel delay circuit 2715 (not shown) and the pixel selector circuit 220. One-pixel delay circuit 2715 outputs a pixel value P49 delayed by one more pixel. Pixel value P49 is supplied to a one-pixel delay circuit 2716 (not shown) and the pixel selector circuit 220. One-pixel delay circuit 2716 outputs a pixel value P39 delayed by one more pixel. Pixel value P39 is supplied to a one-pixel delay circuit 2717 (not shown) and the pixel selector circuit 220. One-pixel delay circuit 2717 outputs a pixel value P29 delayed by one more pixel. Pixel value P29 is supplied to a one-pixel delay circuit 2718 (not shown) and the pixel selector circuit 220. One-pixel delay circuit 2718 outputs a pixel value P19 delayed by one more pixel. Pixel value P19 is supplied to a one-pixel delay circuit 2719 and the pixel selector circuit 220. One-pixel delay circuit 2719 outputs a pixel value P09 delayed by one more pixel. Pixel value P09 is supplied to the pixel selector circuit 220. One-line delay circuit 202 outputs a pixel value PA8. Pixel value PA8 is supplied to a one-line delay circuit 203 (not shown), a one-pixel delay circuit 2720 (not shown), and the pixel selector circuit 220. One-pixel delay circuit 2720 outputs a pixel value P98 delayed by one pixel. Pixel value P98 is supplied to a one-pixel delay circuit 2721 (not shown) and the pixel selector circuit 220. One-pixel delay circuit 2721 outputs a pixel value P88 delayed by one more pixel. Pixel value P88 is supplied to a one-pixel delay circuit 2722 (not shown) and the pixel selector circuit 220. One-pixel delay circuit 2722 outputs a pixel value P78 delayed by one more pixel. Pixel value P78 is supplied to a one-pixel delay circuit 2723 (not shown) and the pixel selector circuit 220. One-pixel delay circuit 2723 outputs a pixel value P68 delayed by one more pixel. Pixel value P68 is supplied to a one-pixel delay circuit 2724 (not shown) and the pixel selector circuit 220. One-pixel delay circuit 2724 outputs a pixel value P58 delayed by one more pixel. Pixel value P58 is supplied to a one-pixel delay circuit 2725 (not shown) and the pixel selector circuit 220. One-pixel delay circuit 2725 outputs a pixel value P48 delayed by one more pixel. Pixel value P48 is supplied to a one-pixel delay circuit 2726 (not shown) and the pixel selector circuit 220. One-pixel delay circuit 2726 outputs a pixel value P38 delayed by one more pixel. Pixel value P38 is supplied to a one-pixel delay circuit 2727 (not shown) and the pixel selector circuit 220. One-pixel delay circuit 2727 outputs a pixel value P28 delayed by one more pixel. Pixel value P28 is supplied to a one-pixel delay circuit 2728 (not shown) and the pixel selector circuit 220. One-pixel delay circuit 2728 outputs a pixel value P18 delayed by one more pixel. Pixel value P18 is supplied to a one-pixel delay circuit 2729 (not shown) and the pixel selector circuit 220. One-pixel delay circuit 2729 outputs a pixel value P08 delayed by one more pixel. Pixel value P08 is supplied to the pixel selector circuit 220.

One-line delay circuit 206 outputs a pixel value PA4. Pixel value PA4 is supplied to a one-line delay circuit 202, a one-pixel delay circuit 2710, and the pixel selector circuit 220. One-pixel delay circuit 2710 outputs a pixel value P99 delayed by one pixel. Pixel value P99 is supplied to a one-pixel delay circuit 2711 and the pixel selector circuit 220. One-pixel delay circuit 2711 outputs a pixel value P89 delayed by one more pixel. Pixel value P89 is supplied to a one-pixel delay circuit 2712 (not shown) and the pixel selector circuit 220. One-pixel delay circuit 2712 outputs a pixel value P79 delayed by one more pixel. Pixel value P79 is supplied to a one-pixel delay circuit 2713 (not shown) and the pixel selector circuit 220. One-pixel delay circuit 2713 outputs a pixel value P69 delayed by one more pixel. Pixel value P69 is supplied to a one-pixel delay circuit 2714 (not shown) and the pixel selector circuit 220. One-pixel delay circuit 2714 outputs a pixel value P59 delayed by one more pixel. Pixel value P59 is supplied to a one-pixel delay circuit 2715 (not shown) and the pixel selector circuit 220. One-pixel delay circuit 2715 outputs a pixel value P49 delayed by one more pixel. Pixel value P49 is supplied to a one-pixel delay circuit 2716 (not shown) and the pixel selector circuit 220. One-pixel delay circuit 2716 outputs a pixel value P39 delayed by one more pixel. Pixel value P39 is supplied to a one-pixel delay circuit 2717 (not shown) and the pixel selector circuit 220. One-pixel delay circuit 2717 outputs a pixel value P29 delayed by one more pixel. Pixel value P29 is supplied to a one-pixel delay circuit 2718 (not shown) and the pixel selector circuit 220. One-pixel delay circuit 2718 outputs a pixel value P19 delayed by one more pixel. Pixel value P19 is supplied to a one-pixel delay circuit 2719 and the pixel selector circuit 220. One-pixel delay circuit 2719 outputs a pixel value P09 delayed by one more pixel. Pixel value P09 is supplied to the pixel selector circuit 220. One-line delay circuit 202 outputs a pixel value PA8. Pixel value PA8 is supplied to a one-line delay circuit 203 (not shown), a one-pixel delay circuit 2720 (not shown), and the pixel selector circuit 220. One-pixel delay circuit 2720 outputs a pixel value P98 delayed by one pixel. Pixel value P98 is supplied to a one-pixel delay circuit 2721 (not shown) and the pixel selector circuit 220. One-pixel delay circuit 2721 outputs a pixel value P88 delayed by one more pixel. Pixel value P88 is supplied to a one-pixel delay circuit 2722 (not shown) and the pixel selector circuit 220. One-pixel delay circuit 2722 outputs a pixel value P78 delayed by one more pixel. Pixel value P78 is supplied to a one-pixel delay circuit 2723 (not shown) and the pixel selector circuit 220. One-pixel delay circuit 2723 outputs a pixel value P68 delayed by one more pixel. Pixel value P68 is supplied to a one-pixel delay circuit 2724 (not shown) and the pixel selector circuit 220. One-pixel delay circuit 2724 outputs a pixel value P58 delayed by one more pixel. Pixel value P58 is supplied to a one-pixel delay circuit 2725 (not shown) and the pixel selector circuit 220. One-pixel delay circuit 2725 outputs a pixel value P48 delayed by one more pixel. Pixel value P48 is supplied to a one-pixel delay circuit 2726 (not shown) and the pixel selector circuit 220. One-pixel delay circuit 2726 outputs a pixel value P38 delayed by one more pixel. Pixel value P38 is supplied to a one-pixel delay circuit 2727 (not shown) and the pixel selector circuit 220. One-pixel delay circuit 2727 outputs a pixel value P28 delayed by one more pixel. Pixel value P28 is supplied to a one-pixel delay circuit 2728 (not shown) and the pixel selector circuit 220. One-pixel delay circuit 2728 outputs a pixel value P18 delayed by one more pixel. Pixel value P18 is supplied to a one-pixel delay circuit 2729 (not shown) and the pixel selector circuit 220. One-pixel delay circuit 2729 outputs a pixel value P08 delayed by one more pixel. Pixel value P08 is supplied to the pixel selector circuit 220.

One-line delay circuit 207 outputs a pixel value PA3. Pixel value PA3 is supplied to a one-line delay circuit 202, a one-pixel delay circuit 2710, and the pixel selector circuit 220. One-pixel delay circuit 2710 outputs a pixel value P99 delayed by one pixel. Pixel value P99 is supplied to a one-pixel delay circuit 2711 and the pixel selector circuit 220. One-pixel delay circuit 2711 outputs a pixel value P89 delayed by one more pixel. Pixel value P89 is supplied to a one-pixel delay circuit 2712 (not shown) and the pixel selector circuit 220. One-pixel delay circuit 2712 outputs a pixel value P79 delayed by one more pixel. Pixel value P79 is supplied to a one-pixel delay circuit 2713 (not shown) and the pixel selector circuit 220. One-pixel delay circuit 2713 outputs a pixel value P69 delayed by one more pixel. Pixel value P69 is supplied to a one-pixel delay circuit 2714 (not shown) and the pixel selector circuit 220. One-pixel delay circuit 2714 outputs a pixel value P59 delayed by one more pixel. Pixel value P59 is supplied to a one-pixel delay circuit 2715 (not shown) and the pixel selector circuit 220. One-pixel delay circuit 2715 outputs a pixel value P49 delayed by one more pixel. Pixel value P49 is supplied to a one-pixel delay circuit 2716 (not shown) and the pixel selector circuit 220. One-pixel delay circuit 2716 outputs a pixel value P39 delayed by one more pixel. Pixel value P39 is supplied to a one-pixel delay circuit 2717 (not shown) and the pixel selector circuit 220. One-pixel delay circuit 2717 outputs a pixel value P29 delayed by one more pixel. Pixel value P29 is supplied to a one-pixel delay circuit 2718 (not shown) and the pixel selector circuit 220. One-pixel delay circuit 2718 outputs a pixel value P19 delayed by one more pixel. Pixel value P19 is supplied to a one-pixel delay circuit 2719 and the pixel selector circuit 220. One-pixel delay circuit 2719 outputs a pixel value P09 delayed by one more pixel. Pixel value P09 is supplied to the pixel selector circuit 220. One-line delay circuit 202 outputs a pixel value PA8. Pixel value PA8 is supplied to a one-line delay circuit 203 (not shown), a one-pixel delay circuit 2720 (not shown), and the pixel selector circuit 220. One-pixel delay circuit 2720 outputs a pixel value P98 delayed by one pixel. Pixel value P98 is supplied to a one-pixel delay circuit 2721 (not shown) and the pixel selector circuit 220. One-pixel delay circuit 2721 outputs a pixel value P88 delayed by one more pixel. Pixel value P88 is supplied to a one-pixel delay circuit 2722 (not shown) and the pixel selector circuit 220. One-pixel delay circuit 2722 outputs a pixel value P78 delayed by one more pixel. Pixel value P78 is supplied to a one-pixel delay circuit 2723 (not shown) and the pixel selector circuit 220. One-pixel delay circuit 2723 outputs a pixel value P68 delayed by one more pixel. Pixel value P68 is supplied to a one-pixel delay circuit 2724 (not shown) and the pixel selector circuit 220. One-pixel delay circuit 2724 outputs a pixel value P58 delayed by one more pixel. Pixel value P58 is supplied to a one-pixel delay circuit 2725 (not shown) and the pixel selector circuit 220. One-pixel delay circuit 2725 outputs a pixel value P48 delayed by one more pixel. Pixel value P48 is supplied to a one-pixel delay circuit 2726 (not shown) and the pixel selector circuit 220. One-pixel delay circuit 2726 outputs a pixel value P38 delayed by one more pixel. Pixel value P38 is supplied to a one-pixel delay circuit 2727 (not shown) and the pixel selector circuit 220. One-pixel delay circuit 2727 outputs a pixel value P28 delayed by one more pixel. Pixel value P28 is supplied to a one-pixel delay circuit 2728 (not shown) and the pixel selector circuit 220. One-pixel delay circuit 2728 outputs a pixel value P18 delayed by one more pixel. Pixel value P18 is supplied to a one-pixel delay circuit 2729 (not shown) and the pixel selector circuit 220. One-pixel delay circuit 2729 outputs a pixel value P08 delayed by one more pixel. Pixel value P08 is supplied to the pixel selector circuit 220.

One-line delay circuit 208 outputs a pixel value PA2. Pixel value PA2 is supplied to a one-line delay circuit 202, a one-pixel delay circuit 2710, and the pixel selector circuit 220. One-pixel delay circuit 2710 outputs a pixel value P99 delayed by one pixel. Pixel value P99 is supplied to a one-pixel delay circuit 2711 and the pixel selector circuit 220. One-pixel delay circuit 2711 outputs a pixel value P89 delayed by one more pixel. Pixel value P89 is supplied to a one-pixel delay circuit 2712 (not shown) and the pixel selector circuit 220. One-pixel delay circuit 2712 outputs a pixel value P79 delayed by one more pixel. Pixel value P79 is supplied to a one-pixel delay circuit 2713 (not shown) and the pixel selector circuit 220. One-pixel delay circuit 2713 outputs a pixel value P69 delayed by one more pixel. Pixel value P69 is supplied to a one-pixel delay circuit 2714 (not shown) and the pixel selector circuit 220. One-pixel delay circuit 2714 outputs a pixel value P59 delayed by one more pixel. Pixel value P59 is supplied to a one-pixel delay circuit 2715 (not shown) and the pixel selector circuit 220. One-pixel delay circuit 2715 outputs a pixel value P49 delayed by one more pixel. Pixel value P49 is supplied to a one-pixel delay circuit 2716 (not shown) and the pixel selector circuit 220. One-pixel delay circuit 2716 outputs a pixel value P39 delayed by one more pixel. Pixel value P39 is supplied to a one-pixel delay circuit 2717 (not shown) and the pixel selector circuit 220. One-pixel delay circuit 2717 outputs a pixel value P29 delayed by one more pixel. Pixel value P29 is supplied to a one-pixel delay circuit 2718 (not shown) and the pixel selector circuit 220. One-pixel delay circuit 2718 outputs a pixel value P19 delayed by one more pixel. Pixel value P19 is supplied to a one-pixel delay circuit 2719 and the pixel selector circuit 220. One-pixel delay circuit 2719 outputs a pixel value P09 delayed by one more pixel. Pixel value P09 is supplied to the pixel selector circuit 220. One-line delay circuit 202 outputs a pixel value PA8. Pixel value PA8 is supplied to a one-line delay circuit 203 (not shown), a one-pixel delay circuit 2720 (not shown), and the pixel selector circuit 220. One-pixel delay circuit 2720 outputs a pixel value P98 delayed by one pixel. Pixel value P98 is supplied to a one-pixel delay circuit 2721 (not shown) and the pixel selector circuit 220. One-pixel delay circuit 2721 outputs a pixel value P88 delayed by one more pixel. Pixel value P88 is supplied to a one-pixel delay circuit 2722 (not shown) and the pixel selector circuit 220. One-pixel delay circuit 2722 outputs a pixel value P78 delayed by one more pixel. Pixel value P78 is supplied to a one-pixel delay circuit 2723 (not shown) and the pixel selector circuit 220. One-pixel delay circuit 2723 outputs a pixel value P68 delayed by one more pixel. Pixel value P68 is supplied to a one-pixel delay circuit 2724 (not shown) and the pixel selector circuit 220. One-pixel delay circuit 2724 outputs a pixel value P58 delayed by one more pixel. Pixel value P58 is supplied to a one-pixel delay circuit 2725 (not shown) and the pixel selector circuit 220. One-pixel delay circuit 2725 outputs a pixel value P48 delayed by one more pixel. Pixel value P48 is supplied to a one-pixel delay circuit 2726 (not shown) and the pixel selector circuit 220. One-pixel delay circuit 2726 outputs a pixel value P38 delayed by one more pixel. Pixel value P38 is supplied to a one-pixel delay circuit 2727 (not shown) and the pixel selector circuit 220. One-pixel delay circuit 2727 outputs a pixel value P28 delayed by one more pixel. Pixel value P28 is supplied to a one-pixel delay circuit 2728 (not shown) and the pixel selector circuit 220. One-pixel delay circuit 2728 outputs a pixel value P18 delayed by one more pixel. Pixel value P18 is supplied to a one-pixel delay circuit 2729 (not shown) and the pixel selector circuit 220. One-pixel delay circuit 2729 outputs a pixel value P08 delayed by one more pixel. Pixel value P08 is supplied to the pixel selector circuit 220.

One-line delay circuit 209 outputs a pixel value PA1. Pixel value PA1 is supplied to a one-line delay circuit 202, a one-pixel delay circuit 2710, and the pixel selector circuit 220. One-pixel delay circuit 2710 outputs a pixel value P99 delayed by one pixel. Pixel value P99 is supplied to a one-pixel delay circuit 2711 and the pixel selector circuit 220. One-pixel delay circuit 2711 outputs a pixel value P89 delayed by one more pixel. Pixel value P89 is supplied to a one-pixel delay circuit 2712 (not shown) and the pixel selector circuit 220. One-pixel delay circuit 2712 outputs a pixel value P79 delayed by one more pixel. Pixel value P79 is supplied to a one-pixel delay circuit 2713 (not shown) and the pixel selector circuit 220. One-pixel delay circuit 2713 outputs a pixel value P69 delayed by one more pixel. Pixel value P69 is supplied to a one-pixel delay circuit 2714 (not shown) and the pixel selector circuit 220. One-pixel delay circuit 2714 outputs a pixel value P59 delayed by one more pixel. Pixel value P59 is supplied to a one-pixel delay circuit 2715 (not shown) and the pixel selector circuit 220. One-pixel delay circuit 2715 outputs a pixel value P49 delayed by one more pixel. Pixel value P49 is supplied to a one-pixel delay circuit 2716 (not shown) and the pixel selector circuit 220. One-pixel delay circuit 2716 outputs a pixel value P39 delayed by one more pixel. Pixel value P39 is supplied to a one-pixel delay circuit 2717 (not shown) and the pixel selector circuit 220. One-pixel delay circuit 2717 outputs a pixel value P29 delayed by one more pixel. Pixel value P29 is supplied to a one-pixel delay circuit 2718 (not shown) and the pixel selector circuit 220. One-pixel delay circuit 2718 outputs a pixel value P19 delayed by one more pixel. Pixel value P19 is supplied to a one-pixel delay circuit 2719 and the pixel selector circuit 220. One-pixel delay circuit 2719 outputs a pixel value P09 delayed by one more pixel. Pixel value P09 is supplied to the pixel selector circuit 220. One-line delay circuit 202 outputs a pixel value PA8. Pixel value PA8 is supplied to a one-line delay circuit 203 (not shown), a one-pixel delay circuit 2720 (not shown), and the pixel selector circuit 220. One-pixel delay circuit 2720 outputs a pixel value P98 delayed by one pixel. Pixel value P98 is supplied to a one-pixel delay circuit 2721 (not shown) and the pixel selector circuit 220. One-pixel delay circuit 2721 outputs a pixel value P88 delayed by one more pixel. Pixel value P88 is supplied to a one-pixel delay circuit 2722 (not shown) and the pixel selector circuit 220. One-pixel delay circuit 2722 outputs a pixel value P78 delayed by one more pixel. Pixel value P78 is supplied to a one-pixel delay circuit 2723 (not shown) and the pixel selector circuit 220. One-pixel delay circuit 2723 outputs a pixel value P68 delayed by one more pixel. Pixel value P68 is supplied to a one-pixel delay circuit 2724 (not shown) and the pixel selector circuit 220. One-pixel delay circuit 2724 outputs a pixel value P58 delayed by one more pixel. Pixel value P58 is supplied to a one-pixel delay circuit 2725 (not shown) and the pixel selector circuit 220. One-pixel delay circuit 2725 outputs a pixel value P48 delayed by one more pixel. Pixel value P48 is supplied to a one-pixel delay circuit 2726 (not shown) and the pixel selector circuit 220. One-pixel delay circuit 2726 outputs a pixel value P38 delayed by one more pixel. Pixel value P38 is supplied to a one-pixel delay circuit 2727 (not shown) and the pixel selector circuit 220. One-pixel delay circuit 2727 outputs a pixel value P28 delayed by one more pixel. Pixel value P28 is supplied to a one-pixel delay circuit 2728 (not shown) and the pixel selector circuit 220. One-pixel delay circuit 2728 outputs a pixel value P18 delayed by one more pixel. Pixel value P18 is supplied to a one-pixel delay circuit 2729 (not shown) and the pixel selector circuit 220. One-pixel delay circuit 2729 outputs a pixel value P08 delayed by one more pixel. Pixel value P08 is supplied to the pixel selector circuit 220.

One-line delay circuit 210 outputs a pixel value PA0. Pixel value PA0 is supplied to a one-line delay circuit 202, a one-pixel delay circuit 2710, and the pixel selector circuit 220. One-pixel delay circuit 2710 outputs a pixel value P99 delayed by one pixel. Pixel value P99 is supplied to a one-pixel delay circuit 2711 and the pixel selector circuit 220. One-pixel delay circuit 2711 outputs a pixel value P89 delayed by one more pixel. Pixel value P89 is supplied to a one-pixel delay circuit 2712 (not shown) and the pixel selector circuit 220. One-pixel delay circuit 2712 outputs a pixel value P79 delayed by one more pixel. Pixel value P79 is supplied to a one-pixel delay circuit 2713 (not shown) and the pixel selector circuit 220. One-pixel delay circuit 2713 outputs a pixel value P69 delayed by one more pixel. Pixel value P69 is supplied to a one-pixel delay circuit 2714 (not shown) and the pixel selector circuit 220. One-pixel delay circuit 2714 outputs a pixel value P59 delayed by one more pixel. Pixel value P59 is supplied to a one-pixel delay circuit 2715 (not shown) and the pixel selector circuit 220. One-pixel delay circuit 2715 outputs a pixel value P49 delayed by one more pixel. Pixel value P49 is supplied to a one-pixel delay circuit 2716 (not shown) and the pixel selector circuit 220. One-pixel delay circuit 2716 outputs a pixel value P39 delayed by one more pixel. Pixel value P39 is supplied to a one-pixel delay circuit 2717 (not shown) and the pixel selector circuit 220. One-pixel delay circuit 2717 outputs a pixel value P29 delayed by one more pixel. Pixel value P29 is supplied to a one-pixel delay circuit 2718 (not shown) and the pixel selector circuit 220. One-pixel delay circuit 2718 outputs a pixel value P19 delayed by one more pixel. Pixel value P19 is supplied to a one-pixel delay circuit 2719 and the pixel selector circuit 220. One-pixel delay circuit 2719 outputs a pixel value P09 delayed by one more pixel. Pixel value P09 is supplied to the pixel selector circuit 220. One-line delay circuit 202 outputs a pixel value PA8. Pixel value PA8 is supplied to a one-line delay circuit 203 (not shown), a one-pixel delay circuit 2720 (not shown), and the pixel selector circuit 220. One-pixel delay circuit 2720 outputs a pixel value P98 delayed by one pixel. Pixel value P98 is supplied to a one-pixel delay circuit 2721 (not shown) and the pixel selector circuit 220. One-pixel delay circuit 2721 outputs a pixel value P88 delayed by one more pixel. Pixel value P88 is supplied to a one-pixel delay circuit 2722 (not shown) and the pixel selector circuit 220. One-pixel delay circuit 2722 outputs a pixel value P78 delayed by one more pixel. Pixel value P78 is supplied to a one-pixel delay circuit 2723 (not shown) and the pixel selector circuit 220. One-pixel delay circuit 2723 outputs a pixel value P68 delayed by one more pixel. Pixel value P68 is supplied to a one-pixel delay circuit 2724 (not shown) and the pixel selector circuit 220. One-pixel delay circuit 2724 outputs a pixel value P58 delayed by one more pixel. Pixel value P58 is supplied to a one-pixel delay circuit 2725 (not shown) and the pixel selector circuit 220. One-pixel delay circuit 2725 outputs a pixel value P48 delayed by one more pixel. Pixel value P48 is supplied to a one-pixel delay circuit 2726 (not shown) and the pixel selector circuit 220. One-pixel delay circuit 2726 outputs a pixel value P38 delayed by one more pixel. Pixel value P38 is supplied to a one-pixel delay circuit 2727 (not shown) and the pixel selector circuit 220. One-pixel delay circuit 2727 outputs a pixel value P28 delayed by one more pixel. Pixel value P28 is supplied to a one-pixel delay circuit 2728 (not shown) and the pixel selector circuit 220. One-pixel delay circuit 2728 outputs a pixel value P18 delayed by one more pixel. Pixel value P18 is supplied to a one-pixel delay circuit 2729 (not shown) and the pixel selector circuit 220. One-pixel delay circuit 2729 outputs a pixel value P08 delayed by one more pixel. Pixel value P08 is supplied to the pixel selector circuit 220.

The pixel selector circuit 220 determines the pixel position of the pixel of interest P55 in the frame image of interest, or the pixel position P55 corresponding to the pixel of interest in the relevant adjacent frame image, from the horizontal synchronization signal HD and vertical synchronization signal VD, which it receives from the synchronization signal generator 18 through a synchronization signal input terminal 218, and thereby identifies the position of the pixel of interest with respect to the color filter array. The pixel selector circuit 220 can also determine whether the pixel of interest is a red, green, or blue pixel. The pixel selector circuit 220 can also identify the pixel positions of the pixels to be added, which are specified by the in-plane pattern detection circuit 50, forward reference pattern detection circuit 71, and backward reference pattern detection circuit 72.

Referring again to FIG. 2, the pixel selector circuits 21, 22, 23 each supply the pixel values of four pixels corresponding to an addition pattern to the addition circuit 24. The MPU 19 sets a sensitivity enhancement factor L of 1 to 12 in the addition circuit 24 through control terminal INc. The addition circuit 24 adds the pixel values of the four pixels supplied from each of the pixel selector circuits 21, 22, 23 and supplies the sum of the pixel values of these twelve pixels from its output terminal OUTa to the image signal processor 15.

An example of the operation when the pixel of interest is a green pixel and there is no movement between frame images will be described with reference to FIGS. 37A, 37B, 42A, and 42B.

When the upper block pattern image region in the frame image of interest is most highly correlated with the pixel of interest, and the image regions in the forward and backward reference frame images with the same pixel arrangement as the upper block pattern in the frame image of interest are most highly correlated with the pixel of interest, the addition circuit 24 carries out the following calculation.

$$G = (G153 + G144 + G164 + G155 + G53 + G44 +$$
$$G64 + G55 + G353 + G344 + G364 + G355) \times L/12$$

An example of the operation when the pixel of interest is a green pixel and there is movement between the frame images will be described with reference to FIGS. 38A, 38B 44A, and 44B.

When the upper block pattern image region in the frame image of interest, the pattern shifted to the upper left in the forward reference frame image, and the pattern shifted to the lower right in the backward reference frame image are most highly correlated with the pixel of interest, the addition circuit 24 carries out the following calculation.

$$G = (G153 + G144 + G164 + G155 + G53 + G44 +$$
$$G64 + G55 + G353 + G344 + G364 + G355) \times L/12$$

An example of the operation when the pixel of interest is a red pixel and there is no movement between frame images will be described with reference to FIGS. 87A, 87B and FIGS. 92A, 92B.

When the upper right block pattern image region in the frame image of interest is most highly correlated with the pixel of interest, and the image regions in the forward and backward reference frame images with the same pixel arrangement as the upper right block pattern in the frame image of interest are most highly correlated with the pixel of interest, the addition circuit 24 carries out the following calculation.

$$R = (R133 + R153 + R135 + R155 + R33 + R53 +$$
$$R35 + R55 + R333 + R353 + R335 + R355) \times L/12$$

An example of the operation when the pixel of interest is a red pixel and there is movement between the frame images will be described with reference to FIGS. 88A, 88B and FIGS. 94A, 94B.

When the upper block pattern image region in the frame image of interest, the pattern shifted to the left in the forward reference frame image, and the pattern shifted to the right in the backward reference frame image are most highly correlated with the pixel of interest, the addition circuit 24 carries out the following calculation.

$$R = (R113 + R133 + R115 + R135 + R33 + R53 +$$
$$R35 + R55 + R353 + R373 + R355 + R375) \times L/12$$

An example of the operation when the pixel of interest is a blue pixel and there is no movement between frame images will be described with reference to FIG. 19, using notation analogous to the notation in FIGS. 87A and 92B to denote the pixel values of blue pixels in the forward and backward reference frame images.

When the upper left block pattern image region in the frame image of interest is most highly correlated with the pixel of interest, and the image regions in the forward and backward reference frame images with the same pixel arrangement as the upper right block pattern in the frame image of interest are most highly correlated with the pixel of interest, the addition circuit 24 carries out the following calculation.

$$B = (B133 + B153 + B135 + B155 + B33 + B53 +$$
$$B35 + B55 + B333 + B353 + B335 + B355) \times L/12$$

An example of the operation when the pixel of interest is a blue pixel and there is movement between frame images will be described with reference to FIG. 19, using notation analogous to the notation in FIGS. 88A and 94B to denote the pixel values of blue pixels in the forward and backward reference frame images.

When the upper left block pattern image region in the frame image of interest, the pattern shifted to the left in the forward reference frame image, and the pattern shifted to the right in the backward reference frame image are most highly correlated with the pixel of interest, the addition circuit 24 carries out the following calculation.

$$B = (B113 + B133 + B115 + B135 + B33 + B53 + B35 + B55 + B353 + B373 + B355 + B375) \times L/12$$

Since this embodiment carries out pixel addition on addition patterns, including vertical, horizontal, and diagonal line patterns and block patterns, that are designed for images including high-resolution subjects, it can find highly correlated pixels to add together. Accordingly, even when pixel addition is carried out on a scene including a high-resolution subject, blurring of the high-resolution part can be prevented.

The addition patterns tested to find correlated red pixels and blue pixels may include vertical, horizontal, and diagonal line patterns analogous to the vertical, horizontal, and diagonal line patterns of green pixels. The addition patterns for red and blue pixels should be determined on the combined basis of the following considerations: since the distance between the added red or blue pixels is longer than the distance between green pixels, the risk of making a mistaken correlation decision is higher; more circuitry is needed to test more patterns; the human eye is less sensitive to color changes than brightness changes.

The embodiment above was described as taking the sum of twelve pixels: four pixels each in the frame image of interest, the forward adjacent frame image, and the backward adjacent frame image. It is also possible, however, to take the sum of six pixels, including just two pixels from each of these three frame images. The embodiment was also described as specifying a sensitivity enhancement factor L ranging from 1 to 12, and as using the same pixel addition patterns for all values of L, but it is also possible to use, for example, four-pixel addition patterns for values of L from 7 to 12 and two-pixel addition patterns for values of L from 1 to 6, to minimize the loss of resolution at high illumination levels and maximize the sensitivity at low illumination levels.

Another way of enhancing sensitivity while reducing loss of resolution is to combine two-pixel and four-pixel addition patterns as follows. When the sensitivity enhancement factor L is 1 to 6, two-pixel addition patterns are used, providing a maximum enhancement factor of 6. When the sensitivity enhancement factor L is 6 to 8, four-pixel addition patterns are used for the frame image of interest and two-pixel addition patterns are used for the adjacent frame images to provide a maximum factor of 8. When the sensitivity enhancement factor L is 8 to 12, four-pixel addition patterns are used in all three frames, providing a maximum factor of 12.

Both the forward and backward adjacent frame images are used in pixel addition in this embodiment, but it is possible to use just one of these two adjacent frame images instead. Less circuitry and in particular less frame image memory is then required, and the device cost is reduced accordingly. Even though fewer pixels are added, sensitivity can still be improved, and the loss of resolution can still be reduced.

Conversely, instead of using three frame image memories, one for the frame image of interest and two for the adjacent frame images, as in this embodiment, it is possible to use four or more frame image memories and add pixels from four or more frame images. The number of pixels added can thereby be increased, and higher sensitivity can be achieved. The maximum and minimum pixel values in the reference addition pattern found in one frame can be used to search for a reference addition pattern in the next adjacent frame.

A Bayer arrangement of primary colors including red, green, and blue color filters has been described, but the above embodiment can operate in the same way and obtain the same effects with any color filter array of the checkerboard type consisting of four-pixel basic blocks measuring two pixels horizontally and two pixels vertically.

Since the pixels most highly correlated with the pixel of interest are selected from a wide range of patterns in the frame of interest in this embodiment, addition of these pixels can achieve improved sensitivity and an improved S/N ratio with minimal loss of resolution.

Since a plurality of patterns in the frame images temporally preceding and following the frame image of interest are also tested to find pixels highly correlated with the pixel of interest, addition of these pixels can also achieve improved sensitivity and an improved S/N ratio with minimal loss of resolution.

Since highly correlated pixels are first identified in the frame image of interest and then used to define the range of search in the preceding and following frame images, the number of patterns tested in the preceding and following frame images is limited, and the circuit size can be reduced accordingly.

Performing pixel addition before image signal processing enables a high-sensitivity signal to be generated on the basis of the output of the imaging element, without being affected by image signal processing. Addition of pixels following image signal processing would invite an unexpectedly large loss of horizontal and vertical resolution, because of filtering and color interpolation using neighboring pixels. Conversely, since the image signal processing would be performed directly on small-amplitude signals, subtle gradation differences might be missed and information might be lost. Performing pixel addition first enables the signal amplitude to be restored to a level such that image signal processing can be carried out without this loss of information, making fine details more visible in the processed image.

This also enables the image obtained by the imaging unit (which has passed through a Bayer array of color filters, for example) to be subjected to noise reduction before color interpolation and other image processing is carried out. Noise can therefore be reduced effectively, because noise reduction is performed before the effect of the noise is spread by the image processing.

Since the image signal processor 15 performs non-linear filtering and gamma conversion, when a low-amplitude signal is input, loss of signal amplitude may occur. Addition of two pixels of the output signal of the image signal processor 15 might therefore fail to double the amplitude of the image signal. In this embodiment, since pixel addition is performed before image signal processing by the image signal processor 15, addition of two pixels can be expected to produce an image signal with twice the original signal amplitude.

The sensitivity enhancement factor in this embodiment can be set to values up to 12. Sensitivity enhancement factors greater than 12 may also be set, but care is necessary to avoid gradation discontinuities.

For ease of explanation, redundant delay circuits 420, 520, 770, 270 are used in this embodiment, as shown in FIGS. 3, 6, 10, and 13, but these circuits can be reconfigured to eliminate some of the redundant elements.

Since pixels of the same filter color are added in this embodiment, vivid color images without color bleeding can be obtained.

When an image captured in a dim environment is amplified by an analog amplifier, the resulting noise may drown out the signal. If the image is amplified by a digital amplifier, gradation discontinuities occur. Since this embodiment achieves high sensitivity through addition of neighboring pixels, the noise component becomes smaller than the signal component. For example, two-pixel addition doubles the signal component while increasing the noise component only by a factor equal to the square root of two, so the pure signal component increases relative to the noise component. Since spatially neighboring pixels in an image tend to be highly correlated, addition of a plurality of pixels close to the pixel of interest is an effective way to achieve high sensitivity.

Second Embodiment

Figure 97:
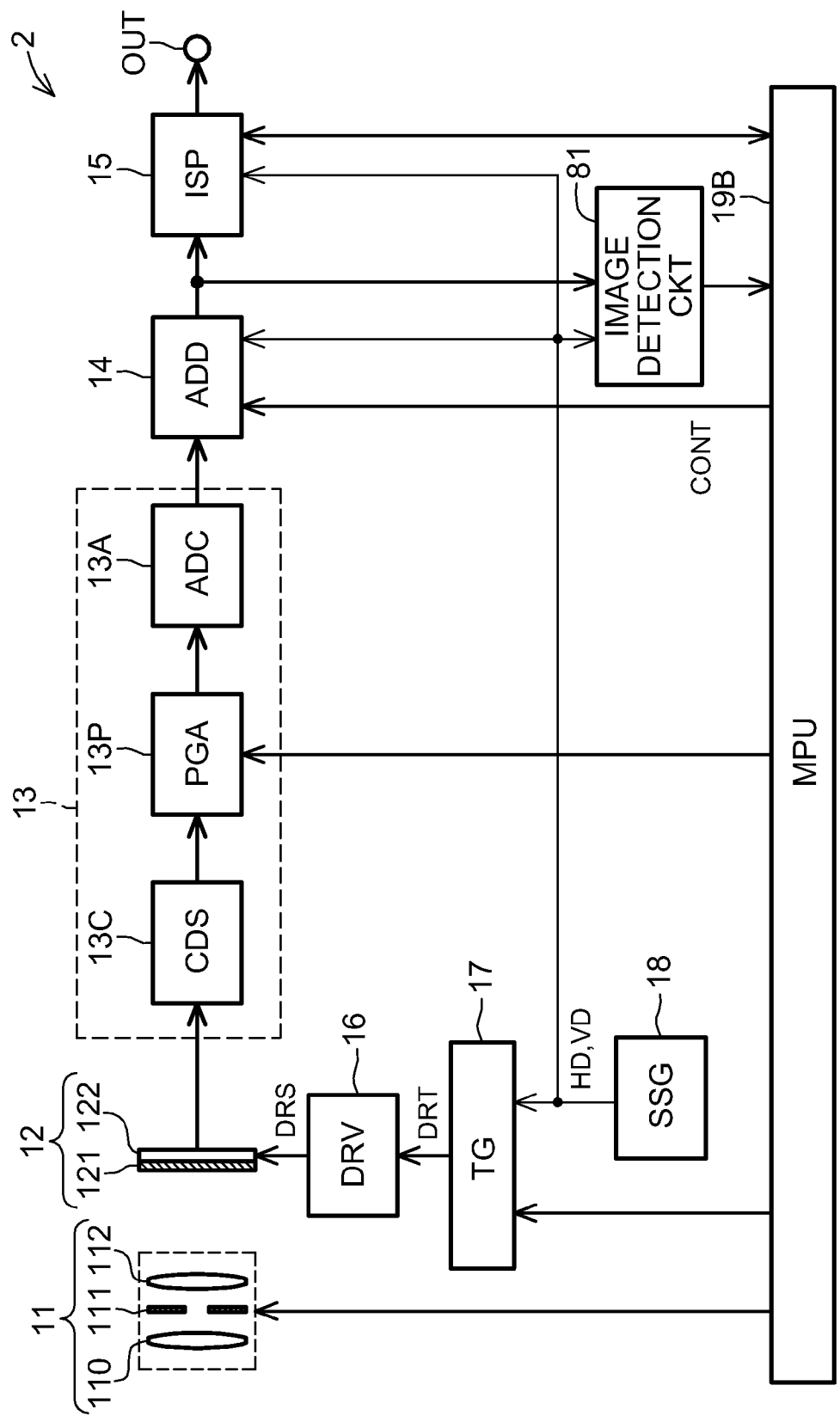
FIG. 97 is a block diagram showing the general structure of an imaging device according to a second embodiment of the invention.

FIG. 97 is a block diagram showing the general structure of the imaging device 2 in a second embodiment of the present invention. This imaging device 2 differs from the imaging device 1 in the first embodiment in having a different MPU 19B and an additional image detection circuit 81. The second embodiment has the same effects as the first embodiment.

The image detection circuit 81 operates in synchronization with the horizontal synchronization signal HD and vertical synchronization signal VD supplied from the synchronization signal generator 18 and detects the luminance level or 'speed' of the corrected image signal output by the pixel adding circuit 14. The image detection circuit 81 has, for example, an integration function and an average level detection function. The integration function calculates an integrated value Ep by adding up the corrected pixel values in an effective pixel region included in the output signal of the pixel adding circuit 14 over a given number of frames (a single frame, for example), in synchronization with the vertical scanning period. The average level detection function divides the integrated value Σp by the total number of effective pixels Np to obtain (detect) the average ASA speed level (=Σp/Np) represented by the signal amplitude. The integrated value Σp and the average ASA speed level are supplied to the MPU 19B. The image detection circuit 81 may extract a given spatial frequency component from the output signal of the pixel adding circuit 14 and integrate the extracted spatial frequency component to calculate the integrated value Σp and detect the average ASA speed level. If the total number of effective pixels Np is a power of two ($2^n$, n being an integer not less than 2), the average ASA speed level may be calculated (detected) by performing a shift operation on the bit string expressing the integrated value Σp.

The image detection circuit 81 also calculates a converted subject illumination value by working backward from the integrated value Σp and the exposure control parameters specified by the MPU 19B. The exposure control parameters include the f-stop value indicating the aperture opening of the diaphragm 111, the gain of the programmable gain amplifier 13P, the charge storage time of the CCD image sensor 12, and the sensitivity enhancement factor L. The converted subject illumination value LX can be calculated from the equation (1) given below:

$$LX = \Sigma p / (K \times Tc \times G \times L) \quad (1)$$

In this equation (1), K is a proportionality constant, Tc is the charge storage time of the CCD image sensor 12, G is the gain of the programmable gain amplifier 13P, and L is the sensitivity enhancement factor used by the pixel adding circuit 14.

In addition to the functions of the MPU 19 in the first embodiment, the MPU 19B in the second embodiment has the function of controlling the exposure control parameters in accordance with the output of the image detection circuit 81 to bring the image signal level to a target signal level. More specifically, the MPU 19B can control the f-stop value of the diaphragm 111 in the imaging optics 11 in accordance with the output of the image detection circuit 81. The timing generator 17 can control charge readout timings and flush timings from the photoelectric conversion devices in the CCD device 122 by supplying a drive timing signal DRT to the drive circuit 16. Therefore, the MPU 19B can control the charge storage time Tc (exposure time) of the CCD image sensor 12 by controlling the operation of the timing generator 17 in accordance with the output of the image detection circuit 81. In addition, the MPU 19B can separately control the gain G and the sensitivity enhancement factor L in accordance with the output of the image detection circuit 81.

The image signal processor 15 is operative to detect the noise level in the output of the pixel adding circuit 14 in synchronization with the vertical scanning period. The MPU 19B may also perform exposure control in accordance with the noise level supplied from the image signal processor 15. For example, the MPU 19B may control the variable coefficient setting circuit 495 in accordance with the noise level to optimize the filter coefficients of the spatial filters 41, 42, 43 and obtain a picture with reduced noise.

In the example described above, the average ASA speed level of the signal amplitude and the noise level are calculated in synchronization with the vertical scanning period. The calculation of the average ASA speed level and the noise level may, however, be performed only once every several vertical scanning periods, in consideration of the time required for signal processing in the image detection circuit 81 and image signal processor 15 and signal transmission from the image detection circuit 81 and image signal processor 15 to the MPU 19B.

The image detection circuit 81 may also be operative to detect the peak value and the average value of the output signal of the pixel adding circuit 14. By making use of the peak and average values detected by the image detection circuit 81, the MPU 19B can perform exposure control to improve the visibility of the subject image of interest. For example, in performing such exposure control, the MPU 19B may make use of the peak value to prevent highlights in the subject image from saturating to pure white, or may make use of the average value to allow medium gradation levels to be distinguished clearly even when highlights saturate to pure white.

An example of exposure control based on the output signal of the pixel adding circuit 14 will now be described. As described in detail below, the MPU 19B can perform sensitivity control as a part of exposure control by controlling the operation of the pixel adding circuit 14. Therefore, regardless of changes in the illumination conditions, a high-visibility image of the subject can be obtained, always under the optimum imaging conditions. The pixel adding circuit 14 can adjust the pixel signal amplitude by changing the sensitivity enhancement factor L in accordance with changes in the illumination conditions.

By carrying out automatic exposure control in accordance with the converted subject illumination value LX, the MPU 19B can hold the average ASA speed level detected by the image detection circuit 81 at a constant level. In a bright environment, if the raw pixel signal amplitudes are large and the converted subject illumination LX has a high value, the MPU 19B can reduce the amount of light striking the CCD image sensor 12 by reducing the aperture of the diaphragm 111 in the imaging optics 11, or reduce the exposure time (charge storage time Tc) by early flushing of the charge stored in the photoelectric conversion devices of the CCD image sensor 12, through an adjustment of flush timings by the timing generator 17.

In a dim environment, if the raw pixel signal amplitudes are small and the converted subject illumination LX has a low value, the MPU 19B can amplify the image signal by increasing the gain G of the programmable gain amplifier 13P. If the gain G is too high, however, the picture may become noisy and its visibility may become poor, so it is preferable to set an upper limit on the gain G.

The MPU 19B can also increase the exposure time (charge storage time Tc) by reducing the frequency of readout of the CCD image sensor 12, so that charge is read from the photoelectric conversion elements at intervals equal to a multiple of the vertical scanning period. An excessive exposure time may produce afterimages of moving subjects, however, lowering picture visibility, so an interpolation circuit should be provided to interpolate frames in vertical scanning periods for which there is no image signal.

The MPU 19B can set the sensitivity enhancement factor L for the pixel adding circuit 14 in the range from 1 to 12, as in the first embodiment, but in the second embodiment the sensitivity enhancement factor L and other exposure control parameters are set (adjusted) in accordance with the converted subject illumination value LX output by the image detection circuit 81. As described above, after generating corrected pixels by summing a plurality of mutually correlated pixels (12 pixels, for example) in a neighborhood of the pixel of interest, the addition circuit 24 multiplies the corrected pixel values by the sensitivity enhancement factor L. This sensitivity enhancement by a factor of L greatly improve the visibility of images captured even in very dim environments, with minimal or no reduction in frame rate, motion resolution, horizontal resolution, and vertical resolution.

Figure 98:
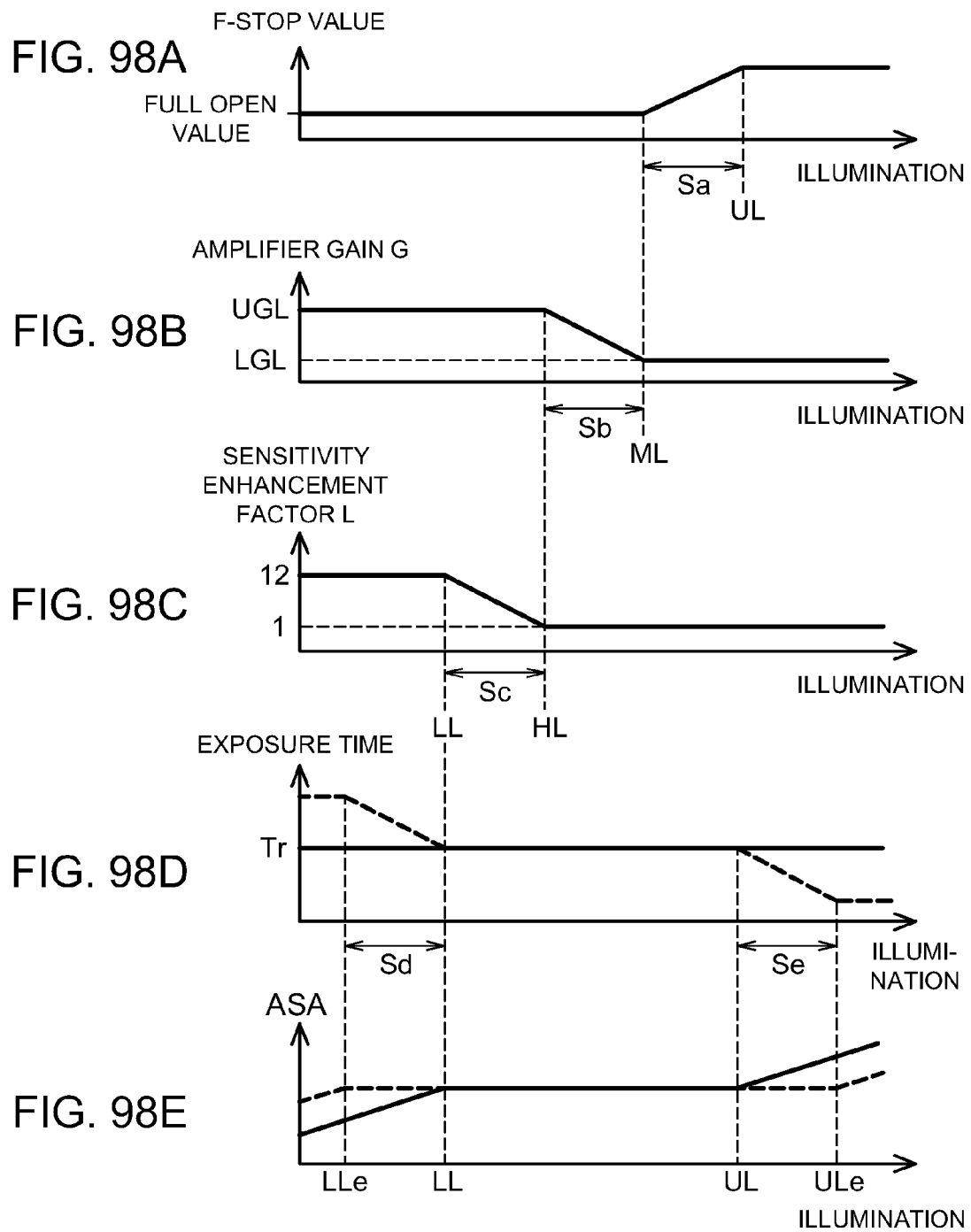
FIG. 98A is a graph showing a relation between illumination and f-stop value (aperture opening)
FIG. 98B is a graph showing a relation between illumination and amplifier gain.
FIG. 98C is a graph showing a relation between illumination and sensitivity enhancement.
FIG. 98D is a graph showing a relation between illumination and exposure time.
FIG. 98E is a graph showing a relation between illumination and average ASA speed level.

An exemplary procedure for performing exposure control (sensitivity control) as the converted subject illumination value LX (illumination LX) changes will be described with reference to the graphs in FIGS. 98A to 98E. FIGS. 98A to 98D show relations between illumination LX and exposure control parameters. FIG. 98A shows the relation between illumination LX and f-stop value (aperture opening). FIG. 98B shows the relation between illumination LX and amplifier gain G. FIG. 98C shows the relation between illumination LX and the sensitivity enhancement factor L. FIG. 98D shows the relation between illumination LX and exposure time. FIG. 98E shows the relation between illumination LX and average ASA speed level. The sensitivity enhancement factor L can be specified in the range from 1 to 12.

The illumination level that brings the output value of the pixel adding circuit 14 to a given level when the diaphragm 111 is fully open, the gain G is at its upper limit value UGL, the sensitivity enhancement factor L is at its lowest value (1), and the standard exposure time Tr indicated by the solid line in FIG. 98D is maintained is defined as a high illumination reference value HL. A low illumination reference value LL is defined as one twelfth of the high illumination reference value HL. The low illumination reference value LL is the illumination level that brings the output value of the pixel adding circuit 14 to the given level when the diaphragm 111 is fully open, the gain G is at its upper limit value UGL, the sensitivity enhancement factor L is 12, and the standard exposure time Tr is maintained.

When an image is captured under high illumination conditions, causing the illumination LX to exceed a threshold UL, the MPU 19B sets the maximum possible f-stop value (minimum diaphragm opening), sets the gain G at its lower limit LGL, and sets the sensitivity enhancement factor L to 1, as shown in FIGS. 98A, 98B, and 98C. The standard exposure time Tr is maintained, as indicated by the solid line in FIG. 98D. When the illumination LX is in a range Sa below this threshold UL and above a threshold ML, the f-stop value is reduced continuously or in steps from the maximum f-value to the fully open value as the illumination LX decreases from threshold UL to threshold ML. The exposure time remains constant. The gain G is held at its lower limit LGL, and the sensitivity enhancement factor is held at 1. These adjustments keep the average ASA speed level at a virtually constant target level when the illumination LX is within range Sa, as shown in FIG. 98E.

When the illumination LX is in a range Sb below threshold ML and above the high reference value HL, the f-stop value is held at the fully open value and the sensitivity enhancement factor L is held at 1, as shown in FIGS. 98A and 98C. As the illumination changes from threshold ML to the high reference value HL, the gain G is increased from the lower limit LGL to the upper limit UGL continuously or in steps, as shown in FIG. 98B. The exposure time is held constant. These adjustments keep the average ASA speed level virtually constant at the target level when the illumination LX is in range Sb, as shown in FIG. 98E.

When the illumination LX is in a range Sc below the high reference value HL and above the low reference value LL, the f-stop value is held at the fully open value and the gain G is held at its upper limit UGL, as shown in FIGS. 98A and 98B. As the illumination decreases from the high reference value HL to the low reference value LL, the sensitivity enhancement factor L is increased from 1 to 12 continuously or in steps, as shown in FIG. 98C. The exposure time remains constant. These adjustments keep the average ASA speed level virtually constant at the target level when illumination LX is in range Sc, as shown in FIG. 98E. When the illumination LX is lower than the low reference value LL, the f-stop value is held at the fully open value, the gain G is held at its upper limit UGL, the sensitivity enhancement factor L is held at 12, and the exposure time is held constant at the Tr value, as shown in FIGS. 98A and 98D.

The relations in FIGS. 98A to 98D may be implemented by a table of settings (lookup table) held in a memory (not shown) or by an operation circuit that calculates the exposure control parameters by use of mathematical functions such as linear functions. The relations in FIGS. 98A to 98D enable the MPU 19B to hold the average ASA speed level of the signal amplitude to a desired target value.

For example, as the illumination LX gradually decreases, lowering the detected average ASA speed level of the signal amplitude, the MPU 19B first opens the diaphragm 111 in the imaging optics 11 (range Sa in FIG. 98A) to keep the signal amplitude at a constant average ASA speed level. After the diaphragm 111 in the imaging optics 11 is fully open, the MPU 19B increases the gain G of the programmable gain amplifier 13P (range Sb in FIG. 98B) to maintain the constant average ASA speed level of the signal amplitude. After the gain G of the programmable gain amplifier 13P reaches its upper limit UGL, the MPU 19B increases the sensitivity enhancement factor L of the pixel adding circuit 14 (range Sc in FIG. 98C) to maintain the constant average ASA speed level of the signal amplitude.

The average ASA speed level can be maintained by adjusting the sensitivity enhancement factor L until its maximum value of 12 is reached. If the illumination LX continues to decrease after the sensitivity enhancement factor L reaches the maximum value of 12, the average ASA speed level starts decreasing as indicated by the solid line in FIG. 98E.

When the illumination LX gradually increases from a low level, increasing the detected average ASA speed level of the signal amplitude, at the point where the illumination LX exceeds the lower reference value LL, the sensitivity enhancement factor L in the pixel adding circuit 14 is reduced (range Sc in FIG. 98C) to keep the ASA speed level of the signal amplitude at a constant value. After the sensitivity enhancement factor L has been reduced to 1, the MPU 19B decreases the gain G of the programmable gain amplifier 13P to maintain the constant average ASA speed level of the signal amplitude. After the gain G of the programmable gain amplifier 13P has been decreased (in range Sb in FIG. 98B) to its lower limit LGL, the diaphragm 111 in the imaging optics 11 is stopped down (in range Sa in FIG. 98A) to maintain the constant average ASA speed level of the signal amplitude. If the illumination LX increases further, the average ASA speed level increases as shown in FIG. 98E.

With this type of exposure control, a constant average ASA speed level of the signal amplitude can be maintained over the illumination range from the lower reference value LL to threshold UL (UL>LL), as indicated by the solid line in FIG. 98E.

A constant exposure time is maintained throughout the exposure control procedure described above, as indicated by the solid line in FIG. 98D. However, variable exposure time control may be performed in accordance with the illumination LX. When the sensitivity enhancement factor L has been increased to the maximum value of 12, if the illumination LX decreases further and a sufficient average ASA speed level cannot be obtained, then in an illumination range Sd lower than the low reference value LL and higher than a threshold LLe, the MPU 19B may increase the exposure time as indicated by the dashed line in FIG. 98D. Conversely, when the diaphragm 111 has been stopped down to its minimum aperture (maximum f-stop value), if the illumination LX increases further and the average ASA speed level becomes too large, then in an illumination range Se higher than threshold UL and lower than a threshold ULe, the MPU 19B may decrease the exposure time, as indicated by the dashed line in FIG. 98D. With this type of exposure time control, a constant average ASA speed level of the signal amplitude can be maintained in the illumination range from threshold LLe to threshold ULe, as indicated the dashed line in FIG. 98E.

The upper limit UGL of the gain G can be set to an appropriate value in accordance with the noise level detected by the image signal processor 15. The gain G may have to be increased when the illumination LX decreases, decreasing the S/N ratio of the output of the CCD image sensor 12. More specifically, the value of the gain G of the programmable gain amplifier 13P at which the ratio of the detected noise level to the detected average ASA speed level reaches a maximum allowable limit (first noise ratio) may be specified as the upper limit UGL. The first noise ratio may be set to 1/50, for example.

The detected noise level is calculated by filtering the output of the pixel adding circuit 14 to extract the noise component and dividing the total sum of the absolute values of the noise component in the entire effective pixel range by the total number of effective pixels. In the filtering process, the noise component can be extracted from the output signal of the pixel adding circuit 14 by first reducing the noise component in the output signal of the pixel adding circuit 14 to generate a noise reduced signal and then subtracting the noise reduced signal from the output signal of the pixel adding circuit 14.

The allowable noise level of the subject image depends on the purpose for which it is used, and the first noise ratio is determined by the purpose for which the imaging device 2 is used: for example, on whether greatest importance is attached to the S/N ratio, the image resolution, or some other factor. The MPU 19B may control the programmable gain amplifier 13P and the pixel adding circuit 14 by determining the upper limit UGL of the gain G dynamically while monitoring the gain G specified for the programmable gain amplifier 13P and the detected noise level supplied from the image signal processor 15 to the MPU 19B.

Alternatively, the value of the gain G when the ratio of the detected noise level to the detected average ASA speed level reaches the first noise ratio may be measured, and the measured value may be factory-written into a memory (not shown) in the imaging device 2 in such a form that it can be referenced as the upper limit UGL. The MPU 19B can then refer to and use the upper limit UGL stored in the memory. The memory into which the upper limit UGL is written should be a non-volatile memory or a battery-backed memory that can retain stored data even while the imaging device 2 is powered down.

The lower limit LGL of the gain G can also be set to an appropriate value in accordance with the noise level detected by the image signal processor 15. More specifically, the value of the gain G of the programmable gain amplifier 13P at which the ratio of the detected noise level to the detected average ASA speed level falls below a certain ratio (second noise ratio) can be specified as the lower limit LGL. The second noise ratio can be determined from the first noise ratio (1/50, for example) and the specified sensitivity enhancement factor L (12, for example). The second noise ratio can be set to 1/600 ($=\{(1/50)\times(1/12)\}$), for example.

The allowable noise level of the subject image depends on the purpose for which it is used, and the second noise ratio is determined by the purpose for which the imaging device 2 is used: for example, on whether greatest importance is attached to the S/N ratio, the image resolution, or another factor. The MPU 19B may control the programmable gain amplifier 13P and the pixel adding circuit 14 by determining the lower limit LGL of the gain G dynamically while monitoring the gain G specified for the programmable gain amplifier 13P and the detected noise level supplied from the image signal processor 15 to the MPU 19B.

Alternatively, the value of the gain G when the ratio of the detected noise level to the detected average ASA speed level reaches the second noise ratio may be measured, and the measured value may be factory-written into a memory (not shown) in the imaging device 2 in such a form that the value can be referenced as the lower limit LGL. The MPU 19B can then refer to and use the lower limit LGL stored in the memory. The memory into which the lower limit LGL is written should be a non-volatile memory or a battery-backed memory that can retain stored data even while the imaging device 2 is powered down.

Since the MPU 19B in the second embodiment can set exposure control parameters (the f-stop value of the diaphragm 111, gain G, charge storage time Tc, and sensitivity enhancement factor L) dynamically in accordance with the output signal of the pixel adding circuit 14 as described above, an image signal that produces a picture of high visibility can be generated regardless of changes in the imaging environment. For example, the MPU 19B can set exposure control parameters dynamically in accordance with the subject illumination LX and the detected average ASA speed level supplied from the image detection circuit 81. Since the pixel adding circuit 14 achieves improved sensitivity and improved S/N ratio while minimizing the loss of image resolution, automatic exposure control can be performed properly in accordance with the output signal of the pixel adding circuit 14.

The pixel adding circuit 14 is also operative to enhance sensitivity by using the sensitivity enhancement factor L (as a multiplication factor) in the process of pixel addition. The MPU 19B can set the sensitivity enhancement factor L, as well as the f-stop value, gain G, and charge storage time Tc, dynamically in accordance with changes in the imaging environment. The imaging device 2 can therefore fine-control the exposure conditions seamlessly as the imaging environment changes, and generate pictures with good visibility and without sudden changes in brightness or other image quality defects. The sensitivity enhancement factor L can be set to fractional values with digits to the right of the decimal place, enabling very fine exposure control.

As shown in FIGS. 98A to 98E, since the MPU 19B controls exposure control parameters, including the sensitivity enhancement factor L, in accordance with the converted subject illumination value LX output from the image detection circuit 81, exposure control can be properly performed under low illumination conditions. Images with high visibility and optimum brightness can be output by controlling the f-stop value, the gain G, the sensitivity enhancement factor L, and the exposure time in that order.

Third Embodiment

Figure 99:
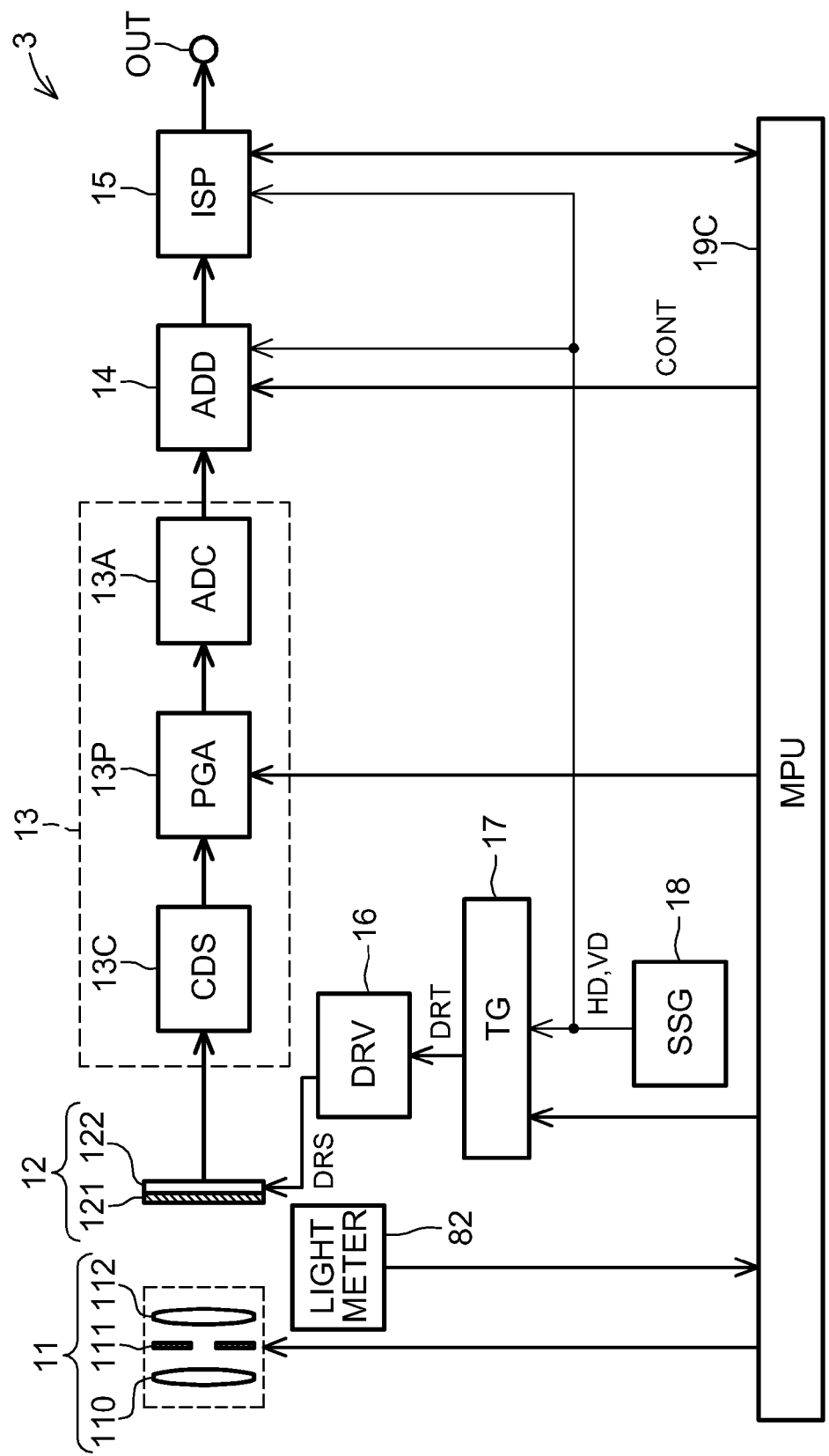
FIG. 99 is a block diagram showing the general structure of an imaging device according to a third embodiment of the invention.

FIG. 99 is a block diagram showing the general structure of the imaging device 3 in a third embodiment of the present invention. This imaging device 3 differs from the imaging device 1 in the first embodiment in having a different MPU 19C and an additional light meter 82. The third embodiment has the same effects as the first embodiment.

The light meter 82 is operative to detect the subject illumination by measuring light striking the imaging surface of the CCD image sensor 12 or the imaging optics 11. The light meter 82 has an illumination sensor (not shown) that is mounted in a position determined with reference to the optical axis of the imaging optics 11.

In addition to the functions of the MPU 19 in the first embodiment, the MPU 19C has the function of controlling the exposure control parameters in accordance with the detected subject illumination value supplied from the light meter 82. More specifically, the MPU 19C can control the f-stop value of the diaphragm 111 in the imaging optics 11, the gain G, and the sensitivity enhancement factor L separately in accordance with the illumination value. The MPU 19C can also control the charge storage time Tc (exposure time) of the CCD image sensor 12 by controlling the operation of the timing generator 17 in accordance with the illumination value. Like the MPU 19B in the second embodiment, the MPU 19C can also perform exposure control in accordance with a noise level value supplied from the image signal processor 15.

The MPU 19C obtains the values of the exposure control parameters (f-stop value of the diaphragm 111, gain G, charge storage time Tc, and sensitivity enhancement factor L) in relation to the illumination value by use of a table of settings held in a memory (not shown) or by use of an operation circuit, and performs exposure control accordingly. The table of settings is a lookup table in which the relations between the exposure control parameters and a plurality of illumination values are recorded.

The setting table may record the relations shown in FIGS. 98A to 98D, for example. In that case, when the illumination is within range Sa, the MPU 19C can set the exposure time of the CCD image sensor 12 to the standard exposure time Tr based on the frame rate, the gain G of the programmable gain amplifier 13P to the lower limit LGL, and the sensitivity enhancement factor L of the pixel adding circuit 14 to unity. Then, as the illumination increases gradually, the MPU 19C raises the f-stop value continuously or in steps in accordance with the relation shown in FIG. 98A. If the illumination increases further after the f-stop value reaches its upper limit (in range Se in FIG. 98D), the MPU 19C may decrease the exposure time of the CCD image sensor 12 from the standard exposure time Tr, as indicated by the dotted line in FIG. 98D.

As the illumination value decreases gradually in range Sa, the MPU 19C decreases the f-stop value continuously or in steps in accordance with the relation in FIG. 98A. If the illumination decreases further after the f-stop value reaches the fully open value, the MPU 19C increases the gain G of the programmable gain amplifier 13P from its lower limit LGL to a higher value (range Sb in FIG. 98B). If the illumination decreases further after the gain G reaches its upper limit UGL, the MPU 19C increases the sensitivity enhancement factor L from 1 to a higher value (range Sc in FIG. 98C). If the illumination decreases further after the sensitivity enhancement factor L reaches 12 (its upper limit), the MPU 19C increases the exposure time from the standard exposure time Tr to a higher value (range Sd in FIG. 98D), as indicated by the dotted line in FIG. 98D.

With this type of exposure control, a constant average ASA speed level of the signal amplitude can be maintained over the illumination range from LLe to ULe in FIG. 98E.

In the third embodiment, since the MPU 19C can set the exposure control parameters (f-stop value of the diaphragm 111, gain G, charge storage time Tc, and sensitivity enhancement factor L) dynamically in accordance with the measured illumination value, an image signal that produces a picture of high visibility can be generated regardless of changes in the imaging environment. Even under low illumination conditions, automatic exposure control can be performed properly in accordance with the output signal of the pixel adding circuit 14. The sensitivity enhancement factor L can be set to fractional values with digits to the right of the decimal place, enabling very fine exposure control.

As in the second embodiment, the MPU 19C can set the sensitivity enhancement factor L, as well as the f-stop value, gain G, and charge storage time Tc, dynamically in accordance with changes in the imaging environment. The imaging device 3 can therefore fine-control the exposure conditions seamlessly as the imaging environment changes. By controlling the f-stop value, gain G, sensitivity enhancement factor L, and exposure time in turn, the imaging device 3 can generate a video signal that produces a picture with good visibility and optimum brightness.

In the second and third embodiments, the exposure time is increased only if there is insufficient signal amplitude at the maximum sensitivity enhancement factor L. This strategy is used to maintain a constant frame rate. If resolution is more important than the frame rate, the exposure time may be increased before the sensitivity enhancement factor L. If the signal amplitude is insufficient after the exposure time reaches a certain level, the sensitivity enhancement factor L may be increased. Alternatively, the sensitivity enhancement factor L and the exposure time may both be increased in parallel.

Variations

Figure 100:
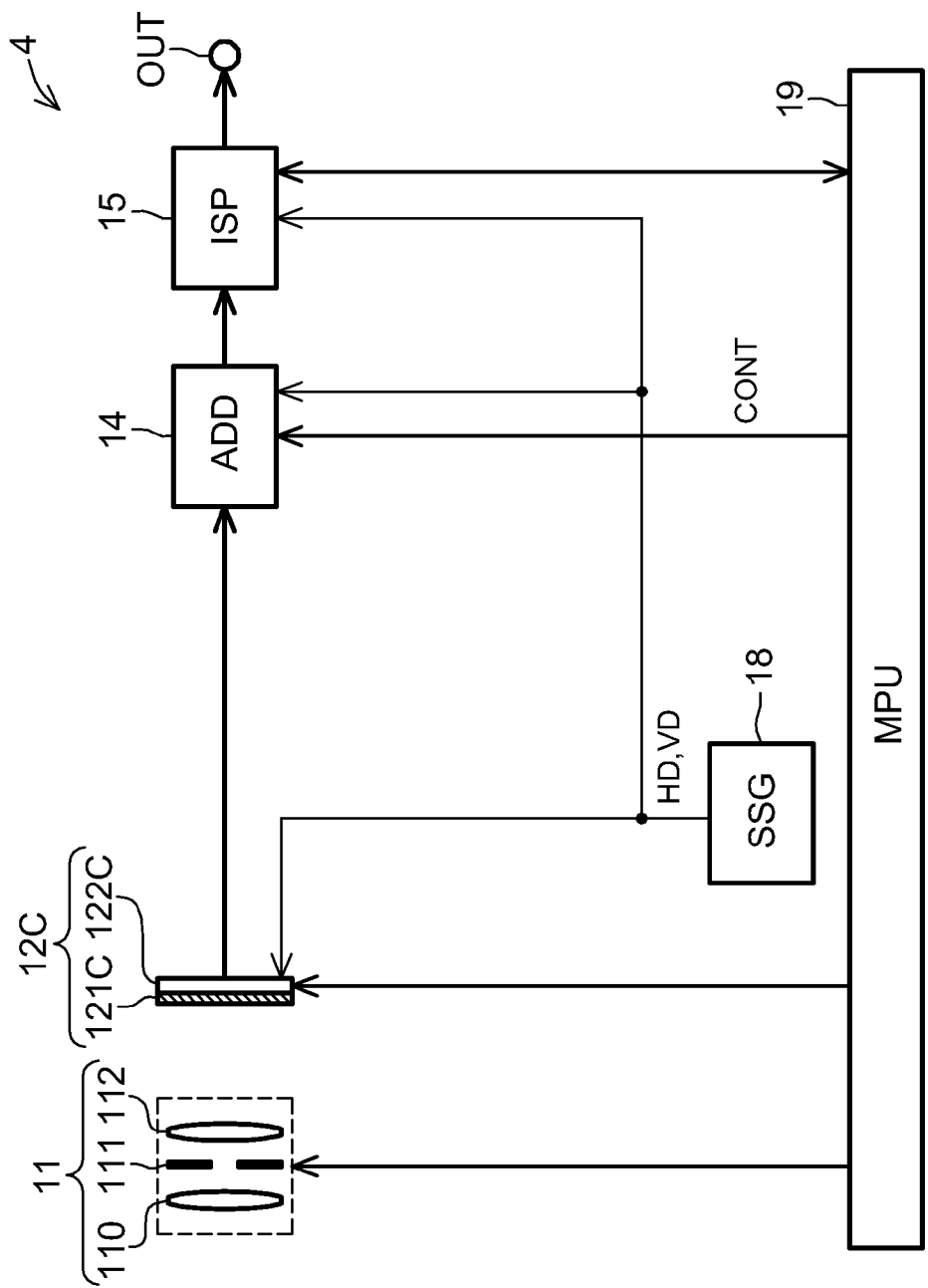
FIG. 100 is a block diagram showing the general structure of an imaging device according to a variation of the first embodiment of the invention.

Embodiments of the present invention have been described above with reference to FIGS. 1-99, but the invention can be implemented in other forms. For example, the embodiments above employ a CCD image sensor 12 as a solid state imager. This CCD image sensor 12 may be an interline transfer CCD imager, a frame-transfer CCD imager, or a frame interline transfer CCD imager, but as another alternative, a CMOS image sensor or any other type of two-dimensional image sensor may be used as the solid state imager. To take just one example, the block diagram in FIG. 100 illustrates an imaging device 4 in which a CMOS image sensor 12C replaces the CCD image sensor 12 and front end section 13 of the first embodiment.

The pixel adding circuit 14 in the embodiments above may process only the pixels in the effective pixel range of the input image signal, or may process both these pixels and pixels outside the effective pixel range. For example, when the pixel of interest is on an edge of the effective pixel range, if an addition pattern extends outside the effective pixel range, the pixel adding circuit 14 may select pixels from outside the effective range. If such pixels are unavailable, they may be replaced with pixels selected from within the effective pixel range.

The pixel adding circuit 14 may be implemented in hardware, e.g., in an integrated circuit chip such as a field programmable gate array (FPGA) or an application specific integrated circuit (ASIC).

Figure 101:
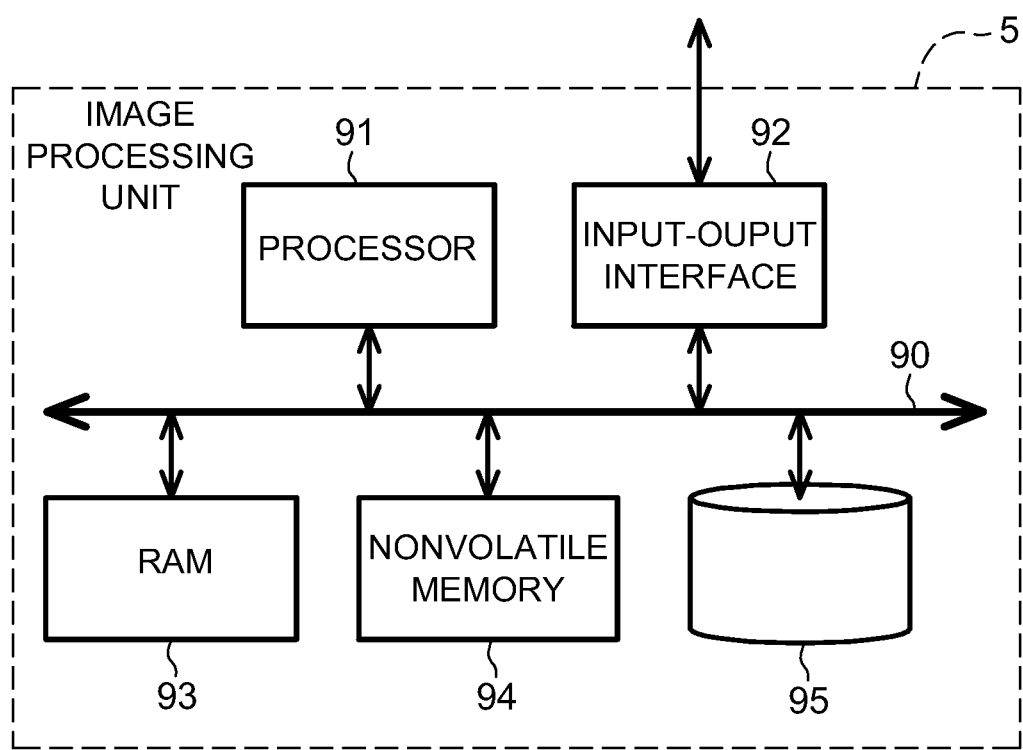
FIG. 101 shows the schematic structure of the image processing unit.

Alternatively, some or all of the functions of the pixel adding circuit 14 may be implemented in software, as programs executed by a microprocessor. FIG. 101 shows the schematic structure of an image processing unit 5 in which the pixel adding circuit 14 is implemented partly or entirely by software programs. The image processing unit 5 in FIG. 101 has a bus 90, a processor 91 including a central processing unit (CPU), an input-output interface 92, a RAM 93, a nonvolatile memory 94, and a recording medium 95. The recording medium 95 may be, for example, a hard disk drive, an optical disc, or a flash memory. The processor 91 can implement the functions of the pixel adding circuit 14 by loading corresponding software programs from the nonvolatile memory 94 or recording medium 95 and executing them.

The imaging devices 1 to 4 described above may form part of a surveillance camera or a camera mounted on a car. In a surveillance camera, which is likely to be used for imaging of comparatively dark locations, the imaging devices 1 to 4 can operate with high sensitivity and achieve high visibility despite the darkness. Furthermore, with the increasing numbers of pixels in recent solid-state imagers, pixel size and the amount of light incident per pixel have been reduced to the point where low sensitivity has become a problem. The above imaging devices 1 to 4 can solve this problem.

Those skilled in the art will recognize that further variations are possible within the scope of the invention, which is defined in the appended claims.

What is claimed is:

1. An image processing device for processing a plurality of frame images which are temporally consecutive images, each frame image including pixels, the image processing device comprising:
an in-plane pattern detector for selecting a pixel of interest from among the pixels in a frame image of interest among the plurality of frame images, calculating, for each of a plurality of in-plane patterns including the pixel of interest, an in-plane correlation index value representing correlation with the pixel of interest, and selecting, as an in-plane pixel addition pattern, on a basis of the calculated in-plane correlation index values, one in-plane pattern among the plurality of in-plane patterns that is most highly correlated with the pixel of interest;
a reference pattern detector for identifying a reference pixel of interest, corresponding to the pixel of interest, in at least one reference frame image temporally adjacent to the frame image of interest, calculating, for each of a plurality of reference pixel patterns including the reference pixel of interest, at least one neighboring pixel neighboring the reference pixel of interest, or both the reference pixel of interest and at least one neighboring pixel neighboring the reference pixel of interest, an inter-plane correlation index value representing correlation with the in-plane pixel addition pattern, and selecting, as a reference pixel addition pattern, on a basis of the calculated inter-plane correlation index values, at least one reference pixel pattern among the plurality of reference pixel patterns that is most highly correlated with the in-plane pixel addition pattern; and
a pixel adder for adding values of the pixels included in the in-plane pixel addition pattern and the at least one reference pixel addition pattern to generate a corrected pixel.

2. The image processing device of claim 1, wherein each of the in-plane pixel patterns includes the pixel of interest and neighboring pixels neighboring the pixel of interest, and the in-plane pattern detector further comprises:
an operation unit for detecting, in each in-plane pixel pattern in the plurality of the in-plane pixel patterns, from among pixel values of the pixels constituting the in-plane pixel pattern, a maximum pixel value and a minimum pixel value, calculating the in-plane correlation index value as a difference between the maximum pixel value and the minimum pixel value, and selecting an in-plane pattern with a smallest in-plane correlation index value as the in-plane pixel addition pattern; and
a pixel designation unit for providing the pixel adder with information indicating pixel positions in the in-plane pixel addition pattern.

3. The image processing device of claim 1, wherein the reference pattern detector further comprises:
an operation unit for detecting, in each reference pixel pattern in the plurality of reference pixel patterns, from among pixel values of the pixels constituting the reference pixel pattern, a maximum pixel value and a minimum pixel value, calculating the inter-plane correlation index value as a difference between the maximum pixel value and the minimum pixel value, and selecting a reference pixel pattern with a smallest inter-plane correlation index value as the reference pixel addition pattern; and
a pixel designation unit for providing the pixel adder with information indicating pixel positions in the reference pixel addition pattern.

4. The image processing device of claim 1, further comprising:
a first delay circuit for delaying the image signal and outputting, in parallel, signals of a plurality of pixels in a first local pixel region centered on the pixel of interest in the frame image of interest; and
a second delay circuit for delaying the image signal and outputting, in parallel, signals of a plurality of pixels in a second local pixel region centered on the reference pixel of interest in the reference frame image; wherein the pixel adder includes an in-plane pixel selector for selecting pixels constituting the in-plane pixel addition pattern from among the signals of the plurality of pixels in the first local pixel region output by the first delay circuit;

a reference pixel selector for selecting pixels constituting the at least one reference pixel addition pattern from among the signals of the plurality of pixels in the second local pixel region output by the second delay circuit; and an addition operation unit for adding values of the pixels selected by the in-plane pixel selector and the pixels selected by the reference pixel selector.

5. The image processing device of claim 1, wherein:

the at least one reference frame image includes a forward reference frame image temporally preceding the frame image of interest and a backward reference frame image temporally following the frame image of interest;

the plurality of reference pixel patterns includes a plurality of forward reference pixel patterns disposed in the forward reference frame image and a plurality of backward reference pixel patterns disposed in the backward reference frame image;

the inter-plane correlation index values include first inter-plane correlation index values representing correlations of the forward reference pixel patterns with the in-plane pixel addition pattern and second inter-plane correlation index values representing correlations of the backward reference pixel patterns with the in-plane pixel addition pattern; and the reference pattern detector selects, as the at least one reference pixel addition pattern, a forward reference pattern most highly correlated with the in-plane pixel addition pattern according to the first inter-plane correlation index values and a backward reference pattern most highly correlated with the in-plane pixel addition pattern according to the second inter-plane correlation index values.

6. The image processing device of claim 1, wherein the pixel adder multiplies a value obtained by adding the values of the pixels included in the in-plane pixel addition pattern and the pixels included in the at least one reference pixel addition pattern by a sensitivity enhancement factor to generate the corrected pixel.

7. An imaging device comprising:
the image processing device of claim 1; and
an imaging element that outputs the plurality of frame images.

8. The imaging device of claim 7, wherein the imaging element includes:

a color filter array having N types of color filters, that transmit light of colors in N mutually differing wavelength regions, arrayed in a periodic manner in a plane, where N is an integer equal to or greater than two; and an imaging surface for detecting an optical image that has passed through the color filter array; and wherein each of the pixels constituting the plurality of frame images has one color, corresponding to one of the N wavelength regions;

the in-plane pattern detector selects, as the plurality of in-plane pixel patterns, patterns of pixels in the frame image of interest that are identical in color to the pixel of interest; and the reference pattern detector selects, as the plurality of reference pixel patterns, patterns of pixels in the at least one reference frame that are identical in color to the pixel of interest.

9. The imaging device of claim 8, wherein the color filter array is a Bayer array.

10. The imaging device of claim 7, wherein the pixel adder multiplies a sum of the values of the pixels included in the in-plane pixel addition pattern and the pixels included in the at least one reference pixel addition pattern by a sensitivity enhancement factor to generate the corrected pixel.

11. The imaging device of claim 10, further comprising:
a diaphragm disposed in front of the imaging element;
a signal amplifier for amplifying the image signal output from the imaging element; and
a control unit for setting the sensitivity enhancement factor; wherein
the control unit also sets at least one of an aperture opening of the diaphragm, a gain of the signal amplifier, and an exposure time of the imaging element according to an output of the pixel adder.

12. The imaging device of claim 11, wherein the control unit calculates a converted subject illumination value from said gain, said exposure time, and a signal amplitude of the output of the pixel adder, and sets said at least one of said aperture opening, said gain, and said exposure time according to the converted subject illumination value.

13. The imaging device of claim 11, further comprising a light meter for detecting subject illumination by measuring light in an optical image incident on the imaging element, wherein the control unit sets the sensitivity enhancement factor according to a value of the detected subject illumination.

14. An image processing method for processing a plurality of frame images which are temporally consecutive images, each frame image including pixels, the image processing method comprising:

selecting a pixel of interest from among the pixels in a frame image of interest among the plurality of frame images and calculating, for each of a plurality of in-plane patterns including the pixel of interest, an in-plane correlation index value representing correlation with the pixel of interest;

selecting, as an in-plane pixel addition pattern, on a basis of the calculated in-plane correlation index values, one in-plane pattern among the plurality of in-plane patterns that is most highly correlated with the pixel of interest;

identifying a reference pixel of interest, corresponding to the pixel of interest, in at least one reference frame image temporally adjacent to the frame image of interest, and calculating, for each of a plurality of reference pixel patterns including the reference pixel of interest, at least one neighboring pixel neighboring the reference pixel of interest, or both the reference pixel of interest and at least one neighboring pixel neighboring the reference pixel of interest, an inter-plane correlation index value representing correlation with the in-plane pixel addition pattern;

selecting, as a reference pixel addition pattern, on a basis of the calculated inter-plane correlation index values, at least one reference pixel pattern among the plurality of reference pixel patterns that is most highly correlated with the in-plane pixel addition pattern; and adding values of the pixels included in the in-plane pixel addition pattern and the at least one reference pixel addition pattern to generate a corrected pixel.

15. The image processing method of claim 14, wherein each of the in-plane pixel patterns includes the pixel of interest and neighboring pixels neighboring the pixel of interest, and wherein calculating, for each of the in-plane patterns, an in-plane correlation index value further comprises:

detecting, in each in-plane pixel pattern in the plurality of the in-plane pixel patterns, from among pixel values of the pixels constituting the in-plane pixel pattern, a maximum pixel value and a minimum pixel value; and calculating the in-plane correlation index value as a difference between the maximum pixel value and the minimum pixel value;

an in-plane pattern with a smallest in-plane correlation index value being selected as the in-plane pixel addition pattern.

16. The image processing method of claim 14, wherein calculating, for each of a plurality of reference pixel patterns, an inter-plane correlation index value further comprises:

detecting, in each reference pixel pattern in the plurality of reference pixel patterns, from among pixel values of the pixels constituting the reference pixel pattern, a maximum pixel value and a minimum pixel value; and calculating the inter-plane correlation index value as a difference between the maximum pixel value and the minimum pixel value;

a reference pixel pattern with a smallest inter-plane correlation index value being selected as the reference pixel addition pattern.

17. The image processing method of claim 14, wherein the frame signal is output from an imaging element including:

a color filter array having N types of color filters, that transmit light of colors in N mutually differing wavelength regions, arrayed in a periodic manner in a plane, where N is an integer equal to or greater than two; and an imaging surface for detecting an optical image that has passed through the color filter array; and wherein each of the pixels constituting the plurality of frame images has one color, corresponding to one of the N wavelength regions;

patterns of pixels in the frame image of interest that are identical in color to the pixel of interest are selected as the plurality of in-plane pixel patterns; and patterns of pixels in the at least one reference frame that are identical in color to the pixel of interest are selected as the plurality of reference pixel patterns.

* * * * *